(12) United States Patent
Chung

(10) Patent No.: US 11,368,562 B2
(45) Date of Patent: Jun. 21, 2022

(54) ELECTRONIC DEVICE AND METHOD FOR SENDING ELECTRONIC DATA

(71) Applicant: Kuo-Chen Chung, New Taipei (TW)

(72) Inventor: Kuo-Chen Chung, New Taipei (TW)

( * ) Notice: Subject to any disclaimer, the term of this patent is extended or adjusted under 35 U.S.C. 154(b) by 27 days.

(21) Appl. No.: 16/960,662

(22) PCT Filed: Jan. 30, 2019

(86) PCT No.: PCT/CN2019/073844
§ 371 (c)(1),
(2) Date: Jul. 8, 2020

(87) PCT Pub. No.: WO2019/149209
PCT Pub. Date: Aug. 8, 2019

(65) Prior Publication Data
US 2020/0412845 A1    Dec. 31, 2020

(30) Foreign Application Priority Data

Feb. 2, 2018   (CN) .......................... 201810104795.9
Jan. 25, 2019  (CN) .......................... 201910071148.7

(51) Int. Cl.
*H04L 69/18*     (2022.01)
*H04L 51/56*     (2022.01)

(52) U.S. Cl.
CPC .............. *H04L 69/18* (2013.01); *H04L 51/36* (2013.01)

(58) Field of Classification Search
CPC ................................. H04L 69/18; H04L 51/36
See application file for complete search history.

(56) References Cited

U.S. PATENT DOCUMENTS 8,472,989 B2 * 6/2013 Klassen .................. H04W 4/12
                                                        455/466
9,307,371 B2    4/2016 Sureka
(Continued)

FOREIGN PATENT DOCUMENTS

CN      1665239 A  *  9/2005
CN      1665239 A     9/2005
(Continued)

OTHER PUBLICATIONS

Written Opinion issued in corresponding International Patent Application No. PCT/CN2019/073844 dated Apr. 22, 2019, consisting of 4 pp.
(Continued)

*Primary Examiner* — Benjamin M Thieu
(74) *Attorney, Agent, or Firm* — Volpe Koenig

(57) ABSTRACT

An electronic device for sending electronic data includes an electricity-using target, a storage unit and a processing unit. The storage unit stores a first communication target identifier used to identify a first communication target under a first specific application communication protocol, and a second communication target identifier used to identify a second communication target under a second specific application communication protocol being different from the first specific application communication protocol. The processing unit accesses the first and the second communication target identifiers by means of the electricity-using target, sends the electronic data toward the first communication target based on the accessed first communication target identifier and the first specific application communication protocol, and sends the electronic data toward the second communication target based on the accessed second communication target identifier and the second specific application communication protocol.

20 Claims, 57 Drawing Sheets

(56) References Cited

U.S. PATENT DOCUMENTS

| | | | |
|---|---|---|---|
| 2002/0087704 A1* | 7/2002 | Chesnais | .............. H04L 69/329 |
| | | | 709/228 |
| 2005/0009541 A1 | 1/2005 | Ye | |
| 2008/0008184 A1 | 1/2008 | Hayashi | |
| 2009/0061825 A1 | 3/2009 | Neelakantan | |
| 2009/0073969 A1 | 3/2009 | Gobara | |
| 2010/0279733 A1* | 11/2010 | Karsten | ................. H04L 69/16 |
| | | | 455/552.1 |
| 2015/0081812 A1 | 3/2015 | Davies | |
| 2017/0201485 A1* | 7/2017 | Kim | ....................... H04W 4/12 |

FOREIGN PATENT DOCUMENTS

| | | |
|---|---|---|
| CN | 104144118 A | 11/2014 |
| WO | 00/23876 A1 | 4/2000 |

OTHER PUBLICATIONS

International Search Report issued in corresponding International Patent Application No. PCT/CN2019/073844 dated Apr. 22, 2019, consisting of 5 pp. (English Translation Provided).

\* cited by examiner

ELECTRONIC DEVICE AND METHOD FOR SENDING ELECTRONIC DATA

CROSS-REFERENCE TO RELATED APPLICATION AND CLAIM OF PRIORITY

The application claims the benefit of the International Patent Application No. PCT/CN2019/073844, filed on Jan. 30, 2019, at the World Intellectual Property Office, the disclosures of which are incorporated herein in their entirety by reference.

TECHNICAL FIELD

The present disclosure is related to an electronic device and, more particularly, is related to an electronic device and method for sending electronic data.

BACKGROUND

An electronic device generally provides a function for sending electronic data to an external device. The electronic device may support a plurality of different message delivery services. The plurality of different message delivery services include an email service, a short-message service, a multimedia-message service and an instant-messaging service. Therefore, the electronic device may need an improved mechanism to effectively implement at least one selected from the plurality of different message delivery services.

U.S. Patent Publication No. 2005/0009541 A1 discloses intelligent messaging. U.S. Patent Publication No. 2009/0061825 A1 discloses techniques for group messaging on a mobile computing device.

SUMMARY OF EXEMPLARY EMBODIMENTS

It is an aspect of the present disclosure to provide an electronic device, which effectively sends electronic data to an external device based on a specific application communication protocol.

It is therefore an embodiment of the present disclosure to provide a method for sending electronic data. The method includes the following steps: A first user input operation and a second user input operation occurred later than the first user input operation are received. A first communication protocol identifier configured to denote a first specific application communication protocol is obtained in response to the first user input operation. A first communication target identifier configured to denote a first communication target is obtained based on the first communication protocol identifier. The first communication target identifier and the first specific application communication protocol are used to send the electronic data to the first communication target in response to the second user input operation.

It is therefore another embodiment of the present disclosure to provide an electronic device for sending electronic data. The electronic device includes an electricity use target and a processing unit. The processing unit is coupled to the electricity-using target, is configured to obtain a first communication protocol identifier configured to identify a first specific application communication protocol by means of the electricity-using target, obtains a first communication target identifier configured to identify the first communication target based on the first communication protocol identifier, and sends the electronic data toward the first communication target based on the first communication target identifier and the first specific application communication protocol.

It is therefore still another embodiment of the present disclosure to provide a method for sending electronic data. The method includes the following steps. An electricity-using target is provided. A first communication protocol identifier configured to identify a first specific application communication protocol is obtained by means of the electricity-using target. A first communication target identifier configured to identify a first communication target is obtained based on the first communication protocol identifier. In addition, the electronic data is sent toward the first communication target based on the first communication target identifier and the first specific application communication protocol.

BRIEF DESCRIPTION OF THE DRAWINGS

The foregoing and other features and advantages of the present disclosure will be more clearly understood through the following descriptions with reference to the drawings, wherein.

DETAILED DESCRIPTION OF THE PREFERRED EMBODIMENTS

Figure 1:
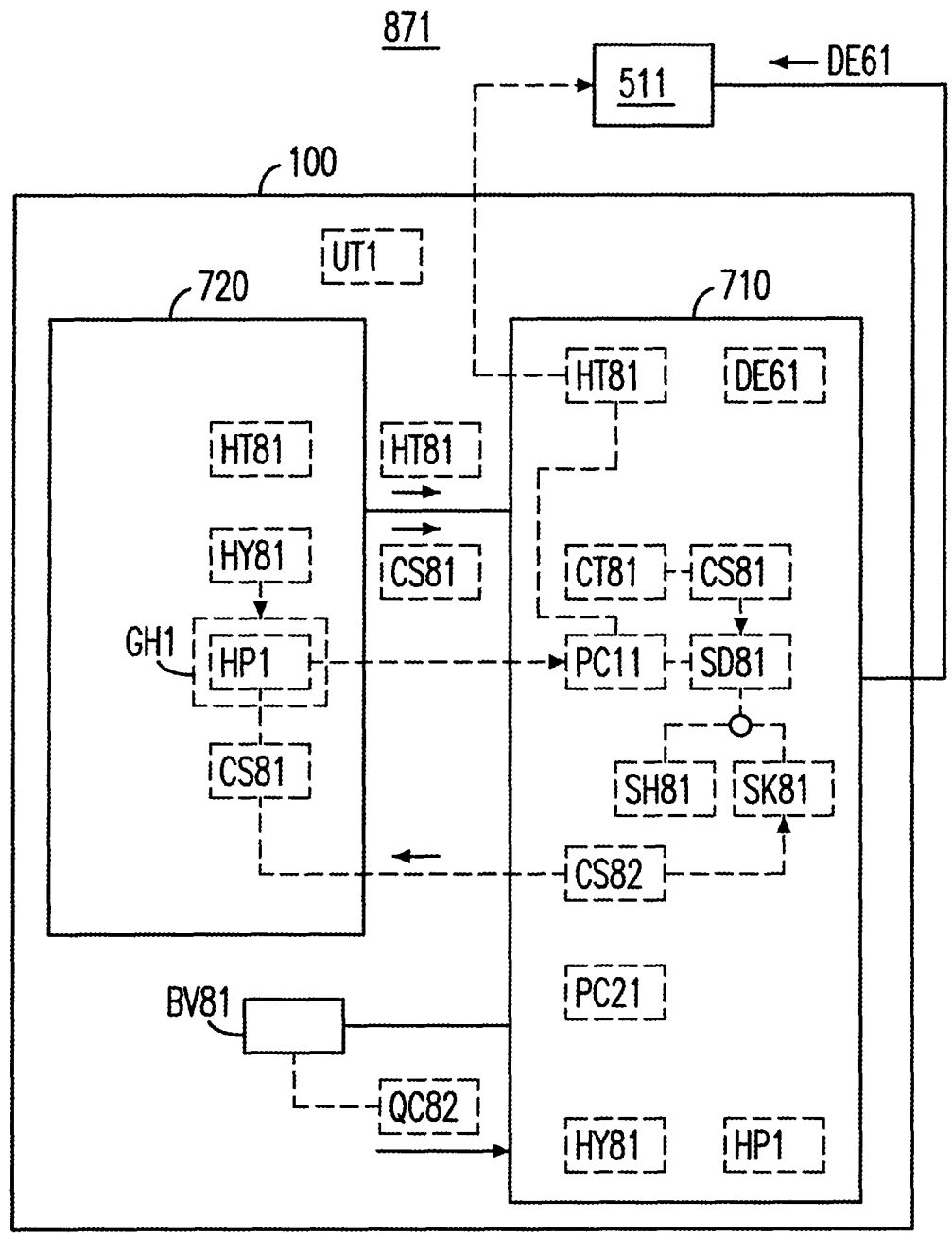
FIG. 1 is a schematic diagram showing a communication system according to various embodiments of the present disclosure.

Please refer to FIG. 1, which is a schematic diagram showing a communication system 871 according to various embodiments of the present disclosure. The communication system 871 includes an electronic device 100 and a first communication target 511. For example, the electronic device 100 is to communicate with the first communication target 511. The electronic device 100 for sending electronic data DE61 includes a storage unit 720 and a processing unit 710. The storage unit 720 provides a first functional state code CS81 and a communication target identifier HT81 configured to identify a first communication target 511 under a first specific application communication protocol PC11. For example, the first functional state code CS81 represents a first functional state SD81 which the first specific application communication protocol PC11 is configured to be in. The first functional state SD81 is equal to one of a first selected state SH81 and a first non-selected state SK81.

The processing unit 710 is coupled to the storage unit 720, and sends the electronic data DE61 toward the first communication target 511 based on the communication target identifier HT81 and the first specific application communication protocol PC11 under a condition that the processing unit 710 recognizes the first functional state code CS81 as a first valid state code CT81 representing the first selected state SH81 in a data transmission phase UT1.

In some embodiments, the electronic device 100 further includes an electricity application target BV81 coupled to the processing unit 710. After the processing unit 710 sends the electronic data DE61 toward the first communication target 511 based on the first specific application communication protocol PC11, the processing unit 710 receives an operation request message QC82 by means of the electricity application target BV81. The processing unit 710, in response to the operation request message QC82, replaces the first functional state code CS81 stored by the storage unit 720 with a second functional state code CS82 representing the first non-selected state SK81 to stop selecting the first specific application communication protocol PC11.

In some embodiments, the storage unit 720 stores the communication target identifier HT81, a communication protocol identifier group GH1 and a protocol identifier group identifier HY81 configured to identify the communication protocol identifier group GH1. The communication protocol identifier group GH1 include a first communication protocol identifier HP1 configured to identify the first specific application communication protocol PC11. For example, the first specific application communication protocol PC11 is one selected from a plurality of different application communication protocols PC11, PC21, . . . . The storage unit 720 further stores the first functional state code CS81 associated with the first communication protocol identifier HP1.

The processing unit 710 is configured to access the stored protocol identifier group identifier HY81 in the data transmission phase UT1, accesses the first communication protocol identifier HP1 belonging to the communication protocol identifier group GH1 based on the accessed protocol identifier group identifier HY81, and accesses the stored first functional state code CS81 based on the accessed first communication protocol identifier HP1 to cause the storage unit 720 to provide the stored first functional state code CS81 to the processing unit 710. Under a condition that the processing unit 710 recognizes the provided first functional state code CS81 as the first valid state code CT81 in the data transmission phase UT1, the processing unit 710 uses the first specific application communication protocol PC11 to send the electronic data DE61 toward the first communication target 511 in the data transmission phase UT1 based on the accessed first communication protocol identifier HP1 and the provided communication target identifier HT81.

Figure 2:
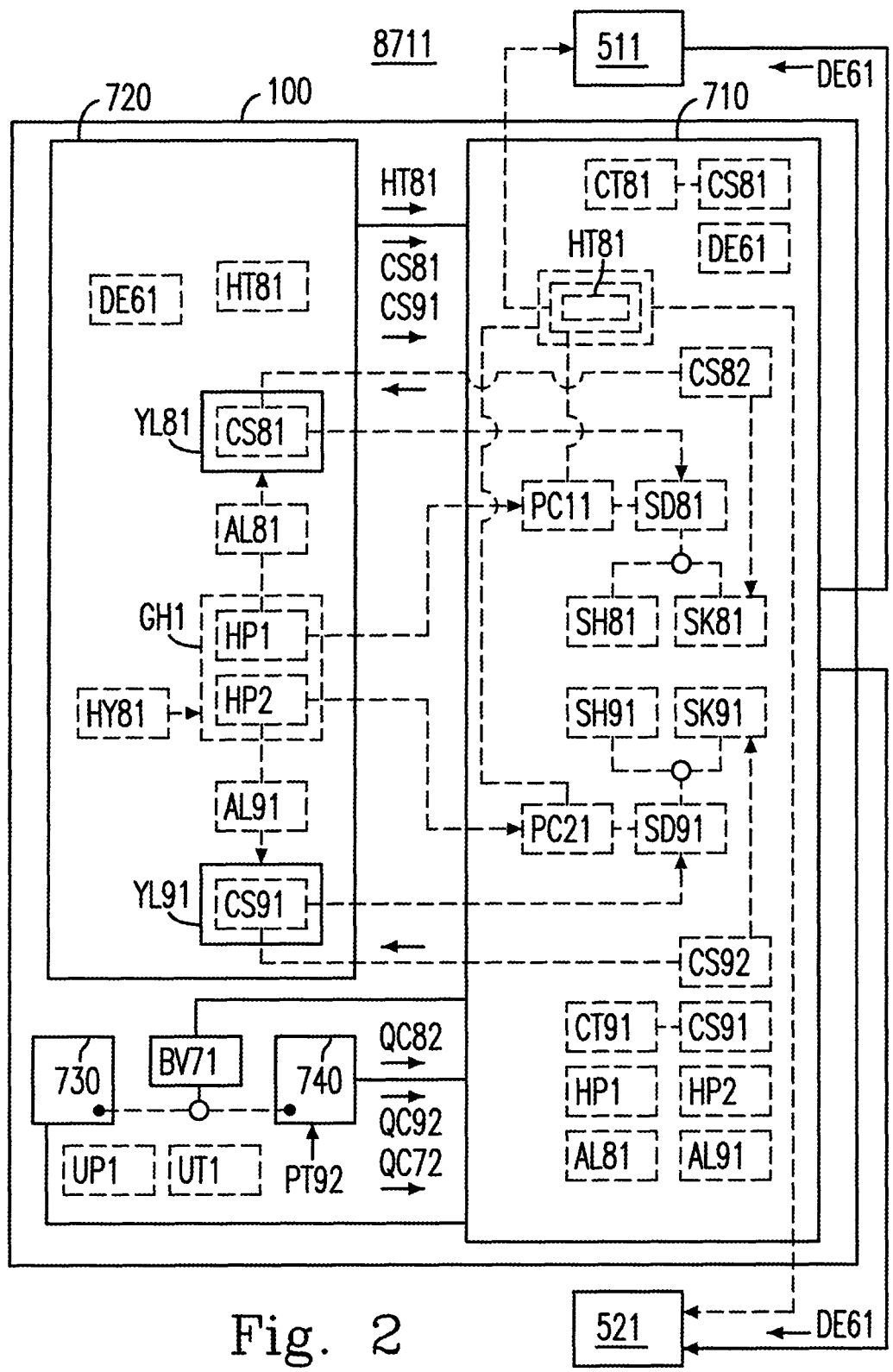
FIG. 2 is a schematic diagram showing an implementation structure of the communication system shown in FIG. 1.
Figure 3:
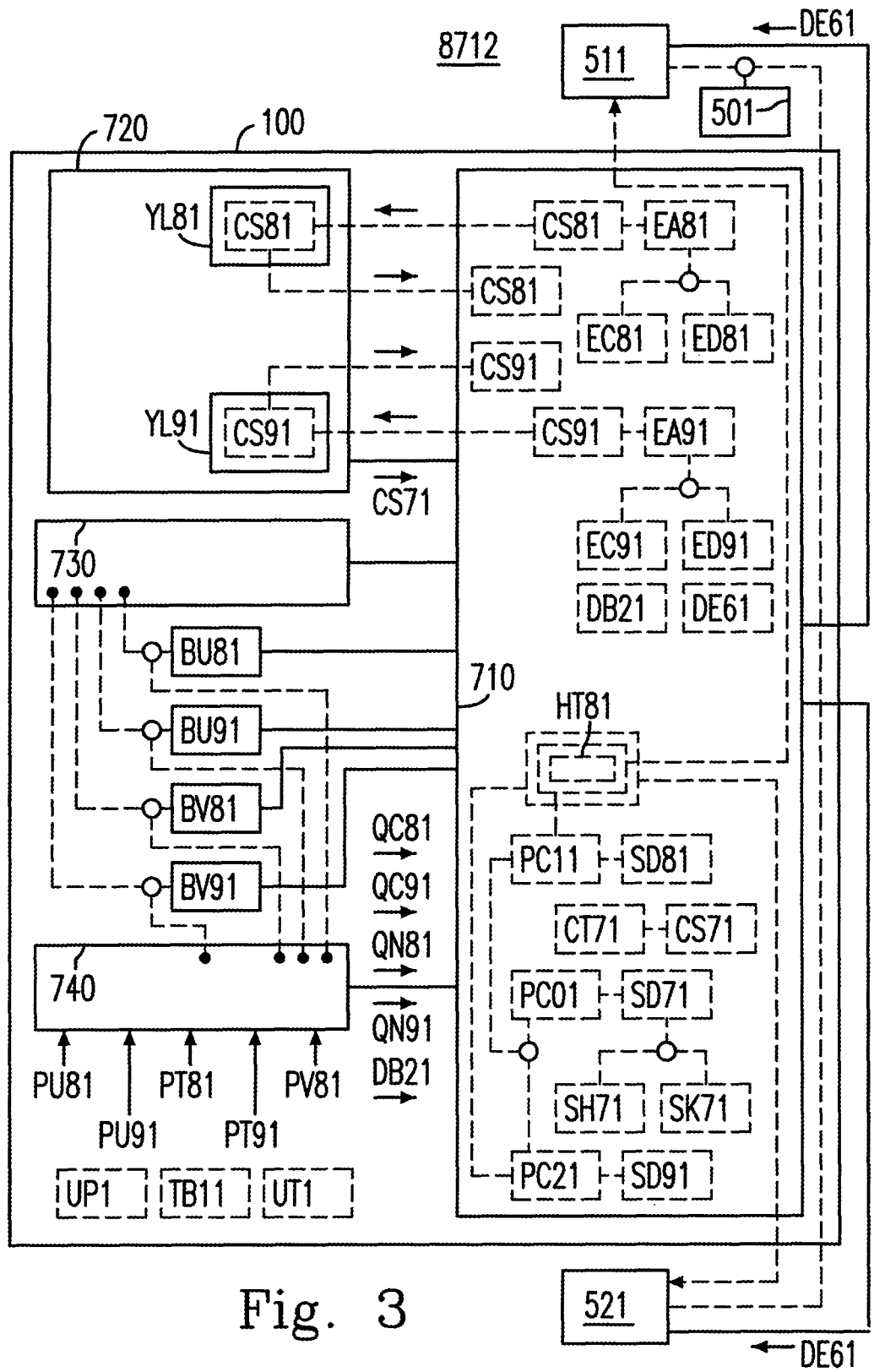
FIG. 3 is a schematic diagram showing an implementation structure of the communication system shown in FIG. 1.

Please refer to FIGS. 2 and 3. FIG. 2 is a schematic diagram showing an implementation structure 8711 of the communication system 871 shown in FIG. 1. FIG. 3 is a schematic diagram showing an implementation structure 8712 of the communication system 871 shown in FIG. 1. As shown in FIGS. 2 and 3, each of the implementation structure 8711 and the implementation structure 8712 includes the electronic device 100, the first communication target 511 and a second communication target 521. The electronic device 100 is further to communicate with the second communication target 521, and includes the processing unit 710, the storage unit 720 coupled to the processing unit 710, an input unit 740 coupled to the processing unit 710, and a display unit 730 coupled to the processing unit 710. For example, the first communication target 511 and the second communication target 521 are a first external target and a second external target, respectively.

In some embodiments, one of the input unit 740 and the display unit 730 includes a first electricity application target BU81 coupled to the processing unit 710. One of the input unit 740 and the display unit 730 includes a second electricity application target BU91 coupled to the processing unit 710. One of the input unit 740 and the display unit 730 includes a third electricity application target BV81 coupled to the processing unit 710. One of the input unit 740 and the display unit 730 includes a fourth electricity application target BV91 coupled to the processing unit 710. The second electricity application target BU91 is the same as or different from the first electricity application target BU81. The fourth electricity application target BV91 is different from the third electricity application target BV81.

The provided communication target identifier HT81 is configured to identify a second communication target 521 under a second specific application communication protocol PC21 being different from the first specific application communication protocol PC11, wherein the second specific application communication protocol PC21 is one selected from the plurality of different application communication protocols PC11, PC21, . . . . The communication protocol identifier group GH1 further includes a second communication protocol identifier HP2 configured to identify the second specific application communication protocol PC21. For example, each of the first electricity application target BU81 and the second electricity application target BU91 is associated with the stored protocol identifier group identifier HY81.

The storage unit 720 further stores a second functional state code CS91 associated with the second communication protocol identifier HP2. For example, the second functional state code CS91 represents a second functional state SD91 which the second specific application communication protocol PC21 is configured to be in. The second functional state SD91 is equal to one of a second selected state SH91 and a second non-selected state SK91. The storage unit 720 has a first application memory location YL81 identified based on a first application memory address AL81, and a second application memory location YL91 identified based on a second application memory address AL91. For example, the first application memory address AL81 is determined according to the stored first communication protocol identifier HP1. The second application memory address AL91 is determined according to the stored second communication protocol identifier HP2.

In some embodiments, the input unit 740 receives a first user input operation PU81, using the first electricity application target BU81, to provide a first operation request message QN81 to the processing unit 710. The input unit 740 further receives a second user input operation PU91 being after the first user input operation PU81, and provides a second operation request message QN91 to the processing unit 710 in response to the second user input operation PU91 using the second electricity application target BU91.

The processing unit 710 causes the electronic device 100 to enter a data preparation phase UP1 to cause the storage unit 720 to prepare the electronic data DE61 in response to the first operation request message QN81. The second electricity application target BU91 is further associated with the prepared electronic data DE61 and the stored communication target identifier HT81. The processing unit 710 reads the stored protocol identifier group identifier HY81 in the data preparation phase UP1, and, based on the read protocol identifier group identifier HY81, reads the stored first communication protocol identifier HP1 and the stored second communication protocol identifier HP2, which belong to the communication protocol identifier group GH1.

In some embodiments, the input unit 740 further receives a third user input operation PT81 using the third electricity application target BV81 in the data preparation phase UP1 to provide a third operation request message QC81 to the processing unit 710. The processing unit 710 performs a first data encoding operation EA81 to determine the first functional state code CS81 in response to the third operation request message QC81. For example, the first data encoding operation EA81 is one of a first practical encoding operation EC81 and a second practical encoding operation ED81. The first practical encoding operation EC81 is used to select the first specific application communication protocol PC11. The second practical encoding operation ED81 is used to stop selecting the first specific application communication protocol PC11. The processing unit 710 uses the read first communication protocol identifier HP1 to fetch the first application memory address AL81 in response to determining the first functional state code CS81, and causes the storage unit 720 to store the determined first functional state code CS81 to the first application memory location YL81 based on the fetched first application memory address AL81.

The input unit 740 further receives a fourth user input operation PT91 using the fourth electricity application target BV91 in the data preparation phase UP1 to provide a fourth operation request message QC91 to the processing unit 710. The processing unit 710 performs a second data encoding operation EA91 to determine the second functional state code CS91 in response to the fourth operation request message QC91. For example, the second data encoding operation EA91 is one of a third practical encoding operation EC91 and a fourth practical encoding operation ED91. The third practical encoding operation EC91 is used to select the second specific application communication protocol PC21. The fourth practical encoding operation ED91 is used to stop selecting the second specific application communication protocol PC21. The processing unit 710 uses the read second communication protocol identifier HP2 to fetch the second application memory address AL91 in response to determining the second functional state code CS91, and causes the storage unit 720 to store the determined second functional state code CS91 to the second application memory location YL91 based on the fetched second application memory address AL91.

The input unit 740 receives a fifth user input operation PV81 being before the second user input operation PU91 in the data preparation phase UP1 to provide input data DB21 to the processing unit 710. The processing unit 710, in response to obtaining the input data DB21, causes the storage unit 720 to store the electronic data DE61 determined according to the obtained input data DB21.

In some embodiments, the processing unit 710 leaves the data preparation phase UP1 to enter the data transmission phase UT1 in response to the second operation request message QN91, and accesses the stored electronic data DE61 in the data transmission phase UT1. The processing unit 710 accesses the stored communication target identifier HT81 in the data transmission phase UT1 to cause the storage unit 720 to provide the stored communication target identifier HT81 to the processing unit 710, and accesses the stored protocol identifier group identifier HY81 in the data transmission phase UT1 to cause the storage unit 720 to provide the stored protocol identifier group identifier HY81 to the processing unit 710.

The processing unit 710 accesses the stored first communication protocol identifier HP1 and the stored second communication protocol identifier HP2, which belong to the communication protocol identifier group GH1, in the data transmission phase UT1 based on the accessed protocol identifier group identifier HY81. The processing unit 710 obtains the first application memory address AL81 in the data transmission phase UT1 based on the accessed first communication protocol identifier HP1, and accesses the first functional state code CS81 stored at the first application memory location YL81 based on the obtained first application memory address AL81 to cause the storage unit 720 to provide the stored first functional state code CS81 to the processing unit 710.

Under a condition that the processing unit 710 recognizes the provided first functional state code CS81 as the first valid state code CT81 in the data transmission phase UT1, the processing unit 710 uses the first specific application communication protocol PC11 to send the accessed electronic data DE61 toward the first communication target 511 in the data transmission phase UT1 based on the accessed electronic data DE61, the accessed first communication protocol identifier HP1 and the provided communication target identifier HT81.

The processing unit 710 obtains the second application memory address AL91 in the data transmission phase UT1 based on the accessed second communication protocol identifier HP2, and accesses the second functional state code CS91 stored at the second application memory location YL91 based on the obtained second application memory address AL91. Under a condition that the processing unit 710 recognizes the accessed second functional state code CS91 as the second valid state code CT91 representing the second selected state SH91 in the data transmission phase UT1, the processing unit 710 uses the second specific application communication protocol PC21 to send the accessed electronic data DE61 toward the second communication target 521 in the data transmission phase UT1 based on the accessed electronic data DE61, the accessed second communication protocol identifier HP2 and the provided communication target identifier HT81.

After the processing unit 710 uses the second specific application communication protocol PC21 to send the electronic data DE61 toward the second communication target 521, the input unit 740 receives a sixth user input operation PT92, using the fourth electricity application target BV91, to provide a fifth operation request message QC92 to the processing unit 710. The processing unit 710, in response to the fifth operation request message QC92, replaces the second functional state code CS91 stored by the storage unit 720 with a third functional state code CS92 representing the second non-selected state SK91 to stop selecting the second specific application communication protocol PC21.

The plurality of different application communication protocols PC11, PC21, . . . are selected from a group consisting of an email communication protocol, an instant-messaging communication protocol, a short-message service communication protocol and a multimedia-message service communication protocol. The first communication target identifier HT11 is the same as or different from the second communication target identifier HT21. The first communication target 511 is the same as or different from the second communication target 521.

Please refer to FIG. 1, FIG. 2 and FIG. 3. A method for sending electronic data DE61 is disclosed. The method includes the following steps: A first functional state code CS81 and a communication target identifier HT81 configured to identify a first communication target 511 under a first specific application communication protocol PC11 are provided, wherein the first functional state code CS81 represents a first functional state SD81 which the first specific application communication protocol PC11 is configured to be in, and the first functional state SD81 is equal to one of a first selected state SH81 and a first non-selected state SK81. In addition, under a condition that the first functional state code CS81 is recognized as a first valid state code CT81 representing the first selected state SH81 in a data transmission phase UT1, the electronic data DE61 is sent toward the first communication target 511 based on the communication target identifier HT81 and the first specific application communication protocol PC11.

In some embodiments, the method further includes the following steps: The first functional state code CS81 is stored. An electricity application target BV81 is provided. After the electronic data DE61 is sent toward the first communication target 511 based on the first specific application communication protocol PC11, an operation request message QC82 is received by means of the electricity application target BV81. In addition, in response to the operation request message QC82, the stored first functional state code CS81 is replaced with a second functional state code CS82 representing the first non-selected state SK81 to stop selecting the first specific application communication protocol PC11.

In some embodiments, the method further includes the following steps: The communication target identifier HT81, a communication protocol identifier group GH1 and a protocol identifier group identifier HY81 configured to identify the communication protocol identifier group GH1 are stored, wherein the communication protocol identifier group GH1 include a first communication protocol identifier HP1 configured to identify the first specific application communication protocol PC11, and the first specific application communication protocol PC11 is one selected from a plurality of different application communication protocols PC11, PC21, . . . . The first functional state code CS81 associated with the first communication protocol identifier HP1 is stored. The stored protocol identifier group identifier HY81 is accessed in the data transmission phase UT1. In addition, the first communication protocol identifier HP1 belonging to the communication protocol identifier group GH1 is accessed based on the accessed protocol identifier group identifier HY81.

The step of providing the first functional state code CS81 includes a sub-step that: the stored first functional state code CS81 is accessed based on the accessed first communication protocol identifier HP1 to provide the stored first functional state code CS81. The step of sending the electronic data DE61 toward the first communication target 511 based on the communication target identifier HT81 and the first specific application communication protocol PC11 includes a sub-step that: under a condition that the provided functional state code CS81 is recognized as the first valid state code CT81 in the data transmission phase UT1, the first specific application communication protocol PC11 is used to send the electronic data DE61 toward the first communication target 511 in the data transmission phase UT1 based on the accessed first communication protocol identifier HP1 and the provided communication target identifier HT81.

In some embodiments, the provided communication target identifier HT81 is configured to identify a second communication target 521 under a second specific application communication protocol PC21 being different from the first specific application communication protocol PC11. For example, the second specific application communication protocol PC21 is one selected from the plurality of different application communication protocols PC11, PC21, . . . . The communication protocol identifier group GH1 further includes a second communication protocol identifier HP2 configured to identify the second specific application communication protocol PC21.

The method further includes a step that: a first electricity application target BU81, a second electricity application target BU91, a third electricity application target BV81 and a fourth electricity application target BV91 are provided. For example, the second electricity application target BU91 is the same as or different from the first electricity application target BU81. The fourth electricity application target BV91 is different from the third electricity application target BV81. Each of the first electricity application target BU81 and the second electricity application target BU91 is associated with the stored protocol identifier group identifier HY81.

The method further includes a step that: a second functional state code CS91 associated with the second communication protocol identifier HP2 is stored. For example, the second functional state code CS91 represents a second functional state SD91 which the second specific application communication protocol PC21 is configured to be in. The second functional state SD91 is equal to one of a second selected state SH91 and a second non-selected state SK91.

The method further includes a step that: a first application memory location YL81 identified based on a first application memory address AL81, and a second application memory location YL91 identified based on a second application memory address AL91 are provided. For example, the first application memory address AL81 is determined according to the stored first communication protocol identifier HP1. The second application memory address AL91 is determined according to the stored second communication protocol identifier HP2.

In some embodiments, the method further includes the following steps: A first user input operation PU81 using the first electricity application target BU81 is received to provide a first operation request message QN81. A second user input operation PU91 being after the first user input operation PU81 is received. A second operation request message QN91 is provided in response to the second user input operation PU91 using the second electricity application target BU91. In addition, a data preparation phase UP1 is entered in response to the first operation request message QN81.

The method further includes the following steps: the electronic data DE61 is prepared in the data preparation phase UP1, wherein the second electricity application target BU91 is further associated with the prepared electronic data DE61 and the stored protocol identifier group identifier HY81. The stored protocol identifier group identifier HY81 is read in the data preparation phase UP1. In addition, based on the read protocol identifier group identifier HY81, the stored first communication protocol identifier HP1 and the stored second communication protocol identifier HP2, which belong to the communication protocol identifier group GH1, are read.

In some embodiments, the method further includes the following steps: A third user input operation PT81 using the third electricity application target BV81 is received in the data preparation phase UP1 to provide a third operation request message QC81. In addition, a first data encoding operation EA81 is performed to determine the first functional state code CS81 in response to the third operation request message QC81. For example, the first data encoding operation EA81 is one of a first practical encoding operation EC81 and a second practical encoding operation ED81. The first practical encoding operation EC81 is used to select the first specific application communication protocol PC11. The second practical encoding operation ED81 is used to stop selecting the first specific application communication protocol PC11.

The method further includes the following steps: A fourth user input operation PT91 using the fourth electricity application target BV91 is received in the data preparation phase UP1 to provide a fourth operation request message QC91. In addition, a second data encoding operation EA91 is performed to determine the second functional state code CS91 in response to the fourth operation request message QC91. For example, the second data encoding operation EA91 is one of a third practical encoding operation EC91 and a fourth practical encoding operation ED91. The third practical encoding operation EC91 is used to select the second specific application communication protocol PC21. The fourth practical encoding operation ED91 is used to stop selecting the second specific application communication protocol PC21.

The step of storing the first functional state code CS81 includes the following sub-steps: The read first communication protocol identifier HP1 is used to fetch the first application memory address AL81 in response to determining the first functional state code CS81. In addition, the determined first functional state code CS81 is stored to the first application memory location YL81 based on the fetched first application memory address AL81. The step of storing the second functional state code CS91 includes the following sub-steps: The read second communication protocol identifier HP2 is used to fetch the second application memory address AL91 in response to determining the second functional state code CS91. In addition, the determined second functional state code CS91 is stored to the second application memory location YL91 based on the fetched second application memory address AL91.

The step of preparing the electronic data DE61 includes the following sub-steps: A fifth user input operation PV81 being before the second user input operation PU91 is received in the data preparation phase IP1 to provide input data DB21. In addition, in response to obtaining the input data DB21, the electronic data DE61 determined according to the obtained input data DB21 is stored.

In some embodiments, the method further includes the following steps: The data preparation phase UP1 is left to enter the data transmission phase UT1 in response to the second operation request message QN91. In addition, the stored electronic data DE61 is accessed in the data transmission phase UT1. The step of providing the communication target identifier HT81 includes a sub-step that: the stored communication target identifier HT81 is accessed in the data transmission phase UT1 to provide the stored communication target identifier HT81.

The step of accessing the first communication protocol identifier HP1 based on the accessed protocol identifier group identifier HY81 includes a sub-step that: the stored first communication protocol identifier HP1 and the stored second communication protocol identifier HP2, which belong to the communication protocol identifier group GH1, are accessed in the data transmission phase UT1 based on the accessed protocol identifier group identifier HY81. The sub-step of accessing the stored first functional state code CS81 based on the accessed first communication protocol identifier HP1 includes the following sub-steps: The first application memory address AL81 is obtained in the data transmission phase UT1 based on the accessed first communication protocol identifier HP1. In addition, the first functional state code CS81 stored at the first application memory location YL81 is accessed based on the obtained first application memory address AL81 to provide the stored first functional state code CS81.

The method further includes the following steps: The second application memory address AL91 is obtained in the data transmission phase UT1 based on the accessed second communication protocol identifier HP2. The second functional state code CS91 stored at the second application memory location YL91 is accessed based on the obtained second application memory address AL91. In addition, under a condition that the accessed second functional state code CS91 is recognized as the second valid state code CT91 representing the second selected state SH91 in the data transmission phase UT1, the second specific application communication protocol PC21 is used to send the accessed electronic data DE61 toward the second communication target 521 in the data transmission phase UT1 based on the accessed electronic data DE61, the accessed second communication protocol identifier HP2 and the provided communication target identifier HT81.

The method further includes the following steps: After the second specific application communication protocol PC21 is used to send the electronic data DE61 toward the second communication target 521, a sixth user input operation PT92 using the fourth electricity application target BV91 is received to provide a fifth operation request message QC92. In addition, in response to the fifth operation request message QC92, the stored second functional state code CS91 is replaced with a third functional state code CS92 representing the second non-selected state SK91 to stop selecting the second specific application communication protocol PC21.

Under a condition that the provided first functional state code CS81 is recognized as the first valid state code CT81 in the data transmission phase UT1, the accessed electronic data DE61, the accessed first communication protocol identifier HP1 and the provided communication target identifier HT81 are used to use the first specific application communication protocol PC11 to send the accessed electronic data DE61 toward the first communication target 511 in the data transmission phase UT1. The plurality of different application communication protocols PC11, PC21, . . . are selected from a group consisting of an email communication protocol, an instant-messaging communication protocol, a short-message service communication protocol and a multimedia-message service communication protocol. The first communication target identifier HT11 is the same as or different from the second communication target identifier HT21. The first communication target 511 is the same as or different from the second communication target 521.

Please refer to FIG. 1, FIG. 2 and FIG. 3. A method for sending electronic data DE61 is disclosed. The method includes the following steps: The storage unit 720 provides a communication target identifier HT81, wherein the communication target identifier HT81 is configured to identify a first communication target 511 under a first specific application communication protocol PC11, and is configured to identify a second communication target 521 under a second specific application communication protocol PC21 being different from the first specific application communication protocol PC11. The processing unit 710 sends the electronic data DE61 toward the first communication target 511 in a data transmission phase UT1 based on the communication target identifier HT81 and the first specific application communication protocol PC11. In addition, the processing unit 710 sends the electronic data DE61 toward the second communication target 521 in the data transmission phase UT1 based on the communication target identifier HT81 and the second specific application communication protocol PC21.

In some embodiments, the method further includes the following steps: One of the input unit 740 and the display unit 730 provides an electricity-using target BV71. In addition, the storage unit 720 provides a first functional state code CS71. For example, the first functional state code CS71 represents a functional state SD71 which a practical application communication protocol PC01 is configured to be in. The practical application communication protocol PC01 is one of the first specific application communication protocol PC11 and the second specific application communication protocol PC21. The functional state SD71 is equal to one of a selected state SH71 and a non-selected state SK71.

One of the step of sending the electronic data DE61 toward the first communication target 511 based on the communication target identifier HT81 and the first specific application communication protocol PC11, and the step of sending the electronic data DE61 toward the second communication target 521 based on the communication target identifier HT81 and the second specific application communication protocol PC21 includes a sub-step that: under a condition that the first functional state code CS71 is recognized by the processing unit 710 as a valid state code CT71 representing the selected state SH71 in a data transmission phase UT1, the processing unit 710 sends the electronic data DE61 toward a practical target 501 based on the communication target identifier HT81 and the practical application communication protocol PC01. The practical target 501 is one of the first communication target 511 and the second communication target 521.

The method further includes the following steps: After the practical application communication protocol PC01 is used by the processing unit 710 to send the electronic data DE61 toward the practical communication target 501, the processing unit 710 receives an operation request message QC72 by means of the electricity-using target BV71. In addition, the processing unit 710, in response to the operation request message QC72, replaces the first functional state code CS71 with a second functional state code CS72 representing the non-selected state SK71 to stop selecting the practical application communication protocol PC01.

The method further includes the following steps: The storage unit 720 stores the communication target identifier HT81, a communication protocol identifier group GH1 and a protocol identifier group identifier HY81 configured to identify the communication protocol identifier group GH1. For example, the communication protocol identifier group GH1 include a first communication protocol identifier HP1 configured to identify the first specific application communication protocol PC11, and a second communication protocol identifier HP2 configured to identify the second specific application communication protocol PC21. Each of the first specific application communication protocol PC11 and the second specific application communication protocol PC21 is one selected from a plurality of different application communication protocols PC11, PC21, . . . .

The method further includes the following steps: The processing unit 710 accesses the stored protocol identifier group identifier HY81 in the data transmission phase UT1. In addition, the processing unit 710 accesses the first communication protocol identifier HP1 and the second communication protocol identifier HP2, which belong to the communication protocol identifier group GH1, based on the accessed protocol identifier group identifier HY81.

The step of sending the electronic data DE61 toward the first communication target 511 includes a sub-step that: the processing unit 710 uses the first specific application communication protocol PC11 to send the electronic data DE61 toward the first communication target 511 in the data transmission phase UT1 based on the accessed first communication protocol identifier HP1 and the provided communication target identifier HT81. The step of sending the electronic data DE61 toward the second communication target 521 includes a sub-step that: the processing unit 710 uses the second specific application communication protocol PC21 to send the electronic data DE61 toward the second communication target 521 in the data transmission phase UT1 based on the accessed second communication protocol identifier HP2 and the provided communication target identifier HT81.

In some embodiments, one of the input unit 740 and the display unit 730 provides a first electricity application target BU81. One of the input unit 740 and the display unit 730 provides a second electricity application target BU91. One of the input unit 740 and the display unit 730 provides a third electricity application target BV81. One of the input unit 740 and the display unit 730 provides a fourth electricity application target BV91. For example, the second electricity application target BU91 is the same as or different from the first electricity application target BU81. The fourth electricity application target BV91 is different from the third electricity application target BV81. Each of the first electricity application target BU81 and the second electricity application target BU91 is associated with the stored protocol identifier group identifier HY81.

The method further includes the following steps: The storage unit 720 stores the protocol identifier group identifier HY81, wherein each of the first electricity application target BU81 and the second electricity application target BU91 is associated with the stored protocol identifier group identifier HY81. In addition, the storage unit 720 stores a first functional state code CS81 associated with the first communication protocol identifier HP1. For example, the first functional state code CS81 represents a first functional state SD81 which the first specific application communication protocol PC11 is configured to be in. The first functional state SD81 is equal to one of a first selected state SH81 and a first non-selected state SK81.

The method further includes a step that: the storage unit 720 stores a second functional state code CS91 associated with the second communication protocol identifier HP2. For example, the second functional state code CS91 represents a second functional state SD91 which the second specific application communication protocol PC21 is configured to be in. The second functional state SD91 is equal to one of a second selected state SH91 and a second non-selected state SK91.

The method further includes a step that: the storage unit 720 provides a first application memory location YL81 identified based on a first application memory address AL81, and a second application memory location YL91 identified based on a second application memory address AL91. For example, the first application memory address AL81 is determined according to the stored first communication protocol identifier HP1. The second application memory address AL91 is determined according to the stored second communication protocol identifier HP2.

In some embodiments, the method further includes the following steps: the input unit 740 receives a first user input operation PU81, using the first electricity application target BU81, to provide a first operation request message QN81. The input unit 740 receives a second user input operation PU91 being after the first user input operation PU81. In addition, the input unit 740 provides a second operation request message QN91 at a provision time TB11 in response to the second user input operation PU91 using the second electricity application target BU91. For example, the data transmission phase UT1 is determined according to the provision time TB11.

The method further includes the following steps: The processing unit 710 causes the method to enter a data preparation phase UP1 in response to the first operation request message QN81. The processing unit 710 causes the storage unit 720 to prepare the electronic data DE61 in the data preparation phase UP1, wherein the second electricity application target BU91 is further associated with the prepared electronic data DE61 and the stored communication target identifier HT81. The processing unit 710 reads the stored protocol identifier group identifier HY81 in the data preparation phase UP1. In addition, the processing unit 710, based on the read protocol identifier group identifier HY81, reads the stored first communication protocol identifier HP1 and the stored second communication protocol identifier HP2, which belong to the communication protocol identifier group GH1.

The method further includes the following steps: The input unit 740 receives a third user input operation PT81 using the third electricity application target BV81 in the data preparation phase UP1 to provide a third operation request message QC81. In addition, the processing unit 710 performs a first data encoding operation EA81 to determine the first functional state code CS81 in response to the third operation request message QC81. For example, the first data encoding operation EA81 is one of a first practical encoding operation EC81 and a second practical encoding operation ED81. The first practical encoding operation EC81 is used to select the first specific application communication protocol PC11. The second practical encoding operation ED81 is used to stop selecting the first specific application communication protocol PC11.

The method further includes the following steps: The input unit 740 receives a fourth user input operation PT91 using the fourth electricity application target BV91 in the data preparation phase UP1 to provide a fourth operation request message QC91. In addition, the processing unit 710 performs a second data encoding operation EA91 to determine the second functional state code CS91 in response to the fourth operation request message QC91. For example, the second data encoding operation EA91 is one of a third practical encoding operation EC91 and a fourth practical encoding operation ED91. The third practical encoding operation EC91 is used to select the second specific application communication protocol PC21. The fourth practical encoding operation ED91 is used to stop selecting the second specific application communication protocol PC21.

In some embodiments, the step of storing the first functional state code CS81 includes the following sub-steps: The processing unit 710 uses the read first communication protocol identifier HP1 to fetch the first application memory address AL81 in response to determining the first functional state code CS81. In addition, the processing unit 710 causes the storage unit 720 to store the determined first functional state code CS81 to the first application memory location YL81 based on the fetched first application memory address AL81. The step of storing the second functional state code CS91 includes the following sub-steps: The processing unit 710 uses the read second communication protocol identifier HP2 to fetch the second application memory address AL91 in response to determining the second functional state code CS91. In addition, the processing unit 710 causes the storage unit 720 to store the determined second functional state code CS91 to the second application memory location YL91 based on the fetched second application memory address AL91.

The step of preparing the electronic data DE61 includes the following sub-steps: The input unit 740 receives a fifth user input operation PV81 being before the second user input operation PU91 in the data preparation phase UP1 to provide input data DB21. In addition, the processing unit 710, in response to obtaining the input data DB21, causes the storage unit 720 to store the electronic data DE61 determined according to the obtained input data DB21.

In some embodiments, the method further includes the following steps: The processing unit 710 causes the method to leave the data preparation phase UP1 to enter the data transmission phase UT1 in response to the second operation request message QN91. In addition, the processing unit 710 accesses the stored electronic data DE61 in the data transmission phase UT1. The step of providing the stored protocol identifier group identifier HY81 includes a sub-step that: the processing unit 710 accesses the stored communication target identifier HT81 in the data transmission phase UT1 to cause the storage unit 720 to provide the stored communication target identifier HT81.

The step of accessing the stored first communication protocol identifier HP1 and the second communication protocol identifier HP2 based on the accessed protocol identifier group identifier HY81 includes a sub-step that: the processing unit 710 accesses the stored first communication protocol identifier HP1 and the stored second communication protocol identifier HP2, which belong to the communication protocol identifier group GH1, in the data transmission phase UT1 based on the accessed protocol identifier group identifier HY81.

In some embodiments, the method further includes the following steps: The processing unit 710 obtains the first application memory address AL81 in the data transmission phase UT1 based on the accessed first communication protocol identifier HP1. The processing unit 710 accesses the first functional state code CS81 stored at the first application memory location YL81 based on the obtained first application memory address AL81. The processing unit 710 obtains the second application memory address AL91 in the data transmission phase UT1 based on the accessed second communication protocol identifier HP2. In addition, the processing unit 710 accesses the second functional state code CS91 stored at the second application memory location YL91 based on the obtained second application memory address AL91.

The sub-step of using the first specific application communication protocol PC11 to send the electronic data DE61 toward the first communication target 511 includes a sub-step that: under a condition that the accessed first functional state code CS81 is recognized by the processing unit 710 as the first valid state code CT81 in the data transmission phase UT1, the processing unit 710 uses the first specific application communication protocol PC11 to send the accessed electronic data DE61 toward the first communication target 511 in the data transmission phase UT1 based on the accessed electronic data DE61, the accessed first communication protocol identifier HP1 and the provided communication target identifier HT81.

The sub-step of using the second specific application communication protocol PC21 to send the electronic data DE61 toward the second communication target 521 includes a sub-step that: under a condition that the accessed second functional state code CS91 is recognized by the processing unit 710 as the second valid state code CT91 representing the second selected state SH91 in the data transmission phase UT1, the processing unit 710 uses the second specific application communication protocol PC21 to send the accessed electronic data DE61 toward the second communication target 521 in the data transmission phase UT1 based on the accessed electronic data DE61, the accessed second communication protocol identifier HP2 and the provided communication target identifier HT81.

The plurality of different application communication protocols PC11, PC21, . . . are selected from a group consisting of an email communication protocol, an instant-messaging communication protocol, a short-message service communication protocol and a multimedia-message service communication protocol. The first communication target identifier HT11 is the same as or different from the second communication target identifier HT21. The first communication target 511 is the same as or different from the second communication target 521.

Figure 4:
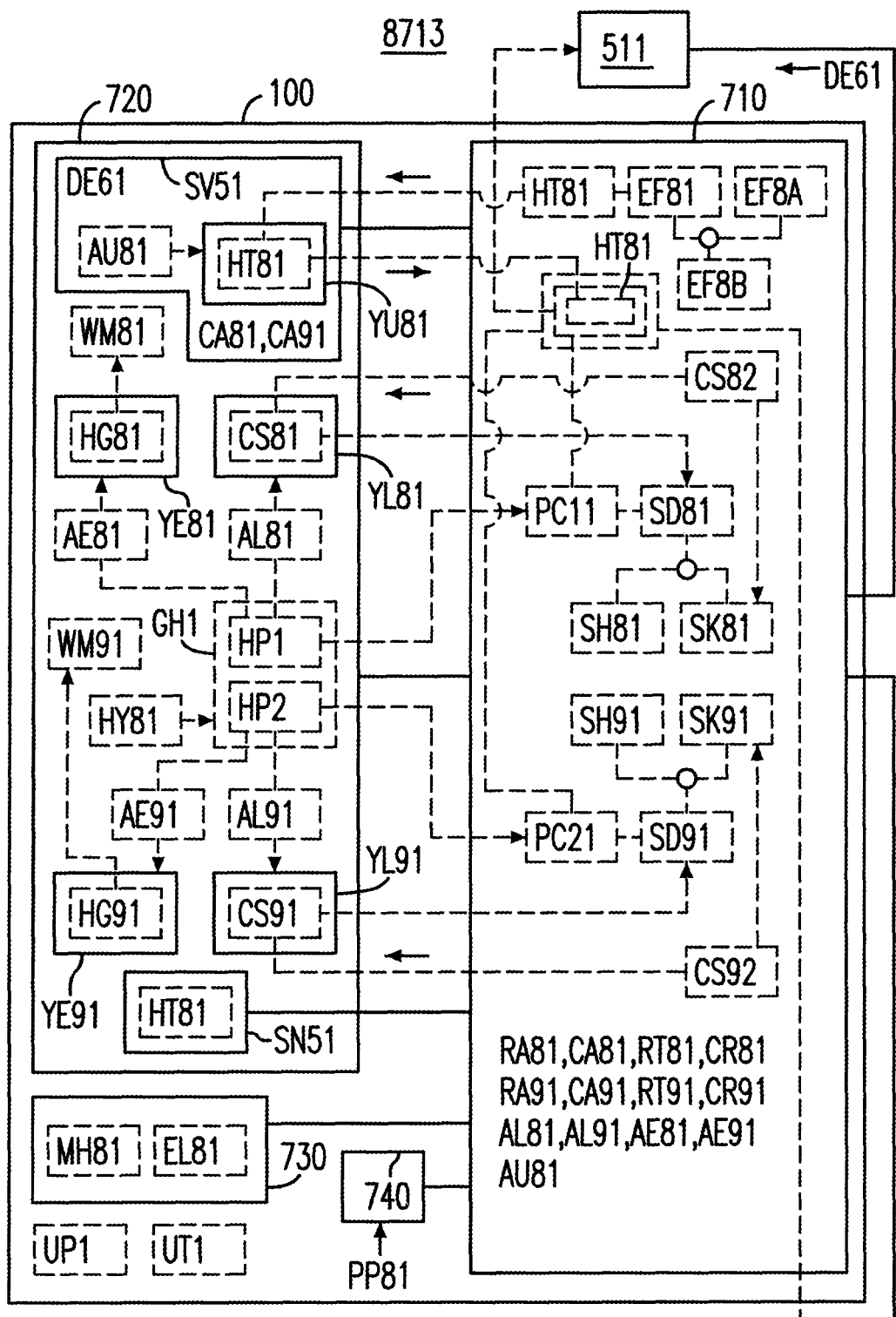
FIG. 4 is a schematic diagram showing an implementation structure of the communication system shown in FIG. 1.
Figure 4:
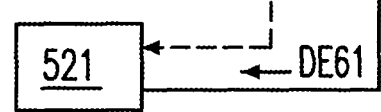

Please refer to FIG. 4, which is a schematic diagram showing an implementation structure 8713 of the communication system 871 shown in FIG. 1. As shown in FIG. 4, the implementation structure 8713 includes the electronic device 100, the first communication target 511 and the second communication target 521. The electronic device 100 is to communicate with at least one of the first communication target 511 and the second communication target 521, and includes the processing unit 710, the storage unit 720 coupled to the processing unit 710, the input unit 740 coupled to the processing unit 710, and the display unit 730 coupled to the processing unit 710. Each of the storage unit 720, the input unit 740 and the display unit 730 is controlled by the processing unit 710. The storage unit 720 has a nonvolatile memory space SN51 coupled to the processing unit 710, and a volatile memory space SV51 coupled to the processing unit 710.

In some embodiments, each of the first electricity application target BU81 and the second electricity application target BU91 is associated with the stored first communication protocol identifier HP1 and the stored second communication protocol identifier HP2 by using the stored protocol identifier group identifier HY81. The storage unit 720 further stores a target identifier set identifier HG81 and a communication target identifier set WM81 identified by the target identifier set identifier HG81, and further has an application memory location YE81 associated with the first specific application communication protocol PC11. For example, the target identifier set identifier HG81 is stored at the application memory location YE81 based on an application memory address AE81 determined according to the first communication protocol identifier HP1. The storage unit 720 stores the communication target identifier set WM81 in the nonvolatile memory space SN51 beforehand.

The storage unit 720 further stores a target identifier set identifier HG91 and a communication target identifier set WM91 identified by the target identifier set identifier HG91, and further has an application memory location YE91 associated with the second specific application communication protocol PC21. For example, the target identifier set identifier HG91 is stored at the application memory location YE91 based on an application memory address AE91 determined according to the second communication protocol identifier HP2. The storage unit 720 stores the communication target identifier set WM91 in the nonvolatile memory space SN51 beforehand.

The storage unit 720 further has an application memory location YU81 identified based on an application memory address AU81. For example, the application memory location YU81 is disposed in the volatile memory space SV51. For example, the storage unit 720 stores the communication target identifier HT81 in the volatile memory space SV51 beforehand.

In some embodiments, the input unit 740 further receives in the data preparation phase UP1 a user input operation PP81 being before the second user input operation PU91. The processing unit 710 performs a data acquisition operation EF81 in response to the user input operation PP81 to obtain the communication target identifier HT81 to be stored. The data acquisition operation EF81 is one of a data acquisition action EF8A and a data acquisition action EF8B. The processing unit 710 fetches the application memory address AU81 in the data preparation phase UP1, and causes the storage unit 720 to store the communication target identifier HT81 at the application memory location YU81 based on the fetched application memory address AU81.

Under a condition that the data acquisition operation EF81 is the data acquisition action EF8A: the input unit 740 provides input data DC81 to the processing unit 710 in response to the user input operation PP81; and the processing unit 710 obtains the communication target identifier HT81 determined according to the input data DC81 based on the input data DC81. Under a condition that the data acquisition operation EF81 is the data acquisition action EF8B: the processing unit 710 reads the communication target identifier HT81 from the nonvolatile memory space SN51 in the data preparation phase UP1 to obtain the communication target identifier HT81 to be stored.

The processing unit 710 obtains the application memory address AU81 in the data transmission phase UT1, and accesses the communication target identifier HT81 stored at the application memory location YU81 based on the obtained application memory address AU81 to cause the storage unit 720 to provide the stored communication target identifier HT81 to the processing unit 710.

In some embodiments, the processing unit 710 reads the communication target identifier HT81 stored in the nonvolatile memory space SN51 in the data preparation phase UP1 in response to the user input operation PP81 to obtain the communication target identifier HT81 to be stored, and causes the display unit 730 to perform a display operation EL81 associated with the read communication target identifier HT81 in response to reading the communication target identifier HT81 to display communication target identification information MH81 associated with the read communication target identifier HT81. For example, the processing unit 710 selects the read communication target identifier HT81 in the data preparation phase UP1, fetches the application memory address AU81 in response to selecting the read communication target identifier HT81, and causes the storage unit 720 to store the selected communication target identifier HT81 at the application memory location YU81 in the data preparation phase UP1 based on the fetched application memory address AU81.

The processing unit 710 uses the read first communication protocol identifier HP1 to obtain the application memory address AE81 in the data preparation phase UP1 in response to reading the communication target identifier HT81 stored in the nonvolatile memory space SN51, and accesses the target identifier set identifier HG81 stored at the application memory location YE81 based on the obtained application memory address AE81. The processing unit 710, based on the accessed target identifier set identifier HG81 and the read communication target identifier HT81, makes a logical decision RA81 on whether the communication target identifier HT81 stored in the nonvolatile memory space SN51 belongs to the communication target identifier set WM81, and causes the storage unit 720 to store a decision data code CA81 representing the logical decision RA81 in the volatile memory space SV51 in response to making the logical decision RA81. For example, the processing unit 710 makes the logical decision RA81 in response to selecting the read communication target identifier HT81.

The processing unit 710 uses the read second communication protocol identifier HP2 to obtain the application memory address AE91 in the data preparation phase UP1 in response to reading the communication target identifier HT81 stored in the nonvolatile memory space SN51, and accesses the target identifier set identifier HG91 stored at the application memory location YE91 based on the obtained application memory address AE91. The processing unit 710, based on the accessed target identifier set identifier HG91 and the read communication target identifier HT81, makes a logical decision RA91 on whether the communication target identifier HT81 stored in the nonvolatile memory space SN51 belongs to the communication target identifier set WM91, and causes the storage unit 720 to store a decision data code CA91 representing the logical decision RA91 in the volatile memory space SV51 in response to making the logical decision RA91. For example, the processing unit 710 makes the logical decision RA91 in response to selecting the read communication target identifier HT81.

In some embodiments, the communication target identifier HT81 stored at the application memory location YU81 is associated with the decision data code CA81 stored in the volatile memory space SV51 and the decision data code CA91 stored in the volatile memory space SV51.

Under a condition that the processing unit 710 recognizes the first functional state code CS81 as the first valid state code CT81 representing the first selected state SH81 in the data transmission phase UT1, the processing unit 710 accesses the decision data code CA81 stored in the volatile memory space SV51. Under a condition that the processing unit 710 recognizes the accessed decision data code CA81 as a valid data code CR81 representing a positive decision RT81, the processing unit 710 uses the first specific application communication protocol PC11 to send the accessed electronic data DE61 toward the first communication target 511 in the data transmission phase UT1 based on the accessed electronic data DE61, the accessed first communication protocol identifier HP1 and the provided communication target identifier HT81.

Under a condition that the processing unit 710 recognizes the second functional state code CS91 as the second valid state code CT91 representing the second selected state SH91 in the data transmission phase UT1, the processing unit 710 accesses the decision data code CA91 stored in the volatile memory space SV51. Under a condition that the processing unit 710 recognizes the accessed decision data code CA91 as a valid data code CR91 representing a positive decision RT91, the processing unit 710 uses the second specific application communication protocol PC21 to send the accessed electronic data DE61 toward the second communication target 521 in the data transmission phase UT1 based on the accessed electronic data DE61, the accessed second communication protocol identifier HP2 and the provided communication target identifier HT81.

Figure 5:
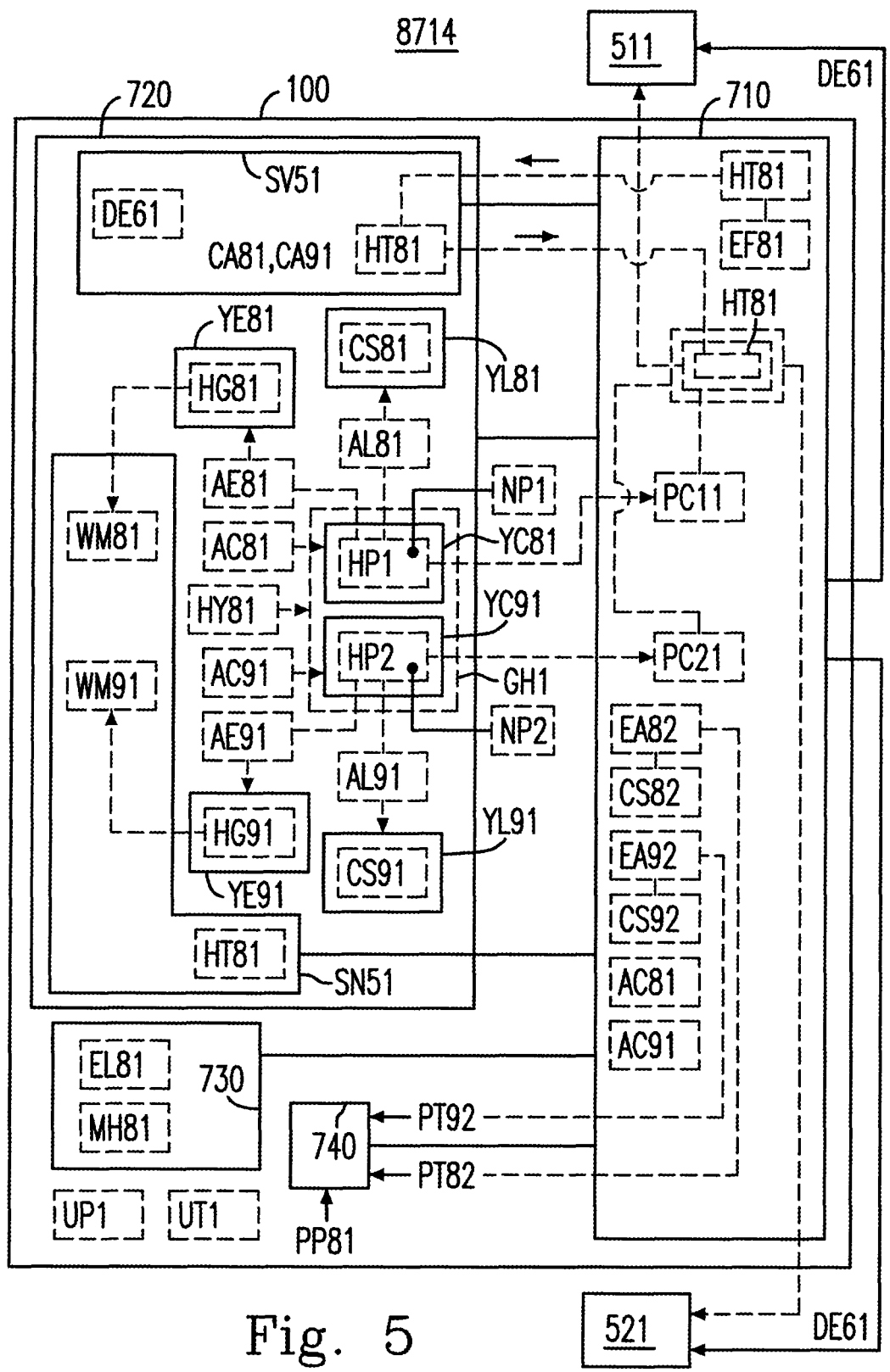
FIG. 5 is a schematic diagram showing an implementation structure of the communication system shown in FIG. 1.

Please refer to FIG. 5, which is a schematic diagram showing an implementation structure 8714 of the communication system 871 shown in FIG. 1. As shown in FIG. 5, the implementation structure 8714 includes the electronic device 100, the first communication target 511 and the second communication target 521. The electronic device 100 is to communicate with at least one of the first communication target 511 and the second communication target 521, and includes the processing unit 710, the storage unit 720 coupled to the processing unit 710, the input unit 740 coupled to the processing unit 710, and the display unit 730 coupled to the processing unit 710. Each of the storage unit 720, the input unit 740 and the display unit 730 is controlled by the processing unit 710. The storage unit 720 has the nonvolatile memory space SN51 coupled to the processing unit 710, and the volatile memory space SV51 coupled to the processing unit 710.

The storage unit 720 stores the protocol identifier group identifier HY81, the electronic data DE61, the first communication protocol identifier HP1, the second communication protocol identifier HP2, the communication target identifier HT81, the first functional state code CS81, the second functional state code CS91, the target identifier set identifier HG81, the communication target identifier set WM81 identified by the target identifier set identifier HG81, the target identifier set identifier HG91, and the communication target identifier set WM91 identified by the target identifier set identifier HG91. The communication target identifier HT81 is associated with at least one of the first electricity application target BU81 and the second electricity application target BU91.

The first functional state code CS81 is stored based on the first communication protocol identifier HP1, or is associated with the first communication protocol identifier HP1. The second functional state code CS91 is stored based on the second communication protocol identifier HP2, or is associated with the second communication protocol identifier HP2. The target identifier set identifier HG81 is stored based on the first communication protocol identifier HP1, or is associated with the first communication protocol identifier HP1. The target identifier set identifier HG91 is stored based on the second communication protocol identifier HP2, or is associated with the second communication protocol identifier HP2.

The first communication protocol identifier HP1 and the second communication protocol identifier HP2 belong to the communication protocol identifier group GH1. For example, the communication protocol identifier group GH1 is a communication protocol identifier array. The first communication protocol identifier HP1 is configured to belong to the communication protocol identifier array based on a first ordinal position represented by a first ordinal number NP1. The second communication protocol identifier HP2 is configured to belong to the communication protocol identifier array based on a second ordinal position represented by a second ordinal number NP2. The storage unit 720 has an application memory location YC81 associated with the first specific application communication protocol PC11, and an application memory location YC91 associated with the second specific application communication protocol PC21.

The first communication protocol identifier HP1 is stored at the application memory location YC81 based on an application memory address AC81. For example, the application memory address AC81 is determined according to the protocol identifier group identifier HY81 and the first ordinal number NP1. The application memory location YC81 is identified based on the application memory address AC81, or is identified by the application memory address AC81. The second communication protocol identifier HP2 is stored at the application memory location YC91 based on an application memory address AC91. For example, the application memory address AC91 is determined according to the protocol identifier group identifier HY81 and the second ordinal number NP2. The application memory location YC91 is identified based on the application memory address AC91, or is identified by the application memory address AC91.

For example, the first communication protocol identifier HP1 is a first numeric identifier. The first functional state code CS81 is stored at the first application memory location YL81 based on the first application memory address AL81. The first application memory address AL81 is determined based on the first communication protocol identifier HP1; therefore, the first functional state code CS81 is stored based on the first communication protocol identifier HP1. For example, the first application memory location YL81 is identified based on the first application memory address AL81, or is identified by the first application memory address AL81.

For example, the second communication protocol identifier HP2 is a second numeric identifier, and is different from the first communication protocol identifier HP1. The second functional state code CS91 is stored at the second application memory location YL91 based on the second application memory address AL91. The second application memory address AL91 is determined based on the second communication protocol identifier HP2; therefore, the second functional state code CS91 is stored based on the second communication protocol identifier HP2. For example, the second application memory location YL91 is identified based on the second application memory address AL91, or is identified by the second application memory address AL91.

For example, the target identifier set identifier HG81 is stored at the application memory location YE81 based on the application memory address AE81. The application memory address AE81 is determined based on the first communication protocol identifier HP1; therefore, the target identifier set identifier HG81 is stored based on the first communication protocol identifier HP1. For example, the application memory location YE81 is identified based on the application memory address AE81, or is identified by the application memory address AE81.

For example, the target identifier set identifier HG91 is stored at the application memory location YE91 based on the application memory address AE91. The application memory address AE91 is determined based on the second communication protocol identifier HP2; therefore, the target identifier set identifier HG91 is stored based on the second communication protocol identifier HP2. For example, the application memory location YE91 is identified based on the application memory address AE91, or is identified by the application memory address AE91.

In some embodiments, the input unit 740 receives the first user input operation PU81 that is occurred earlier than the second user input operation PU91, and provides the first operation request message QN81 to the processing unit 710 in response to the first user input operation PU81 using the first electricity application target BU81. The processing unit 710 causes the electronic device 100 to enter the data preparation phase UP1 in response to the first operation request message QN81. In the data preparation phase UP1, the input unit 740 receives one selected from a group consisting of the third user input operation PT81, the user input operation PP81, the fourth user input operation PU91, the fifth user input operation PV81, and any combination thereof. For example, the processing unit 710 reads at least one selected from a group consisting of the stored protocol identifier group identifier HY81, the stored first communication protocol identifier HP1 and the stored second communication protocol identifier HP2 in response to the first operation request message QN81 to store at least one of the first functional state code CS81 and the second functional state code CS91.

The input unit 740 receives the second user input operation PU91 at an end time of the data preparation phase UP1, and provides the second operation request message QN91 to the processing unit 710 in response to the second user input operation PU91 using the second electricity application target BU91. The processing unit 710 causes the electronic device 100 to leave the data preparation phase UP1 to enter the data transmission phase UT1 in response to the second operation request message QN91.

The processing unit 710 accesses first application data stored by the storage unit 720 in the data transmission phase UT1 to provide the first application data to the processing unit 710. For example, the first application data includes at least one selected from a group consisting of the protocol identifier group identifier HY81, the electronic data DE61, the first communication protocol identifier HP1, the second communication protocol identifier HP2, the communication target identifier HT81, the first functional state code CS81 and the second functional state code CS91. The processing unit 710 uses at least one of the first specific application communication protocol PC11 and the second specific application communication protocol PC21 based on the accessed first application data to send the electronic data DE61 toward at least one of the first communication target 511 and the second communication target 521.

For example, the processing unit 710 accesses the electronic data DE61, the communication target identifier HT81, the first functional state code CS81 and the second functional state code CS91, which are stored by the storage unit 720, in response to the second operation request message QN91 to cause the storage unit 720 to provide the stored electronic data DE61, the stored communication target identifier HT81, the stored first functional state code CS81 and the stored second functional state code CS91 to the processing unit 710.

For example, the processing unit 710 accesses the stored protocol identifier group identifier HY81, the stored electronic data DE61 and the stored communication target identifier HT81 in response to the second operation request message QN91, accesses the stored first communication protocol identifier HP1 and the stored second communication protocol identifier HP2 based on the accessed protocol identifier group identifier HY81, accesses the stored first functional state code CS81 based on the accessed first communication protocol identifier HP1, and accesses the stored second functional state code CS91 based on the accessed second communication protocol identifier HP2.

In some embodiments, the input unit 740 receives the third user input operation PT81 using the third electricity application target BV81 to provide the third operation request message QC81 to the processing unit 710. The processing unit 710 performs the first data encoding operation EA81 to determine the first functional state code CS81 in response to the third operation request message QC81, and uses the read first communication protocol identifier HP1 to cause the storage unit 720 to store the determined first functional state code CS81 to the first application memory location YL81 in response to determining the first functional state code CS81. For example, the first data encoding operation EA81 is one of the first practical encoding operation EC81 and the second practical encoding operation ED81. The first practical encoding operation EC81 is used to select the first specific application communication protocol PC11. The second practical encoding operation ED81 is used to stop selecting the first specific application communication protocol PC11.

The input unit 740 receives the user input operation PP81 to provide an operation request message QP81 to the processing unit 710. The processing unit 710 performs the data acquisition operation EF81 in response to the operation request message QP81 to obtain the communication target identifier HT81 to be stored, and causes the storage unit 720 to store the obtained communication target identifier HT81 in the volatile memory space SV51 in response to obtaining the to-be-stored communication target identifier HT81. For example, the data acquisition operation EF81 reads the communication target identifier HT81 from the nonvolatile memory space SN51. The processing unit 710 is configured to select the read communication target identifier HT81, and causes the storage unit 720 to store the selected communication target identifier HT81 at the application memory location YU81 in response to selecting the read communication target identifier HT81.

The input unit 740 receives the fourth user input operation PT91 using the fourth electricity application target BV91 to provide the fourth operation request message QC91 to the processing unit 710. The processing unit 710 performs the second data encoding operation EA91 to determine the second functional state code CS91 in response to the fourth operation request message QC91, and uses the read second communication protocol identifier HP2 to cause the storage unit 720 to store the determined second functional state code CS91 to the second application memory location YL91 in response to determining the second functional state code CS91. For example, the second data encoding operation EA91 is one of the third practical encoding operation EC91 and the forth practical encoding operation ED91. The third practical encoding operation EC91 is used to select the second specific application communication protocol PC21. The fourth practical encoding operation ED91 is used to stop selecting the second specific application communication protocol PC21.

In some embodiments, the stored protocol identifier group identifier HY81 is one of a third numeric identifier and an alphanumeric identifier. The third electricity application target BV81 is associated with the stored protocol identifier group identifier HY81. The processing unit 710 reads or accesses the stored protocol identifier group identifier HY81 in response to the third operation request message QC81, and reads the stored first communication protocol identifier HP1 belonging to the communication protocol identifier group GH1 based on the read protocol identifier group identifier HY81 and the first ordinal number NP1. The fourth electricity application target BV91 is associated with the stored protocol identifier group identifier HY81. The processing unit 710 reads or accesses the stored protocol identifier group identifier HY81 in response to the fourth operation request message QC91, and reads the stored second communication protocol identifier HP2 belonging to the communication protocol identifier group GH1 based on the read protocol identifier group identifier HY81 and the second ordinal number NP2.

The input unit 740 receives the fifth user input operation PV81 to provide the input data DB21 to the processing unit 710. The processing unit 710, in response to obtaining the input data DB21, causes the storage unit 720 to store the electronic data DE61 determined according to the obtained input data DB21, and accesses the stored electronic data DE61 to send the accessed electronic data DE61 in response to the second operation request message QN91.

After the processing unit 710 uses the second specific application communication protocol PC21 to send the electronic data DE61 toward the second communication target 521, the input unit 740 can receive the sixth user input operation PT92, using the fourth electricity application target BV91, to provide the fifth operation request message QC92 to the processing unit 710. The processing unit 710, in response to the fifth operation request message QC92, replaces the second functional state code CS91 stored by the storage unit 720 with the third functional state code CS92 representing the second non-selected state SK91 to stop selecting the second specific application communication protocol PC21. For example, the processing unit 710 performs a data encoding operation EA92 to determine the third functional state code CS92 based on the second functional state code CS91.

After the processing unit 710 uses the first specific application communication protocol PC11 to send the electronic data DE61 toward the first communication target 511, the input unit 740 can receive a user input operation PT82, using the third electricity application target BV81, to provide the operation request message QC82 to the processing unit 710. The processing unit 710, in response to the operation request message QC82, replaces the first functional state code CS81 stored by the storage unit 720 with the second functional state code CS82 representing the second non-selected state SK81 to stop selecting the first specific application communication protocol PC11. For example, the processing unit 710 performs a data encoding operation EA82 to determine the second functional state code CS82 based on the first functional state code CS81.

Please additionally refer to FIG. 2 and FIG. 3. In some embodiments, one of the input unit 740 and the display unit 730 provides the electricity-using target BV71. The storage unit 720 stores the first functional state code CS71. The processing unit 710 causes the storage unit 720 to provide the first functional state code CS71 to the processing unit 710. For example, the first functional state code CS71 represents the functional state SD71 which the practical application communication protocol PC01 is configured to be in. The practical application communication protocol PC01 is one of the first specific application communication protocol PC11 and the second specific application communication protocol PC21. The functional state SD71 is equal to one of the selected state SH71 and the non-selected state SK71.

Under a condition that the processing unit 710 recognizes the provided first functional state code CS71 as the valid state code CT71 representing the selected state SH71, the processing unit 710 sends the electronic data DE61 toward the practical target 501 based on the provided communication target identifier HT81 and the practical application communication protocol PC01. The practical target 501 is one of the first communication target 511 and the second communication target 521.

After the processing unit 710 uses the practical application communication protocol PC01 to send the electronic data DE61 toward the practical communication target 501, the processing unit 710 receives the operation request message QC72 by means of the electricity-using target BV71. The processing unit 710, in response to the operation request message QC72, replaces the first functional state code CS71 with the second functional state code CS72 representing the non-selected state SK71 to stop selecting the practical application communication protocol PC01. For example, the processing unit 710 performs a data encoding operation EA72 to determine the second functional state code CS72 based on the provided first functional state code CS71.

In some embodiments, the first functional state code CS71 is one of the first functional state code CS81 and the second functional state code CS91, which are stored in the storage unit 720. Under a condition that the first functional state code CS71 is the first functional state code CS81, the electricity-using target BV71, the practical application communication protocol PC01, the functional state SD71, the selected state SH71, the non-selected state SK71, the valid state code CT71, the practical communication target 501, the operation request message QC72, the second functional state code CS72 and the data encoding operation EA72 are the third electricity application target BV81, the first specific application communication protocol PC11, the first functional state SD81, the first selected state SH81, the first non-selected state SK81, the first valid state code CT81, the first communication target 511, the operation request message QC82, the second functional state code CS82 and the data encoding operation EA82, respectively.

Under a condition that the first functional state code CS71 is the second functional state code CS91, the electricity-using target BV71, the practical application communication protocol PC01, the functional state SD71, the selected state SH71, the non-selected state SK71, the valid state code CT71, the practical communication target 501, the operation request message QC72, the second functional state code CS72 and the data encoding operation EA72 are the fourth electricity application target BV91, the second specific application communication protocol PC21, the second functional state SD91, the second selected state SH91, the second non-selected state SK91, the second valid state code CT91, the second communication target 521, the fifth operation request message QC92, the third functional state code CS92 and the data encoding operation EA92, respectively.

For example, the first electricity application target BU81 is one of a first display target and a first sensing target. The second electricity application target BU91 is one of a second display target and a second sensing target. The third electricity application target BV81 is one of a third display target and a third sensing target. The fourth electricity application target BV91 is one of a fourth display target and a fourth sensing target.

Figure 6:
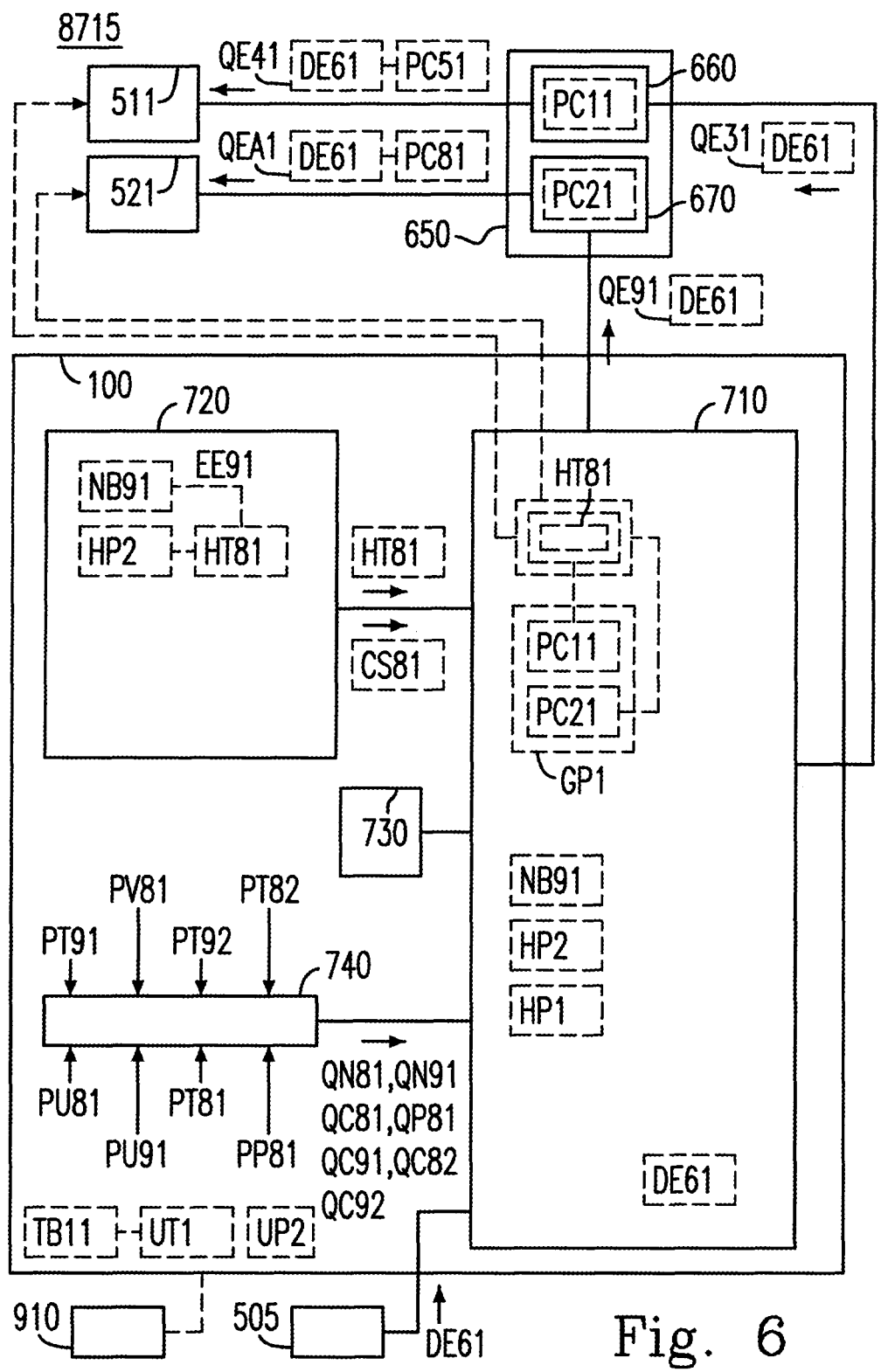
FIG. 6 is a schematic diagram showing an implementation structure of the communication system shown in FIG. 1.

Please refer to FIG. 6, which is a schematic diagram showing an implementation structure 8715 of the communication system 871 shown in FIG. 1. As shown in FIG. 6, the implementation structure 8715 includes the electronic device 100, a message service system 650, the first communication target 511 and the second communication target 521. The electronic device 100 includes the processing unit 710, the storage unit 720 coupled to the processing unit 710, the input unit 740 coupled to the processing unit 710, and the display unit 730 coupled to the processing unit 710. The message service system 650 includes a first message service device 660 and a second message service device 670. The processing unit 710 is coupled to the first message service device 660 and the second message service device 670. The first message service device 660 supports the first specific application communication protocol PC11. The second message service device 670 supports the second specific application communication protocol PC21, and is the same or different from the first message service device 660.

In some embodiments, the processing unit 710 accesses or reads the electronic data DE61, the first communication protocol identifier HP1 and the communication target identifier HT81, which are stored in the storage unit 720, in response to the second operation request message QN91 to obtain the stored electronic data DE61, the stored first communication protocol identifier HP1 and the stored communication target identifier HT81, and uses the first specific application communication protocol PC11 to transmit an electronic message QE31 toward the first message service device 660 in the data transmission phase UT1 based on the obtained electronic data DE61, the obtained first communication protocol identifier HP1 and the obtained communication target identifier HT81. The electronic message QE31 includes the electronic data DE61.

For example, the electronic message QE31 is or serves as an instruction message used to instruct the first message service device 660. The first message service device 660 uses the first specific application communication protocol PC11 to transmit an electronic message QE41 toward the first communication target 511 in response to the electronic message QE31, so that the first communication target 511 receives the electronic message QE41 in a specific application communication protocol PC51 being matched with or equal to the first specific application communication protocol PC11. The electronic message QE41 includes the electronic data DE61.

The processing unit 710 accesses or reads the electronic data DE61, the second communication protocol identifier HP2 and the communication target identifier HT81, which are stored in the storage unit 720, in response to the second operation request message QN91 to obtain the stored electronic data DE61, the stored second communication protocol identifier HP2 and the stored communication target identifier HT81, and uses the second specific application communication protocol PC21 to transmit an electronic message QE91 toward the second message service device 670 in the data transmission phase UT1 based on the obtained electronic data DE61, the obtained second communication protocol identifier HP2 and the obtained communication target identifier HT81. The electronic message QE91 includes the electronic data DE61.

For example, the electronic message QE91 is or serves as an instruction message used to instruct the second message service device 670. The second message service device 670 uses the second specific application communication protocol PC21 to transmit an electronic message QEA1 toward the second communication target 521 in response to the electronic message QE91, so that the second communication target 521 receives the electronic message QEA1 in a specific application communication protocol PC81 being matched with or equal to the second specific application communication protocol PC21. The electronic message QEA1 includes the electronic data DE61.

In some embodiments, the storage unit 720 further stores a user account NB91 associated with the stored second communication protocol identifier HP2 and the stored communication target identifier HT81. For example, the stored communication target identifier HT81 and the user account NB91 have a data chaining EE91 therebetween. Under a condition that the stored communication target identifier HT81 belongs to the second communication target identifier set WM91, the stored communication target identifier HT81 is configured to correspond to the user account NB91 configured to indicate the second communication target 521.

In a specific situation associated with the user account NB91, under a condition that the processing unit 710 recognizes the accessed decision data code CA91 as the valid data code CR91 representing the positive decision RT91 in the data transmission phase UT1, the processing unit 710 accesses the user account NB91, used to send the electronic data DE61, based on the provided communication target identifier HT81 and the data chaining EE91. The processing unit 710 uses the second specific application communication protocol PC21 to send the electronic data DE61 toward the second communication target 521 in the data transmission phase UT1 based on the accessed electronic data DE61, the accessed second communication protocol identifier HP2 and the accessed user account NB91.

In some embodiments, the processing unit 710 accesses or reads the electronic data DE61, the second communication protocol identifier HP2 and the user account NB91, which are stored in the storage unit 720, in response to the second operation request message QN91 to obtain the stored electronic data DE61, the stored second communication protocol identifier HP2 and the stored user account NB91, and uses the second specific application communication protocol PC21 to transmit an electronic message QE91 toward the second message service device 670 in the data transmission phase UT1 based on the obtained electronic data DE61, the obtained second communication protocol identifier HP2 and the obtained user account NB91. The electronic message QE91 includes the electronic data DE61.

For example, the data transmission phase UT1 immediately follows the provision time TB11, and has a time length. For example, the time length is equal to one selected from a group consisting of 10 minutes, 5 minutes, 3 minutes, 2 minutes, 1 minute, 50 seconds, 40 seconds, 30 seconds, 20 seconds, 10 seconds, 5 seconds, 3 seconds, 2 seconds, 1 second and 0.5 second. In some embodiments, when the processing unit 710 is configured to cause the data transmission phase UT1 to end, the processing unit 710 causes the electronic device 100 to enter a data preparation phase UP2 being after the data transmission phase UT1. For example, the processing unit 710 causes the electronic device 100 to enter the data preparation phase UP2 in response to the second operation request message QN91.

In some embodiments, the electronic device 100 is used by a user 910. The input unit 740 receives from the user 910 at least one selected from a plurality of user input operations. The plurality of user input operations include the first user input operation PU81, the second user input operation PU91, the third user input operation PT81, the user input operation PP81, the fourth user input operation PT91, the fifth user input operation PV81, the sixth user input operation PT92 and the user input operation PT82. In some embodiments, the electronic device 100 is used by a plurality of users including the user 910. The input unit 740 is operated by the plurality of users to receive the plurality of user input operations. For example, the plurality of users are different.

In some embodiments, each of the first specific application communication protocol PC11 and the second specific application communication protocol PC21 is selected from the plurality of different application communication protocols PC11, PC21, . . . . The plurality of different application communication protocols PC11, PC21, . . . are selected from a group consisting of the email communication protocol, the instant-messaging communication protocol, the short-message service communication protocol and the multimedia-message service communication protocol. For example, the first operation request message QN81, the second operation request message QN91, the third operation request message QC81, the operation request message QP81, the fourth operation request message QC91, the operation request message QC81 and the fifth operation request message QC92 are a plurality of user request messages, respectively. For example, the plurality of different application communication protocols PC11, PC21, . . . constitute an application communication protocol group GP1. The communication protocol identifier group GH1 is configured to identify the application communication protocol group GP1.

For example, the processing unit 710 reads at least one selected from a group consisting of the stored protocol identifier group identifier HY81, the stored first communication protocol identifier HP1 and the stored second communication protocol identifier HP2 in response to the second operation request message QN91. For example, the processing unit 710 accesses at least one selected from a group consisting of the stored protocol identifier group identifier HY81, the stored first communication protocol identifier HP1 and the stored second communication protocol identifier HP2 in response to the second operation request message QN91.

In some embodiments, the processing unit 710 receives the electronic data DE61 from an external device 505 in the data preparation phase IP1, and stores the received electronic data DE61 into the storage unit 720 in response to receiving the electronic data DE61. For example, the external device 505 is coupled to the processing unit 710. In some embodiments, the processing unit 710 accesses the protocol identifier group identifier HY81 in response to the second operation request message QN91, and accesses the first communication protocol identifier HP1 stored at the application memory location YC81 based on the accessed protocol identifier group identifier HY81 and the first ordinal number NP1. The processing unit 710 accesses the second communication protocol identifier HP2 stored at the application memory location YC91 based on the accessed protocol identifier group identifier HY81 and the second ordinal number NP2. For example, the external device 505 is one of the first communication target 511 and the second communication target 521.

Figure 7:
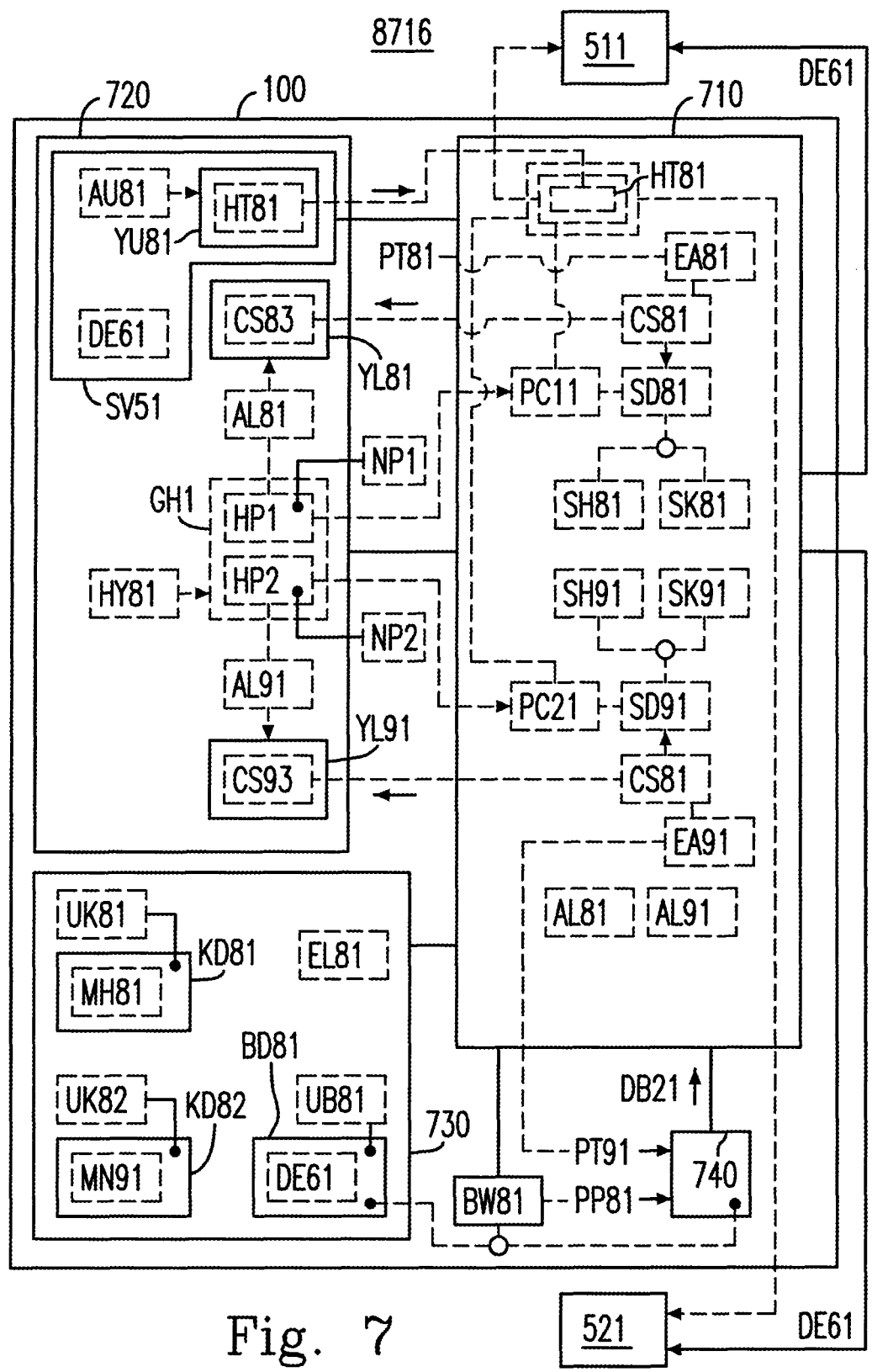
FIG. 7 is a schematic diagram showing an implementation structure of the communication system shown in FIG. 1.

Please refer to FIG. 7, which is a schematic diagram showing an implementation structure 8716 of the communication system 871 shown in FIG. 1. As shown in FIG. 7, the implementation structure 8716 includes the electronic device 100, the first communication target 511 and the second communication target 521. The electronic device 100 includes the processing unit 710, the storage unit 720 coupled to the processing unit 710, the input unit 740 coupled to the processing unit 710, and the display unit 730 coupled to the processing unit 710. Each of the storage unit 720, the input unit 740 and the display unit 730 is controlled by the processing unit 710. One of the input unit 740 and the display unit 730 includes an electricity application target BW81 coupled to the processing unit 710. The electricity application target BW81 is associated with the application memory location YU81 disposed in the volatile memory space SV51.

In some embodiments, the input unit 740 receives in the data preparation phase UP1 the user input operation PP81 using or selecting the electricity application target BW81, and provides the operation request message QP81 to the processing unit 710 in response to the user input operation PP81. The processing unit 710 reads the communication target identifier HT81 stored in the nonvolatile memory space SN51 in response to the operation request message QP81 to obtain the communication target identifier HT81 to be stored, and causes the display unit 730 to perform a display operation EL81 associated with the read communication target identifier HT81 in response to reading the stored communication target identifier HT81. The display operation EL81 is used to display communication target identification information MH81 associated with the read communication target identifier HT81.

The processing unit 710 selects the read communication target identifier HT81 in the data preparation phase UP1 in response to the operation request message QP81, fetches the application memory address AU81 in response to selecting the read communication target identifier HT81, and causes the storage unit 720 to store the selected communication target identifier HT81 at the application memory location YU81 in the data preparation phase UP1 based on the fetched application memory address AU81.

The display unit 730 includes a display area KD81 located at a display representative location UK81, a display area KD82 located at a display representative location UK82, and a display area BD81 located at a display representative location UB81. The display representative location UK81, the display representative location UK82 and the display representative location UB81 are different. The processing unit 710, in the data preparation phase UP1 based on the obtained communication target identifier HT81, causes the display unit 730 to display on the display area KD81 communication target identification information MH81 representing the obtained communication target identifier HT81. The processing unit 710, in the data preparation phase UP1 based on the accessed user account NB91, causes the display unit 730 to display on the display area KD82 user account information MN91 representing the user account NB91. In addition, the processing unit 710, in the data preparation phase UP1 based on the input data DB21 provided by the input unit 740, causes the display unit 730 to display on the display area BD81 the electronic data DE61 derived from the provided input data DB21.

In some embodiments, before the input unit 740 receives the third user input operation PT81, the storage unit 720 stores a functional state code CS83 stored based on the stored first communication protocol identifier HP1. The functional state code CS83 is stored at the first application memory location YL81, and represents one of the first selected state SH81 and the first non-selected state SK81. The processing unit 710 performs the first data encoding operation EA81 to determine the first functional state code CS81 being different from the functional state code CS83 in response to the third user input operation PT81, and uses the read first communication protocol identifier HP1 to cause the storage unit 720 to store the determined first functional state code CS81 to the first application memory location YL81 in response to determining the first functional state code CS81. In some embodiments, the input unit 740 receives the third user input operation PT81 occurred earlier than the first user input operation PU81 to cause the processing unit 710 to determine the first functional state code CS81.

For example, the first data encoding operation EA81 is performed to determine the first functional state code CS81 based on the functional state code CS83, and is one of the first practical encoding operation EC81 and the second practical encoding operation ED81. The first practical encoding operation EC81 is used to select the first specific application communication protocol PC11. The second practical encoding operation ED81 is used to stop selecting the first specific application communication protocol PC11. For example, the processing unit 710 reads the stored protocol identifier group identifier HY81 in response to determining the first functional state code CS81, reads the stored first communication protocol identifier HP1 based on the read protocol identifier group identifier HY81 and the first ordinal number NP1, fetches the first application memory address AL81 based on the read first communication protocol identifier HP1, and replaces the functional state code CS83 stored at the first application memory location YL81 with the determined first functional state code CS81 based on the fetched first application memory address AL81.

In some embodiments, before the input unit 740 receives the fourth user input operation PT91, the storage unit 720 stores a functional state code CS93 stored based on the stored second communication protocol identifier HP2. The functional state code CS93 is stored at the second application memory location YL91, and represents one of the second selected state SH91 and the second non-selected state SK91. The processing unit 710 performs the second data encoding operation EA91 to determine the second functional state code CS91 being different from the functional state code CS93 in response to the fourth user input operation PT91, and uses the read second communication protocol identifier HP2 to cause the storage unit 720 to store the determined second functional state code CS91 to the second application memory location YL91 in response to determining the second functional state code CS91. In some embodiments, the input unit 740 receives the fourth user input operation PT91 occurred earlier than the first user input operation PU81 to cause the processing unit 710 to determine the second functional state code CS91.

For example, the second data encoding operation EA91 is performed to determine the second functional state code CS91 based on the functional state code CS93, and is one of the third practical encoding operation EC91 and the fourth practical encoding operation ED91. The third practical encoding operation EC91 is used to select the second specific application communication protocol PC21. The fourth practical encoding operation ED91 is used to stop selecting the second specific application communication protocol PC21. For example, the processing unit 710 reads the stored protocol identifier group identifier HY81 in response to determining the second functional state code CS91, reads the stored second communication protocol identifier HP2 based on the read protocol identifier group identifier HY81 and the second ordinal number NP2, fetches the second application memory address AL91 based on the read second communication protocol identifier HP2, and replaces the functional state code CS93 stored at the second application memory location YL91 with the determined second functional state code CS91 based on the fetched second application memory address AL91.

Figure 8:
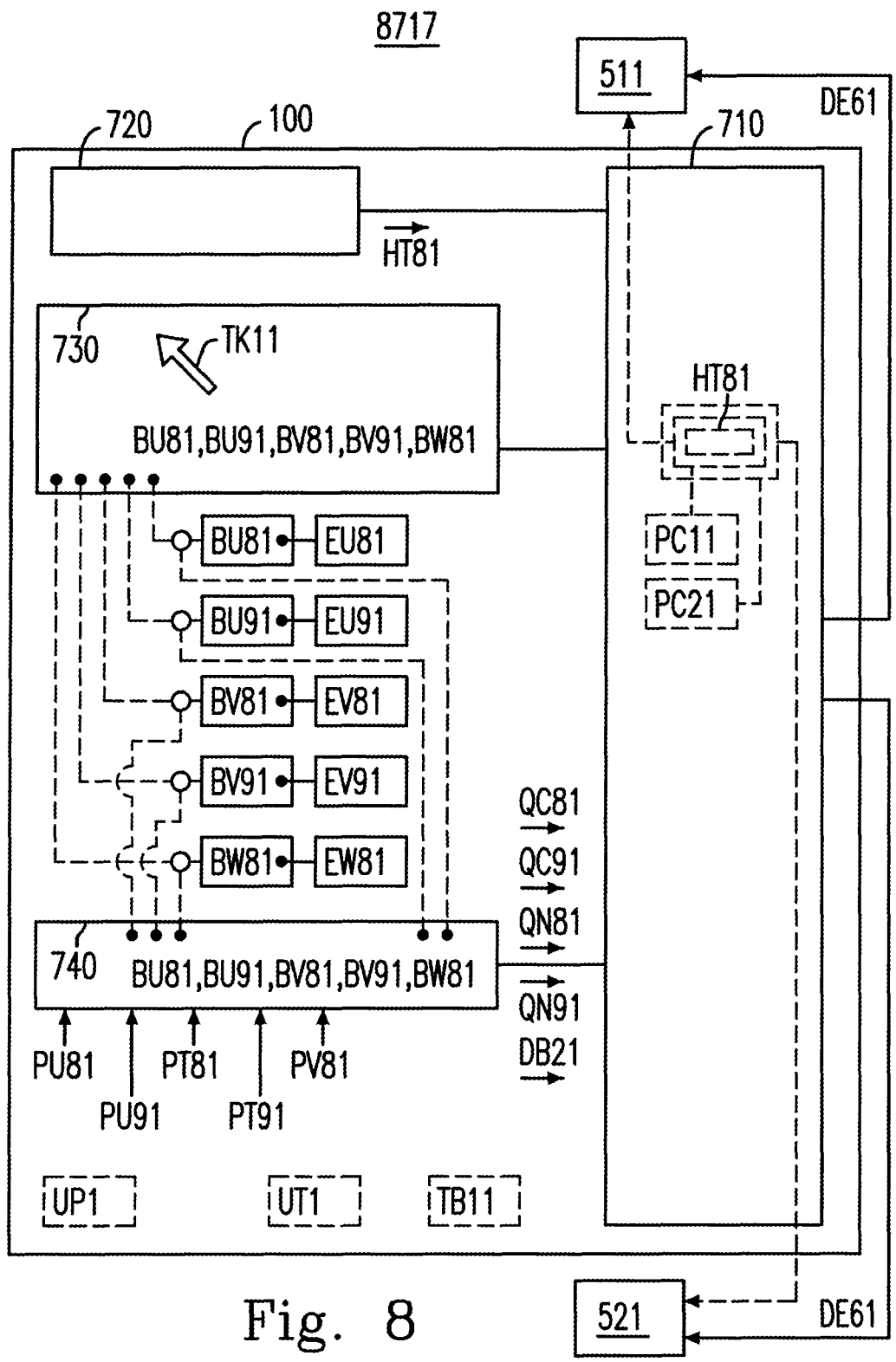
FIG. 8 is a schematic diagram showing an implementation structure of the communication system shown in FIG. 1.

Please refer to FIG. 8, which is a schematic diagram showing an implementation structure 8717 of the communication system 871 shown in FIG. 1. As shown in FIG. 8, the implementation structure 8717 includes the electronic device 100, the first communication target 511 and the second communication target 521. The electronic device 100 includes the processing unit 710, the storage unit 720 coupled to the processing unit 710, the input unit 740 coupled to the processing unit 710, and the display unit 730 coupled to the processing unit 710. Each of the storage unit 720, the input unit 740 and the display unit 730 is controlled by the processing unit 710.

In some embodiments, the electronic device 100 includes the first electricity application target BU81, the second electricity application target BU91, the third electricity application target BV81, the fourth electricity application target BV91 and the electricity application target BW81, each of which is coupled to the processing unit 710. The first, the second, the third and the fourth electricity application targets BU81, BU91, BV81 and BV91 and the electricity application target BW81 are respectively located at a spatial location EU81, a spatial location EU91, a spatial location EV81, a spatial location EV91 and a spatial location EW81.

For example, the spatial locations EU81, EU91, EV81, EV91 and EW81 are different. For example, two selected from a group consisting of the spatial locations EU81, EU91, EV81, EV91 and EW81 are the same. The first, the second, the third and the fourth electricity application targets BU81, BU91, BV81 and BV91 and the electricity application target BW81 respectively have a plurality of electricity application areas, or are respectively formed by the plurality of electricity application areas.

For example, the input unit 740 includes one selected from a group consisting of the first, the second, the third and the fourth electricity application targets BU81, BU91, BV81 and BV91, the electricity application target BW81, and any combination thereof. For example, the first electricity application target BU81 is a first sensing target, wherein the first sensing target includes one selected from a group consisting of a first sensing area, a first push button and a first touch point. The second electricity application target BU91 is a second sensing target, wherein the second sensing target includes one selected from a group consisting of a second sensing area, a second push button and a second touch point. The third electricity application target BV81 is a third sensing target, wherein the third sensing target includes one selected from a group consisting of a third sensing area, a third push button and a third touch point. The fourth electricity application target BV91 is a fourth sensing target, wherein the fourth sensing target includes one selected from a group consisting of a fourth sensing area, a fourth push button and a fourth touch point.

The processing unit 710 causes the electronic device 100 to enter the data preparation phase UP1 by means of the first electricity application target BU81. The processing unit 710 causes the electronic device 100 to leave the data preparation phase UP1 to enter the data transmission phase UT1 by means of the second electricity application target BU91. The processing unit 710 determines the first functional state code CS81 by means of the third electricity application target BV81. The processing unit 710 determines the second functional state code CS91 by means of the fourth electricity application target BV91. The processing unit 710 obtains the communication target identifier HT81 to be stored to the volatile memory space SV51 by means of the electricity application target BW81.

For example, the display unit 730 includes one selected from a group consisting of the first, the second, the third and the fourth electricity application targets BU81, BU91, BV81 and BV91, the electricity application target BW81, and any combination thereof. For example, the processing unit 710 is configured to cause the display unit 730 to display the first and the second electricity application targets BU81 and BU91 at the same time or for different times. For example, the processing unit 710 is configured to cause the display unit 730 to display the third and the fourth electricity application targets BV81 and BV91 at the same time or for different times.

For example, the first electricity application target BU81 is a first display target, wherein the first display target includes one selected from a group consisting of a first display area, a first icon and a first display action item. The second electricity application target BU91 is a second display target, wherein the second display target includes one selected from a group consisting of a second display area, a second icon and a second display action item. The third electricity application target BV81 is a third display target, wherein the third display target includes one selected from a group consisting of a third display area, a third icon and a third display action item. The fourth electricity application target BV91 is a fourth display target, wherein the fourth display target includes one selected from a group consisting of a fourth display area, a fourth icon and a fourth display action item.

The first electricity application target BU81 is associated with at least one selected from a group consisting of the stored protocol identifier group identifier HY81, the stored first communication protocol identifier HP1, the stored second communication protocol identifier HP2, the stored communication target identifier HT81, the stored target identifier set identifier HG81 and the stored target identifier set identifier HG91. The second electricity application target BU91 is associated with at least one selected from a group consisting of the stored protocol identifier group identifier HY81, the stored first communication protocol identifier HP1, the stored second communication protocol identifier HP2, the stored electronic data DE61 and the stored communication target identifier HT81.

The third electricity application target BV81 is associated with at least one of the stored first communication protocol identifier HP1 and the first application memory address AL81. The fourth electricity application target BV91 is associated with at least one of the stored second communication protocol identifier HP2 and the second application memory address AL91. The electricity application target BV81 is associated with the stored communication target identifier HT81, and is used to select the stored communication target identifier HT81.

In some embodiments, the processing unit 710 is configured to cause the display unit 730 to display a selection tool TK11. The first user input operation PU81 uses or selects the first electricity application target BU81 displayed by the display unit 730 by means of the selection tool TK11 to cause the input unit 740 to provide the first operation request message QN81 to the processing unit 710. The second user input operation PU91 uses or selects the second electricity application target BU91 displayed by the display unit 730 by means of the selection tool TK11 to cause the input unit 740 to provide the second operation request message QN91 to the processing unit 710. The third user input operation PT81 uses or selects the third electricity application target BV81 displayed by the display unit 730 by means of the selection tool TK11 to cause the input unit 740 to provide the third operation request message QC81 to the processing unit 710. The fourth user input operation PT91 uses or selects the fourth electricity application target BV91 displayed by the display unit 730 by means of the selection tool TK11 to cause the input unit 740 to provide the fourth operation request message QC91 to the processing unit 710.

The user input operation PP81 uses or selects the electricity application target BW81 displayed by the display unit 730 by means of the selection tool TK11 to cause the input unit 740 to provide the operation request message QP81 to the processing unit 710. The sixth user input operation PT92 uses or selects the fourth electricity application target BV91 displayed by the display unit 730 by means of the selection tool TK11 to cause the input unit 740 to provide the fifth operation request message QC92 to the processing unit 710. The user input operation PT82 uses or selects the third electricity application target BV81 displayed by the display unit 730 by means of the selection tool TK11 to cause the input unit 740 to provide the operation request message QC82 to the processing unit 710. For example, the selection tool TK11 is a cursor.

Figure 9:
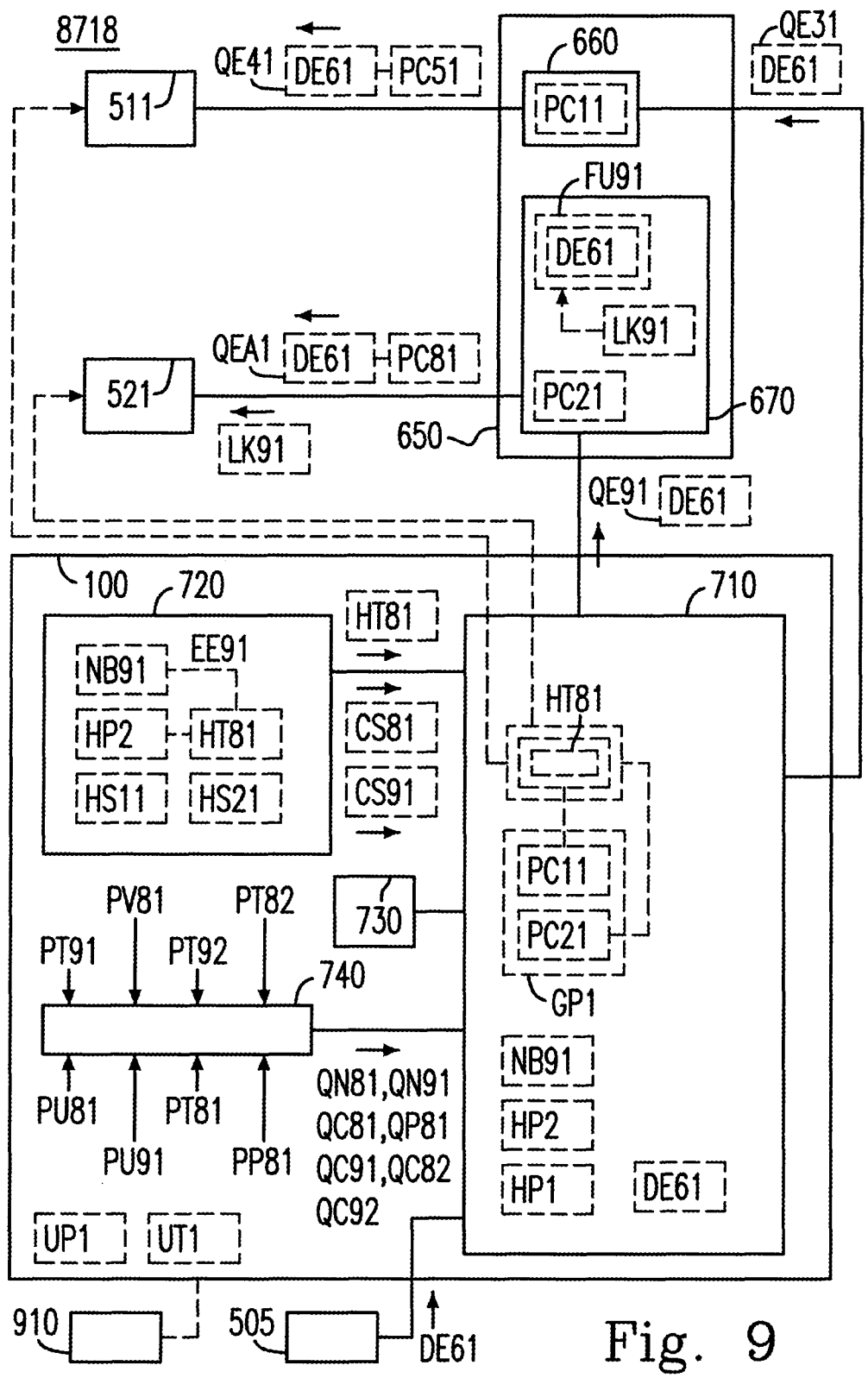
FIG. 9 is a schematic diagram showing an implementation structure of the communication system shown in FIG. 1.

Please refer to FIG. 9, which is a schematic diagram showing an implementation structure 8718 of the communication system 871 shown in FIG. 1. As shown in FIG. 9, the implementation structure 8718 includes the electronic device 100, the message service system 650, the first communication target 511 and the second communication target 521. The electronic device 100 includes the processing unit 710, the storage unit 720 coupled to the processing unit 710, the input unit 740 coupled to the processing unit 710, and the display unit 730 coupled to the processing unit 710. The message service system 650 includes the first message service device 660 and the second message service device 670. The processing unit 710 is coupled to the first message service device 660 and the second message service device 670. The first message service device 660 supports the first specific application communication protocol PC11. The second message service device 670 supports the second specific application communication protocol PC21, and is the same or different from the first message service device 660.

In some embodiments, the communication target identifier HT81 is an email address; the first specific application communication protocol PC11 is the email communication protocol; and the second specific application communication protocol PC21 is the instant-messaging communication protocol. The second message service device 670 supports the second specific application communication protocol PC21. For example, under a condition that the second communication target 521 is linked (or coupled) to the second message service device 670 by using the second specific application communication protocol PC21 (or the instant-messaging communication protocol), the processing unit 710 uses the provided communication target identifier HT81 and the second specific application communication protocol PC21 to send the electronic data DE61 toward the second communication target 521 in response to the second operation request message QN91, so that the second communication target 521 instantly receives the electronic data DE61 from the electronic device 100 through the second message service device 670.

For example, the second communication target 521 has at least one of the communication target identifier HT81 and the user account NB91, and is linked (or coupled) to one of the message service system 650 and the second message service device 670 based on the second specific application communication protocol PC21 and at least one of the communication target identifier HT81 and the user account NB91.

The first message service device 660 supports the first specific application communication protocol PC11. For example, under a condition that the second communication target 521 is linked (or coupled) to the second message service device 670 by using the second specific application communication protocol PC21 (or the instant-messaging communication protocol), the processing unit 710 uses the provided communication target identifier HT81 and the first specific application communication protocol PC11 (or the email communication protocol) to send the electronic data DE61 toward the first message service device 660 in response to the second operation request message QN91, so that the first communication target 511 receives the electronic data DE61 from the electronic device 100 through the first message service device 660 after the data transmission phase UT1.

For example, the second communication target 521 is the same or different from the first communication target 511. For example, the first communication target 511 has the communication target identifier HT81, and is linked (or coupled) to one of the message service system 650 and the first message service device 660 based on the first specific application communication protocol PC11 and the communication target identifier HT81.

In some embodiments, the second message service device 670 receives the electronic message QE91 including the electronic data DE61 from the electronic device 100, obtains a uniform resource locator (abbreviated to URL) LK91 used to temporarily store the electronic data DE61 in response to receiving the electronic message QE91. The uniform resource locator LK91 is configured to identify a web page FU91. The second message service device 670 causes the web page FU91 to temporarily include the electronic data DE61 based on the uniform resource locator LK91, transmits the uniform resource locator LK91 to the second communication target 521, and transmits the electronic message QEA1 including the electronic data DE61 toward the second communication target 521 from the web page FU91 under a condition that the second communication target 521 uses the uniform resource locator LK91.

In some embodiments, the message service system 650 includes the first message service device 660 and the second message service device 670. The electronic device 100 is identified by a first source communication target identifier HS11 under the first specific application communication protocol PC11, and is identified by a second source communication target identifier HS21 under the second specific application communication protocol PC21. For example, the first source communication target identifier HS11 is the same as or different from the second source communication target identifier HS21. The electronic device 100 has the first source communication target identifier HS11 and the second source communication target identifier HS21, and is linked (or coupled) to one of the message service system 650 and the second message service device 670 based on the second source communication target identifier HS21 under the second specific application communication protocol PC21. The electronic device 100 inquires of one of the message service system 650 and the second message service device 670 about an addressable location of the second communication target 521 under the second specific application communication protocol PC21, and thereby receives a response message associated with the addressable location from the message service system 650.

The electronic device 100 uses the second specific application communication protocol PC21 and one of the provided communication target identifier HT81 and the accessed user account NB91 to directly send the electronic data DE61 toward the second communication target 521 in the data transmission phase UT1 in response to the response message, and thereby sends the electronic data DE61 toward the second communication target 521 without going through the second message service device 670. Therefore, the second communication target 521 instantly directly receives the electronic data DE61 from the electronic device 100.

In some embodiments, the communication target identifier HT81 is a first telephone number; the first specific application communication protocol PC11 is the short-message service communication protocol; and the second specific application communication protocol PC21 is the multimedia-message service communication protocol. For example, the communication target identifier HT81 (or the first telephone number) is a first mobile telephone number, so that the first communication target 511 is a first mobile device. The first message service device 660 supports the first specific application communication protocol PC11 (or the short-message service communication protocol). For example, under a condition that the processing unit 710 recognizes the first functional state code CS81 as the first valid state code CT81 representing the first selected state SH81 in response to the second operation request signal QN91, the processing unit 710 uses the first specific application communication protocol PC11 (or the short-message service communication protocol) to send the electronic data DE61 toward the first communication target 511 in the data transmission phase UT1 based on the obtained communication target identifier HT81 (or the first telephone number) and the obtained first communication protocol identifier HP1.

The second message service device 670 supports the second specific application communication protocol PC21 (or the multimedia-message service communication protocol). For example, under a condition that the processing unit 710 recognizes the second functional state code CS91 as the second valid state code CT91 representing the second selected state SH91 in response to the second operation request signal QN91, the processing unit 710 uses the second specific application communication protocol PC21 (or the multimedia-message service communication protocol) to send the electronic data DE61 toward the second communication target 521 in the data transmission phase UT1 based on the obtained communication target identifier HT81 (or the first telephone number) and the obtained second communication protocol identifier HP2.

In some embodiments, the communication target identifier HT81 is a second telephone number; the first specific application communication protocol PC11 is the short-message service communication protocol; and the second specific application communication protocol PC21 is the instant-messaging communication protocol. For example, the communication target identifier HT81 (or the second telephone number) is a second mobile telephone number, and is configured to correspond to the user account NB91, so that the first communication target 511 is a second mobile device. The first message service device 660 supports the first specific application communication protocol PC11 (or the short-message service communication protocol). For example, under a condition that the processing unit 710 recognizes the first functional state code CS81 as the first valid state code CT81 representing the first selected state SH81 in response to the second operation request signal QN91, the processing unit 710 uses the first specific application communication protocol PC11 (or the short-message service communication protocol) to send the electronic data DE61 toward the first communication target 511 in the data transmission phase UT1 based on the obtained communication target identifier HT81 (or the telephone number) and the obtained first communication protocol identifier HP1.

The second message service device 670 supports the second specific application communication protocol PC21 (or the instant-messaging communication protocol). For example, under a condition that the processing unit 710 recognizes the second functional state code CS91 as the second valid state code CT91 representing the second selected state SH91 in response to the second operation request signal QN91, the processing unit 710 uses the second specific application communication protocol PC21 (or the instant-messaging communication protocol) to send the electronic data DE61 toward the second communication target 521 in the data transmission phase UT1 based on the obtained user account NB91 and the obtained second communication protocol identifier HP2.

Figure 10:
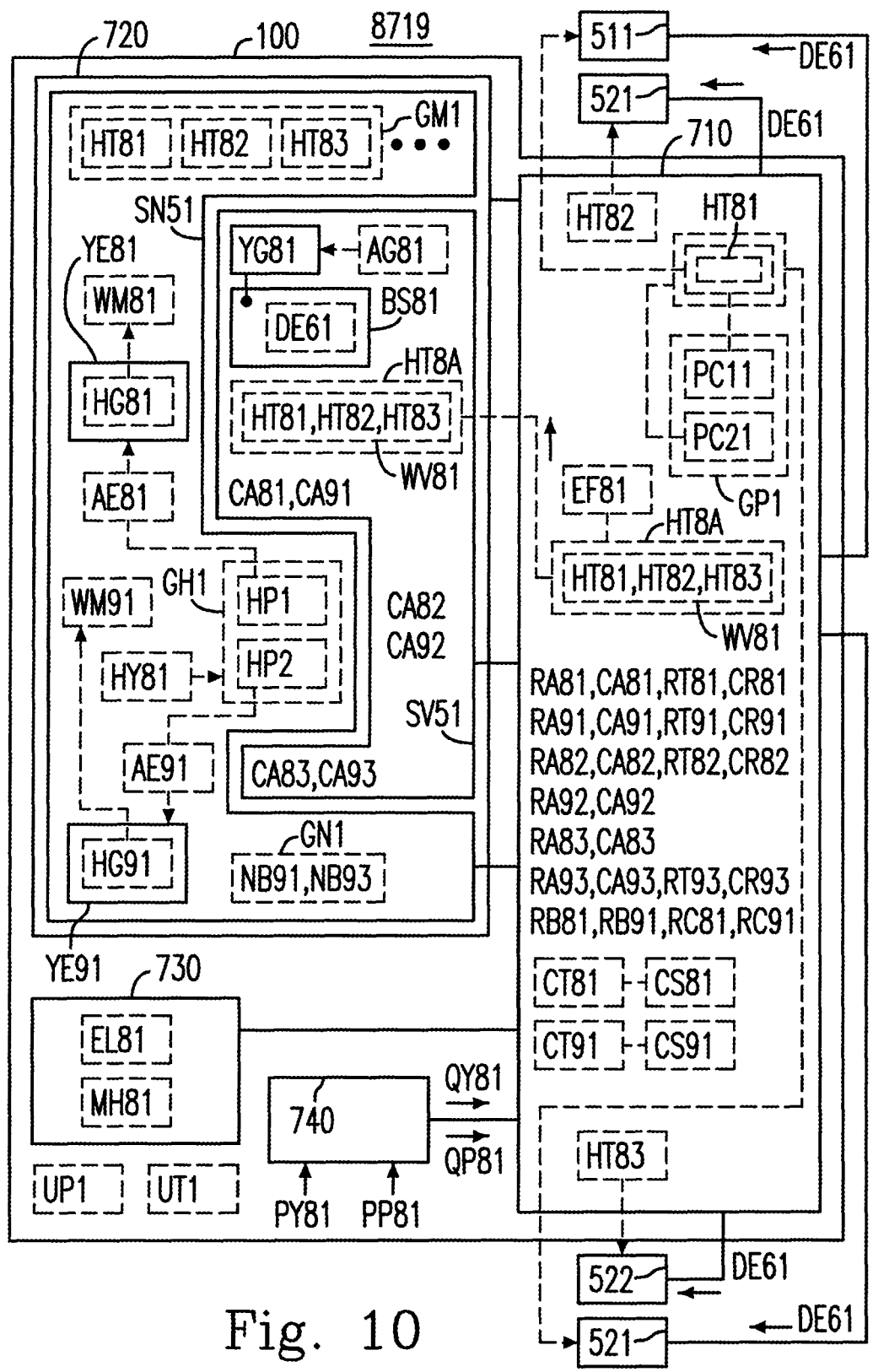
FIG. 10 is a schematic diagram showing an implementation structure of the communication system shown in FIG. 1.

Please refer to FIG. 10, which is a schematic diagram showing an implementation structure 8719 of the communication system 871 shown in FIG. 1. As shown in FIG. 10, the implementation structure 8719 includes the electronic device 100, the first communication target 511, the second communication target 521, a communication target 512 and a communication target 522. The electronic device 100 includes the processing unit 710, the storage unit 720, the input unit 740 and the display unit 730. The processing unit 710 includes a processor 712 and a communication interface unit 714 coupled to the processor 712. The communication interface unit 714 is coupled or linked to the message service system 650. Each of the storage unit 720, the input unit 740, the display unit 730 and the communication interface unit 714 is coupled to the processor 712, and is controlled by the processor 712.

In some embodiments, the storage unit 720 has a storage block BS81, and stores the communication protocol identifier group GH1, a user account group GN1, and a plurality of communication target identifiers HT81, HT82, HT83, . . . including the communication target identifier HT81. The communication protocol identifier group GH1 include the first communication protocol identifier HP1 and the second communication protocol identifier HP2. For example, the communication protocol identifier group GH1 is a communication protocol identifier array. Before the second user input operation PU91, the storage unit 720 is configured to store the electronic data DE61 in the storage block BS81. The processing unit 710 obtains the electronic data DE61 from the storage block BS81 in response to the second operation request message QN91. For example, the storage block BS81 is located at an application memory location YG81. The application memory location YG81 is identified based on an application memory address AG81, or is identified by the application memory address AG81; therefore, the storage block BS81 is identified based on the application memory address AG81, or is identified by the application memory address AG81.

For example, each of the storage block BS81 and the application memory location YG81 is disposed in the volatile memory space SV51. The application memory address AG81 is determined according to a selected protocol identifier being one of the stored first communication protocol identifier HP1 and the stored second communication protocol identifier HP2. The processing unit 710 obtains the application memory address AG81 based on the selected protocol identifier, causes the storage unit 720 to store the electronic data DE61 at the application memory location YG81 based on the obtained application memory address AG81, and causes the storage unit 720 to read or access the electronic data DE61 stored at the application memory location YG8 based on the obtained application memory address AG81.

In some embodiments, the storage unit 720 stores the plurality of communication target identifiers HT81, HT82, HT83, . . . in the nonvolatile memory space SN51 beforehand. For example, the storage unit 720 stores the communication target identifier set WM81, the communication target identifier set WM91 and a communication target identifier group GM1 in the nonvolatile memory space SN51 beforehand.

In some embodiments, the communication target identifier HT81 stored in the nonvolatile memory space SN51 is configured to belong to the communication target identifier set WM81, is configured to belong to the communication target identifier set WM91, and is further configured to belong to the communication target identifier group GM1. The communication target identifier sets WM81 and WM91 are configured to respectively correspond to the first communication protocol identifier HP1 and the second communication protocol identifier HP2. The communication target identifier set WM81 includes the communication target identifier HT81 and a communication target identifier HT82. The communication target identifier set WM91 includes the communication target identifier HT81 and a communication target identifier HT83. The communication target identifier group GM1 includes the communication target identifier HT81, the communication target identifier HT82 and the communication target identifier HT83. The communication target identifier HT82 is configured to identify the communication target 512 under the first specific application communication protocol PC11. The communication target identifier HT83 is configured to identify the communication target 522 under the second specific application communication protocol PC21.

The user account group GN1 is associated the second communication protocol identifier HP2, and includes the user account NB91 and a user account NB93. Under a condition that each of the communication target identifiers HT81 and HT83 belongs to the communication target identifier set WM91, the stored communication target identifiers HT81 and HT83 are configured to respectively correspond to the user accounts NB91 and NB93.

In some embodiments, the input unit 740 receives in the data preparation phase UP1 a user input operation PY81 occurred earlier than the second user input operation PU91 to provide an operation request message QY81 to the processing unit 710. The processing unit 710 causes the communication target identifier HT81 stored in the nonvolatile memory space SN51 to join the communication target identifier group GM1 in response to the operation request message QY81. For example, the processing unit 710 further causes at least one of the communication target identifiers HT82 and HT83 stored in the nonvolatile memory space SN51 to join the communication target identifier group GM1 in response to the operation request message QY81.

The processing unit 710 causes the communication target identifiers HT81 and HT82 stored in the nonvolatile memory space SN51 to join the communication target identifier group WM81 in response to the operation request message QY81. The processing unit 710 causes the communication target identifiers HT81 and HT83 stored in the nonvolatile memory space SN51 to join the communication target identifier group WM91 in response to the operation request message QY81.

For example, the input unit 740 receives the user input operation PP81 in the data preparation phase UP1 to provide the operation request message QP81 to the processing unit 710. The processing unit 710 performs the data acquisition operation EF81 in response to the operation request message QP81 to obtain the communication target identifier HT81 to be stored, and causes the storage unit 720 to store the obtained communication target identifier HT81 at the application memory location YU81 in response to obtaining the communication target identifier HT81.

For example, the data acquisition operation EF81 is used to select the communication target identifier HT81 stored in the nonvolatile memory space SN51. The processing unit 710, in response to reading the communication target identifier HT81, causes the display unit 730 to perform the display operation EL81 associated with the read communication target identifier HT81 to display the communication target identification information MH81 associated with the read communication target identifier HT81.

For example, the processing unit 710 performs the data acquisition operation EF81 in the data preparation phase UP1 to obtain communication target identification data HT8A to be stored, and causes the storage unit 720 to store the obtained communication target identification data HT8A in the volatile memory space SV51 in response to obtaining the communication target identification data HT8A. For example, the communication target identification data HT8A includes the communication target identifiers HT81, HT82 and HT83. For example, the processing unit 710 is configured to causes the storage unit 720 to store a communication target identifier set WV81 in the volatile memory space SV51 in the data preparation phase UP1. The communication target identifier set WV81 includes the communication target identification data HT8A. For example, the data acquisition operation EF81 is used to select the communication target identification data HT8A stored in the nonvolatile memory space SN51.

The processing unit 710 uses the read first communication protocol identifier HP1 to obtain the application memory address AE81 in the data preparation phase UP1 in response to reading the communication target identifier HT81 stored in the nonvolatile memory space SN51, and accesses the target identifier set identifier HG81 stored at the application memory location YE81 based on the obtained application memory address AE81. The processing unit 710, based on the accessed target identifier set identifier HG81 and the read communication target identifier HT81, makes the logical decision RA81 on whether the communication target identifier HT81 stored in the nonvolatile memory space SN51 belongs to the communication target identifier set WM81, and causes the storage unit 720 to store the decision data code CA81 representing the logical decision RA81 in the volatile memory space SV51 in response to making the logical decision RA81. For example, the processing unit 710 makes the logical decision RA81 in response to selecting the read communication target identifier HT81.

The processing unit 710 uses the read second communication protocol identifier HP2 to obtain the application memory address AE91 in the data preparation phase UP1 in response to reading the communication target identifier HT81 stored in the nonvolatile memory space SN51, and accesses the target identifier set identifier HG91 stored at the application memory location YE91 based on the obtained application memory address AE91. The processing unit 710, based on the accessed target identifier set identifier HG91 and the read communication target identifier HT81, makes the logical decision RA91 on whether the communication target identifier HT81 stored in the nonvolatile memory space SN51 belongs to the communication target identifier set WM91, and causes the storage unit 720 to store the decision data code CA91 representing the logical decision RA91 in the volatile memory space SV51 in response to making the logical decision RA91. For example, the processing unit 710 makes the logical decision RA91 in response to selecting the read communication target identifier HT81.

The processing unit 710, in the data preparation phase UP1 in response to reading the communication target identifier HT82 stored in the nonvolatile memory space SN51, uses the accessed target identifier set identifier HG81 and the read communication target identifier HT82 to make a logical decision RA82 on whether the communication target identifier HT82 stored in the nonvolatile memory space SN51 belongs to the communication target identifier set WM81, and causes the storage unit 720 to store a decision data code CA82 representing the logical decision RA82 in the volatile memory space SV51 in response to making the logical decision RA82. For example, the processing unit 710 makes the logical decision RA82 in response to selecting the read communication target identifier HT82.

The processing unit 710, in the data preparation phase UP1 in response to reading the communication target identifier HT82 stored in the nonvolatile memory space SN51, uses the accessed target identifier set identifier HG91 and the read communication target identifier HT82 to make a logical decision RA92 on whether the communication target identifier HT82 stored in the nonvolatile memory space SN51 belongs to the communication target identifier set WM91, and causes the storage unit 720 to store a decision data code CA92 representing the logical decision RA92 in the volatile memory space SV51 in response to making the logical decision RA92. For example, the processing unit 710 makes the logical decision RA92 in response to selecting the read communication target identifier HT82.

The processing unit 710, in the data preparation phase UP1 in response to reading the communication target identifier HT83 stored in the nonvolatile memory space SN51, uses the accessed target identifier set identifier HG81 and the read communication target identifier HT83 to make a logical decision RA83 on whether the communication target identifier HT83 stored in the nonvolatile memory space SN51 belongs to the communication target identifier set WM81, and causes the storage unit 720 to store a decision data code CA83 representing the logical decision RA83 in the volatile memory space SV51 in response to making the logical decision RA83. For example, the processing unit 710 makes the logical decision RA83 in response to selecting the read communication target identifier HT83.

The processing unit 710, in the data preparation phase UP1 in response to reading the communication target identifier HT83 stored in the nonvolatile memory space SN51, uses the accessed target identifier set identifier HG91 and the read communication target identifier HT83 to make a logical decision RA93 on whether the communication target identifier HT83 stored in the nonvolatile memory space SN51 belongs to the communication target identifier set WM91, and causes the storage unit 720 to store a decision data code CA93 representing the logical decision RA93 in the volatile memory space SV51 in response to making the logical decision RA93. For example, the processing unit 710 makes the logical decision RA93 in response to selecting the read communication target identifier HT83.

The processing unit 710 causes the storage unit 720 to provide the stored first functional state code CS81 to the processing unit 710 in response to the second operation request message QN91. Under a condition that the processing unit 710 recognizes the provided first functional state code CS81 as the first valid state code CT81 in the data transmission phase UT1, the processing unit 710 accesses the decision data code CA81 stored in the volatile memory space SV51. Under a condition that the processing unit 710 recognizes the accessed decision data code CA81 as the valid data code CR81 representing the positive decision RT81 in the data transmission phase UT1, the processing unit 710 uses the first specific application communication protocol PC11 to send the electronic data DE61 toward the first communication target 511 in the data transmission phase UT1 based on the accessed first communication protocol identifier HP1 and the accessed communication target identifier HT81.

The processing unit 710 accesses the communication target identifier HT82 stored in the volatile memory space SV51 in response to the second operation request message QN91. Under a condition that the processing unit 710 recognizes the provided first functional state code CS81 as the first valid state code CT81 in the data transmission phase UT1, the processing unit 710 accesses the decision data code CA82 stored in the volatile memory space SV51. Under a condition that the processing unit 710 recognizes the accessed decision data code CA82 as a valid data code CR82 representing a positive decision RT82 in the data transmission phase UT1, the processing unit 710 uses the first specific application communication protocol PC11 to send the electronic data DE61 toward the communication target 512 in the data transmission phase UT1 based on the accessed first communication protocol identifier HP1 and the accessed communication target identifier HT82.

The processing unit 710 accesses the second functional state code CS91 stored at the second application memory location YL91 in response to the second operation request message QN91. Under a condition that the processing unit 710 recognizes in the data transmission phase UT1 the accessed second functional state code CS91 as the second valid state code CT91 representing the second selected state SH91, the processing unit 710 accesses the decision data code CA91 stored in the volatile memory space SV51. Under a condition that the processing unit 710 recognizes the accessed decision data code CA91 as the valid data code CR91 representing the positive decision RT91 in the data transmission phase UT1, the processing unit 710 uses the second specific application communication protocol PC21 to send the electronic data DE61 toward the second communication target 511 in the data transmission phase UT1 based on the accessed second communication protocol identifier HP2 and the provided communication target identifier HT81.

The processing unit 710 accesses the communication target identifier HT83 stored in the volatile memory space SV51 in response to the second operation request message QN91. Under a condition that the processing unit 710 recognizes in the data transmission phase UT1 the accessed second functional state code CS91 as the second valid state code CT91, the processing unit 710 accesses the decision data code CA93 stored in the volatile memory space SV51. Under a condition that the processing unit 710 recognizes the accessed decision data code CA93 as a valid data code CR93 representing a positive decision RT93 in the data transmission phase UT1, the processing unit 710 uses the second specific application communication protocol PC21 to send the electronic data DE61 toward the second communication target 511 in the data transmission phase UT1 based on the accessed second communication protocol identifier HP2 and the accessed communication target identifier HT83.

The processing unit 710, in response to the second operation request message QN91, makes a logical decision RB81 on whether the provided first functional state code CS81 represents the first selected state SH81. Under a condition that the logical decision RB81 is positive, the processing unit 710 recognizes the provided first functional state code CS81 as the first valid state code CT81 in the data transmission phase UT1. The processing unit 710, in response to the second operation request message QN91, makes a logical decision RB91 on whether the provided second functional state code CS91 represents the second selected state SH91. Under a condition that the logical decision RB91 is positive, the processing unit 710 recognizes the provided first functional state code CS91 as the second valid state code CT91 in the data transmission phase UT1.

The processing unit 710, in response to accessing the stored decision data code CA81, makes a logical decision RC81 on whether the accessed decision data code CA81 represents the positive decision RT81. Under a condition that the logical decision RC81 is positive, the processing unit 710 recognizes the accessed decision data code CA81 as the valid data code CR81 in the data transmission phase UT1. The processing unit 710, in response to accessing the stored decision data code CA91, makes a logical decision RC91 on whether the accessed decision data code CA91 represents the positive decision RT91. Under a condition that the logical decision RC91 is positive, the processing unit 710 recognizes the accessed decision data code CA91 as the valid data code CR91 in the data transmission phase UT1.

For example, the processing unit 710 is configured to cause the storage unit 720 to store one selected from a group consisting of the protocol identifier group identifier HY81, the communication protocol identifier group GH1, the first functional state code CS81, the second functional state code CS91, the communication target identifier set WV81, the target identifier set identifier HG81, the communication target identifier set WM81, the target identifier set identifier HG81, the communication target identifier set WM81 and any combination thereof in at least one of the nonvolatile memory space SN51 and the volatile memory space SV51.

Figure 11:
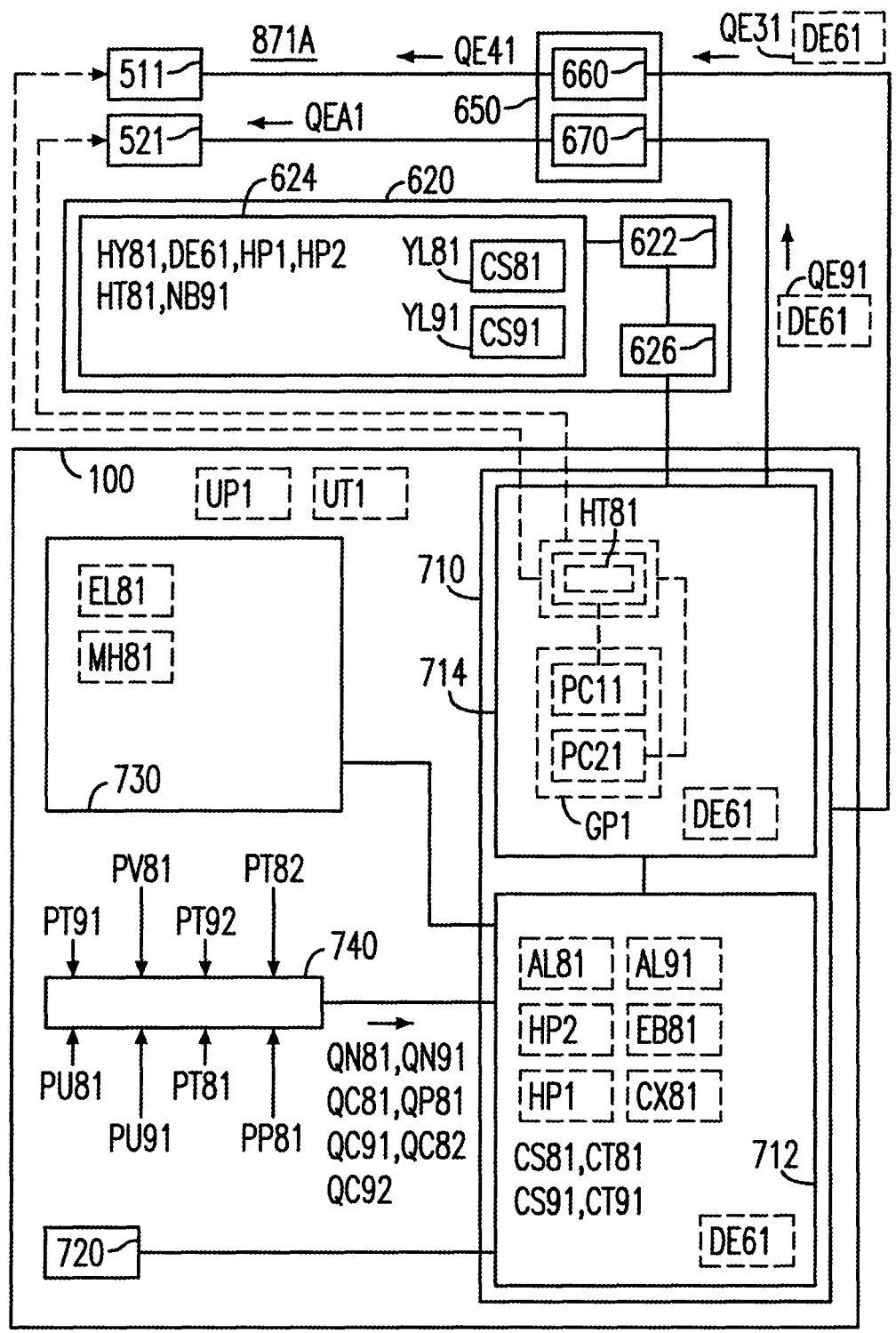
FIG. 11 is a schematic diagram showing an implementation structure of the communication system shown in FIG. 1.

Please refer to FIG. 11, which is a schematic diagram showing an implementation structure 871A of the communication system 871 shown in FIG. 1. As shown in FIG. 11, the implementation structure 871A includes the electronic device 100, the message service system 650, the first communication target 511, the second communication target 521, and a server 620 coupled to the electronic device 100. The electronic device 100 includes the processing unit 710, the storage unit 720, the input unit 740 and the display unit 730. The processing unit 710 includes a processor 712 and a communication interface unit 714 coupled to the processor 712. The communication interface unit 714 is coupled or linked to the message service system 650. Each of the storage unit 720, the input unit 740, the display unit 730 and the communication interface unit 714 is coupled to the processor 712, and is controlled by the processor 712.

In some embodiments, the server 620 includes a processing unit 622, a storage unit 624 coupled to the processing unit 622, and a communication interface unit 626 coupled to the processing unit 622. The communication interface unit 626 is coupled to the communication interface unit 714. The storage unit 624 stores the protocol identifier group identifier HY81, the electronic data DE61, the first communication protocol identifier HP1, the second communication protocol identifier HP2, the communication target identifier HT81, the first functional state code CS81, the second functional state code CS91 and the user account NB91.

The input unit 740 provides the first operation request message QN81 to the processor 712 in response to the first user input operation PU81 using the first electricity application target BU81. The processor 712 causes the electronic device 100 to enter the data preparation phase UP1 in response to the first operation request message QN81. The processor 712 accesses or reads second application data through the communication interface unit 714, the communication interface unit 626 and the processing unit 622 in the data preparation phase UP1. The second application data includes at least one of the protocol identifier group identifier HY81, the stored first communication protocol identifier HP1 and the stored second communication protocol identifier HP2, which are stored in the storage unit 624.

The processor 712 determines the first functional state code CS81 in the data preparation phase UP1, and uses the read second application data to fetch the first application memory address AL81, determined according to the read first communication protocol identifier HP1, in response to determining the first functional state code CS81. The processor 712 stores the determined first functional state code CS81 to the first application memory location YL81, located in the storage unit 624, through the communication interface unit 714, the communication interface unit 626 and the processing unit 622 based on the fetched first application memory address AL81.

The processor 712 determines the second functional state code CS91 in the data preparation phase UP1, and uses the read second application data to fetch the second application memory address AL91, determined according to the read second communication protocol identifier HP2, in response to determining the second functional state code CS91. The processor 712 stores the determined second functional state code CS91 to the second application memory location YL91, located in the storage unit 624, through the communication interface unit 714, the communication interface unit 626 and the processing unit 622 based on the fetched second application memory address AL91.

The processor 712 is configured to read the communication target identifier HT81, stored by the storage unit 624, through the communication interface unit 714, the communication interface unit 626 and the processing unit 622 in the data preparation phase UP1. The processor 712, in response to reading the stored communication target identifier HT81, causes the display unit 730 to perform the display operation EL81 associated with the read communication target identifier HT81 to display the communication target identification information MH81 associated with the read communication target identifier HT81. The processor 712, in response to the user input operation PP81, performs the data acquisition operation EF81 to obtain the communication target identifier HT81 to be stored into the volatile memory space SV51, and stores the obtained communication target identifier HT81 in the volatile memory space SV51. For example, the data acquisition operation EF81 is configured to select the communication target identifier HT81 stored in the nonvolatile memory space SN51.

In some embodiments, the input unit 740 provides the second operation request message QN91 to the processing unit 710 in response to the second user input operation PU91 using the second electricity application target BU91. The processor 712 causes the electronic device 100 to leave the data preparation phase UP1 to enter the data transmission phase UT1 in response to the second operation request message QN91. The processor 712 accesses or reads third application data through the communication interface unit 714, the communication interface unit 626 and the processing unit 622 in the data transmission phase UT1. The third application data includes at least one selected from a group consisting of the protocol identifier group identifier HY81, the electronic data DE61, the first communication protocol identifier HP1, the second communication protocol identifier HP2, the communication target identifier HT81, the first functional state code CS81 and the second functional state code CS91, which are stored in the storage unit 624.

The processor 712 causes the communication interface unit 714 to uses at least one of the first specific application communication protocol PC11 and the second specific application communication protocol PC21 to send the electronic data DE61 toward at least one of the first communication target 511 and the second communication target 521 based on the accessed third application data.

In some embodiments, the processor 712 uses in the data transmission phase UT1 the accessed third application data to obtain the first application memory address AL81 determined according to the accessed first communication protocol identifier HP1, and accesses the first functional state code CS81, stored at the first application memory location YL81 located in the storage unit 624, through the communication interface unit 714, the communication interface unit 626 and the processing unit 622 based on the obtained first application memory address AL81. The processor 712 uses in the data transmission phase UT1 the accessed third application data to obtain the second application memory address AL91 determined according to the accessed second communication protocol identifier HP2, and accesses the second functional state code CS91, stored at the second application memory location YL91 located in the storage unit 624, through the communication interface unit 714, the communication interface unit 626 and the processing unit 622 based on the obtained second application memory address AL91.

For example, the processor 712 accesses or obtains the first functional state code CS81, the electronic data DE61, the first communication protocol identifier HP1 and the communication target identifier HT81 in the data transmission phase UT1. Under a condition that the processor 712 recognizes the obtained first functional state code CS81 as the first valid state code CT81 representing the first selected state SH81, the processor 712 causes the communication interface unit 714 to use the first specific application communication protocol PC11 to send the electronic data DE61 toward the first communication target 511 based on the obtained electronic data DE61, the obtained first communication protocol identifier HP1 and the obtained communication target identifier HT81.

The processor 712 further accesses or obtains the second functional state code CS91 and the second communication protocol identifier HP2 in the data transmission phase UT1. Under a condition that the processor 712 recognizes the obtained second functional state code CS91 as the second valid state code CT91 representing the second selected state SH91, the processor 712 causes the communication interface unit 714 to use the second specific application communication protocol PC21 to send the electronic data DE61 toward the second communication target 521 based on the obtained electronic data DE61, the obtained first communication protocol identifier HP1 and the obtained communication target identifier HT81.

Figure 12:
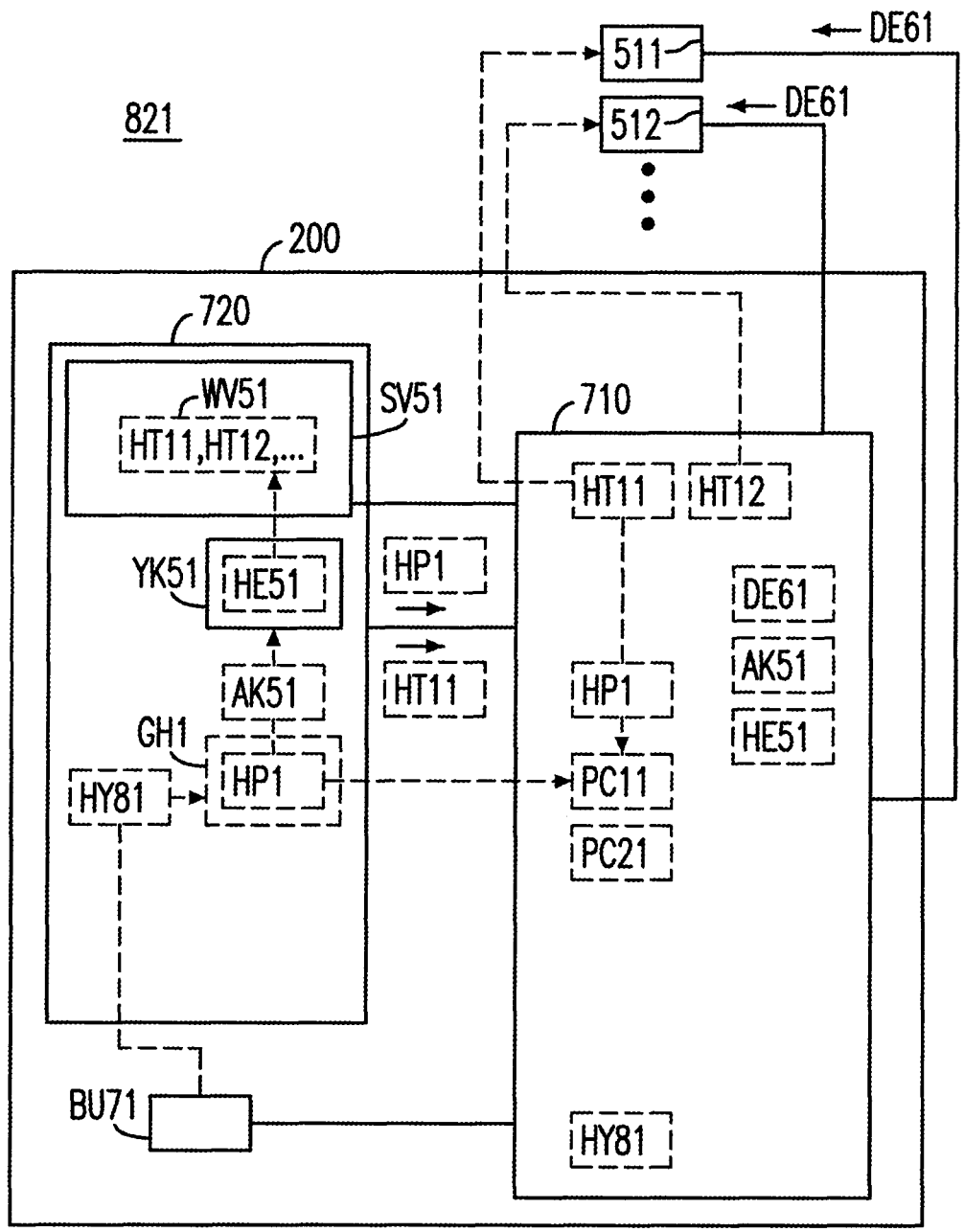
FIG. 12 is a schematic diagram showing a communication system according to various embodiments of the present disclosure.

Please refer to FIG. 12, which is a schematic diagram showing a communication system 821 according to various embodiments of the present disclosure. The communication system 821 includes an electronic device 200 and a first communication target 511. For example, the electronic device 200 is to communicate with the first communication target 511. The electronic device 200 for sending electronic data DE61 includes an electricity-using target BU71 and a processing unit 710. The processing unit 710 is coupled to the electricity-using target BU71, is configured to obtain a first communication protocol identifier HP1 configured to identify a first specific application communication protocol PC11 by means of the electricity-using target BU71, obtains a first communication target identifier HT11 configured to identify the first communication target 511 based on the first communication protocol identifier HP1, and sends the electronic data DE61 toward the first communication target 511 based on the first communication target identifier HT11 and the first specific application communication protocol PC11.

In some embodiments, the electronic device 200 further includes a storage unit 720 coupled to the processing unit 710. The storage unit 720 has a volatile memory space SV51 coupled to the processing unit 710, and an application memory location YK51 identified based on an application memory address AK51. For example, the application memory address AK51 is determined according to a first communication protocol identifier HP1. The storage unit 720 further stores a target identifier set identifier HE51 and a communication target identifier set WV51 identified by the target identifier set identifier HE51. For example, the target identifier set identifier HE51 is stored at the application memory location YK51 based on the application memory address AK51. The communication target identifier set WV51 is stored in the volatile memory space SV51. The processing unit 710 obtains the application memory address AK51 based on the first communication protocol identifier HP1, and accesses the target identifier set identifier HE51 stored at the application memory location YK51 based on the obtained application memory address AK51.

Under a condition that the communication target identifier set WV51 consists of a plurality of communication target identifiers HT11, HT12, . . . including the stored first communication target identifier HT11 and the plurality of communication target identifiers HT11, HT12, . . . are configured to respectively identify a plurality of communication targets 511, 512, . . . , the processing unit 710 accesses the plurality of communication target identifiers HT11, HT12, . . . based on the accessed target identifier set identifier HE51. The processing unit 710 uses the first specific application communication protocol PC11 to send the electronic data DE61 toward each of the plurality of communication targets 511, 512, . . . based on the first communication protocol identifier HP1 and the accessed plurality of communication target identifiers HT11, HT12, . . . .

In some embodiments, the first specific application communication protocol PC11 is one selected from a plurality of different application communication protocols PC11, PC21, . . . . The first communication protocol identifier HP1 belongs to a communication protocol identifier group GH1 identified by a protocol identifier group identifier HY81. The storage unit 720 stores the communication protocol identifier group GH1 and the protocol identifier group identifier HY81 associated with the electricity-using target BU71. The processing unit 710 is configured to access the stored protocol identifier group identifier HY81 by means of the electricity-using target BU71, and obtains the stored first communication protocol identifier HP1 from the stored communication protocol identifier group GH1 based on the accessed protocol identifier group identifier HY81.

Figure 13:
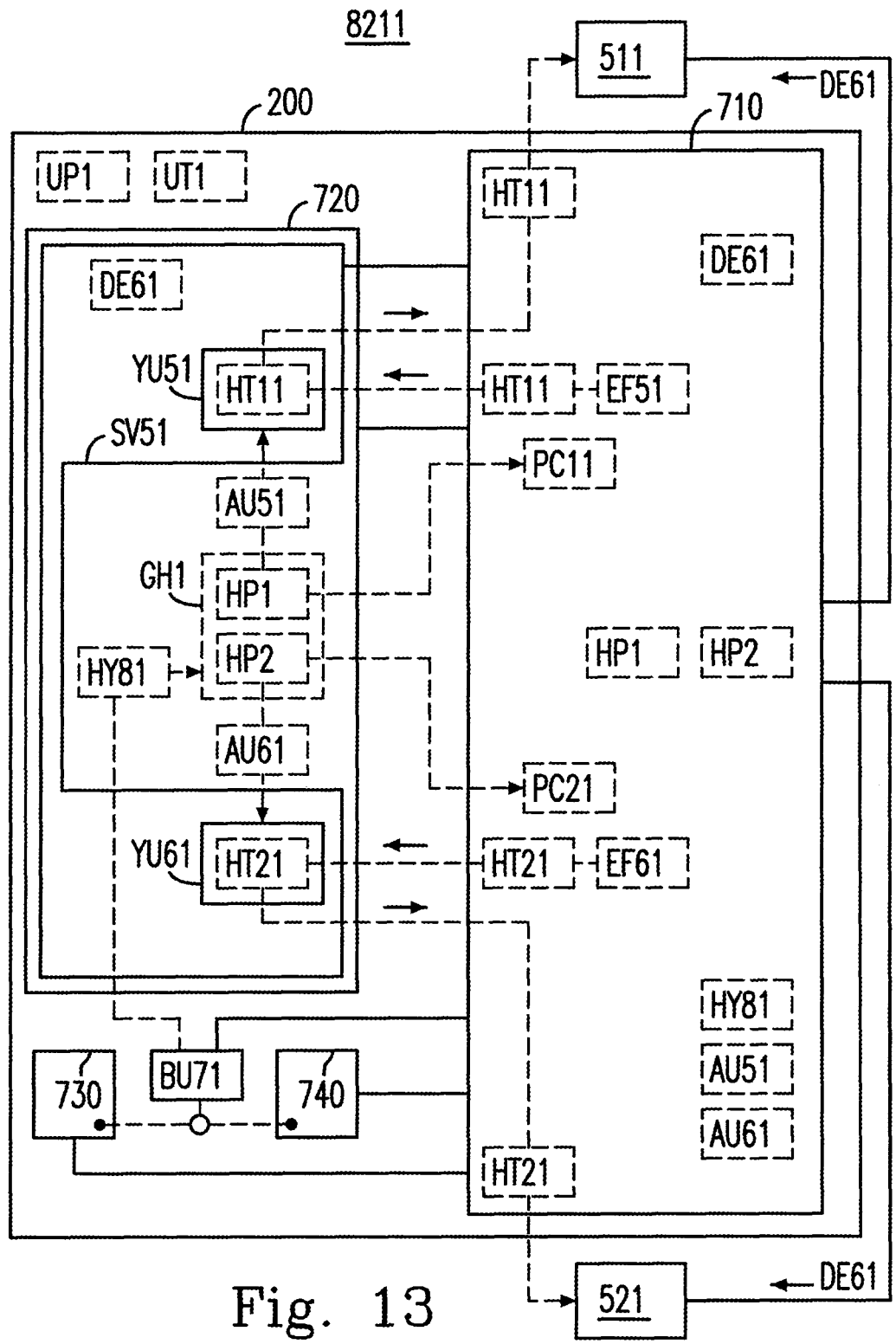
FIG. 13 is a schematic diagram showing an implementation structure of the communication system shown in FIG. 12.
Figure 14:
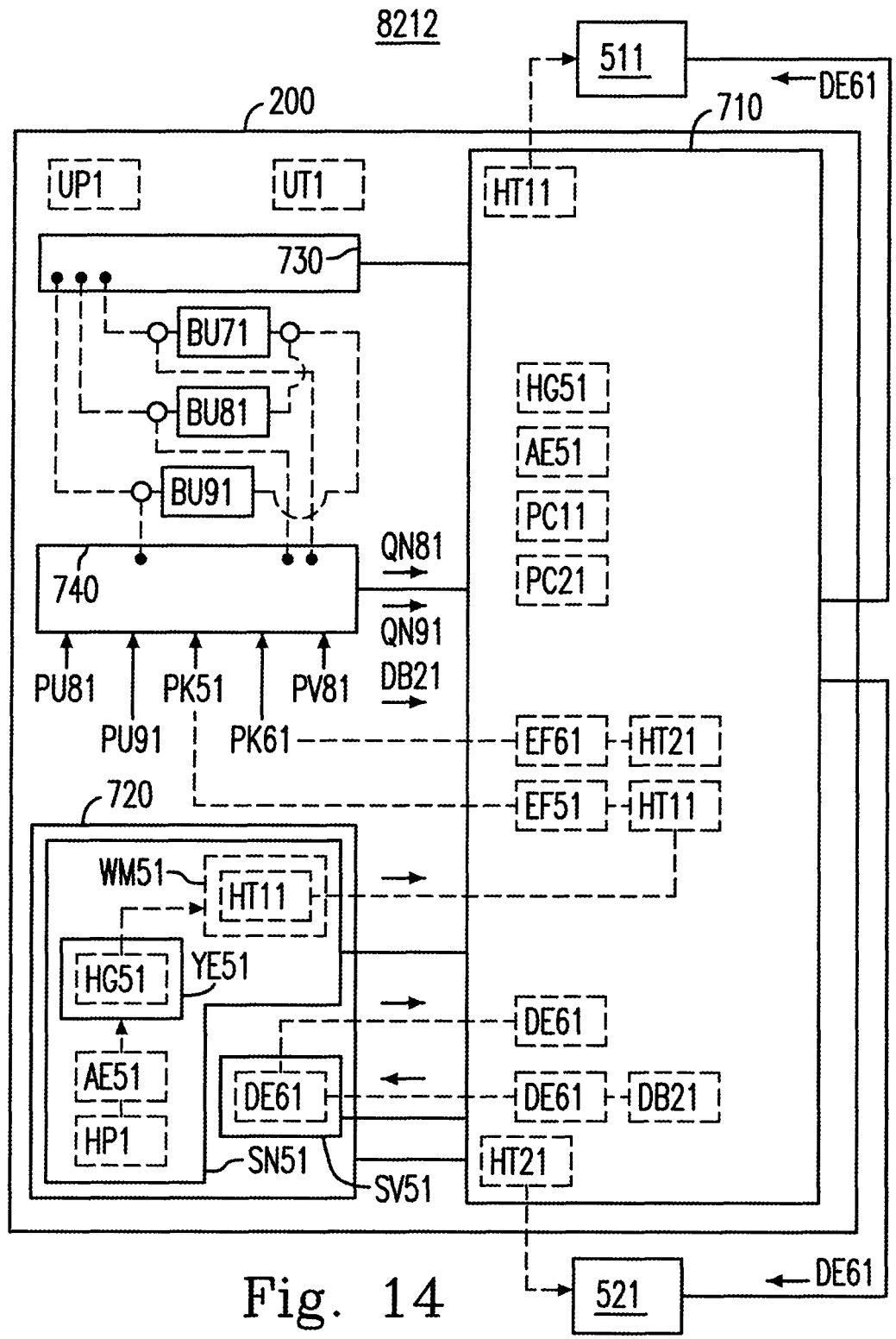
FIG. 14 is a schematic diagram showing an implementation structure of the communication system shown in FIG. 12.

Please refer to FIG. 13 and FIG. 14. FIG. 13 is a schematic diagram showing an implementation structure 8211 of the communication system 821 shown in FIG. 12. FIG. 14 is a schematic diagram showing an implementation structure 8212 of the communication system 821 shown in FIG. 12. As shown in FIGS. 13 and 14, each of the implementation structures 8211 and 8212 includes the electronic device 200, the first communication target 511 and a second communication target 521. The electronic device 200 is further to communicate with the second communication target 521, and includes the processing unit 710, the storage unit 720 coupled to the processing unit 710, an input unit 740 coupled to the processing unit 710, and a display unit 730 coupled to the processing unit 710.

In some embodiments, one of the input unit 740 and the display unit 730 includes a first electricity application target BU81 coupled to the processing unit 710. One of the input unit 740 and the display unit 730 includes a second electricity application target BU91 coupled to the processing unit 710. For example, the second electricity application target BU91 is the same as or different from the first electricity application target BU81. The electricity-using target BU71 is one of the first and the second electricity application targets BU81 and BU91. The stored communication protocol identifier group GH1 include a second communication protocol identifier HP2 configured to identify a second specific application communication protocol PC21. For example, the second specific application communication protocol PC21 is different from the first specific application communication protocol PC11, and is selected from the plurality of different application communication protocols PC11, PC21, . . . .

The storage unit 720 further stores a second communication target identifier HT21 associated with the second communication protocol identifier HP2. For example, the second communication target identifier HT21 is configured to identify a second communication target 521. The storage unit 720 has a first application memory location YU51 identified based on a first application memory address AU51, and a second application memory location YU61 identified based on a second application memory address AU61. For example, each of the first and the second application memory locations YU51 and YU61 is disposed in the volatile memory space SV51. The first application memory address AU51 is determined according to the stored first communication protocol identifier HP1. The second application memory address AU61 is determined according to the second communication protocol identifier HP2.

In some embodiments, each of the first and the second electricity application targets BU81 and BU91 is associated with the stored protocol identifier group identifier HY81. The second communication protocol identifier HP2 belongs to the communication protocol identifier group GH1. The input unit 740 receives a first user input operation PU81 using the first electricity application target BU81 to provide a first operation request message QN81 to the processing unit 710. The input unit 740 receives a second user input operation PU91 being after the first user input operation PU81, and provides a second operation request message QN91 to the processing unit 710 in response to the second user input operation PU91 using the second electricity application target BU91.

The processing unit 710 causes the electronic device 200 to enter a data preparation phase UP1 in response to the first operation request message QN81, and causes the storage unit 720 to prepare the electronic data DE61 in the data preparation phase UP1. The processing unit 710 reads the stored protocol identifier group identifier HY81 in the data preparation phase UP1, and reads the stored first and the stored second communication protocol identifiers HP1 and HP2 that belong to the stored communication protocol identifier group GH1 based on the read protocol identifier group identifier HY81.

In some embodiments, the input unit 740 receives a third user input operation PK51 in the data preparation phase UP1. The processing unit 710 performs a first data acquisition operation EF51 in response to the third user input operation PK51 to obtain the first communication target identifier HT11 to be stored. The processing unit 710 fetches the first application memory address AU51 in the data preparation phase UP1 based on the read first communication protocol identifier HP1, and causes the storage unit 720 to store the obtained first communication target identifier HT11 at the first application memory location YU51 based on the fetched first application memory address AU51.

The input unit 740 receives a fourth user input operation PK61 in the data preparation phase UP1. The processing unit 710 performs a second data acquisition operation EF61 in response to the fourth user input operation PK61 to obtain the second communication target identifier HT21 to be stored. The processing unit 710 fetches the second application memory address AU61 in the data preparation phase UP1 based on the read second communication protocol identifier HP2, and causes the storage unit 720 to store the obtained second communication target identifier HT21 at the second application memory location YU61 based on the fetched second application memory address AU61.

The input unit 740 receives a fifth user input operation PV81 being before the second user input operation PU91 in the data preparation phase UP1 to provide an input data DB21 to the processing unit 710. The processing unit 710, in response to obtaining the input data DB21, causes the storage unit 720 to store the electronic data DE61 determined according to the obtained input data DB21. For example, the second electricity application target BU91 is further associated with the stored electronic data DE61.

In some embodiments, the processing unit 710 leaves the data preparation phase UP1 to enter a data transmission phase UT1 in response to the second operation request message QN91, and accesses the stored protocol identifier group identifier HY81 in the data transmission phase UT1. The processing unit 710 accesses the stored first communication protocol identifier HP1 belonging to the stored communication protocol identifier group GH1 based on the accessed protocol identifier group identifier HY81 to obtain the stored first communication protocol identifier HP1 from the stored communication protocol identifier group GH1. The processing unit 710 accesses the stored second communication protocol identifier HP2 that belongs to the stored communication protocol identifier group GH1 based on the accessed protocol identifier group identifier HY81. The processing unit 710 accesses the stored electronic data DE61 in the data transmission phase UT1.

The processing unit 710 obtains the first application memory address AU51 in the data transmission phase UT1 based on the obtained first communication protocol identifier HP1, and accesses the first communication target identifier HT11 stored at the first application memory location YU51 based on the obtained first application memory address AU51. The processing unit 710 uses the first specific application communication protocol PC11 to send the accessed electronic data DE61 toward the first communication target 511 in the data transmission phase UT1 based on the accessed electronic data DE61, the obtained first communication protocol identifier HP1 and the accessed first communication target identifier HT11.

The processing unit 710 obtains the second application memory address AU61 in the data transmission phase UT1 based on the accessed second communication protocol identifier HP2, and accesses the second communication target identifier HT21 stored at the second application memory location YU61 based on the obtained second application memory address AU61. The processing unit 710 uses the second specific application communication protocol PC21 to send the accessed electronic data DE61 toward the second communication target 521 in the data transmission phase UT1 based on the accessed electronic data DE61, the accessed second communication protocol identifier HP2 and the accessed second communication target identifier HT21.

The plurality of different application communication protocols PC11, PC21, . . . are selected from a group consisting of an email communication protocol, an instant-messaging communication protocol, a short-message service communication protocol and a multimedia-message service communication protocol. The first communication target identifier HT11 is the same as or different from the second communication target identifier HT21. The first communication target 511 is the same as or different from the second communication target 521.

Please refer to FIG. 12, FIG. 13 and FIG. 14. A method for sending electronic data DE61 is disclosed. The method includes the following steps: An electricity-using target BU71 is provided. A first communication protocol identifier HP1 configured to identify a first specific application communication protocol PC11 is obtained by means of the electricity-using target BU71. A first communication target identifier HT11 configured to identify a first communication target 511 is obtained based on the first communication protocol identifier HP1. In addition, the electronic data DE61 is sent toward the first communication target 511 based on the first communication target identifier HT11 and the first specific application communication protocol PC11.

In some embodiments, the method further includes the following steps: A volatile memory space SV51 is provided. An application memory location YK51 identified based on an application memory address AK51 is provided, wherein the application memory address AK51 is determined according to the first communication protocol identifier HP1. In addition, a target identifier set identifier HE51 and a communication target identifier set WV51 identified by the target identifier set identifier HE51 are stored. For example, the target identifier set identifier HE51 is stored at the application memory location YK51 based on the application memory address AK51. The communication target identifier set WV51 is stored in the volatile memory space SV51.

The method further includes the following steps: The application memory address AK51 is obtained based on the first communication protocol identifier HP1. The target identifier set identifier HE51 stored at the application memory location YK51 is accessed based on the obtained application memory address AK51. In addition, under a condition that the communication target identifier set WV51 consists of a plurality of communication target identifiers HT11, HT12, . . . including the stored first communication target identifier HT11 and the plurality of communication target identifiers HT11, HT12, . . . are configured to respectively identify a plurality of communication targets 511, 512, . . . , the plurality of communication target identifiers HT11, HT12, . . . are accessed based on the accessed target identifier set identifier HE51.

The step of sending the electronic data DE61 toward the first communication target 511 is included in a step, included in the method, that: the first specific application communication protocol PC11 is used to send the electronic data DE61 toward each of the plurality of communication targets 511, 512, . . . based on the first communication protocol identifier HP1 and the accessed plurality of communication target identifiers HT11, HT12, . . . .

In some embodiments, the first specific application communication protocol PC11 is one selected from a plurality of different application communication protocols PC11, PC21, . . . . The first communication protocol identifier HP1 belongs to a communication protocol identifier group GH1 identified by a protocol identifier group identifier HY81. The method further includes the following steps: The communication protocol identifier group GH1 and the protocol identifier group identifier HY81 associated with the electricity-using target BU71 are stored. The stored protocol identifier group identifier HY81 is accessed by means of the electricity-using target BU71. In addition, the stored first communication protocol identifier HP1 is obtained from the stored communication protocol identifier group GH1 based on the accessed protocol identifier group identifier HY81.

The stored communication protocol identifier group GH1 include a second communication protocol identifier HP2 configured to identify a second specific application communication protocol PC21. For example, the second specific application communication protocol PC21 is different from the first specific application communication protocol PC11, and is selected from the plurality of different application communication protocols PC11, PC21, . . . . The method further includes the following steps: A volatile memory space SV51 is provided. In addition, a first electricity application target BU81 and a second electricity application target BU91 are provided. For example, the second electricity application target BU91 is the same as or different from the first electricity application target BU81. The electricity-using target BU71 is one of the first and the second electricity application targets BU81 and BU91.

The method further includes the following steps: A second communication target identifier HT21 associated with the second communication protocol identifier HP2 is stored, wherein the second communication target identifier HT21 is configured to identify a second communication target 521. In addition, a first application memory location YU51 identified based on a first application memory address AU51, and a second application memory location YU61 identified based on a second application memory address AU61 are provided. For example, each of the first and the second application memory locations YU51 and YU61 is disposed in the volatile memory space SV51. The first application memory address AU51 is determined according to the stored first communication protocol identifier HP1. The second application memory address AU61 is determined according to the second communication protocol identifier HP2.

In some embodiments, each of the first and the second electricity application targets BU81 and BU91 is associated with the stored protocol identifier group identifier HY81. The method further includes the following steps: A first user input operation PU81 using the first electricity application target BU81 is received to provide a first operation request message QN81. A second user input operation PU91 being after the first user input operation PU81 is received. In addition, a second operation request message QN91 is provided in response to the second user input operation PU91 using the second electricity application target BU91.

The method further includes the following steps: A data preparation phase UP1 is entered in response to the first operation request message QN81. The electronic data DE61 is prepared in the data preparation phase UP1. The stored protocol identifier group identifier HY81 is read in the data preparation phase UP1. In addition, the stored first and the stored second communication protocol identifiers HP1 and HP2 that belong to the stored communication protocol identifier group GH1 are read based on the read protocol identifier group identifier HY81.

In some embodiments, the method further includes the following steps: A third user input operation PK51 is received in the data preparation phase UP1. A first data acquisition operation EF51 is performed in response to the third user input operation PK51 to obtain the first communication target identifier HT11 to be stored. The first application memory address AU51 is fetched in the data preparation phase UP1 based on the read first communication protocol identifier HP1. In addition, the obtained first communication target identifier HT11 is stored at the first application memory location YU51 based on the fetched first application memory address AU51.

The method further includes the following steps: A fourth user input operation PK61 is received in the data preparation phase UP1. A second data acquisition operation EF61 is performed in response to the fourth user input operation PK61 to obtain the second communication target identifier HT21 to be stored. The second application memory address AU61 is fetched in the data preparation phase UP1 based on the read second communication protocol identifier HP2. The obtained second communication target identifier HT21 is stored at the second application memory location YU61 based on the fetched second application memory address AU61. In addition, the data preparation phase UP1 is left to enter a data transmission phase UT1 in response to the second operation request message QN91.

The step of accessing the stored protocol identifier group identifier HY81 by means of the electricity-using target BU71 includes a sub-step that: the stored protocol identifier group identifier HY81 is accessed in the data transmission phase UT1. The step of obtaining the stored first communication protocol identifier HP1 from the stored communication protocol identifier group GH1 include a sub-step that: the stored first communication protocol identifier HP1 that belongs to the stored communication protocol identifier group GH1 is accessed based on the accessed protocol identifier group identifier HY81 to obtain the stored first communication protocol identifier HP1 from the stored communication protocol identifier group GH1.

The step of preparing the electronic data DE61 includes the following sub-steps: A fifth user input operation PV81 being before the second user input operation PU91 is received in the data preparation phase UP1 to provide an input data DB21. In addition, in response to obtaining the input data DB21, the electronic data DE61 determined according to the obtained input data DB21 is stored. For example, the second electricity application target BU91 is further associated with the stored electronic data DE61.

In some embodiments, the method further includes the following steps: The stored second communication protocol identifier HP2 belonging to the stored communication protocol identifier group GH1 is accessed based on the accessed protocol identifier group identifier HY81. The stored electronic data DE61 is accessed in the data transmission phase UT1. The first application memory address AU51 is obtained in the data transmission phase UT1 based on the obtained first communication protocol identifier HP1. In addition, the first communication target identifier HT11 stored at the first application memory location YU51 is accessed based on the obtained first application memory address AU51.

The method further includes the following steps: The second application memory address AU61 is obtained in the data transmission phase UT1 based on the accessed second communication protocol identifier HP2. The second communication target identifier HT21 stored at the second application memory location YU61 is accessed based on the obtained second application memory address AU61. In addition, the second specific application communication protocol PC21 is used to send the accessed electronic data DE61 toward the second communication target 521 in the data transmission phase UT1 based on the accessed electronic data DE61, the accessed second communication protocol identifier HP2 and the accessed second communication target identifier HT21.

The step of sending the electronic data DE61 toward the first communication target 511 includes a sub-step that: the first specific application communication protocol PC11 is used to send the accessed electronic data DE61 toward the first communication target 511 in the data transmission phase UT1 based on the accessed electronic data DE61, the obtained first communication protocol identifier HP1 and the accessed first communication target identifier HT11. The plurality of different application communication protocols PC11, PC21, . . . are selected from a group consisting of an email communication protocol, an instant-messaging communication protocol, a short-message service communication protocol and a multimedia-message service communication protocol. The first communication target identifier HT11 is the same as or different from the second communication target identifier HT21. The first communication target 511 is the same as or different from the second communication target 521.

Please refer to FIG. 12, FIG. 13 and FIG. 14. A method for sending electronic data DE61 is disclosed. The method includes the following steps: The input unit 740 receives a first user input operation PU81 and a second user input operation PU91 occurred later than the first user input operation PU81. The processing unit 710 obtains a first communication protocol identifier HP1 configured to denote a first specific application communication protocol PC11 in response to the first user input operation PU81. The processing unit 710 obtains a first communication target identifier HT11 configured to denote a first communication target 511 based on the first communication protocol identifier HP1. In addition, the processing unit 710 uses the first communication target identifier HT11 and the first specific application communication protocol PC11 to send the electronic data DE61 to the first communication target 511 in response to the second user input operation PU91.

In some embodiments, the method further includes the following steps: The storage unit 720 provides a nonvolatile memory space SN51. The storage unit 720 stores a target identifier set identifier HG51 and a communication target identifier set WM51 denoted by the target identifier set identifier HG51, wherein the communication target identifier set WM51 includes the first communication target identifier HT11, and is stored in the nonvolatile memory space SN51. In addition, the storage unit 720 provides an application memory location YE51 associated with the first specific application communication protocol PC11. For example, the target identifier set identifier HG51 is stored at the application memory location YE51 indicated based on an application memory address AE51.

The step of obtaining the first communication target identifier HT11 based on the first communication protocol identifier HP1 includes the following sub-steps: The processing unit 710 obtains the application memory address AE51 based on the first communication protocol identifier HP1. The processing unit 710 accesses the target identifier set identifier HG51 stored at the application memory location YE51 based on the obtained application memory address AE51. In addition, the processing unit 710 obtains the first communication target identifier HT11 from the communication target identifier set WM51 based on the accessed target identifier set identifier HG51.

In some embodiments, the first specific application communication protocol PC11 is one selected from a plurality of different application communication protocols PC11, PC21, . . . . The method further includes the following steps: The storage unit 720 provides a volatile memory space SV51. The storage unit 720 provides a first application memory location YU51 indicated based on a first application memory address AU51, wherein the first application memory location YU51 is disposed in the volatile memory space SV51. The processing unit 710 fetches the first application memory address AU51 based on the first communication protocol identifier HP1. In addition, the processing unit 710 causes the storage unit 720 to store the first communication target identifier HT11 at the first application memory location YU51 based on the fetched first application memory address AU51.

The step of sending the electronic data DE61 to the first communication target 511 includes the following sub-steps: The processing unit 710 accesses the first communication target identifier HT11 stored at the first application memory location YU51 in response to the second user input operation PU91. In addition, the processing unit 710 sends the electronic data DE61 to the first communication target 511 based on the accessed first communication target identifier HT11 and the first specific application communication protocol PC11.

In some embodiments, the first communication protocol identifier HP1 belongs to a communication protocol identifier group GH1 denoted by a protocol identifier group identifier HY81. The communication protocol identifier group GH1 include a second communication protocol identifier HP2 configured to denote a second specific application communication protocol PC21. For example, the second specific application communication protocol PC21 is different from the first specific application communication protocol PC11, and is selected from the plurality of different application communication protocols PC11, PC21, . . . .

In some embodiments, the method further includes the following steps: One of the input unit 740 and the display unit 730 provides a first electricity application target BU81 associated with the first communication protocol identifier HP1. In addition, one of the input unit 740 and the display unit 730 provides a second electricity application target BU91. For example, the second electricity application target BU91 is the same as or different from the first electricity application target BU81.

The method further includes the following steps: The storage unit 720 stores the communication protocol identifier group GH1 and the protocol identifier group identifier HY81 associated with the first electricity application target BU81. The storage unit 720 stores a second communication target identifier HT21 associated with the stored second communication protocol identifier HP2, wherein the second communication target identifier HT21 is configured to denote a second communication target 521. In addition, the storage unit 720 provides a second application memory location YU61 indicated based on a second application memory address AU61. For example, the second application memory location YU61 is disposed in the volatile memory space SV51. The first application memory address AU51 is determined according to the stored first communication protocol identifier HP1. The second application memory address AU61 is determined according to the second communication protocol identifier HP2.

The method further includes the following steps: The input unit 740 provides a first operation request message QN81 in response to the first user input operation PU81 using the first electricity application target BU81. The input unit 740 provides a second operation request message QN91 in response to the second user input operation PU91 using the second electricity application target BU91. The processing unit 710 causes the method to enter a data preparation phase UP1 in response to the first operation request message QN81. The processing unit 710 causes the storage unit 720 to prepare the electronic data DE61 in the data preparation phase UP1. In addition, the processing unit 710 accesses the protocol identifier group identifier HY81 stored by the storage unit 720 in the data preparation phase UP1.

The method further includes the following steps: The processing unit 710 accesses the stored first communication protocol identifier HP1 that belongs to the stored communication protocol identifier group GH1 based on the accessed protocol identifier group identifier HY81 to obtain the stored first communication protocol identifier HP1 from the stored communication protocol identifier group GH1. The processing unit 710 accesses the stored second communication protocol identifier HP2 that belongs to the stored communication protocol identifier group GH1 based on the accessed protocol identifier group identifier HY81. In addition, the input unit 740 receives a third user input operation PK51 in the data preparation phase UP1.

The step of obtaining the first communication target identifier HT11 includes a sub-step that: the processing unit 710 performs a first data acquisition action EF5B in the data preparation phase UP1 in response to the third user input operation PK51 to obtain the first communication target identifier HT11 to be stored. For example, the first data acquisition action EF5B uses the obtained first communication protocol identifier HP1. For example, the first data acquisition operation EF51 is the first data acquisition action EF5B.

In some embodiments, the method further includes the following steps: The input unit 740 receives a fourth user input operation PK61 in the data preparation phase UP1. In addition, the processing unit 710 performs a second data acquisition action EF6B in response to the fourth user input operation PK61 to obtain the second communication target identifier HT21 to be stored. For example, the second data acquisition action EF6B uses the accessed second communication protocol identifier HP2. For example, the second data acquisition operation EF61 is the second data acquisition action EF6B.

The method further includes the following steps: The processing unit 710 fetches the second application memory address AU61 in the data preparation phase UP1 based on the accessed second communication protocol identifier HP2. The processing unit 710 causes the storage unit 720 to store the obtained second communication target identifier HT21 at the second application memory location YU61 based on the fetched second application memory address AU61. In addition, the processing unit 710 causes the method to leave the data preparation phase UP1 to enter a data transmission phase UT1 in response to the second operation request message QN91.

The step of accessing the first communication target identifier HT11 includes the following sub-steps: The processing unit 710 obtains the first application memory address AU51 in the data transmission phase UT1 based on the obtained first communication protocol identifier HP1. In addition, the processing unit 710 accesses the first communication target identifier HT11 stored at the first application memory location YU51 based on the obtained first application memory address AU51.

The step of preparing the electronic data DE61 includes the following sub-steps: The input unit 740 receives a fifth user input operation PV81 being before the second user input operation PU91 in the data preparation phase UP1 to provide an input data DB21. In addition, the processing unit 710, in response to obtaining the input data DB21, stores the electronic data DE61 determined according to the obtained input data DB21. For example, the second electricity application target BU91 is further associated with the stored electronic data DE61.

In some embodiments, the method further includes the following steps: The processing unit 710 accesses the stored electronic data DE61 in the data transmission phase UT1. The processing unit 710 obtains the second application memory address AU61 in the data transmission phase UT1 based on the accessed second communication protocol identifier HP2. The processing unit 710 accesses the second communication target identifier HT21 stored at the second application memory location YU61 based on the obtained second application memory address AU61. In addition, the processing unit 710 uses the second specific application communication protocol PC21 to send the accessed electronic data DE61 to the second communication target 521 in the data transmission phase UT1 based on the accessed electronic data DE61, the accessed second communication protocol identifier HP2 and the accessed second communication target identifier HT21.

The step of sending the electronic data DE61 to the first communication target 511 based on the accessed first communication target identifier HT11 and the first specific application communication protocol PC11 includes a substep that: the processing unit 710 uses the first specific application communication protocol PC11 to send the accessed electronic data DE61 to the first communication target 511 in the data transmission phase UT1 based on the accessed electronic data DE61, the obtained first communication protocol identifier HP1 and the accessed first communication target identifier HT11. The plurality of different application communication protocols PC11, PC21, . . . are selected from a group consisting of an email communication protocol, an instant-messaging communication protocol, a short-message service communication protocol and a multimedia-message service communication protocol. The first communication target identifier HT11 is the same as or different from the second communication target identifier HT21. The first communication target 511 is the same as or different from the second communication target 521.

Figure 15:
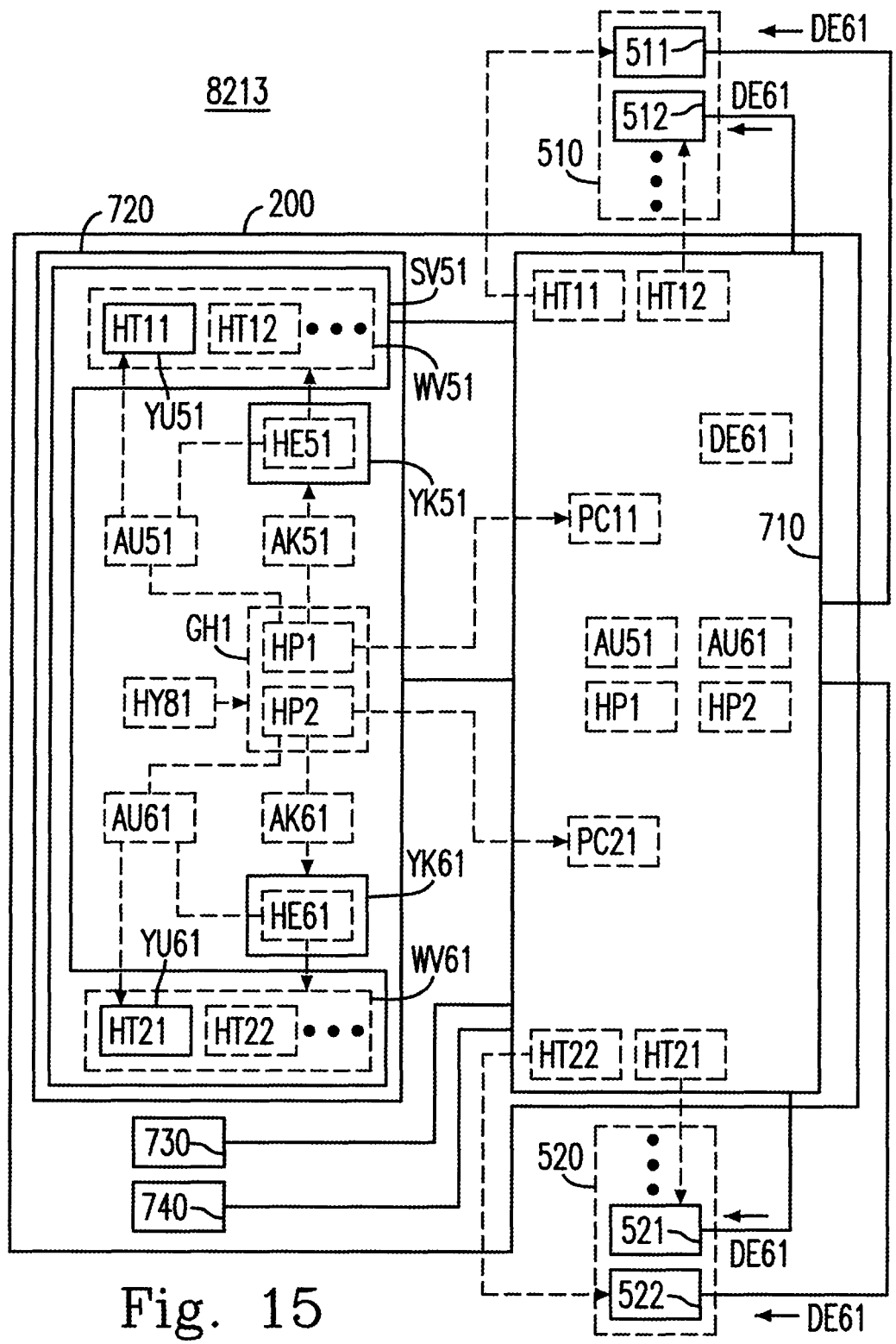
FIG. 15 is a schematic diagram showing an implementation structure of the communication system shown in FIG. 12.
Figure 16:
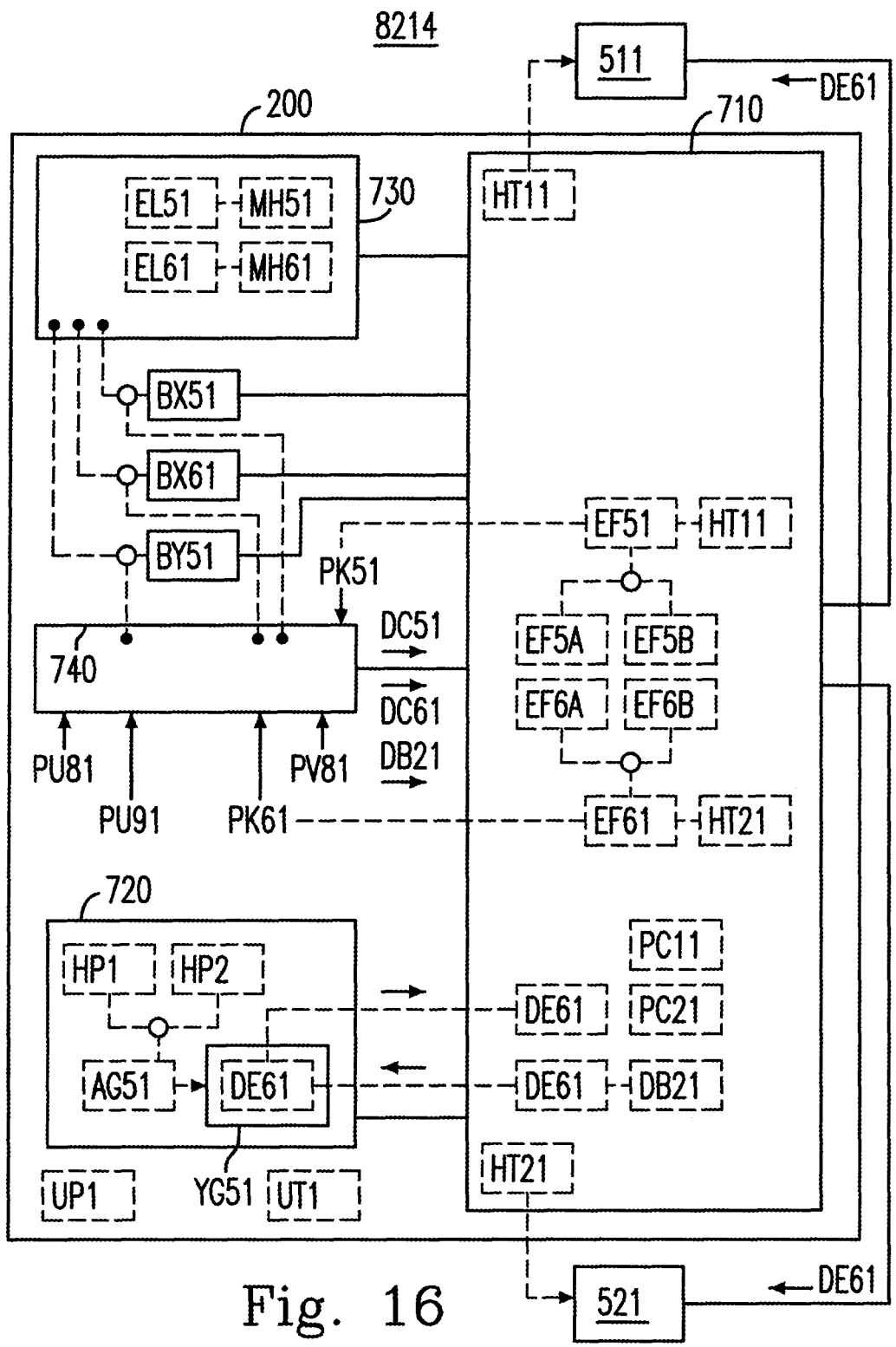
FIG. 16 is a schematic diagram showing an implementation structure of the communication system shown in FIG. 12.

Please refer to FIG. 15, which is a schematic diagram showing an implementation structure 8213 of the communication system 821 shown in FIG. 12. FIG. 16 is a schematic diagram showing an implementation structure 8214 of the communication system 821 shown in FIG. 12. As shown in FIG. 15, the implementation structure 8213 includes the electronic device 200, the first communication target 511, the second communication target 521, a communication target 512 and a communication target 522. The electronic device 200 is to communicate with at least one of the first communication target 511, the second communication target 521, the communication target 512 and the communication target 522, and includes the processing unit 710, the storage unit 720 coupled to the processing unit 710, the input unit 740 coupled to the processing unit 710, and the display unit 730 coupled to the processing unit 710. Each of the storage unit 720, the input unit 740 and the display unit 730 is controlled by the processing unit 710. The storage unit 720 has a volatile memory space SV51 coupled to the processing unit 710, and a nonvolatile memory space SN51 coupled to the processing unit 710.

In some embodiments, the storage unit 720 further has an application memory location YK61 identified based on an application memory address AK61. For example, the application memory address AK61 is determined according to the stored second communication protocol identifier HP2. The storage unit 720 further stores a target identifier set identifier HE61 and a communication target identifier set WV61 identified by the target identifier set identifier HE61. For example, the target identifier set identifier HE61 is stored at the application memory location YK61 based on the application memory address AK61. The processing unit 710 causes the storage unit 720 to store the communication target identifier set WV61 in the volatile memory space SV51 in the data preparation phase UP1. The processing unit 710 obtains the application memory address AK61 based on the accessed second communication protocol identifier HP2, and accesses the target identifier set identifier HE61 stored at the application memory location YK61 based on the obtained application memory address AK61.

Under a condition that the communication target identifier set WV61 consists of a plurality of communication target identifiers HT21, HT22, . . . including the stored second communication target identifier HT21 and the plurality of communication target identifiers HT21, HT22, . . . are configured to respectively identify a plurality of communication targets 521, 522, . . . , the processing unit 710 accesses the plurality of communication target identifiers HT21, HT22, . . . in the data transmission phase UT1 based on the accessed target identifier set identifier HE61. The processing unit 710 uses the second specific application communication protocol PC21 to send the electronic data DE61 toward each of the plurality of communication targets 521, 522, . . . in the data transmission phase UT1 based on the accessed second communication protocol identifier HP2 and the accessed plurality of communication target identifiers HT21, HT22, . . . .

For example, the plurality of communication targets 511, 512, . . . constitute a first communication target set 510. The plurality of communication targets 521, 522, . . . constitute a second communication target set 520. The communication target identifier set WV51 is configured to identify the first communication target set 510. The processing unit 710 causes the storage unit 720 to store the communication target identifier set WV51 in the volatile memory space SV51 in the data preparation phase UP1. The communication target identifier set WV61 is configured to identify the second communication target set 520.

For example, the prepared first communication target identifier HT11 is stored at the first application memory location YU51. The first application memory location YU51 is identified by the first application memory address AU51, or is identified based on the first application memory address AU51. The first application memory address AU51 is determined according to the stored first communication protocol identifier HP1 and the stored target identifier set identifier HE51. The prepared second communication target identifier HT21 is stored at the second application memory location YU61. The second application memory location YU61 is identified by the second application memory address AU61, or is identified based on the second application memory address AU61. The second application memory address AU61 is determined according to the stored second communication protocol identifier HP2 and the stored target identifier set identifier HE61.

Figure 17:
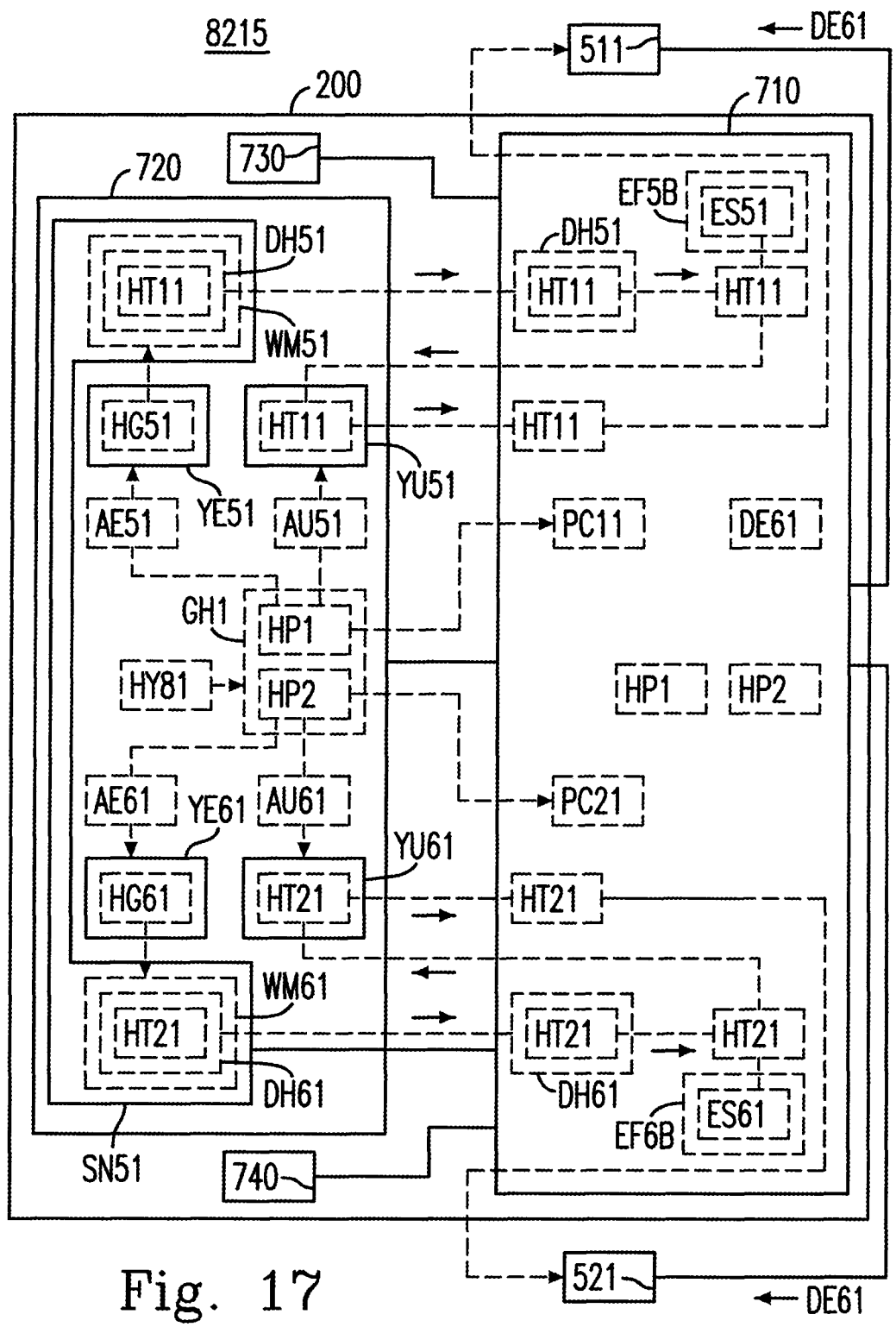
FIG. 17 is a schematic diagram showing an implementation structure of the communication system shown in FIG. 12.

Please refer to FIG. 16 and FIG. 17. FIG. 16 is a schematic diagram showing an implementation structure 8214 of the communication system 821 shown in FIG. 12. FIG. 17 is a schematic diagram showing an implementation structure 8215 of the communication system 821 shown in FIG. 12. As shown in FIG. 16 and FIG. 17, each of the implementation structures 8214 and 8215 includes the electronic device 200, the first communication target 511 and the second communication target 521. The electronic device 200 is to communicate with at least one of the first communication target 511 and the second communication target 521, and includes the processing unit 710, the storage unit 720 coupled to the processing unit 710, the input unit 740 coupled to the processing unit 710, and the display unit 730 coupled to the processing unit 710. Each of the storage unit 720, the input unit 740 and the display unit 730 is controlled by the processing unit 710. The storage unit 720 has a volatile memory space SV51 coupled to the processing unit 710, and a nonvolatile memory space SN51 coupled to the processing unit 710.

One of the input unit 740 and the display unit 730 includes an electricity application target BX51 coupled to the processing unit 710. One of the input unit 740 and the display unit 730 includes an electricity application target BX61 coupled to the processing unit 710. One of the input unit 740 and the display unit 730 includes an electricity application target BY51 coupled to the processing unit 710. For example, the electricity application targets BX51, BX61 and BY51 are respectively located at different spatial locations.

In some embodiments, the storage unit 720 further stores a target identifier set identifier HG51 and a communication target identifier set WM51 identified by the target identifier set identifier HG51, and further has an application memory location YE51 associated with the first specific application communication protocol PC11. For example, the communication target identifier set WM51 includes the first communication target identifier HT11, and is stored in the nonvolatile memory space SN51 beforehand. The target identifier set identifier HG51 is stored at the application memory location YE51 based on an application memory address AE51 determined according to the stored first communication protocol identifier HP1.

The input unit 740 receives the third user input operation PK51 in the data preparation phase UP1. The processing unit 710 performs the first data acquisition operation EF51 in response to the third user input operation PK51 using the electricity application target BX51 to obtain the first communication target identifier HT11 to be stored. The first data acquisition operation EF51 is one of a data acquisition action EF5A and a first data acquisition action EF5B. The processing unit 710 fetches the first application memory address AU51 in the data preparation phase UP1 based on the read first communication protocol identifier HP1, and causes the storage unit 720 to store the obtained first communication target identifier HT11 at the first application memory location YU51 based on the fetched first application memory address AU51.

Under a condition that the first data acquisition operation EF51 is the data acquisition action EF5A: the input unit 740 provides an input data DC51 to the processing unit 710 in response to the third user input operation PK51; and the processing unit 710, based on the input data DC51, obtains the first communication target identifier HT11 determined according to the input data DC51.

Under a condition that the first data acquisition operation EF51 is the first data acquisition action EF5B: the processing unit 710 is configured to use the read or accessed first communication protocol identifier HP1 to obtain the application memory address AE51; the processing unit 710 reads the target identifier set identifier HG51 stored at the application memory location YE51 based on the obtained application memory address AE51; and the processing unit 710 reads communication target identifier data DH51 belonging to the communication target identifier set WM51 based on the read target identifier set identifier HG51, wherein the communication target identifier data DH51 includes the first communication target identifier HT11.

Under a condition that the first data acquisition operation EF51 is the first data acquisition action EF5B, the processing unit 710 performs a data selection operation ES51 in response to the third user input operation PK51 to obtain the first communication target identifier HT11 from the communication target identifier data DH51. For example, the processing unit 710 causes the display unit 730 to perform a display operation EL51 associated with the read first communication target identifier HT11 in response to reading the communication target identifier data DH51 to display communication target identification information MH51 associated with the read first communication target identifier HT11. Under a condition that the display unit 730 displays the communication target identification information MH51, the processing unit 710 performs the data selection operation ES51 in response to the third user input operation PK51 to obtain the first communication target identifier HT11.

In some embodiments, the storage unit 720 further stores a target identifier set identifier HG61 and a communication target identifier set WM61 identified by the target identifier set identifier HG61, and further has an application memory location YE61 associated with the second specific application communication protocol PC21. For example, the communication target identifier set WM61 includes the second communication target identifier HT21, and is stored in the nonvolatile memory space SN51 beforehand. The target identifier set identifier HG61 is stored at the application memory location YE61 based on an application memory address AE61 determined according to the second communication protocol identifier HP2.

The input unit 740 receives the fourth user input operation PK61 in the data preparation phase UP1. The processing unit 710 performs the second data acquisition operation EF61 in response to the fourth user input operation PK61 using the electricity application target BX61 to obtain the second communication target identifier HT21 to be stored. The second data acquisition operation EF61 is one of a data acquisition action EF6A and a second data acquisition action EF6B. The processing unit 710 fetches the second application memory address AU61 in the data preparation phase UP1 based on the read second communication protocol identifier HP2, and causes the storage unit 720 to store the obtained second communication target identifier HT21 at the second application memory location YU61 based on the fetched second application memory address AU61. For example, each of the first and the second application memory locations YU51 and YU61 is disposed in the volatile memory space SV51.

Under a condition that the second data acquisition operation EF61 is the data acquisition action EF6A: the input unit 740 provides an input data DC61 to the processing unit 710 in response to the fourth user input operation PK61; and the processing unit 710, based on the input data DC61, obtains the second communication target identifier HT21 determined according to the input data DC61.

Under a condition that the second data acquisition operation EF61 is the second data acquisition action EF6B: the processing unit 710 is configured to use the read or accessed second communication protocol identifier HP2 to obtain the application memory address AE61; the processing unit 710 reads the target identifier set identifier HG61 stored at the application memory location YE61 based on the obtained application memory address AE61; and the processing unit 710 reads communication target identifier data DH61 belonging to the communication target identifier set WM61 based on the read target identifier set identifier HG61, wherein the communication target identifier data DH61 includes the second communication target identifier HT21.

Under a condition that the second data acquisition operation EF61 is the second data acquisition action EF6B, the processing unit 710 performs a data selection operation ES61 in response to the fourth user input operation PK61 to obtain the second communication target identifier HT21 from the communication target identifier data DH61. For example, the processing unit 710 causes the display unit 730 to perform a display operation EL61 associated with the read second communication target identifier HT21 in response to reading the communication target identifier data DH61 to display communication target identification information MH61 associated with the read second communication target identifier HT21. Under a condition that the display unit 730 displays the communication target identification information MH61, the processing unit 710 performs the data selection operation ES61 in response to the fourth user input operation PK61 to obtain the second communication target identifier HT21.

For example, the first communication target identifier HT11 belonging to the communication target identifier set WM51 is stored at a first practical memory location. The first practical memory location is identified by a first practical memory address, or is identified based on the first practical memory address. The first practical memory address is determined according to the stored first communication protocol identifier HP1 and the stored target identifier set identifier HG51. The second communication target identifier HT21 belonging to the communication target identifier set WM61 is stored at a second practical memory location. The second practical memory location is identified by a second practical memory address, or is identified based on the second practical memory address. The second practical memory address is determined according to the stored second communication protocol identifier HP2 and the stored target identifier set identifier HG61.

In some embodiments, the storage unit 720 further has an application memory location YG51 identified based on an application memory address AG51. For example, the application memory address AG51 is identified by the application memory address AG51. The electricity application target BY51 is associated with the application memory address AG51. The input unit 740 receives the fifth user input operation PV81 using the electricity application target BY51 in the data preparation phase UP1 to provide the input data DB21 to the processing unit 710. The processing unit 710, in response to obtaining the input data DB21, obtains the electronic data DE61 determined according to the obtained input data DB21. The processing unit 710 obtains the application memory address AG51, and causes the storage unit 720 to store the obtained electronic data DE61 at the application memory location YG51 based on the obtained application memory address AG51.

For example, the application memory address AG51 is determined according to a selected protocol identifier being one of the stored first communication protocol identifier HP1 and the stored second communication protocol identifier HP2. The processing unit 710 obtains the application memory address AG51 based on the selected protocol identifier, and causes the storage unit 720 to read or access the electronic data DE61 stored at the application memory location YG51 based on the obtained application memory address AG51. For example, the application memory location YG51 is disposed in the volatile memory space SV51.

For example, the processing unit 710 is configured to cause the storage unit 720 to store, in at least one of the nonvolatile memory space SN51 and the volatile memory space SV51, one selected from a group consisting of the protocol identifier group identifier HY81, the communication protocol identifier group GH1, the target identifier set identifier HE51, the communication target identifier set WV51, the target identifier set identifier HE61, the communication target identifier set WV61, the target identifier set identifier HG51, the communication target identifier set WM51, the target identifier set identifier HG61, the communication target identifier set WM61 and any combination thereof.

Figure 18:
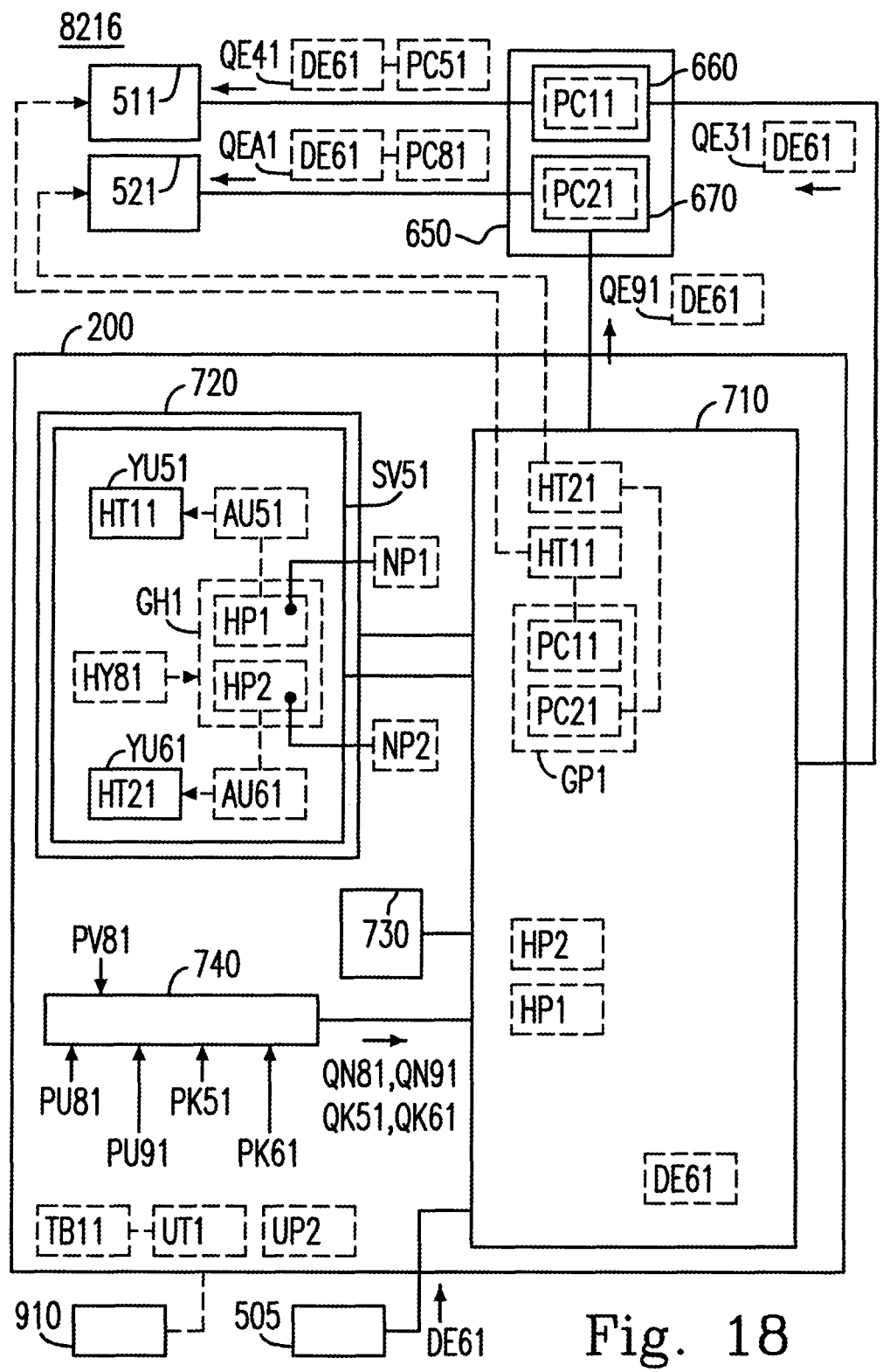
FIG. 18 is a schematic diagram showing an implementation structure of the communication system shown in FIG. 12.

Please refer to FIG. 18, which is a schematic diagram showing an implementation structure 8216 of the communication system 821 shown in FIG. 12. As shown in FIG. 18, the implementation structure 8216 includes the electronic device 200, a message service system 650, the first communication target 511 and the second communication target 521. The electronic device 200 includes the processing unit 710, the storage unit 720 coupled to the processing unit 710, the input unit 740 coupled to the processing unit 710, and the display unit 730 coupled to the processing unit 710. The message service system 650 includes a first message service device 660 and a second message service device 670. The processing unit 710 is coupled to the first message service device 660 and the second message service device 670. The first message service device 660 supports the first specific application communication protocol PC11. The second message service device 670 supports the second specific application communication protocol PC21, and is the same or different from the first message service device 660.

The processing unit 710 is configured to support the first specific application communication protocol PC11 and the second specific application communication protocol PC21. The storage unit 720 stores the protocol identifier group identifier HY81, the electronic data DE61, the first communication protocol identifier HP1, the second communication protocol identifier HP2, the first communication target identifier HT11, the second communication target identifier HT21, the target identifier set identifier HE51, the communication target identifier set WV51 identified by the target identifier set identifier HE51, the target identifier set identifier HE61, the communication target identifier set WV61 identified by the target identifier set identifier HE61, the target identifier set identifier HG51, the communication target identifier set WM51 identified by the target identifier set identifier HG51, the target identifier set identifier HG61, and the communication target identifier set WM61 identified by the target identifier set identifier HG61.

The first electricity application target BU81 is associated with the protocol identifier group identifier HY81, the first communication protocol identifier HP1, the second communication protocol identifier HP2, the target identifier set identifier HG51 and the target identifier set identifier HG61. The second electricity application target BU91 is associated with the protocol identifier group identifier HY81, the electronic data DE61, the first communication protocol identifier HP1, the second communication protocol identifier HP2, the target identifier set identifier HE51 and the target identifier set identifier HE61.

The target identifier set identifier HE51 is stored based on the first communication protocol identifier HP1, or is associated with the first communication protocol identifier HP1. The target identifier set identifier HE61 is stored based on the second communication protocol identifier HP2, or is associated with the second communication protocol identifier HP2. The target identifier set identifier HG51 is stored based on the first communication protocol identifier HP1, or is associated with the first communication protocol identifier HP1. The target identifier set identifier HG61 is stored based on the second communication protocol identifier HP2, or is associated with the second communication protocol identifier HP2.

The first communication protocol identifier HP1 and the second communication protocol identifier HP2 belong to the communication protocol identifier group GH1. For example, the communication protocol identifier group GH1 is a communication protocol identifier array. The first communication protocol identifier HP1 is configured to belong to the communication protocol identifier array based on a first ordinal position represented by a first ordinal number NP1. The second communication protocol identifier HP2 is configured to belong to the communication protocol identifier array based on a second ordinal position represented by a second ordinal number NP2. The storage unit 720 has an application memory location YC81 associated with the first specific application communication protocol PC11, and an application memory location YC91 associated with the second specific application communication protocol PC21.

The first communication protocol identifier HP1 is stored at the application memory location YC81 based on an application memory address AC81. For example, the application memory address AC81 is determined according to the protocol identifier group identifier HY81 and the first ordinal number NP1. The application memory location YC81 is identified based on the application memory address AC81, or is identified by the application memory address AC81. The second communication protocol identifier HP2 is stored at the application memory location YC91 based on an application memory address AC91. For example, the application memory address AC91 is determined according to the protocol identifier group identifier HY81 and the second ordinal number NP2. The application memory location YC91 is identified based on the application memory address AC91, or is identified by the application memory address AC91.

For example, the first communication protocol identifier HP1 is a first numeric identifier. The target identifier set identifier HE51 is stored at the application memory location YK51 based on the application memory address AK51. The application memory address AK51 is determined according to the first communication protocol identifier HP1; therefore, the target identifier set identifier HE51 is stored based on the first communication protocol identifier HP1. For example, the application memory location YK51 is identified based on the application memory address AK51, or is identified by the application memory address AK51.

For example, the second communication protocol identifier HP2 is a second numeric identifier, and is different from the first communication protocol identifier HP1. The target identifier set identifier HE61 is stored at the application memory location YK61 based on the application memory address AK61. The application memory address AK61 is determined according to the second communication protocol identifier HP2; therefore, the target identifier set identifier HE61 is stored based on the second communication protocol identifier HP2. For example, the application memory location YK61 is identified based on the application memory address AK61, or is identified by the application memory address AK61.

For example, the target identifier set identifier HG51 is stored at the application memory location YE51 based on the application memory address AE51. The application memory address AE51 is determined according to the first communication protocol identifier HP1; therefore, the target identifier set identifier HG51 is stored based on the first communication protocol identifier HP1. For example, the application memory location YE51 is identified based on the application memory address AE51, or is identified by the application memory address AE51.

For example, the target identifier set identifier HG61 is stored at the application memory location YE61 based on the application memory address AE61. The application memory address AE61 is determined according to the second communication protocol identifier HP2; therefore, the target identifier set identifier HG61 is stored based on the second communication protocol identifier HP2. For example, the application memory location YE61 is identified based on the application memory address AE61, or is identified by the application memory address AE61.

In some embodiments, the input unit 740 receives the first user input operation PU81 occurred earlier than the second user input operation PU91, and provides the first operation request message QN81 to the processing unit 710 in response to the first user input operation PU81 using the first electricity application target BU81. The processing unit 710 causes the electronic device 200 to enter the data preparation phase UP1 in response to the first operation request message QN81. In the data preparation phase UP1, the input unit 740 receives one selected from a group consisting of the third user input operation PK51, the fourth user input operation PK61, the fifth user input operation PV81, and any combination thereof.

For example, the processing unit 710 reads at least one selected from a group consisting of the stored protocol identifier group identifier HY81, the stored first communication protocol identifier HP1 and the stored second communication protocol identifier HP2 in response to the first operation request message QN81 to store at least one of the obtained first communication target identifier HT11 and the obtained second communication target identifier HT21. For example, the processing unit 710 reads the stored protocol identifier group identifier HY81 in the data preparation phase UP1, and reads the stored first communication protocol identifier HP1 and the stored second communication protocol identifier HP2 based on the read protocol identifier group identifier HY81.

The input unit 740 receives the second user input operation PU91 at an end time of the data preparation phase UP1, and provides the second operation request message QN91 to the processing unit 710 in response to the second user input operation PU91 using the second electricity application target BU91. The processing unit 710 causes the electronic device 200 to leave the data preparation phase UP1 to enter the data transmission phase UT1 in response to the second operation request message QN91.

The processing unit 710 accesses fourth application data stored by the storage unit 720 in the data transmission phase UT1 to cause the storage unit 720 to provide the fourth application data to the processing unit 710. For example, the fourth application data includes at least one selected from a group consisting of the protocol identifier group identifier HY81, the electronic data DE61, the first communication protocol identifier HP1, the second communication protocol identifier HP2, the first communication target identifier HT11 and the second communication target identifier HT21. The processing unit 710 uses at least one of the first specific application communication protocol PC11 and the second specific application communication protocol PC21 based on the accessed fourth application data to send the electronic data DE61 toward at least one of the first communication target 511 and the second communication target 521.

In some embodiments, the processing unit 710 accesses fifth application data stored by the storage unit 720 in the data transmission phase UT1 to cause the storage unit 720 to provide the fifth application data to the processing unit 710. For example, the fifth application data includes at least one selected from a group consisting of the protocol identifier group identifier HY81, the electronic data DE61, the first communication protocol identifier HP1, the second communication protocol identifier HP2, the target identifier set identifier HE51 and the target identifier set identifier HE61. The processing unit 710 uses at least one of the first specific application communication protocol PC11 and the second specific application communication protocol PC21 based on the accessed fifth application data to send the electronic data DE61 toward at least one of the plurality of communication target identifiers HT11, HT12, . . . and the plurality of communication target identifiers HT21, HT22, . . . .

For example, the processing unit 710, in response to the second operation request message QN91, accesses the electronic data DE61, the first communication protocol identifier HP1, the second communication protocol identifier HP2, the first communication target identifier HT11 and the second communication target identifier HT21, which are stored by the storage unit 720, to cause the storage unit 720 to provide the stored electronic data DE61, the stored first communication protocol identifier HP1, the stored second communication protocol identifier HP2, the stored first communication target identifier HT11 and the stored second communication target identifier HT21 to the processing unit 710.

For example, the processing unit 710, in response to the second operation request message QN91, accesses the stored protocol identifier group identifier HY81, the stored electronic data DE61 and a stored communication target identifier HM81, and accesses the stored first communication protocol identifier HP1 and the stored second communication protocol identifier HP2 based on the accessed protocol identifier group identifier HY81. The processing unit 710 accesses the stored first communication target identifier HT11 based on the accessed first communication protocol identifier HP1, and accesses the stored second communication target identifier HT21 based on the accessed second communication protocol identifier HP2. For example, the processing unit 710 accesses the stored target identifier set identifier HE51 based on the accessed first communication protocol identifier HP1, and accesses the stored target identifier set identifier HE61 based on the accessed second communication protocol identifier HP2.

In some embodiments, the input unit 740 receives the third user input operation PK51 using the electricity application target BX51 in the data preparation phase UP1. The processing unit 710 performs the first data acquisition operation EF51 in response to the third user input operation PK51 to obtain the first communication target identifier HT11 to be stored. The processing unit 710 fetches the first application memory address AU51 in the data preparation phase UP1 based on the read first communication protocol identifier HP1, and causes the storage unit 720 to store the obtained first communication target identifier HT11 at the first application memory location YU51 based on the fetched first application memory address AU51.

The input unit 740 receives the fourth user input operation PK61 using the electricity application target BX61 in the data preparation phase UP1. The processing unit 710 performs the second data acquisition operation EF61 in response to the fourth user input operation PK61 to obtain the second communication target identifier HT21 to be stored. The processing unit 710 fetches the second application memory address AU61 in the data preparation phase UP1 based on the read second communication protocol identifier HP2, and causes the storage unit 720 to store the obtained second communication target identifier HT21 at the second application memory location YU61 based on the fetched second application memory address AU61.

In some embodiments, the stored protocol identifier group identifier HY81 is one of a third numeric identifier and an alphanumeric identifier. The electricity application target BX51 is associated with the stored protocol identifier group identifier HY81. The input unit 740 provides an operation request message QK51 to the processing unit 710 in response to the third user input operation PK51 using the electricity application target BX51. The processing unit 710 reads or accesses the stored protocol identifier group identifier HY81 in response to the operation request message QK51, and reads the stored first communication protocol identifier HP1 belonging to the communication protocol identifier group GH1 based on the read protocol identifier group identifier HY81 and the first ordinal number NP1. For example, the processing unit 710 further performs the first data acquisition operation EF51 in response to the operation request message QK51 to obtain the first communication target identifier HT11 to be stored.

The electricity application target BX61 is associated with the stored protocol identifier group identifier HY81. The input unit 740 provides an operation request message QK61 to the processing unit 710 in response to the fourth user input operation PK61 using the electricity application target BX61. The processing unit 710 reads or accesses the stored protocol identifier group identifier HY81 in response to the operation request message QK61, and reads the stored second communication protocol identifier HP2 belonging to the communication protocol identifier group GH1 based on the read protocol identifier group identifier HY81 and the second ordinal number NP2. For example, the processing unit 710 further performs the second data acquisition operation EF61 in response to the operation request message QK61 to obtain the second communication target identifier HT21 to be stored.

At least one of the electricity application target BY51 and the first electricity application target BU81 is associated with the application memory address AG51. The second electricity application target BU91 is associated with the application memory address AG51. The processing unit 710 fetches the application memory address AG51 in the data preparation phase UP1. The input unit 740 receives the fifth user input operation PV81 using the electricity application target BY51 in the data preparation phase UP1 to provide the input data DB21 to the processing unit 710.

The processing unit 710, in response to obtaining the input data DB21, uses the fetched application memory address AG51 to cause the storage unit 720 to store the electronic data DE61 determined according to the obtained input data DB21 at the application memory location YG51. The processing unit 710 obtains the application memory address AG51 in the data transmission phase UT1, and accesses the electronic data DE61 stored at the application memory location YG51 in the data transmission phase UT1 based on the obtained application memory address AG51 to send the accessed electronic data DE61.

For example, the first electricity application target BU81 is one of a first display target and a first sensing target. The second electricity application target BU91 is one of a second display target and a second sensing target. The electricity application target BX51 is one of a display area and a sensing area. The electricity application target BX61 is one of a display area and a sensing area. The electricity application target BY51 is one of a display area and a sensing area.

In some embodiments, the processing unit 710 accesses or reads the electronic data DE61, the first communication protocol identifier HP1 and the first communication target identifier HT11, which are stored in the storage unit 720, in response to the second operation request message QN91 to obtain the stored electronic data DE61, the stored first communication protocol identifier HP1 and the stored first communication target identifier HT11, and uses the first specific application communication protocol PC11 to transmit an electronic message QE31 toward the first message service device 660 in the data transmission phase UT1 based on the obtained electronic data DE61, the obtained first communication protocol identifier HP1 and the obtained first communication target identifier HT11. The electronic message QE31 includes the electronic data DE61.

For example, the electronic message QE31 is or serves as an instruction message used to instruct the first message service device 660. The first message service device 660 uses the first specific application communication protocol PC11 to transmit an electronic message QE41 toward the first communication target 511 in response to the electronic message QE31, so that the first communication target 511 receives the electronic message QE41 in a specific application communication protocol PC51 being matched with or equal to the first specific application communication protocol PC11. The electronic message QE41 includes the electronic data DE61.

The processing unit 710 accesses or reads the electronic data DE61, the second communication protocol identifier HP2 and the second communication target identifier HT21, which are stored in the storage unit 720, in response to the second operation request message QN91 to obtain the stored electronic data DE61, the stored second communication protocol identifier HP2 and the stored second communication target identifier HT21, and uses the second specific application communication protocol PC21 to transmit an electronic message QE91 toward the second message service device 670 in the data transmission phase UT1 based on the obtained electronic data DE61, the obtained second communication protocol identifier HP2 and the obtained second communication target identifier HT21. The electronic message QE91 includes the electronic data DE61.

For example, the electronic message QE91 is or serves as an instruction message used to instruct the second message service device 670. The second message service device 670 uses the second specific application communication protocol PC21 to transmit an electronic message QEA1 toward the second communication target 521 in response to the electronic message QE91, so that the second communication target 521 receives the electronic message QEA1 in a specific application communication protocol PC81 being matched with or equal to the second specific application communication protocol PC21. The electronic message QEA1 includes the electronic data DE61.

The input unit 740 provides the second operation request message QN91 at a provision time TB11 in response to the second user input operation PU91 using the second electricity application target BU91. For example, the data transmission phase UT1 immediately follows the provision time TB11, and has a time length. For example, the time length is equal to one selected from a group consisting of 10 minutes, 5 minutes, 3 minutes, 2 minutes, 1 minute, 50 seconds, 40 seconds, 30 seconds, 20 seconds, 10 seconds, 5 seconds, 3 seconds, 2 seconds, 1 second and 0.5 second. In some embodiments, when the processing unit 710 is configured to cause the data transmission phase UT1 to end, the processing unit 710 causes the electronic device 200 to enter a data preparation phase UP2 being after the data transmission phase UT1. For example, the processing unit 710 causes the electronic device 200 to enter the data preparation phase UP2 in response to the second operation request message QN91.

In some embodiments, the electronic device 200 is used by a user 910. The input unit 740 receives from the user 910 at least one selected from a plurality of user input operations. The plurality of user input operations include the first user input operation PU81, the second user input operation PU91, the third user input operation PK51, the fourth user input operation PK61 and the fifth user input operation PV81. In some embodiments, the electronic device 200 is used by a plurality of users including the user 910. The input unit 740 is operated by the plurality of users to receive the plurality of user input operations. For example, the plurality of users are different.

In some embodiments, each of the first specific application communication protocol PC11 and the second specific application communication protocol PC21 is selected from the plurality of different application communication protocols PC11, PC21, . . . . The plurality of different application communication protocols PC11, PC21, . . . are selected from a group consisting of the email communication protocol, the instant-messaging communication protocol, the short-message service communication protocol and the multimedia-message service communication protocol. For example, the first operation request message QN81 and the second operation request message QN91 are a plurality of user request messages, respectively. For example, the plurality of different application communication protocols PC11, PC21, . . . constitute an application communication protocol group GP1. The communication protocol identifier group GH1 is configured to identify the application communication protocol group GP1.

For example, the processing unit 710 reads at least one selected from a group consisting of the stored protocol identifier group identifier HY81, the stored first communication protocol identifier HP1 and the stored second communication protocol identifier HP2 in response to the first operation request message QN81. For example, the processing unit 710 accesses at least one selected from a group consisting of the stored protocol identifier group identifier HY81, the stored first communication protocol identifier HP1 and the stored second communication protocol identifier HP2 in response to the second operation request message QN91.

In some embodiments, the processing unit 710 receives the electronic data DE61 from an external device 505 in the data preparation phase UP1, and stores the received electronic data DE61 into the storage unit 720 in response to receiving the electronic data DE61. For example, the external device 505 is coupled to the processing unit 710. Please additionally refer to FIG. 5. In some embodiments, the processing unit 710 accesses the protocol identifier group identifier HY81 in response to the second operation request message QN91, and accesses the first communication protocol identifier HP1 stored at the application memory location YC81 based on the accessed protocol identifier group identifier HY81 and the first ordinal number NP1. The processing unit 710 accesses the second communication protocol identifier HP2 stored at the application memory location YC91 based on the accessed protocol identifier group identifier HY81 and the second ordinal number NP2.

Figure 19:
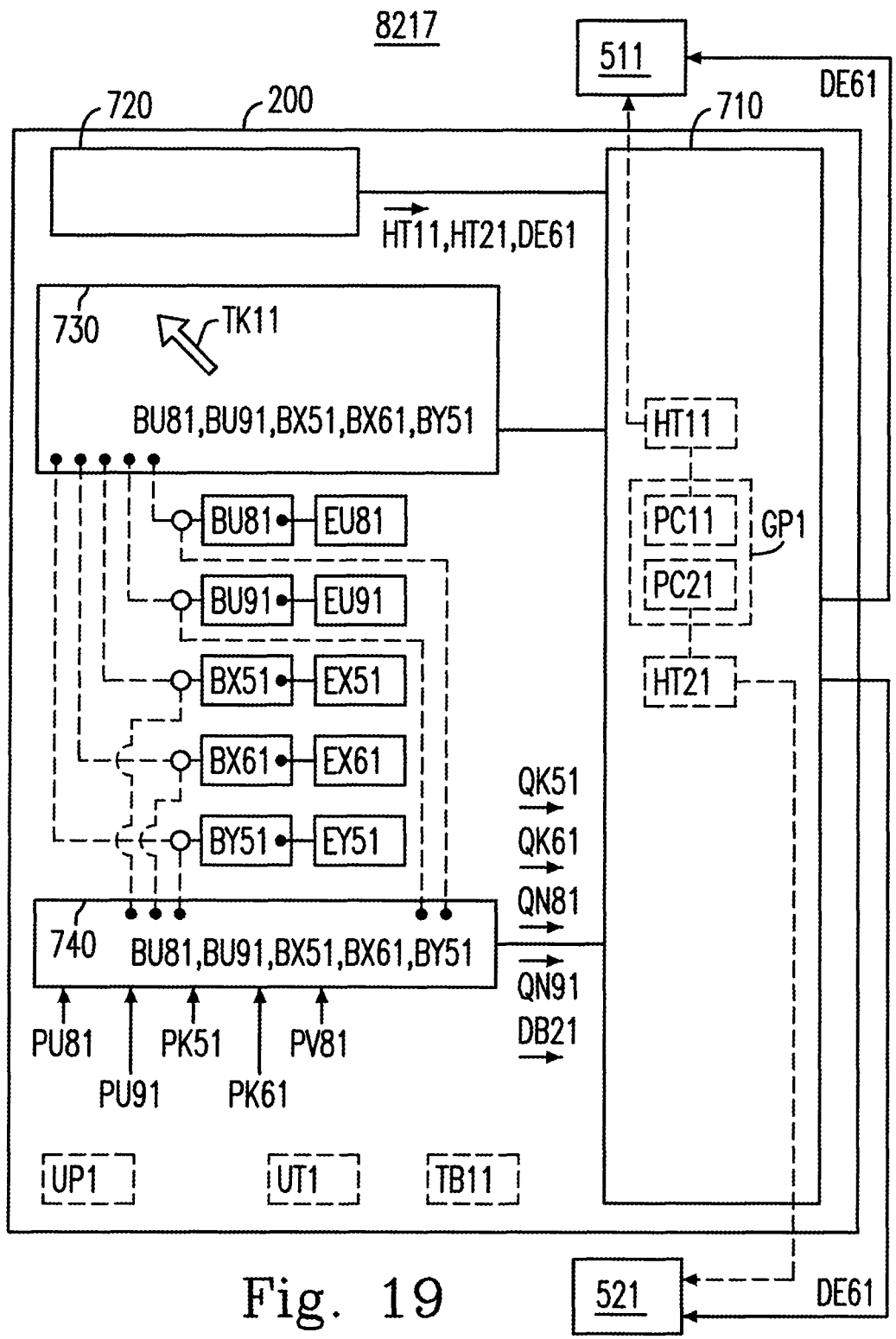
FIG. 19 is a schematic diagram showing an implementation structure of the communication system shown in FIG. 12.

Please refer to FIG. 19, which is a schematic diagram showing an implementation structure 8217 of the communication system 821 shown in FIG. 12. As shown in FIG. 19, the implementation structure 8217 includes the electronic device 200, the first communication target 511 and the second communication target 521. The electronic device 200 includes the processing unit 710, the storage unit 720 coupled to the processing unit 710, the input unit 740 coupled to the processing unit 710, and the display unit 730 coupled to the processing unit 710. Each of the storage unit 720, the input unit 740 and the display unit 730 is controlled by the processing unit 710.

In some embodiments, the electronic device 200 includes the first electricity application target BU81, the second electricity application target BU91, the electricity application target BX51, the electricity application target BX61 and the electricity application target BY51, each of which is coupled to the processing unit 710. The first and the second electricity application targets BU81 and BU91, and the electricity application targets BX51, BX61 and BY51 are respectively located at a spatial location EU81, a spatial location EU91, a spatial location EX51, a spatial location EX61 and a spatial location EY51.

For example, the spatial locations EU81, EU91, EX51, EX61 and EY51 are different. For example, two selected from a group consisting of the spatial locations EU81, EU91, EX51, EX61 and EY51 are the same. The first and the second electricity application targets BU81 and BU91, and the electricity application targets BX51, BX61 and BY51 respectively have a plurality of electricity application areas, or are respectively formed by the plurality of electricity application areas.

For example, the input unit 740 includes one selected from a group consisting of the first and the second electricity application targets BU81 and BU91, the electricity application targets BX51, BX61 and BY51, and any combination thereof. Any of the first and the second electricity application targets BU81 and BU91, and the electricity application targets BX51, BX61 and BY51 is a sensing target, wherein the sensing target includes one selected from a group consisting of a sensing area, a push button and a touch point.

The processing unit 710 causes the electronic device 200 to enter the data preparation phase UP1 by means of the first electricity application target BU81. The processing unit 710 causes the electronic device 200 to leave the data preparation phase UP1 to enter the data transmission phase UT1 by means of the second electricity application target BU91. The processing unit 710 obtains the first communication target identifier HT11 to be stored by means of the electricity application target BX51. The processing unit 710 obtains the second communication target identifier HT21 to be stored by means of the electricity application target BX61. The processing unit 710 obtains the input data DB21 by means of the electricity application target BY51.

For example, the display unit 730 includes one selected from a group consisting of the first and the second electricity application targets BU81 and BU91, the electricity application targets BX51, BX61 and BY51, and any combination thereof. For example, the processing unit 710 is configured to cause the display unit 730 to display the first and the second electricity application targets BU81 and BU91 at the same time or for different times. For example, the processing unit 710 is configured to cause the display unit 730 to display the electricity application targets BX51, BX61 and BY51 at the same time or for different times. Any of the first and the second electricity application targets BU81 and BU91, and the electricity application targets BX51, BX61 and BY51 is a display target, wherein the display target includes one selected from a group consisting of a display area, an icon and a display action item.

The first electricity application target BU81 is associated with at least one selected from a group consisting of the stored protocol identifier group identifier HY81, the stored first communication protocol identifier HP1, the stored second communication protocol identifier HP2, the stored first communication target identifier HT11, the stored second communication target identifier HT21, the stored target identifier set identifier HE51, the stored target identifier set identifier HE61, the stored target identifier set identifier HG51 and the stored target identifier set identifier HG61. The second electricity application target BU91 is associated with at least one selected from a group consisting of the stored protocol identifier group identifier HY81, the stored first communication protocol identifier HP1, the stored second communication protocol identifier HP2, the stored electronic data DE61, the stored target identifier set identifier HE51 and the stored target identifier set identifier HE61.

The electricity application target BX51 is associated with at least one of the stored first communication protocol identifier HP1 and the first application memory address AU51. The electricity application target BX61 is associated with at least one of the stored second communication protocol identifier HP2 and the second application memory address AU61. The electricity application target BY51 is associated with the application memory address AG51, and is used to obtain the input data DB21.

In some embodiments, the processing unit 710 is configured to cause the display unit 730 to display a selection tool TK11. The first user input operation PU81 uses or selects the first electricity application target BU81 displayed by the display unit 730 by means of the selection tool TK11 to cause the input unit 740 to provide the first operation request message QN81 to the processing unit 710. The second user input operation PU91 uses or selects the second electricity application target BU91 displayed by the display unit 730 by means of the selection tool TK11 to cause the input unit 740 to provide the second operation request message QN91 to the processing unit 710.

The third user input operation PK51 uses the electricity application target BX51 displayed by the display unit 730 by means of the selection tool TK11 to cause the processing unit 710 to obtain the first communication target identifier HT11 to be stored. The fourth user input operation PK61 uses the electricity application target BX61 displayed by the display unit 730 by means of the selection tool TK11 to cause the processing unit 710 to obtain the second communication target identifier HT21 to be stored. The fifth user input operation PV81 uses the electricity application target BY51 displayed by the display unit 730 by means of the selection tool TK11 to cause the processing unit 710 to obtain the input data DB21. For example, the selection tool TK11 is a cursor.

Figure 20:
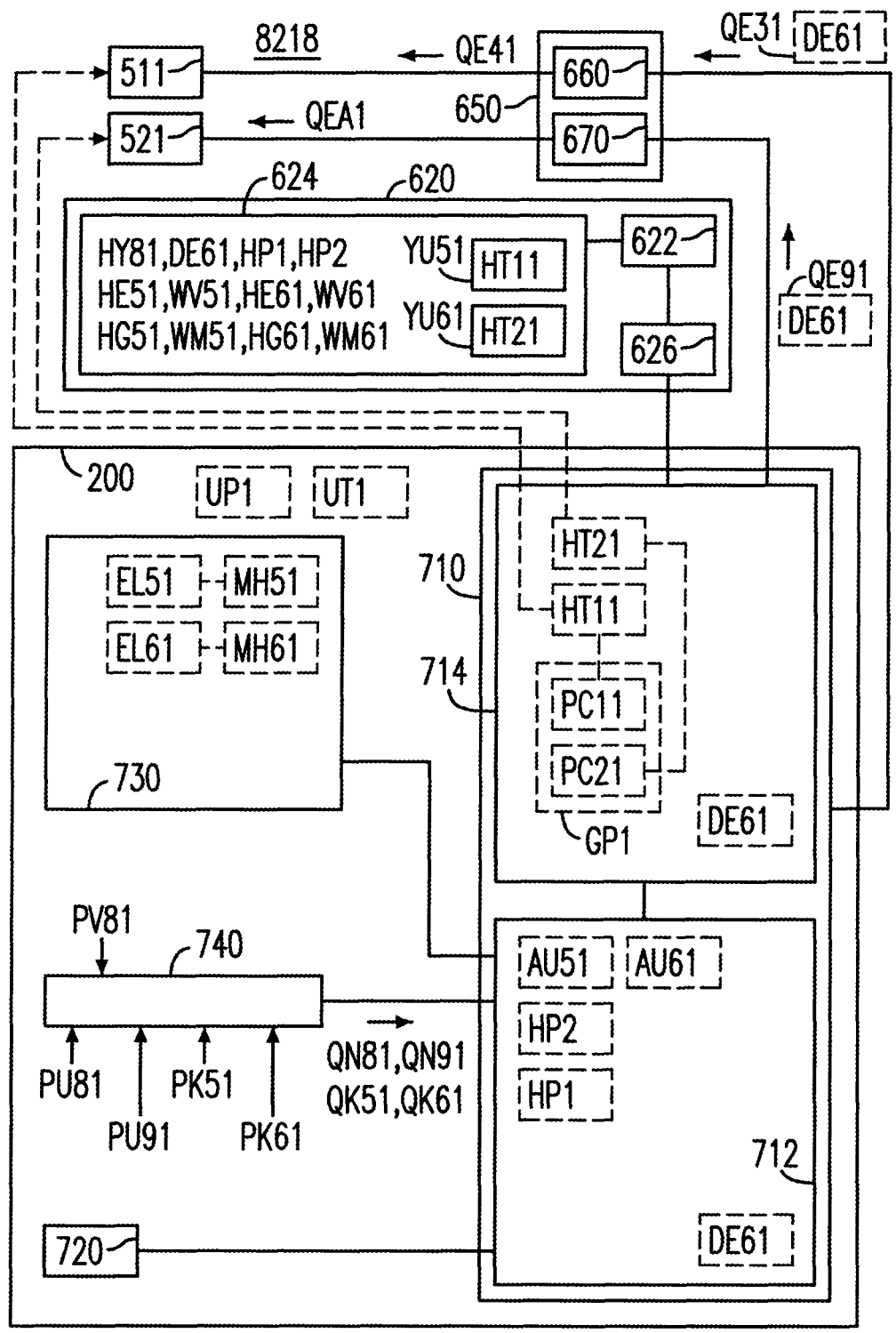
FIG. 20 is a schematic diagram showing an implementation structure of the communication system shown in FIG. 12.

Please refer to FIG. 20, which is a schematic diagram showing an implementation structure 8218 of the communication system 821 shown in FIG. 12. As shown in FIG. 20, the implementation structure 8218 includes the electronic device 200, the message service system 650, the first communication target 511, the second communication target 521, and a server 620 coupled to the electronic device 200. The electronic device 100 includes the processing unit 710, the storage unit 720, the input unit 740 and the display unit 730. The processing unit 710 includes a processor 712 and a communication interface unit 714 coupled to the processor 712. The communication interface unit 714 is coupled or linked to the message service system 650. Each of the storage unit 720, the input unit 740, the display unit 730 and the communication interface unit 714 is coupled to the processor 712, and is controlled by the processor 712.

In some embodiments, the server 620 includes a processing unit 622, a storage unit 624 coupled to the processing unit 622, and a communication interface unit 626 coupled to the processing unit 622. The communication interface unit 626 is coupled to the communication interface unit 714. The storage unit 624 stores the protocol identifier group identifier HY81, the electronic data DE61, the first communication protocol identifier HP1, the second communication protocol identifier HP2, the first communication target identifier HT11, the second communication target identifier HT21, the target identifier set identifier HE51, the communication target identifier set WV51, the target identifier set identifier HE61, the communication target identifier set WV61, the target identifier set identifier HG51, the communication target identifier set WM51, the target identifier set identifier HG61 and the communication target identifier set WM61.

The input unit 740 provides the first operation request message QN81 to the processor 712 in response to the first user input operation PU81 using the first electricity application target BU81. The processor 712 causes the electronic device 200 to enter the data preparation phase UP1 in response to the first operation request message QN81. The processor 712 accesses or reads sixth application data through the communication interface unit 714, the communication interface unit 626 and the processing unit 622 in the data preparation phase UP1. The sixth application data includes at least one selected from a group consisting of the protocol identifier group identifier HY81, the stored first communication protocol identifier HP1 and the stored second communication protocol identifier HP2, which are stored in the storage unit 624.

The processor 712, in the data preparation phase UP1, obtains the first communication target identifier HT11 to be stored, and uses the read sixth application data to fetch the first application memory address AU51, determined according to the read first communication protocol identifier HP1, in response to obtaining the first communication target identifier HT11. The processor 712 stores the obtained first communication target identifier HT11 to the first application memory location YU51, located in the storage unit 624, through the communication interface unit 714, the communication interface unit 626 and the processing unit 622 based on the fetched first application memory address AU51.

The processor 712, in the data preparation phase UP1, obtains the second communication target identifier HT21 to be stored, and uses the read sixth application data to fetch the second application memory address AU61, determined according to the read second communication protocol identifier HP2, in response to obtaining the second communication target identifier HT21. The processor 712 stores the obtained second communication target identifier HT21 to the second application memory location YU61, located in the storage unit 624, through the communication interface unit 714, the communication interface unit 626 and the processing unit 622 based on the fetched second application memory address AU61.

In some embodiments, the input unit 740 provides the second operation request message QN91 to the processor 712 in response to the second user input operation PU91 using the second electricity application target BU91. The processor 712 causes the electronic device 200 to leave the data preparation phase UP1 to enter the data transmission phase UT1 in response to the second operation request message QN91. The processor 712 accesses or reads seventh application data through the communication interface unit 714, the communication interface unit 626 and the processing unit 622 in the data transmission phase UT1. The seventh application data includes at least one selected from a group consisting of the protocol identifier group identifier HY81, the electronic data DE61, the first communication protocol identifier HP1, the second communication protocol identifier HP2, the first communication target identifier HT11, the second communication target identifier HT21, the target identifier set identifier HE51 and the target identifier set identifier HE61, which are stored in the storage unit 624.

The processor 712 causes the communication interface unit 714 to uses at least one of the first specific application communication protocol PC11 and the second specific application communication protocol PC21 to send the electronic data DE61 toward at least one of the first communication target 511 and the second communication target 521 based on the accessed seventh application data.

In some embodiments, the processor 712 uses in the data transmission phase UT1 the accessed seventh application data to obtain the first application memory address AU51 determined according to the accessed first communication protocol identifier HP1, and accesses the first communication target identifier HT11, stored at the first application memory location YU51 located in the storage unit 624, through the communication interface unit 714, the communication interface unit 626 and the processing unit 622 based on the obtained first application memory address AU51. The processor 712 uses in the data transmission phase UT1 the accessed seventh application data to obtain the second application memory address AU61 determined according to the accessed second communication protocol identifier HP2, and accesses the second communication target identifier HT21, stored at the second application memory location YU61 located in the storage unit 624, through the communication interface unit 714, the communication interface unit 626 and the processing unit 622 based on the obtained second application memory address AU61.

For example, the processor 712 accesses or obtains the first functional state code CS81, the electronic data DE61, the first communication protocol identifier HP1 and the communication target identifier HM81 in the data transmission phase UT1. Under a condition that the processor 712 recognizes the obtained first functional state code CS81 as the first valid state code CT81 representing the first selected state SH81, the processor 712 causes the communication interface unit 714 to use the first specific application communication protocol PC11 to send the electronic data DE61 toward the first communication target 511 based on the obtained electronic data DE61, the obtained first communication protocol identifier HP1 and the obtained communication target identifier HM81.

The processor 712 further accesses or obtains the second functional state code CS91 and the second communication protocol identifier HP2 in the data transmission phase UT1. Under a condition that the processor 712 recognizes the obtained second functional state code CS91 as the second valid state code CT91 representing the second selected state SH91, the processor 712 causes the communication interface unit 714 to use the second specific application communication protocol PC21 to send the electronic data DE61 toward the second communication target 521 based on the obtained electronic data DE61, the obtained first communication protocol identifier HP1 and the obtained communication target identifier HM81.

Figure 21:
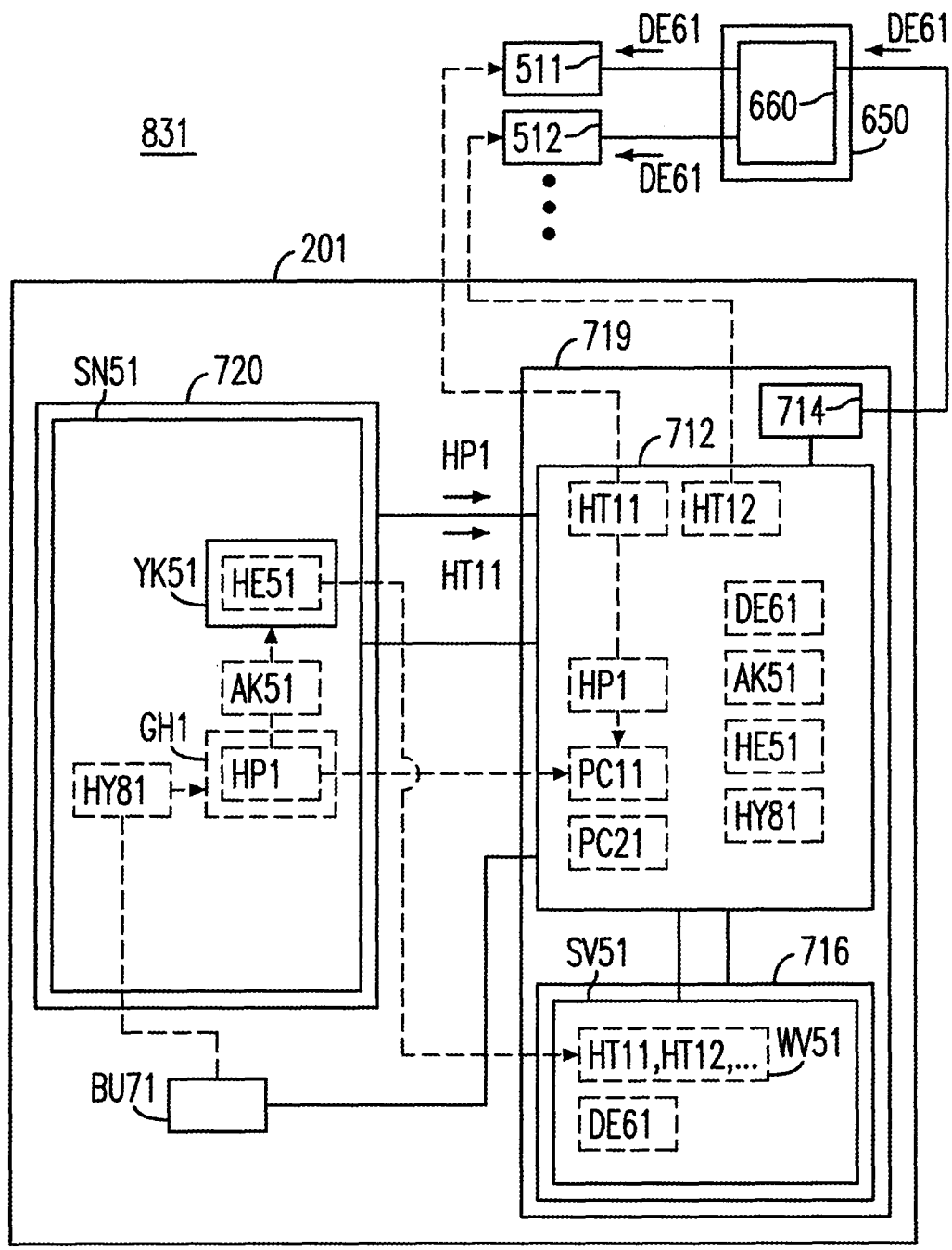
FIG. 21 is a schematic diagram showing a communication system according to various embodiments of the present disclosure.

Please refer to FIG. 21, which is a schematic diagram showing a communication system 831 according to various embodiments of the present disclosure. The communication system 831 includes an electronic device 201, a message service system 650, a first communication target 511 and a second communication target 521. The electronic device 201 includes a processing unit 719, a storage unit 720 coupled to the processing unit 719, and an electricity-using target BU71 coupled to the processing unit 719. The processing unit 719 includes a processor 712, a communication interface unit 714 coupled to the processor 712, and a volatile memory unit 716 coupled to the processor 712. For example, the storage unit 720 is a nonvolatile storage unit. The communication interface unit 714 is coupled or linked to the message service system 650. Each of the storage unit 720, the communication interface unit 714 and the volatile memory unit 716 is coupled to the processor 712, and is controlled by the processor 712.

Figure 22:
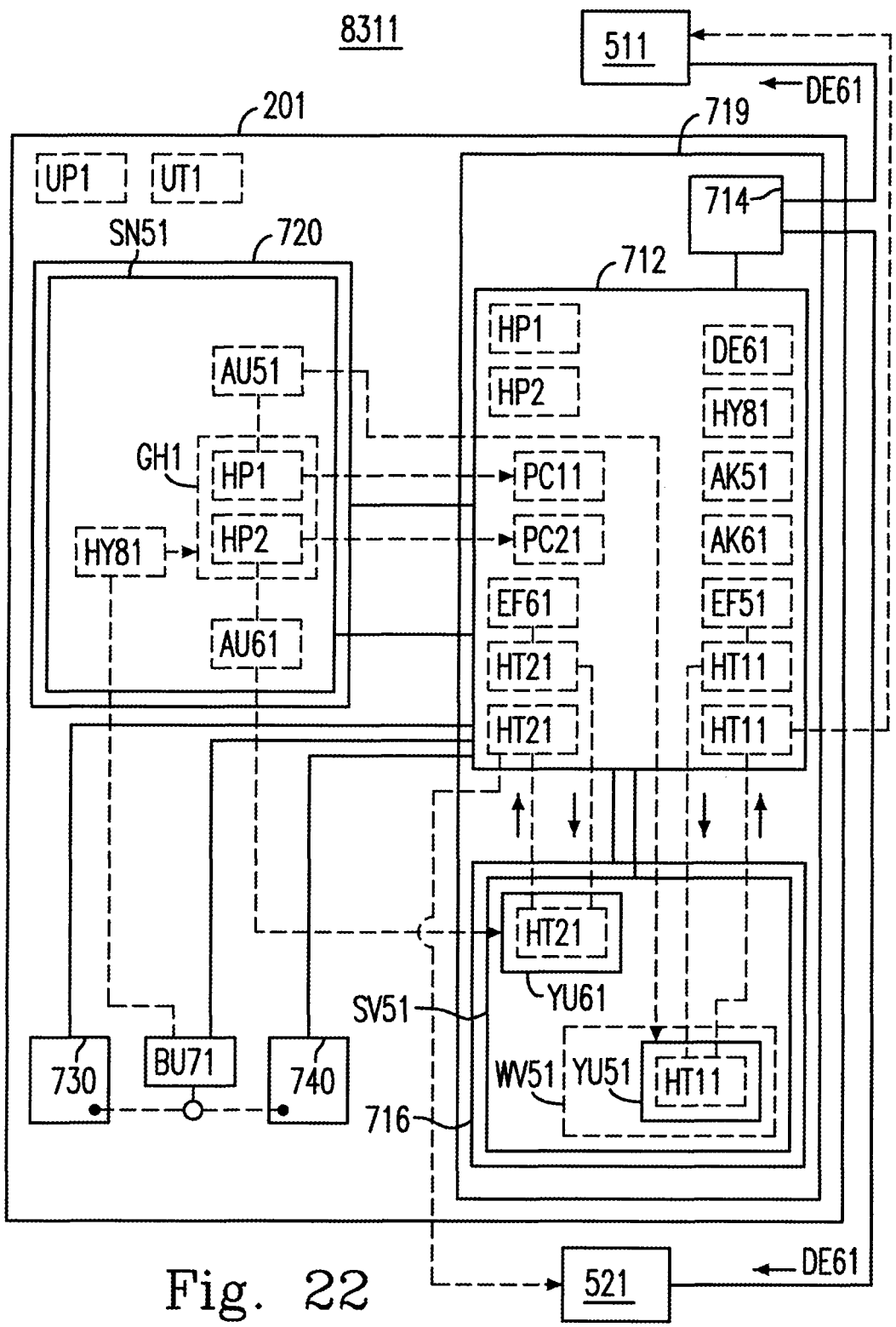
FIG. 22 is a schematic diagram showing an implementation structure of the communication system shown in FIG. 21.
Figure 23:
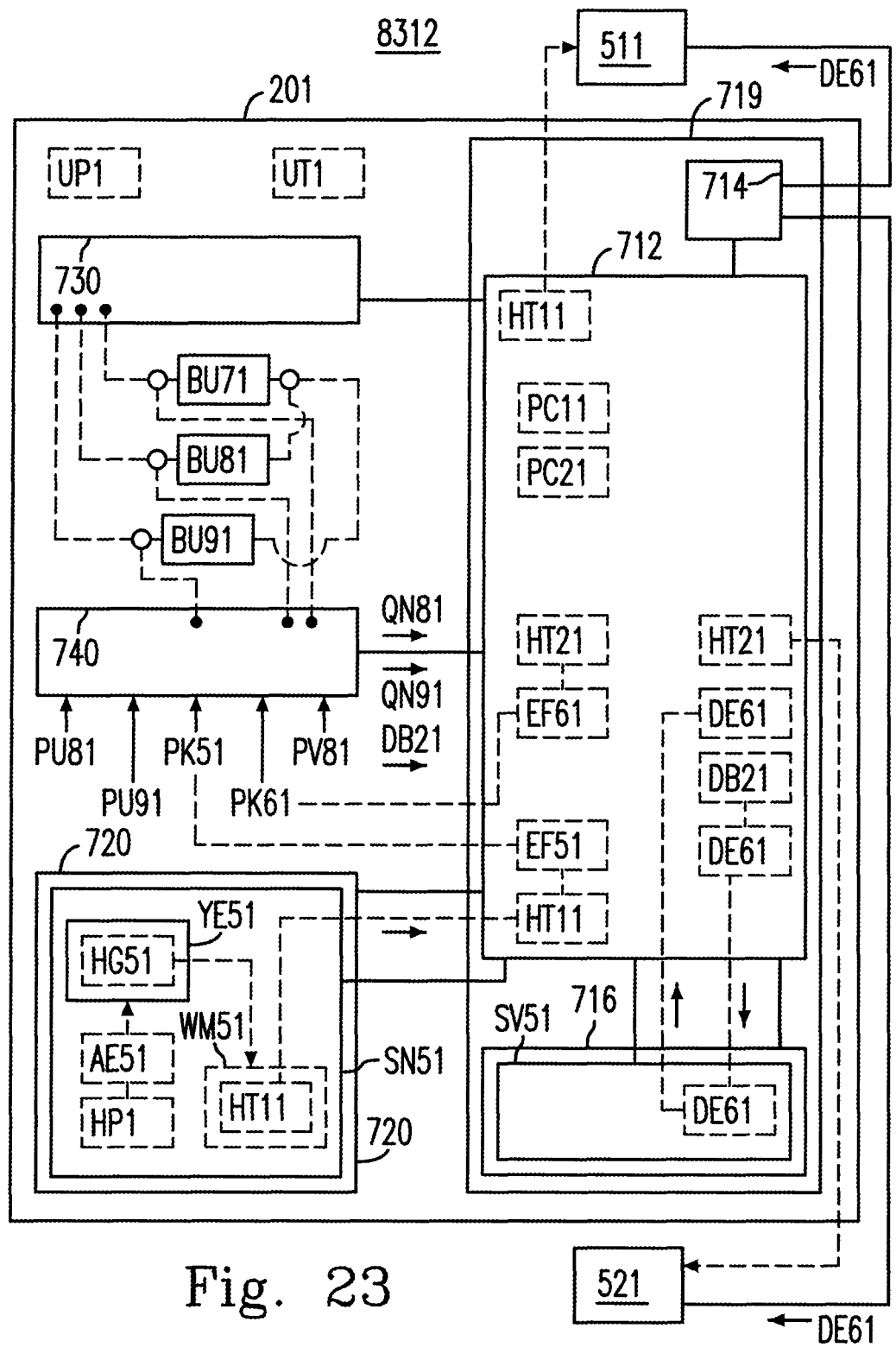
FIG. 23 is a schematic diagram showing an implementation structure of the communication system shown in FIG. 21.

Please refer to FIG. 22 and FIG. 23. FIG. 22 is a schematic diagram showing an implementation structure 8311 of the communication system 831 shown in FIG. 21. FIG. 23 is a schematic diagram showing an implementation structure 8312 of the communication system 831 shown in FIG. 21. As shown in FIGS. 22 and 23, each of the implementation structures 8311 and 8312 includes the electronic device 201, the first communication target 511 and a second communication target 521. The electronic device 201 is further to communicate with the second communication target 521, and includes the processing unit 719, the storage unit 720 coupled to the processing unit 719, an input unit 740 coupled to the processing unit 719, and a display unit 730 coupled to the processing unit 719. The processing unit 719 includes a processor 712, a communication interface unit 714 coupled to the processor 712, and a volatile memory unit 716 coupled to the processor 712. For example, each of the storage unit 720, the input unit 740, the display unit 730, the communication interface unit 714 and the volatile memory unit 716 is coupled to the processor 712, and is controlled by the processor 712.

In some embodiments, the input unit 740 receives a first user input operation PU81 and a second user input operation PU91 occurred later than the first user input operation PU81. The processing unit 719 obtains a first communication protocol identifier HP1 configured to identify a first specific application communication protocol PC11 in response to the first user input operation PU81. The processing unit 719 obtains a first communication target identifier HT11 configured to identify the first communication target 511 based on the first communication protocol identifier HP1. The processing unit 719 uses the first communication target identifier HT11 and the first specific application communication protocol PC11 to send the electronic data DE61 toward the first communication target 511 in response to the second user input operation PU91.

In some embodiments, the volatile memory unit 716 has a volatile memory space SV51 coupled to the processor 712. The storage unit 720 has an application memory location YK51 identified based on an application memory address AK51, and stores a target identifier set identifier HE51. For example, the application memory address AK51 is determined according to the first communication protocol identifier HP1. The volatile memory unit 716 stores a communication target identifier set WV51 identified by the target identifier set identifier HE51. For example, the target identifier set identifier HE51 is stored at the application memory location YK51 based on the application memory address AK51. The communication target identifier set WV51 is stored in the volatile memory space SV51. The processing unit 719 obtains the application memory address AK51 based on the first communication protocol identifier HP1, and accesses the target identifier set identifier HE51 stored at the application memory location YK51 based on the obtained application memory address AK51.

Under a condition that the communication target identifier set WV51 consists of a plurality of communication target identifiers HT11, HT12, . . . including the stored first communication target identifier HT11 and the plurality of communication target identifiers HT11, HT12, . . . are configured to respectively identify a plurality of communication targets 511, 512, . . . , the processing unit 719 accesses the plurality of communication target identifiers HT11, HT12, . . . based on the accessed target identifier set identifier HE51. The processing unit 719 uses the first specific application communication protocol PC11 to send the electronic data DE61 toward each of the plurality of communication targets 511, 512, . . . based on the first communication protocol identifier HP1 and the accessed plurality of communication target identifiers HT11, HT12, . . . .

In some embodiments, the storage unit 720 has a nonvolatile memory space SN51 coupled to the processor 712. The storage unit 720 stores a target identifier set identifier HG51 and a communication target identifier set WM51 identified by the target identifier set identifier HG51. For example, the communication target identifier set WM51 includes the first communication target identifier HT11, and is stored in the nonvolatile memory space SN51. The storage unit 720 has an application memory location YE51 associated with the first specific application communication protocol PC11. For example, the target identifier set identifier HG51 is stored at the application memory location YE51 identified based on an application memory address AE51.

The processor 712 obtains the application memory address AE51 based on the first communication protocol identifier HP1. The processor 712 accesses the target identifier set identifier HG51 stored at the application memory location YE51 based on the obtained application memory address AE51. The processor 712 obtains the first communication target identifier HT11 from the communication target identifier set WM51 based on the accessed target identifier set identifier HG51.

In some embodiments, the first specific application communication protocol PC11 is selected from a plurality of different application communication protocols PC11, PC21, . . . . The volatile memory unit 716 has the volatile memory space SV51. The volatile memory unit 716 has a first application memory location YU51 identified based on a first application memory address AU51. For example, the first application memory location YU51 is disposed in the volatile memory space SV51. The processor 712 fetches the first application memory address AU51 based on the first communication protocol identifier HP1. The processor 712 causes the volatile memory unit 716 to store the first communication target identifier HT11 at the first application memory location YU51 based on the fetched first application memory address AU51.

The processor 712 accesses the first communication target identifier HT11 stored at the first application memory location YU51 in response to the second user input operation PU91. The processor 712 causes the communication interface unit 714 to send the electronic data DE61 toward the first communication target 511 based on the accessed first communication target identifier HT11 and the first specific application communication protocol PC11.

In some embodiments, the first communication protocol identifier HP1 belongs to a communication protocol identifier group GH1 identified by a protocol identifier group identifier HY81. The communication protocol identifier group GH1 include a second communication protocol identifier HP2 configured to identify a second specific application communication protocol PC21. For example, the second specific application communication protocol PC21 is different from the first specific application communication protocol PC11, and is selected from the plurality of different application communication protocols PC11, PC21, . . . .

One of the input unit 740 and the display unit 730 includes a first electricity application target BU81 coupled to the processor 712. For example, the first electricity application target BU81 is associated with the first communication protocol identifier HP1. One of the input unit 740 and the display unit 730 includes a second electricity application target BU91 coupled to the processor 712. For example, the second electricity application target BU91 is the same as or different from the first electricity application target BU81. The electricity-using target BU71 is one of the first and the second electricity application targets BU81 and BU91.

In some embodiments, the storage unit 720 stores the communication protocol identifier group GH1 and the protocol identifier group identifier HY81 associated with the first electricity application target BU81. The volatile memory unit 716 stores a second communication target identifier HT21 associated with the second communication protocol identifier HP2. For example, the second communication target identifier HT21 is configured to identify a second communication target 521.

The volatile memory unit 716 provides a second application memory location YU61 identified based on a second application memory address AU61. For example, the second application memory location YU61 is disposed in the volatile memory space SV51. The first application memory address AU51 is determined according to the stored first communication protocol identifier HP1. The second application memory address AU61 is determined according to the second communication protocol identifier HP2.

The input unit 740 provides a first operation request message QN81 to the processor 712 in response to the first user input operation PU81 using the first electricity application target BU81. The input unit 740 provides a second operation request message QN91 to the processor 712 in response to the second user input operation PU91 using the second electricity application target BU91. The processor 712 causes the electronic device 201 to enter a data preparation phase UP1 in response to the first operation request message QN81. The processor 712 causes the volatile memory unit 716 to prepare the electronic data DE61 in the data preparation phase UP1.

The processor 712 accesses the stored protocol identifier group identifier HY81 in the data preparation phase UP1. The processor 712 accesses the first communication protocol identifiers HP1 belonging to the stored communication protocol identifier group GH1 based on the accessed protocol identifier group identifier HY81 to obtain the stored first communication protocol identifiers HP1 from the stored communication protocol identifier group GH1. The processor 712 accesses the second communication protocol identifiers HP2 belonging to the stored communication protocol identifier group GH1 based on the accessed protocol identifier group identifier HY81.

In some embodiments, the input unit 740 receives a third user input operation PK51 in the data preparation phase UP1. The processor 712 performs a first data acquisition action EF5B in the data preparation phase UP1 in response to the third user input operation PK51 to obtain the first communication target identifier HT11 to be stored. For example, the first data acquisition action EF5B uses the obtained first communication protocol identifier HP1.

The input unit 740 receives a fourth user input operation PK61 in the data preparation phase UP1. The processor 712 performs a second data acquisition action EF6B in response to the fourth user input operation PK61 to obtain the second communication target identifier HT21 to be stored. For example, the second data acquisition action EF6B uses the accessed second communication protocol identifier HP2. The processor 712 fetches the second application memory address AU61 in the data preparation phase UP1 based on the accessed second communication protocol identifier HP2. The processor 712 causes the volatile memory unit 716 to store the obtained second communication target identifier HT21 at the second application memory location YU61 based on the fetched second application memory address AU61.

The input unit 740 receives a fifth user input operation PV81 occurred earlier than the second user input operation PU91 in the data preparation phase UP1 to provide input data DB21. The processor 712, in response to obtaining the input data DB21, causes the volatile memory unit 716 to store the electronic data DE61, determined according to the obtained input data DB21, in the volatile memory space SV51. For example, the second electricity application target BU91 is associated with the stored electronic data DE61.

In some embodiments, the processor 712 causes the electronic device 201 to leave the data preparation phase UP1 to enter a data transmission phase UT1 in response to the second operation request message QN91, and obtains the first application memory address AU51 based on the first communication protocol identifier HP1. The processor 712 accesses the first communication target identifier HT11 stored at the first application memory location YU51 based on the obtained first application memory address AU51.

The processor 712, in the data transmission phase UT1, accesses the electronic data DE61 stored in the volatile memory space SV51. The processor 712 obtains the second application memory address AU61 in the data transmission phase UT1 based on the accessed second communication protocol identifier HP2. The processor 712 accesses the second communication target identifier HT21 stored at the second application memory location YU61 based on the obtained second application memory address AU61.

The processor 712 uses the first specific application communication protocol PC11 to send the accessed electronic data DE61 toward the first communication target 511 in the data transmission phase UT1 based on the accessed electronic data DE61, the obtained first communication protocol identifier HP1 and the accessed first communication target identifier HT11. The processor 712 uses the second specific application communication protocol PC21 to send the accessed electronic data DE61 toward the second communication target 521 in the data transmission phase UT1 based on the accessed electronic data DE61, the accessed second communication protocol identifier HP2 and the accessed second communication target identifier HT21.

The plurality of different application communication protocols PC11, PC21, . . . are selected from a group consisting of an email communication protocol, an instant-messaging communication protocol, a short-message service communication protocol and a multimedia-message service communication protocol. The first communication target identifier HT11 is the same as or different from the second communication target identifier HT21. The first communication target 511 is the same as or different from the second communication target 521. For example, each of the protocol identifier group identifier HY81, the communication protocol identifier group GH1, the target identifier set identifier HE51, the target identifier set identifier HG51 and the communication target identifier set WV51 is stored in the nonvolatile memory space SN51 beforehand.

Figure 24:
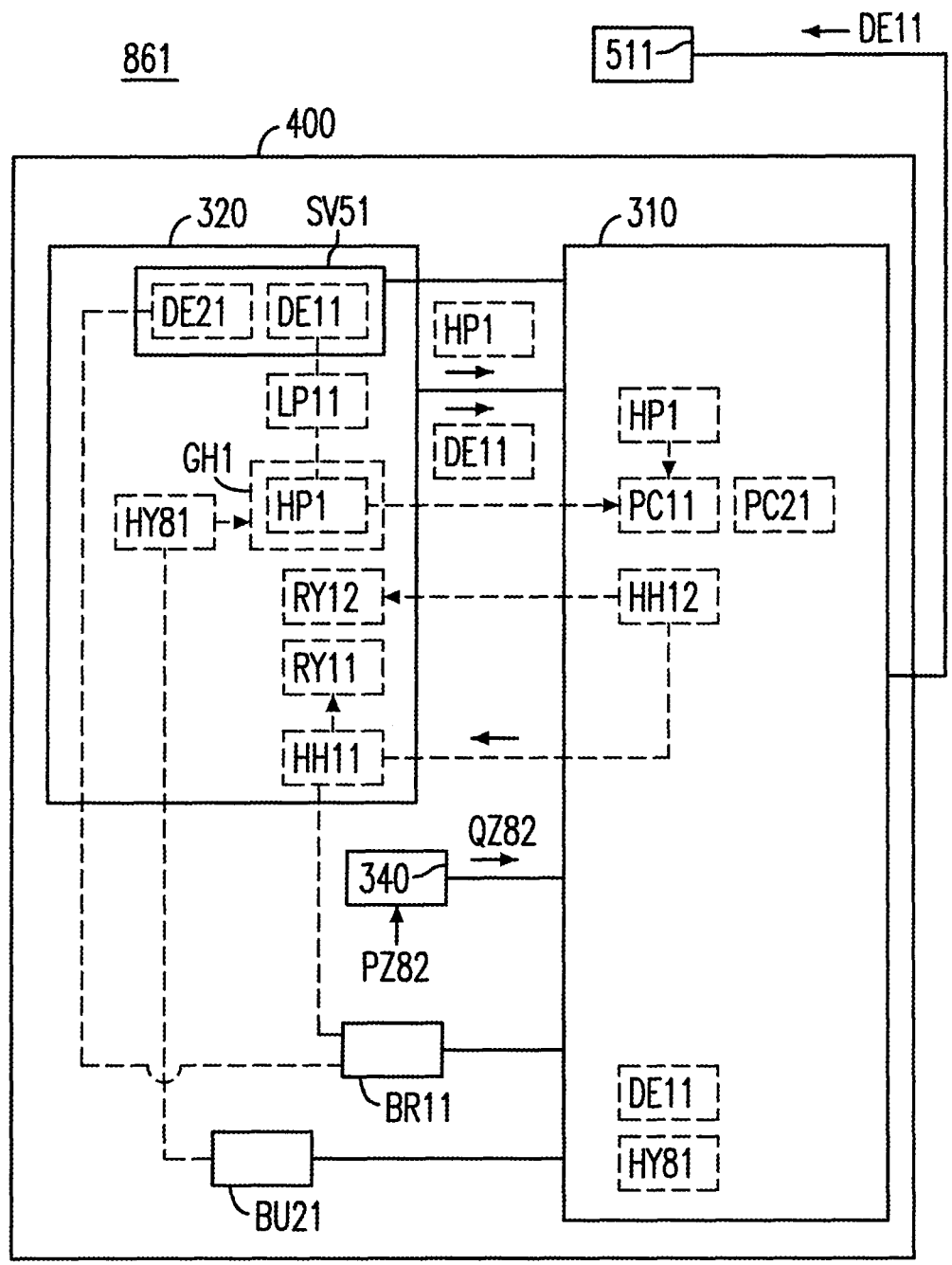
FIG. 24 is a schematic diagram showing a communication system according to various embodiments of the present disclosure.

Please refer to FIG. 24, which is a schematic diagram showing a communication system 861 according to various embodiments of the present disclosure. The communication system 861 includes an electronic device 400 and a first communication target 511. For example, the electronic device 400 is to communicate with the first communication target 511. The electronic device 400 for sending a first electronic data DE11 includes a storage unit 320, an electricity-using target BU21 and a processing unit 310. The storage unit 320 stores the first electronic data DE11. The processing unit 310 is coupled to the storage unit 320 and the electricity-using target BU21, is configured to obtain a first communication protocol identifier HP1 configured to identify a first specific application communication protocol PC11 by means of the electricity-using target BU21, accesses the stored first electronic data DE11 based on the first communication protocol identifier HP1, and sends the accessed first electronic data DE11 toward the first communication target 511 based on the first specific application communication protocol PC11.

In some embodiments, the electronic device 400 further includes an electricity application target BR11 coupled to the processing unit 310, and an input unit 340 coupled to the processing unit 310. The storage unit 320 has a volatile memory space SV51 coupled to the processing unit 310, and further stores a second electronic data DE21, a first data derivation rule identifier HH11, and a first data derivation rule RY11 identified by the first data derivation rule identifier HH11. For example, each of the first electronic data DE11 and the second electronic data DE21 is stored in the volatile memory space SV51. The electricity application target BR11 is associated with the second electronic data DE21 and the first data derivation rule identifier HH11.

Before the processing unit 310 accesses the first electronic data DE11 based on the first communication protocol identifier HP1, the processing unit 310 reads the stored second electronic data DE21 and the first data derivation rule identifier HH11 by means of the electricity application target BR11, reads the first data derivation rule RY11 based on the read first data derivation rule identifier HH11, and processes the read second electronic data DE21 to form the stored first electronic data DE11 based on the read first data derivation rule RY11.

After the processing unit 310 sends the accessed first electronic data DE11 toward the first communication target 511 based on the first specific application communication protocol PC11, the input unit 340 receives a user input operation PZ82 to provide an operation request message QZ82 to the processing unit 310. The processing unit 310, in response to the operation request message QZ82, replaces the stored first data derivation rule identifier HH11 with a second data derivation rule identifier HH12 being different from the first data derivation rule identifier HH11. For example, the second data derivation rule identifier HH12 is configured to identify a second data derivation rule RY12 being different from the first data derivation rule RY11.

In some embodiments, the first specific application communication protocol PC11 is selected from a plurality of different application communication protocols PC11, PC21, . . . . The first communication protocol identifier HP1 belongs to a communication protocol identifier group GH1 identified by a protocol identifier group identifier HY81. The storage unit 320 further stores the communication protocol identifier group GH1, the protocol identifier group identifier HY81, and a first address pointer LP11 associated with the first communication protocol identifier HP1 and the first electronic data DE11.

The processing unit 310 is configured to access the stored protocol identifier group identifier HY81, and accesses the stored first communication protocol identifier HP1 belonging to the stored communication protocol identifier group GH1 based on the accessed protocol identifier group identifier HY81 to obtain the stored first communication protocol identifier HP1 from the storage unit 320. The processing unit 310 uses the stored first address pointer LP11 to access the stored first electronic data DE11 based on the obtained first communication protocol identifier HP1.

Figure 25:
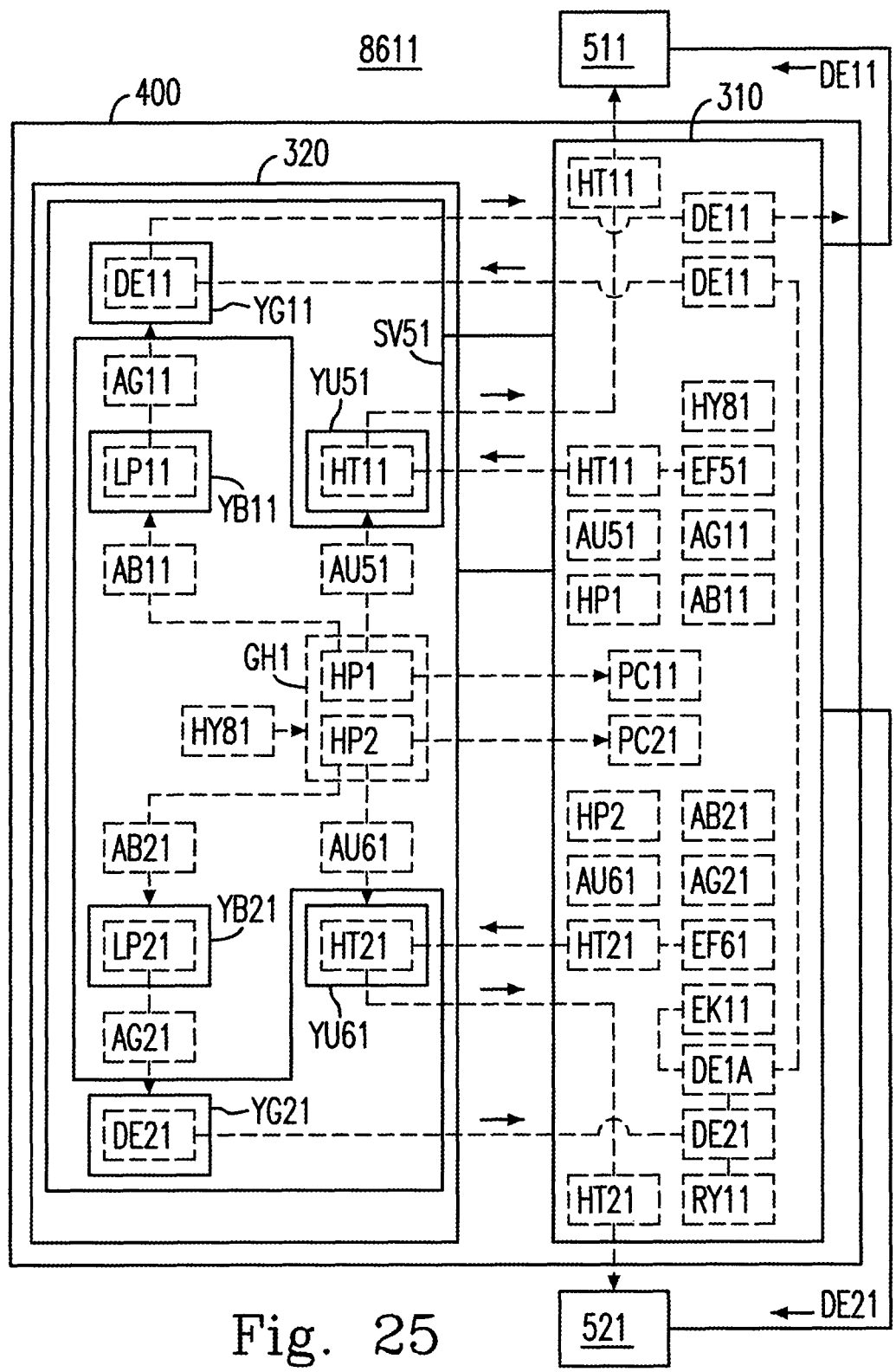
FIG. 25 is a schematic diagram showing an implementation structure of the communication system shown in FIG. 24.

Please refer to FIG. 25, which is a schematic diagram showing an implementation structure 8611 of the communication system 861 shown in FIG. 24. As shown in FIG. 25, the implementation structure 8611 includes the electronic device 400, the first communication target 511 and a second communication target 521. The electronic device 400 is further to communicate with the second communication target 521, and includes the processing unit 310 and the storage unit 320 coupled to the processing unit 310. The storage unit 320 has a volatile memory space SV51 coupled to the processing unit 310.

Figure 26:
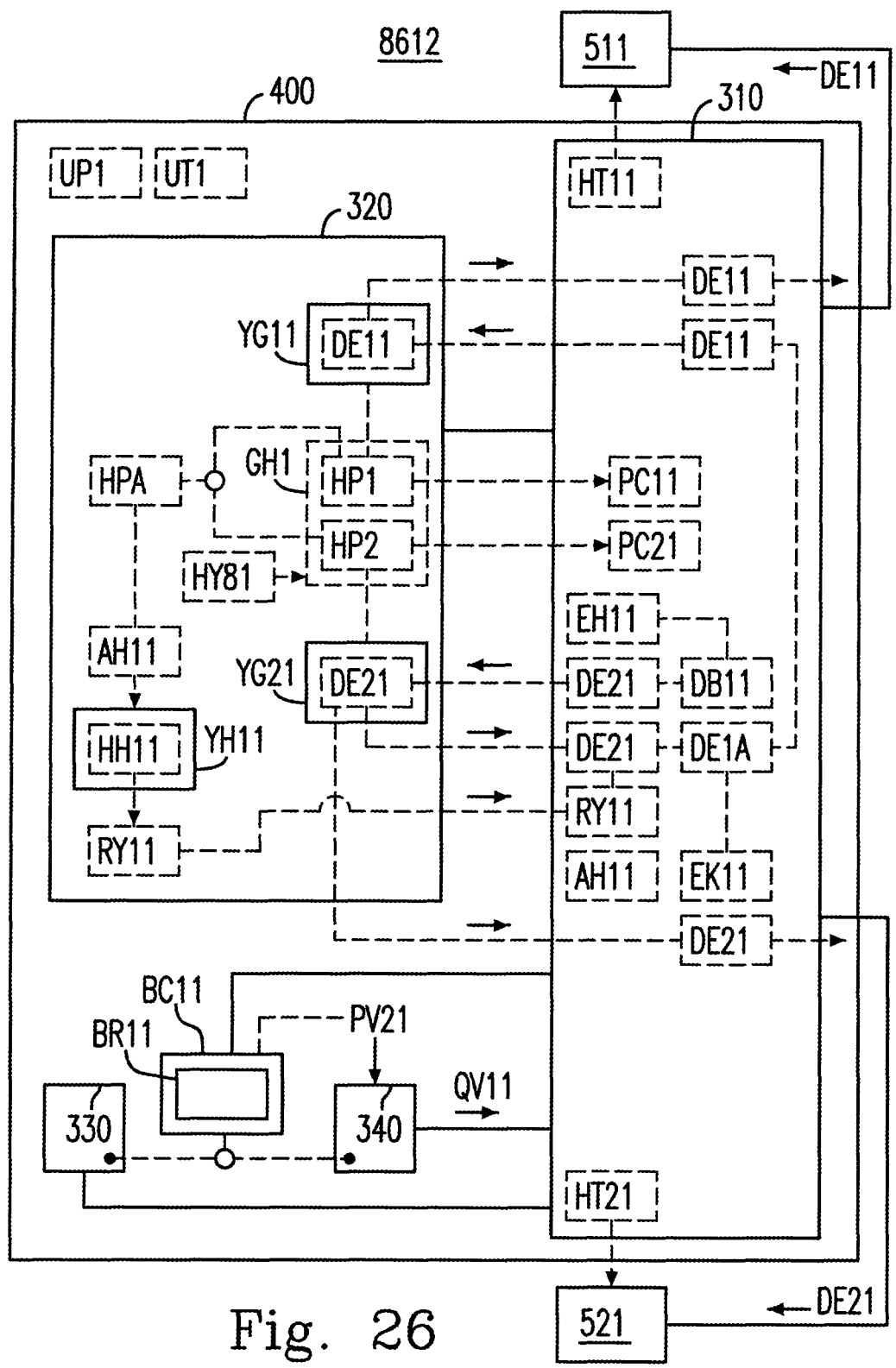
FIG. 26 is a schematic diagram showing an implementation structure of the communication system shown in FIG. 24.
Figure 27:
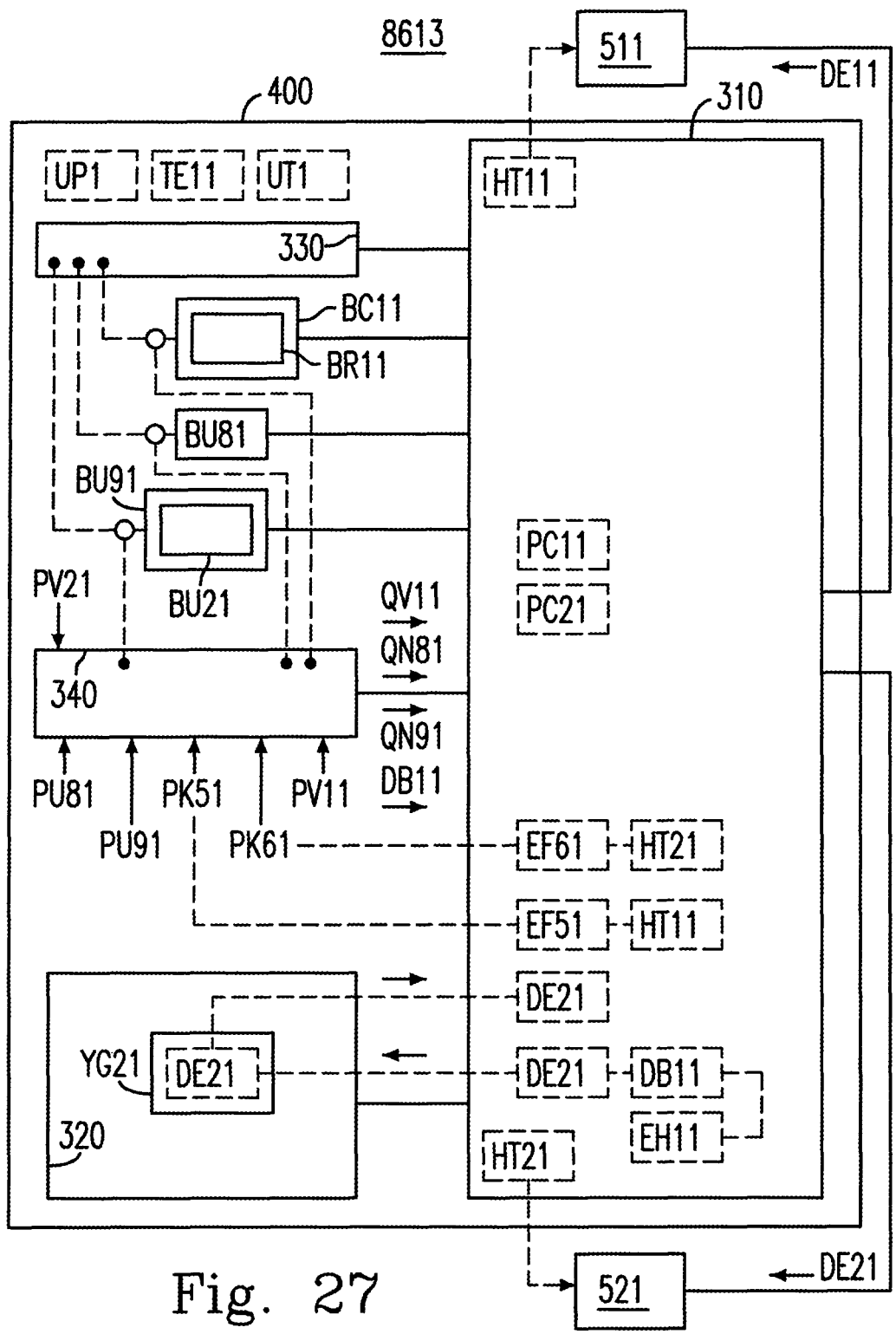
FIG. 27 is a schematic diagram showing an implementation structure of the communication system shown in FIG. 24.

Please refer to FIG. 26 and FIG. 27. FIG. 26 is a schematic diagram showing an implementation structure 8612 of the communication system 861 shown in FIG. 24. FIG. 27 is a schematic diagram showing an implementation structure 8613 of the communication system 861 shown in FIG. 24. As shown in FIGS. 26 and 27, any of the implementation structures 8612 and 8613 includes the electronic device 400, the first communication target 511 and a second communication target 521. The electronic device 400 is further to communicate with the second communication target 521, and includes the processing unit 310, the storage unit 320 coupled to the processing unit 310, an input unit 340 coupled to the processing unit 310, and a display unit 330 coupled to the processing unit 310. The storage unit 320 has the volatile memory space SV51 coupled to the processing unit 310.

In some embodiments, one of the input unit 340 and the display unit 330 includes a first electricity application target BU81 coupled to the processing unit 310. One of the input unit 340 and the display unit 330 includes a second electricity application target BU91 coupled to the processing unit 310. For example, the second electricity application target BU91 is the same as or different from the first electricity application target BU81. The electricity-using target BU21 is the second electricity application target BU91. One of the input unit 340 and the display unit 330 includes a third electricity application target BC11 coupled to the processing unit 310. For example, the third electricity application target BC11 is the electricity application target BR11. The stored communication protocol identifier group GH1 include a second communication protocol identifier HP2 configured to identify a second specific application communication protocol PC21. For example, the second specific application communication protocol PC21 is different from the first specific application communication protocol PC11, and is selected from the plurality of different application communication protocols PC11, PC21, . . . .

The storage unit 320 further stores a first data derivation rule identifier HH11 associated with the third electricity application target BC11, and a first data derivation rule RY11 identified by the first data derivation rule identifier HH11. The storage unit 320 further stores a first communication target identifier HT11 associated with the first communication protocol identifier HP1, and a second communication target identifier HT21 associated with the second communication protocol identifier HP2. For example, the first communication target identifier HT11 is configured to identify the first communication target 511. The second communication target identifier HT21 is configured to identify a second communication target 521.

The storage unit 320 has a first application memory location YU51 identified based on a first application memory address AU51, and a second application memory location YU61 identified based on a second application memory address AU61. For example, each of the first and the second application memory locations YU51 and YU61 is disposed in the volatile memory space SV51. The first application memory address AU51 is determined according to the stored first communication protocol identifier HP1. The second application memory address AU61 is determined according to the second communication protocol identifier HP2.

The storage unit 320 further has a third application memory location YG11 identified by a third application memory address AG11, and a fourth application memory location YG21 identified by a fourth application memory address AG21. For example, each of the third and the fourth application memory locations YG11 and YG21 is disposed in the volatile memory space SV51. The first electronic data DE11 is configured to be stored at the third application memory location YG11. The second electronic data DE21 is configured to be stored at the fourth application memory location YG21. The storage unit 320 further stores a second address pointer LP21 associated with the second communication protocol identifier HP2. For example, the first address pointer LP11 points to the third application memory address AG11. The second address pointer LP21 points to the fourth application memory address AG21.

The storage unit 320 further has a fifth application memory location YB11 identified by a fifth application memory address AB11, and a sixth application memory location YB21 identified by a sixth application memory address AB21. For example, the fifth application memory address AB11 is determined according to the stored first communication protocol identifier HP1. The sixth application memory address AB21 is determined according to the stored second communication protocol identifier HP2. The first address pointer LP11 is configured to be stored at the fifth application memory location YB11. The second address pointer LP21 is configured to be stored at the sixth application memory location YB21.

The storage unit 320 further has a seventh application memory location YH11 identified by a seventh application memory address AH11. For example, the seventh application memory address AH11 is determined according to a designated protocol identifier HPA being one of the stored first communication protocol identifier HP1 and the stored second communication protocol identifier HP2. The third electricity application target BC11 is associated with the seventh application memory address AH11. The first data derivation rule identifier HH11 is stored at the seventh application memory location YH11 based on the seventh application memory address AH11.

In some embodiments, each of the first and the second electricity application targets BU81 and BU91 is associated with the stored protocol identifier group identifier HY81. The input unit 340 receives a first user input operation PU81 using the first electricity application target BU81 to provide a first operation request message QN81 to the processing unit 310. The input unit 340 receives a second user input operation PU91 being after the first user input operation PU81, and provides a second operation request message QN91 to the processing unit 310 in response to the second user input operation PU91 using the second electricity application target BU91.

The processing unit 310 enters a data preparation phase UP1 in response to the first operation request message QN81, and causes the storage unit 320 to prepare second electronic data DE21 in the data preparation phase UP1. The processing unit 310 reads the stored protocol identifier group identifier HY81 in the data preparation phase UP1. The processing unit 310, in the data preparation phase UP1, reads the stored first communication protocol identifiers HP1 belonging to the stored communication protocol identifier group GH1 based on the read protocol identifier group identifier HY81 to obtain the stored first communication protocol identifiers HP1. The processing unit 310 reads the stored second communication protocol identifiers HP2 belonging to the stored communication protocol identifier group GH1 in the data preparation phase UP1 based on the read protocol identifier group identifier HY81.

In some embodiments, the input unit 340 receives a third user input operation PK51 in the data preparation phase UP1. The processing unit 310 performs a first data acquisition operation EF51 in response to the third user input operation PK51 to obtain the first communication target identifier HT11 to be stored. The processing unit 310 fetches the first application memory address AU51 in the data preparation phase UP1 based on the read first communication protocol identifier HP1, and causes the storage unit 320 to store the obtained first communication target identifier HT11 at the first application memory location YU51 based on the fetched first application memory address AU51.

The input unit 340 receives a fourth user input operation PK61 in the data preparation phase UP1. The processing unit 310 performs a second data acquisition operation EF61 in response to the fourth user input operation PK61 to obtain the second communication target identifier HT21 to be stored. The processing unit 310 fetches the second application memory address AU61 in the data preparation phase UP1 based on the read second communication protocol identifier HP2, and causes the storage unit 320 to store the obtained second communication target identifier HT21 at the second application memory location YU61 based on the fetched second application memory address AU61.

The input unit 340 receives a fifth user input operation PV11 being before the second user input operation PU91 in the data preparation phase UP1 to provide an input data DB11 to the processing unit 310. The processing unit 310, in response to obtaining the input data DB11, performs a third data acquisition operation EH11 to fetch the second electronic data DE21 determined according to the obtained input data DB11. The processing unit 310 fetches the sixth application memory address AB21 in the data preparation phase UP1 based on the read second communication protocol identifier HP2, reads the second address pointer LP21 to fetch the fourth application memory address AG21 based on the fetched sixth application memory address AB21, and causes the storage unit 320 to store the fetched second electronic data DE21 at the fourth application memory location YG21 based on the fetched fourth application memory address AG21. For example, the second electricity application target BU91 is associated with the stored second electronic data DE21. For example, the processing unit 310 performs the third data acquisition operation EH11 to the obtained input data DB11 to derive the second electronic data DE21.

In some embodiments, the third electricity application target BC11 is associated with the stored second address pointer LP21, the seventh application memory address AH11, the stored first data derivation rule identifier HH11 and the first address pointer LP11. The input unit 340, in the data preparation phase UP1, receives a sixth user input operation PV21 between the fifth user input operation PV11 and the second user input operation PU91, and provides a third operation request message QV11 to the processing unit 310 in response to the sixth user input operation PV21 using the third electricity application target BC11.

The processing unit 310 uses the designated protocol identifier HPA to fetch the seventh application memory address AH11 in response to the third operation request message QV11, reads the first data derivation rule identifier HH11 stored at the seventh application memory location YH11 based on the fetched seventh application memory address AH11, and reads the stored first data derivation rule RY11 based on the read first data derivation rule identifier HH11. The processing unit 310 reads the second electronic data DE21 stored at the fourth application memory location YG21 in response to the third operation request message QV11 to obtain the stored second electronic data DE21 from the storage unit 320.

The processing unit 310 processes the read second electronic data DE21 to form a third electronic data DE1A based on the read first data derivation rule RY11. For example, the third electronic data DE1A is equal to one of the obtained second electronic data DE21 and a portion of the read second electronic data DE21. The processing unit 310 applies the read first data derivation rule RY11 to the read second electronic data DE21 to form the third electronic data DE1A derived from the read second electronic data DE21. Under a condition that the processing unit 310 forms the third electronic data DE1A, the processing unit 310 performs a data derivation operation EK11 to form the first electronic data DE11 derived from the third electronic data DE1A. For example, the first electronic data DE11 is the same as or different from the third electronic data DE1A. The data derivation operation EK11 is one of a null derivation operation and a practical derivation operation.

The processing unit 310 fetches the fifth application memory address AB11 in the data preparation phase UP1 based on the obtained first communication protocol identifier HP1, reads the first address pointer LP11 based on the fetched fifth application memory address AB11 to fetch the third application memory address AG11, and causes the storage unit 320 to store the formed first electronic data DE11 at the third application memory location YG11 based on the fetched third application memory address AG11. For example, the second electricity application target BU91 is further associated with the stored first electronic data DE11.

In some embodiments, the processing unit 310 leaves the data preparation phase UP1 to enter a data transmission phase UT1 in response to the second operation request message QN91, and accesses the stored protocol identifier group identifier HY81 in the data transmission phase UT1. The processing unit 310 accesses the stored first communication protocol identifier HP1 belonging to the stored communication protocol identifier group GH1 in the data transmission phase UT1 based on the accessed protocol identifier group identifier HY81 to obtain the stored first communication protocol identifier HP1. In addition, the processing unit 310 accesses the stored second communication protocol identifier HP2 belonging to the stored communication protocol identifier group GH1 in the data transmission phase UT1 based on the accessed protocol identifier group identifier HY81.

The processing unit 310 uses the obtained first communication protocol identifier HP1 to obtain the first application memory address AU51 in the data transmission phase UT1, and accesses the first communication target identifier HT11 stored at the first application memory location YU51 based on the obtained first application memory address AU51. The processing unit 310 uses the accessed second communication protocol identifier HP2 to obtain the second application memory address AU61 in the data transmission phase UT1, and accesses the second communication target identifier HT21 stored at the second application memory location YU61 based on the obtained second application memory address AU61.

The processing unit 310 uses the obtained first communication protocol identifier HP1 to obtain the fifth application memory address AB11 in the data transmission phase UT1, accesses the first address pointer LP11 based on the obtained fifth application memory address AB11 to obtain the third application memory address AG11, and accesses the first electronic data DE11 stored at the third application memory location YG11 based on the obtained third application memory address AG11. The processing unit 310 uses the accessed second communication protocol identifier HP2 to obtain the sixth application memory address AB21 in the data transmission phase UT1, accesses the second address pointer LP21 based on the obtained sixth application memory address AB21 to obtain the fourth application memory address AG21, and accesses the second electronic data DE21 stored at the fourth application memory location YG21 based on the obtained fourth application memory address AG21.

The processing unit 310 uses the first specific application communication protocol PC11 to send the accessed first electronic data DE11 toward the first communication target 511 in the data transmission phase UT1 based on the accessed first electronic data DE11, the obtained first communication protocol identifier HP1 and the accessed first communication target identifier HT11. The processing unit 310 uses the second specific application communication protocol PC21 to send the accessed second electronic data DE21 toward the second communication target 521 in the data transmission phase UT1 based on the accessed second electronic data DE21, the accessed second communication protocol identifier HP2 and the accessed second communication target identifier HT21.

The plurality of different application communication protocols PC11, PC21, . . . are selected from a group consisting of an email communication protocol, an instant-messaging communication protocol, a short-message service communication protocol and a multimedia-message service communication protocol. The first communication target identifier HT11 is the same as or different from the second communication target identifier HT21. The first communication target 511 is the same as or different from the second communication target 521.

Please refer to FIG. 24, FIG. 25, FIG. 26 and FIG. 27. A method for sending electronic data DE11 toward a first communication target 511 is disclosed. The method includes the following steps: First electronic data DE11 is stored. An electricity-using target BU21 is provided. A first communication protocol identifier HP1 configured to identify a first specific application communication protocol PC11 is obtained by means of the electricity-using target BU21. The stored first electronic data DE11 is accessed based on the first communication protocol identifier HP1. In addition, the accessed first electronic data DE11 is sent toward the first communication target 511 based on the first specific application communication protocol PC11.

In some embodiments, the method further includes the following steps: A volatile memory space SV51 is provided. Second electronic data DE21, a first data derivation rule identifier HH11, and a first data derivation rule RY11 identified by the first data derivation rule identifier HH11 are stored, wherein each of the first electronic data DE11 and the second electronic data DE21 is stored in the volatile memory space SV51. An electricity application target BR11 is provided, wherein the electricity application target BR11 is associated with the second electronic data DE21 and the first data derivation rule identifier HH11. Before the first electronic data DE11 is accessed based on the first communication protocol identifier HP1, the stored second electronic data DE21 and the first data derivation rule identifier HH11 are read by means of the electricity application target BR11. In addition, the first data derivation rule RY11 is read based on the read first data derivation rule identifier HH11.

The method further includes the following steps: The read second electronic data DE21 is processed to form the stored first electronic data DE11 based on the read first data derivation rule RY11. After the accessed first electronic data DE11 is sent toward the first communication target 511 based on the first specific application communication protocol PC11, a user input operation PZ82 is received to provide an operation request message QZ82. In addition, in response to the operation request message QZ82, the stored first data derivation rule identifier HH11 is replaced with a second data derivation rule identifier HH12 being different from the first data derivation rule identifier HH11. For example, the second data derivation rule identifier HH12 is configured to identify a second data derivation rule RY12 being different from the first data derivation rule RY11.

In some embodiments, the first specific application communication protocol PC11 is selected from a plurality of different application communication protocols PC11, PC21, . . . . The first communication protocol identifier HP1 belongs to a communication protocol identifier group GH1 identified by a protocol identifier group identifier HY81. The method further includes the following steps: A volatile memory space SV51 is provided. In addition, the communication protocol identifier group GH1, the protocol identifier group identifier HY81, and a first address pointer LP11 associated with the first communication protocol identifier HP1 and the first electronic data DE11 are stored.

The method further includes the following steps: The stored protocol identifier group identifier HY81 is accessed. In addition, the stored first communication protocol identifier HP1 belonging to the stored communication protocol identifier group GH1 is accessed based on the accessed protocol identifier group identifier HY81 to obtain the stored first communication protocol identifier HP1. The step of accessing the stored first electronic data DE11 includes a step that: the stored first address pointer LP11 is used to access the stored first electronic data DE11 based on the obtained first communication protocol identifier HP1.

In some embodiments, the stored communication protocol identifier group GH1 include a second communication protocol identifier HP2 configured to identify a second specific application communication protocol PC21. For example, the second specific application communication protocol PC21 is different from the first specific application communication protocol PC11, and is selected from the plurality of different application communication protocols PC11, PC21, . . . . The method further includes the following steps: A first electricity application target BU81 is provided. In addition, a second electricity application target BU91 is provided. For example, the second electricity application target BU91 is the same as or different from the first electricity application target BU81. Each of the first and the second electricity application targets BU81 and BU91 is associated with the stored protocol identifier group identifier HY81. The electricity-using target BU21 is the second electricity application target BU91.

The method further includes the following steps: A third electricity application target BC11 is provided. In addition, a first data derivation rule identifier HH11 associated with the third electricity application target BC11, and a first data derivation rule RY11 identified by the first data derivation rule identifier HH11 are stored. For example, the electricity application target BR11 is the third electricity application target BC11.

The method further includes a step that: a first communication target identifier HT11 associated with the first communication protocol identifier HP1, and a second communication target identifier HT21 associated with the second communication protocol identifier HP2 are stored. For example, the first communication target identifier HT11 is configured to identify the second communication target 511. The second communication target identifier HT21 is configured to identify a second communication target 521.

The method further includes a step that: a first application memory location YU51 identified based on a first application memory address AU51, and a second application memory location YU61 identified based on a second application memory address AU61 are provided. For example, each of the first and the second application memory locations YU51 and YU61 is disposed in the volatile memory space SV51. The first application memory address AU51 is determined according to the stored first communication protocol identifier HP1. The second application memory address AU61 is determined according to the second communication protocol identifier HP2.

The method further includes a step that: a third application memory location YG11 identified by a third application memory address AG11, and a fourth application memory location YG21 identified by a fourth application memory address AG21 are provided. For example, each of the third and the fourth application memory locations YG11 and YG21 is disposed in the volatile memory space SV51. The first electronic data DE11 is configured to be stored at the third application memory location YG11. The second electronic data DE21 is configured to be stored at the fourth application memory location YG21.

The method further includes a step that: a second address pointer LP21 associated with the second communication protocol identifier HP2 is stored. For example, the first address pointer LP11 points to the third application memory address AG11. The second address pointer LP21 points to the fourth application memory address AG21.

The method further includes a step that: a fifth application memory location YB11 identified by a fifth application memory address AB11, and a sixth application memory location YB21 identified by a sixth application memory address AB21 are provided. For example, the fifth application memory address AB11 is determined according to the stored first communication protocol identifier HP1. The sixth application memory address AB21 is determined according to the stored second communication protocol identifier HP2. The first address pointer LP11 is configured to be stored at the fifth application memory location YB11. The second address pointer LP21 is configured to be stored at the sixth application memory location YB21.

The method further includes a step that: a seventh application memory location YH11 identified by a seventh application memory address AH11 is provided. For example, the seventh application memory address AH11 is determined according to a designated protocol identifier being one of the stored first communication protocol identifier HP1 and the stored second communication protocol identifier HP2. The third electricity application target BC11 is associated with the seventh application memory address AH11. The first data derivation rule identifier HH11 is stored at the seventh application memory location YH11 based on the seventh application memory address AH11.

In some embodiments, the method further includes the following steps: A first user input operation PU81 using the first electricity application target BU81 is received to provide a first operation request message QN81. A second user input operation PU91 being after the first user input operation PU81 is received. A second operation request message QN91 is provided in response to the second user input operation PU91 using the second electricity application target BU91. A data preparation phase UP1 is entered in response to the first operation request message QN81. In addition, second electronic data DE21 is prepared in the data preparation phase UP1.

The method further includes the following steps: The stored protocol identifier group identifier HY81 is read in the data preparation phase UP1. The stored first communication protocol identifiers HP1 belonging to the stored communication protocol identifier group GH1 is read in the data preparation phase UP1 based on the read protocol identifier group identifier HY81 to obtain the stored first communication protocol identifiers HP1. In addition, the stored second communication protocol identifiers HP2 belonging to the stored communication protocol identifier group GH1 is read in the data preparation phase UP1 based on the read protocol identifier group identifier HY81.

In some embodiments, the method further includes the following steps: A third user input operation PK51 is received in the data preparation phase UP1. A first data acquisition operation EF51 is performed in response to the third user input operation PK51 to obtain the first communication target identifier HT11 to be stored. The first application memory address AU51 is fetched in the data preparation phase UP1 based on the read first communication protocol identifier HP1. The obtained first communication target identifier HT11 is stored at the first application memory location YU51 based on the fetched first application memory address AU51.

The method further includes the following steps: A fourth user input operation PK61 is received in the data preparation phase UP1. A second data acquisition operation EF61 is performed in response to the fourth user input operation PK61 to obtain the second communication target identifier HT21 to be stored. The second application memory address AU61 is fetched in the data preparation phase UP1 based on the read second communication protocol identifier HP2. In addition, the obtained second communication target identifier HT21 is stored at the second application memory location YU61 based on the fetched second application memory address AU61.

The step of preparing the second electronic data DE21 includes the following sub-steps: A fifth user input operation PV11 being before the second user input operation PU91 is received in the data preparation phase UP1 to provide input data DB11. In response to obtaining the input data DB11, a third data acquisition operation EH11 is performed to fetch the second electronic data DE21 determined according to the obtained input data DB11. The sixth application memory address AB21 is fetched in the data preparation phase UP1 based on the read second communication protocol identifier HP2. The second address pointer LP21 is read to fetch the fourth application memory address AG21 based on the fetched sixth application memory address AB21. In addition, the fetched second electronic data DE21 is stored at the fourth application memory location YG21 based on the fetched fourth application memory address AG21. For example, the second electricity application target BU91 is associated with the stored second electronic data DE21.

In some embodiments, the method further includes the following steps: In the data preparation phase UP1, a sixth user input operation PV21 is received between the fifth user input operation PV11 and the second user input operation PU91. In addition, a third operation request message QV11 is provided in response to the sixth user input operation PV21 using the third electricity application target BC11. For example, the third electricity application target BC11 is associated with the stored second address pointer LP21, the seventh application memory address AH11, the stored first data derivation rule identifier HH11 and the first address pointer LP11.

The method further includes the following steps: The designated protocol identifier HPA is used to fetch the seventh application memory address AH11 in response to the third operation request message QV11. The first data derivation rule identifier HH11 stored at the seventh application memory location YH11 is read based on the fetched seventh application memory address AH11. The stored first data derivation rule RY11 is read based on the read first data derivation rule identifier HH11. In addition, the second electronic data DE21 stored at the fourth application memory location YG21 is read in response to the third operation request message QV11 to obtain the second electronic data DE21.

The method further includes the following steps: The read second electronic data DE21 is processed to form third electronic data DE1A based on the read first data derivation rule RY11, wherein the third electronic data DE1A is equal to one of the obtained second electronic data DE21 and a portion of the read second electronic data DE21. In addition, under a condition that the third electronic data DE1A is formed, a data derivation operation EK11 is performed to form the first electronic data DE11 derived from the third electronic data DE1A. For example, the first electronic data DE11 is the same as or different from the third electronic data DE1A. The data derivation operation EK11 is one of a null derivation operation and a practical derivation operation.

The method further includes the following steps: The fifth application memory address AB11 is fetched in the data preparation phase UP1 based on the obtained first communication protocol identifier HP1. The first address pointer LP11 is read based on the fetched fifth application memory address AB11 to fetch the third application memory address AG11. In addition, the formed first electronic data DE11 is stored at the third application memory location YG11 based on the fetched third application memory address AG11. For example, the second electricity application target BU91 is further associated with the stored first electronic data DE11.

In some embodiments, the method further includes the following steps: the data preparation phase UP1 is left to enter a data transmission phase UT1 in response to the second operation request message QN91, wherein the stored protocol identifier group identifier HY81 is accessed in the data transmission phase UT1, and the stored first communication protocol identifier HP1 belonging to the stored communication protocol identifier group GH1 is accessed in the data transmission phase UT1 to obtain the stored first communication protocol identifier HP1. In addition, the stored second communication protocol identifier HP2 belonging to the stored communication protocol identifier group GH1 is accessed in the data transmission phase UT1 based on the accessed protocol identifier group identifier HY81.

The method further includes the following steps: The obtained first communication protocol identifier HP1 is used to obtain the first application memory address AU51 in the data transmission phase UT1. The first communication target identifier HT11 stored at the first application memory location YU51 is accessed based on the obtained first application memory address AU51. The accessed second communication protocol identifier HP2 is used to obtain the second application memory address AU61 in the data transmission phase UT1. In addition, the second communication target identifier HT21 stored at the second application memory location YU61 is accessed based on the obtained second application memory address AU61.

The method further includes the following steps: The accessed second communication protocol identifier HP2 is used to obtain the sixth application memory address AB21 in the data transmission phase UT1. The second address pointer LP21 is accessed based on the obtained sixth application memory address AB21 to obtain the fourth application memory address AG21. The second electronic data DE21 stored at the fourth application memory location YG21 is accessed based on the obtained fourth application memory address AG21. In addition, the second specific application communication protocol PC21 is used to send the accessed second electronic data DE21 toward the second communication target 521 in the data transmission phase UT1 based on the accessed second electronic data DE21, the accessed second communication protocol identifier HP2 and the accessed second communication target identifier HT21.

In some embodiments, the sub-step of using the stored first address pointer LP11 to access the stored first electronic data DE11 includes the following sub-steps: The obtained first communication protocol identifier HP1 is used to obtain the fifth application memory address AB11 in the data transmission phase UT1. The first address pointer LP11 is accessed based on the obtained fifth application memory address AB11 to obtain the third application memory address AG11. In addition, the first electronic data DE11 stored at the third application memory location YG11 is accessed based on the obtained third application memory address AG11.

The step of sending the accessed first electronic data DE11 toward the first communication target 511 includes a sub-step that: the first specific application communication protocol PC11 is used to send the accessed first electronic data DE11 toward the first communication target 511 in the data transmission phase UT1 based on the accessed first electronic data DE11, the obtained first communication protocol identifier HP1 and the accessed first communication target identifier HT11. The plurality of different application communication protocols PC11, PC21, . . . are selected from a group consisting of an email communication protocol, an instant-messaging communication protocol, a short-message service communication protocol and a multimedia-message service communication protocol. The first communication target identifier HT11 is the same as or different from the second communication target identifier HT21. The first communication target 511 is the same as or different from the second communication target 521.

Please refer to FIGS. 24, 25, 26 and 27. An electronic device 400 for sending first electronic data DE11 toward a first communication target 511 is disclosed. The electronic device 400 includes a storage unit 320, an input unit 340 and a processing unit 310. The input unit 340 receives a first user input operation PU81 and a second user input operation PU91 occurred later than the first user input operation PU81.

The processing unit 310 is coupled to the storage unit 320 and the input unit 340, obtains a first communication protocol identifier HP1 configured to identify a first specific application communication protocol PC11 in response to the first user input operation PU81, causes the storage unit 320 to store the first electronic data DE11 based on the first communication protocol identifier HP1, accesses the stored first electronic data DE11 in response to the second user input operation PU91, and sends the accessed first electronic data DE11 toward the first communication target 511 based on the first specific application communication protocol PC11.

In some embodiments, the electronic device 400 further includes an electricity application target BR11 coupled to the processing unit 310. The storage unit 320 has a volatile memory space SV51 coupled to the processing unit 310, and stores second electronic data DE21, a first data derivation rule identifier HH11, and a first data derivation rule RY11 identified by the first data derivation rule identifier HH11. For example, each of the first electronic data DE11 and the second electronic data DE21 is stored in the volatile memory space SV51. The electricity application target BR11 is associated with the second electronic data DE21 and the first data derivation rule identifier HH11.

At an acquisition time TE11 occurring between the first and the second user input operations PU81 and PU91, the processing unit 310 reads the stored second electronic data DE21 and the first data derivation rule identifier HH11 by means of the electricity application target BR11. The processing unit 310 reads the first data derivation rule RY11 based on the read first data derivation rule identifier HH11, and processes the read second electronic data DE21 to form the stored first electronic data DE11 based on the read first data derivation rule RY11.

After the processing unit 310 sends the accessed first electronic data DE11 toward the first communication target

511 based on the first specific application communication protocol PC11, the input unit 340 receives a third user input operation PZ82 to provide an operation request message QZ82 to the processing unit 310. The processing unit 310, in response to the operation request message QZ82, replaces the stored first data derivation rule identifier HH11 with a second data derivation rule identifier HH12 being different from the first data derivation rule identifier HH11. For example, the second data derivation rule identifier HH12 is configured to identify a second data derivation rule RY12 being different from the first data derivation rule RY11.

In some embodiments, the storage unit 320 has a volatile memory space SV51 coupled to the processing unit 310. The first specific application communication protocol PC11 is selected from a plurality of different application communication protocols PC11, PC21, . . . . The processing unit 310 further obtains a second communication protocol identifier HP2 configured to identify a second specific application communication protocol PC21 in response to the first user input operation PU81, accesses second electronic data DE21 stored in the volatile memory space SV51 based on the second communication protocol identifier HP2, and sends the accessed second electronic data DE21 toward a second communication target 521 based on the second specific application communication protocol PC21. For example, the second specific application communication protocol PC21 is different from the first specific application communication protocol PC11, and is selected from the plurality of different application communication protocols PC11, PC21, . . . .

In some embodiments, the electronic device 400 further includes an input unit 340 coupled to the processing unit 310, and a display unit 330 coupled to the processing unit 310. One of the input unit 340 and the display unit 330 includes a first electricity application target BU81 coupled to the processing unit 310. One of the input unit 340 and the display unit 330 includes a second electricity application target BU91 coupled to the processing unit 310. For example, the second electricity application target BU91 is the same as or different from the first electricity application target BU81. One of the input unit 340 and the display unit 330 includes a third electricity application target BC11 coupled to the processing unit 310. For example, the electricity application target BR11 is the third electricity application target BC11.

Each of the first and the second communication protocol identifiers HP1 and HP2 belongs to a communication protocol identifier group GH1 identified by a protocol identifier group identifier HY81. The storage unit 320 stores the communication protocol identifier group GH1, the protocol identifier group identifier HY81 associated with the first electricity application target BU81, a first data derivation rule identifier HH11 associated with the third electricity application target BC11, and a first data derivation rule RY11 identified by the first data derivation rule identifier HH11.

The storage unit 320 further stores a first communication target identifier HT11 associated with the stored first communication protocol identifier HP1, and a second communication target identifier HT21 associated with the second communication protocol identifier HP2. For example, the first communication target identifier HT11 is configured to identify the second communication target 511. The second communication target identifier HT21 is configured to identify a second communication target 521.

The storage unit 320 has a first application memory location YU51 identified based on a first application memory address AU51, and a second application memory location YU61 identified based on a second application memory address AU61. For example, each of the first and the second application memory locations YU51 and YU61 is disposed in the volatile memory space SV51. The first application memory address AU51 is determined according to the stored first communication protocol identifier HP1. The second application memory address AU61 is determined according to the stored second communication protocol identifier HP2.

The storage unit 320 further has a third application memory location YG11 identified by a third application memory address AG11, and a fourth application memory location YG21 identified by a fourth application memory address AG21. For example, each of the third and the fourth application memory locations YG11 and YG21 is disposed in the volatile memory space SV51. The first electronic data DE11 is configured to be stored at the third application memory location YG11. The second electronic data DE21 is configured to be stored at the fourth application memory location YG21.

The storage unit 320 further stores a first address pointer LP11 associated with the first communication protocol identifier HP1, and a second address pointer LP21 associated with the second communication protocol identifier HP2. For example, the first address pointer LP11 points to the third application memory address AG11. The second address pointer LP21 points to the fourth application memory address AG21.

The storage unit 320 further has a fifth application memory location YB11 identified by a fifth application memory address AB11, and a sixth application memory location YB21 identified by a sixth application memory address AB21. For example, the fifth application memory address AB11 is determined according to the stored first communication protocol identifier HP1. The sixth application memory address AB21 is determined according to the stored second communication protocol identifier HP2. The first address pointer LP11 is configured to be stored at the fifth application memory location YB11. The second address pointer LP21 is configured to be stored at the sixth application memory location YB21.

The storage unit 320 further has a seventh application memory location YH11 identified by a seventh application memory address AH11. For example, the seventh application memory address AH11 is determined according to a designated protocol identifier HPA being one of the stored first communication protocol identifier HP1 and the stored second communication protocol identifier HP2. The third electricity application target BC11 is associated with the seventh application memory address AH11. The first data derivation rule identifier HH11 is stored at the seventh application memory location YH11 based on the seventh application memory address AH11.

In some embodiments, the input unit 340 receives a first user input operation PU81 using the first electricity application target BU81 to provide a first operation request message QN81 to the processing unit 310. The input unit 340 receives a second user input operation PU91 occurred later than the first user input operation PU81, and provides a second operation request message QN91 to the processing unit 310 in response to the second user input operation PU91 using the second electricity application target BU91. The processing unit 310 enters a data preparation phase UP1 in response to the first operation request message QN81, and causes the storage unit 320 to prepare second electronic data DE21 in the data preparation phase UP1.

The processing unit 310 accesses the stored protocol identifier group identifier HY81 in the data preparation phase UP1. The processing unit 310, in the data preparation phase UP1, accesses the stored first communication protocol identifiers HP1 belonging to the stored communication protocol identifier group GH1 based on the accessed protocol identifier group identifier HY81 to obtain the stored first communication protocol identifiers HP1. The processing unit 310 accesses the stored second communication protocol identifiers HP2 belonging to the stored communication protocol identifier group GH1 in the data preparation phase UP1 based on the accessed protocol identifier group identifier HY81 to obtain the stored second communication protocol identifiers HP2.

In some embodiments, the input unit 340 receives a third user input operation PK51 in the data preparation phase UP1. The processing unit 310 performs a first data acquisition operation EF51 in response to the third user input operation PK51 to obtain the first communication target identifier HT11 to be stored. The processing unit 310 fetches the first application memory address AU51 in the data preparation phase UP1 based on the obtained first communication protocol identifier HP1, and causes the storage unit 320 to store the obtained first communication target identifier HT11 at the first application memory location YU51 based on the fetched first application memory address AU51.

The input unit 340 receives a fourth user input operation PK61 in the data preparation phase UP1. The processing unit 310 performs a second data acquisition operation EF61 in response to the fourth user input operation PK61 to obtain the second communication target identifier HT21 to be stored. The processing unit 310 fetches the second application memory address AU61 in the data preparation phase UP1 based on the obtained second communication protocol identifier HP2, and causes the storage unit 320 to store the obtained second communication target identifier HT21 at the second application memory location YU61 based on the fetched second application memory address AU61.

The input unit 340 receives a fifth user input operation PV11 occurred earlier than the second user input operation PU91 in the data preparation phase UP1 to provide input data DB11 to the processing unit 310. The processing unit 310, in response to obtaining the input data DB11, performs a third data acquisition operation EH11 to fetch the second electronic data DE21 determined according to the obtained input data DB11.

The processing unit 310 fetches the sixth application memory address AB21 in the data preparation phase UP1 based on the obtained second communication protocol identifier HP2, reads the second address pointer LP21 to fetch the fourth application memory address AG21 based on the fetched sixth application memory address AB21, and causes the storage unit 320 to store the fetched second electronic data DE21 at the fourth application memory location YG21 based on the fetched fourth application memory address AG21. For example, the second electricity application target BU91 is associated with the stored second electronic data DE21.

In some embodiments, the third electricity application target BC11 is associated with the stored second address pointer LP21, the seventh application memory address AH11, the stored first data derivation rule identifier HH11 and the first address pointer LP11. The input unit 340, in the data preparation phase UP1, receives a sixth user input operation PV21 between the fifth user input operation PV11 and the second user input operation PU91, and provides a third operation request message QV11 to the processing unit 310 in response to the sixth user input operation PV21 using the third electricity application target BC11.

The processing unit 310 uses the designated protocol identifier HPA to fetch the seventh application memory address AH11 in response to the third operation request message QV11, reads the first data derivation rule identifier HH11 stored at the seventh application memory location YH11 based on the fetched seventh application memory address AH11, and reads the stored first data derivation rule RY11 based on the read first data derivation rule identifier HH11. The processing unit 310 uses the read fourth application memory address AG21 to read the second electronic data DE21 stored at the fourth application memory location YG21 in response to the third operation request message QV11 to obtain the stored second electronic data DE21 from the storage unit 320.

The processing unit 310 processes the obtained second electronic data DE21 to form third electronic data DE1A based on the read first data derivation rule RY11. For example, the third electronic data DE1A is equal to one of the obtained second electronic data DE21 and a portion of the obtained second electronic data DE21. The processing unit 310 applies the read first data derivation rule RY11 to the obtained second electronic data DE21 to form the third electronic data DE1A derived from the obtained second electronic data DE21.

Under a condition that the processing unit 310 forms the third electronic data DE1A, the processing unit 310 performs a data derivation operation EK11 to form the first electronic data DE11 derived from the third electronic data DE1A. For example, the first electronic data DE11 is the same as or different from the third electronic data DE1A. The data derivation operation EK11 is one of a null derivation operation and a practical derivation operation.

The processing unit 310 fetches the fifth application memory address AB11 in the data preparation phase UP1 based on the obtained first communication protocol identifier HP1, reads the first address pointer LP11 based on the fetched fifth application memory address AB11 to fetch the third application memory address AG11, and causes the storage unit 320 to store the formed first electronic data DE11 at the third application memory location YG11 based on the fetched third application memory address AG11. For example, the second user input operation PU91 is further associated with the stored first electronic data DE11.

In some embodiments, the processing unit 310 leaves the data preparation phase UP1 to enter a data transmission phase UT1 in response to the second operation request message QN91. The processing unit 310 uses the obtained first communication protocol identifier HP1 to obtain the first application memory address AU51 in the data transmission phase UT1, and accesses the first communication target identifier HT11 stored at the first application memory location YU51 based on the obtained first application memory address AU51. The processing unit 310 uses the obtained second communication protocol identifier HP2 to obtain the second application memory address AU61 in the data transmission phase UT1, and accesses the second communication target identifier HT21 stored at the second application memory location YU61 based on the obtained second application memory address AU61.

The processing unit 310 uses the obtained first communication protocol identifier HP1 to obtain the fifth application memory address AB11 in the data transmission phase UT1, accesses the first address pointer LP11 based on the obtained fifth application memory address AB11 to obtain the third application memory address AG11, and accesses the first electronic data DE11 stored at the third application memory location YG11 based on the obtained third application memory address AG11.

The processing unit 310 uses the obtained second communication protocol identifier HP2 to obtain the sixth application memory address AB21 in the data transmission phase UT1, accesses the second address pointer LP21 based on the obtained sixth application memory address AB21 to obtain the fourth application memory address AG21, and accesses the second electronic data DE21 stored at the fourth application memory location YG21 based on the obtained fourth application memory address AG21.

The processing unit 310 uses the first specific application communication protocol PC11 to send the accessed first electronic data DE11 toward the first communication target 511 in the data transmission phase UT1 based on the accessed first electronic data DE11, the obtained first communication protocol identifier HP1 and the accessed first communication target identifier HT11. The processing unit 310 uses the second specific application communication protocol PC21 to send the accessed second electronic data DE21 toward the second communication target 521 in the data transmission phase UT1 based on the accessed second electronic data DE21, the obtained second communication protocol identifier HP2 and the accessed second communication target identifier HT21.

The plurality of different application communication protocols PC11, PC21, . . . are selected from a group consisting of an email communication protocol, an instant-messaging communication protocol, a short-message service communication protocol and a multimedia-message service communication protocol. The first communication target identifier HT11 is the same as or different from the second communication target identifier HT21. The first communication target 511 is the same as or different from the second communication target 521.

Figure 28:
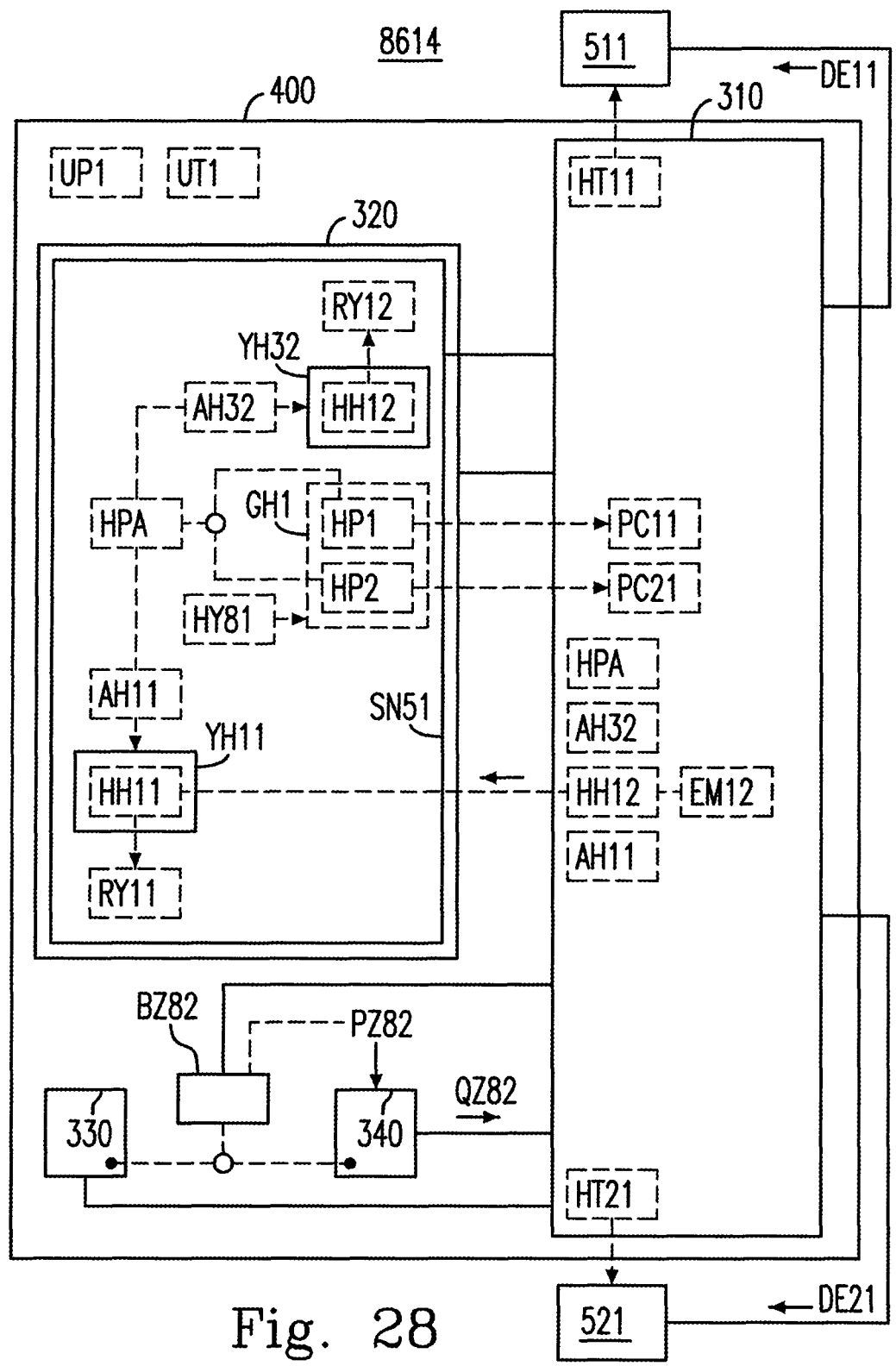
FIG. 28 is a schematic diagram showing an implementation structure of the communication system shown in FIG. 24.

Please refer to FIG. 28, which is a schematic diagram showing an implementation structure 8614 of the communication system 861 shown in FIG. 24. As shown in FIG. 28, the implementation structures 8614 includes the electronic device 400, the first communication target 511 and the second communication target 521. The electronic device 400 is to communicate with at least one of the first and the second communication targets 511 and 521, and includes the processing unit 310, the storage unit 320 coupled to the processing unit 310, the input unit 340 coupled to the processing unit 310, and the display unit 330 coupled to the processing unit 310. Each of the storage unit 320, the input unit 340 and the display unit 330 is controlled by the processing unit 310. The storage unit 320 has the volatile memory space SV51 coupled to the processing unit 310, and the nonvolatile memory space SN51 coupled to the processing unit 310.

In some embodiments, one of the input unit 340 and the display unit 330 includes an electricity application target BZ82 coupled to the processing unit 310. The electricity application target BZ82 is associated with the seventh application memory address AH11. After the processing unit 310 sends the accessed first electronic data DE11 toward the first communication target 511 based on the first specific application communication protocol PC11, the input unit 340 receives the user input operation PZ82 using the electricity application target BZ82 to provide the operation request message QZ82 to the processing unit 310. The processing unit 310, in response to the operation request message QZ82, performs a data acquisition operation EM12 to obtain the second data derivation rule identifier HH12 being different from the first data derivation rule identifier HH11, and uses the designated protocol identifier HPA to obtain the seventh application memory address AH11 in response to the operation request message QZ82.

The storage unit 320 further stores the second data derivation rule RY12 identified by the second data derivation rule identifier HH12. The processing unit 310 replaces the first data derivation rule identifier HH11 stored at the seventh application memory location YH11 with the second data derivation rule identifier HH12 based on the obtained seventh application memory address AH11. Therefore, the third electricity application target BC11 becomes to be associated with the second data derivation rule identifier HH12 and the second data derivation rule RY12. For example, the data acquisition operation EM12 is one of a data encoding operation and a data access operation. Under a condition that the data acquisition operation EM12 is the data encoding operation, the data encoding operation uses the stored first data derivation rule identifier HH11 to obtain the second data derivation rule identifier HH12.

In some embodiments, the storage unit 320 further has an application memory location YH32 identified based on an application memory address AH32. For example, the application memory address AH32 is determined according to the designated protocol identifier HPA. The second data derivation rule identifier HH12 is stored at the application memory location YH32 based on the application memory address AH32. Under a condition that the data acquisition operation EM12 is the data access operation, the data access operation uses the designated protocol identifier HPA to obtain the application memory address AH32, and accesses the second data derivation rule identifier HH12 stored at the application memory location YH32 based on the obtained application memory address AH32 to obtain the second data derivation rule identifier HH12.

For example, the electricity application target BZ82 is associated with the stored protocol identifier group identifier HY81, the stored designated protocol identifier HPA, the application memory address AH32, and the second data derivation rule identifier HH12 stored at the application memory location YH32. For example, the processing unit 310 reads the stored protocol identifier group identifier HY81 in response to the operation request message QZ82, and reads the stored designated protocol identifier HPA belonging to the stored communication protocol identifier group GH1 based on the read protocol identifier group identifier HY81 to obtain the stored designated protocol identifier HPA.

Figure 29:
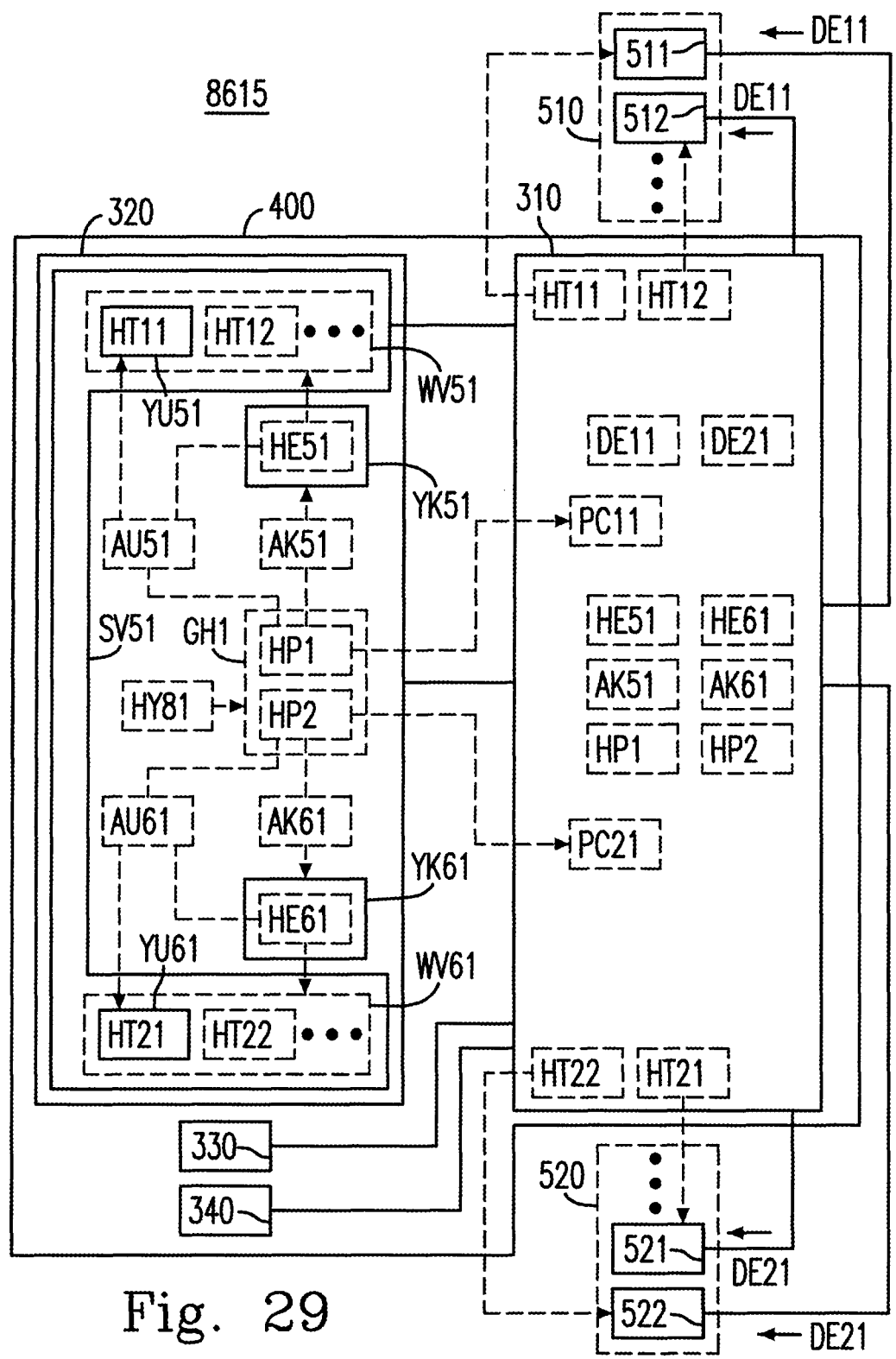
FIG. 29 is a schematic diagram showing an implementation structure of the communication system shown in FIG. 24.

Please refer to FIG. 29, which is a schematic diagram showing an implementation structure 8615 of the communication system 861 shown in FIG. 24. As shown in FIG. 29, the implementation structure 8615 includes the electronic device 400, the first communication target 511, the second communication target 521, a communication target 512 and a communication target 522. The electronic device 400 is to communicate with at least one of the first communication target 511, the second communication target 521, the communication target 512 and the communication target 522, and includes the processing unit 310, the storage unit 320 coupled to the processing unit 310, the input unit 340 coupled to the processing unit 310, and the display unit 330 coupled to the processing unit 30. Each of the storage unit 320, the input unit 340 and the display unit 330 is controlled by the processing unit 310. The storage unit 320 has a volatile memory space SV51 coupled to the processing unit 310, and a nonvolatile memory space SN51 coupled to the processing unit 310.

In some embodiments, the storage unit 320 further has an application memory location YK51 identified based on an application memory address AK51. For example, the application memory address AK51 is determined according to the stored first communication protocol identifier HP1. The storage unit 320 further stores a target identifier set identifier HE51 and a communication target identifier set WV51 identified by the target identifier set identifier HE51. For example, the target identifier set identifier HE51 is stored at the application memory location YK51 based on the application memory address AK51. The processing unit 310 causes the storage unit 320 to store the communication target identifier set WV51 in the volatile memory space SV51 in the data preparation phase UP1. The processing unit 310 obtains the application memory address AK51 based on the obtained first communication protocol identifier HP1, and accesses the target identifier set identifier HE51 stored at the application memory location YK51 based on the obtained application memory address AK51.

Under a condition that the communication target identifier set WV51 consists of a plurality of communication target identifiers HT11, HT12, . . . and the plurality of communication target identifiers HT11, HT12, . . . are configured to respectively identify a plurality of communication targets 511, 512, . . . , the processing unit 310 accesses the plurality of communication target identifiers HT11, HT12, . . . based on the accessed target identifier set identifier HE51. The processing unit 310 uses the first specific application communication protocol PC11 to send the accessed first electronic data DE11 toward each of the plurality of communication targets 511, 512, . . . based on the accessed first electronic data DE11, the obtained first communication protocol identifier HP1 and the accessed plurality of communication target identifiers HT11, HT12, . . . .

In some embodiments, the storage unit 320 further has an application memory location YK61 identified based on an application memory address AK61. For example, the application memory address AK61 is determined according to the stored second communication protocol identifier HP2. The storage unit 320 further stores a target identifier set identifier HE61 and a communication target identifier set WV61 identified by the target identifier set identifier HE61. For example, the target identifier set identifier HE61 is stored at the application memory location YK61 based on the application memory address AK61. The processing unit 310 causes the storage unit 320 to store the communication target identifier set WV61 in the volatile memory space SV51 in the data preparation phase UP1. The processing unit 310 obtains the application memory address AK61 based on the obtained second communication protocol identifier HP2, and accesses the target identifier set identifier HE61 stored at the application memory location YK61 based on the obtained application memory address AK61.

Under a condition that the communication target identifier set WV61 consists of a plurality of communication target identifiers HT21, HT22, . . . and the plurality of communication target identifiers HT21, HT22, . . . are configured to respectively identify a plurality of communication targets 521, 522, . . . , the processing unit 310 accesses the plurality of communication target identifiers HT21, HT22, . . . based on the accessed target identifier set identifier HE61. The processing unit 310 uses the second specific application communication protocol PC21 to send the accessed second electronic data DE21 toward each of the plurality of communication targets 521, 522, . . . based on the accessed second electronic data DE21, the obtained second communication protocol identifier HP2 and the accessed plurality of communication target identifiers HT21, HT22, . . . .

For example, the plurality of communication targets 511, 512, . . . constitutes a first communication target set 510. The plurality of communication targets 521, 522, . . . constitutes a second communication target set 520. The communication target identifier set WV51 is configured to identify the first communication target set 510. The communication target identifier set WV61 is configured to identify the second communication target set 520.

For example, the prepared first communication target identifier HT11 is stored at the application memory location YU51. The application memory location YU51 is identified by the application memory address AU51, or is identified based on the application memory address AU51. The application memory address AU51 is determined according to the stored first communication protocol identifier HP1 and the stored target identifier set identifier HE51. The prepared second communication target identifier HT21 is stored at the application memory location YU61. The application memory location YU61 is identified by the application memory address AU61, or is identified based on the application memory address AU61. The application memory address AU61 is determined according to the stored second communication protocol identifier HP2 and the stored target identifier set identifier HE61.

Figure 30:
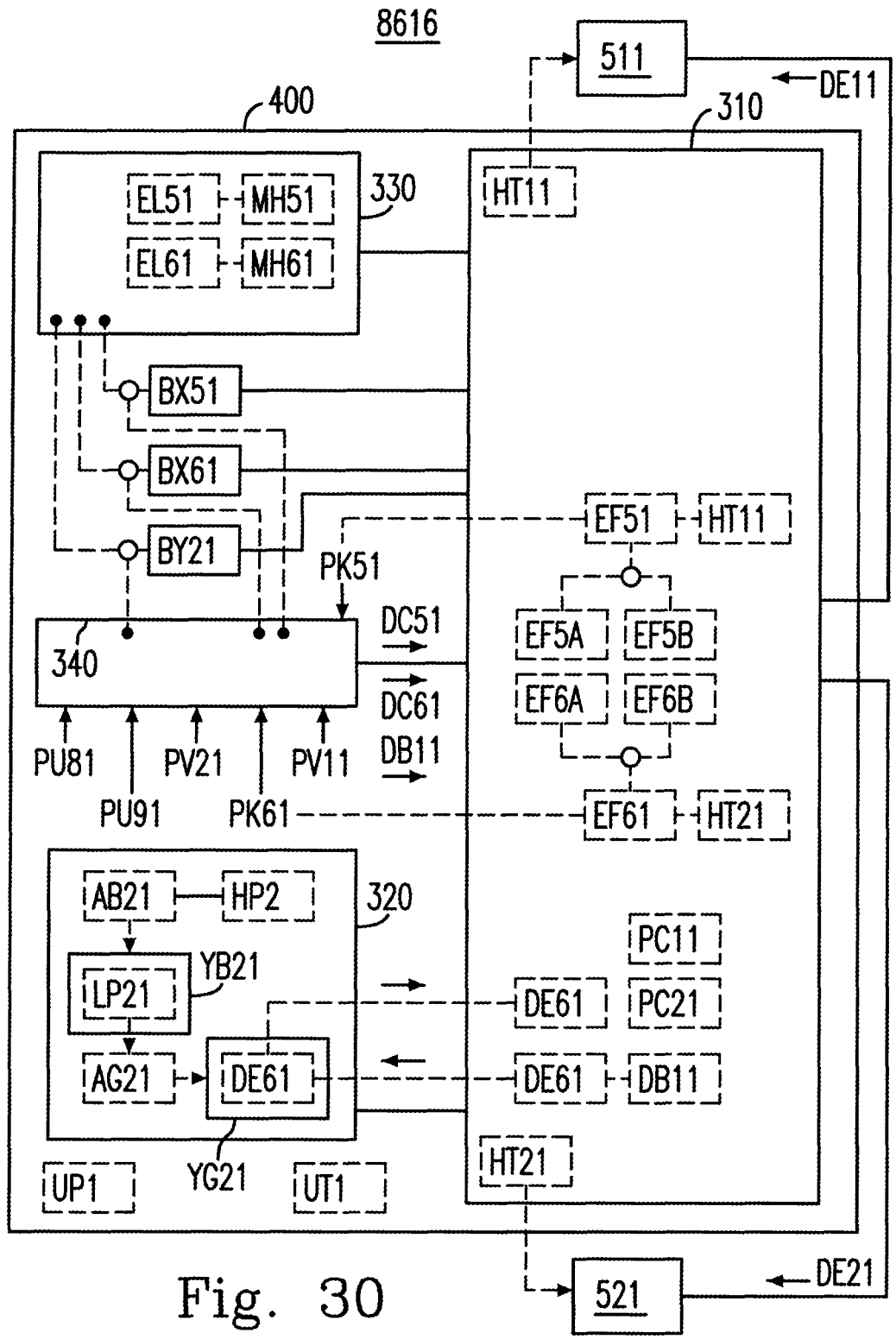
FIG. 30 is a schematic diagram showing an implementation structure of the communication system shown in FIG. 24.
Figure 31:
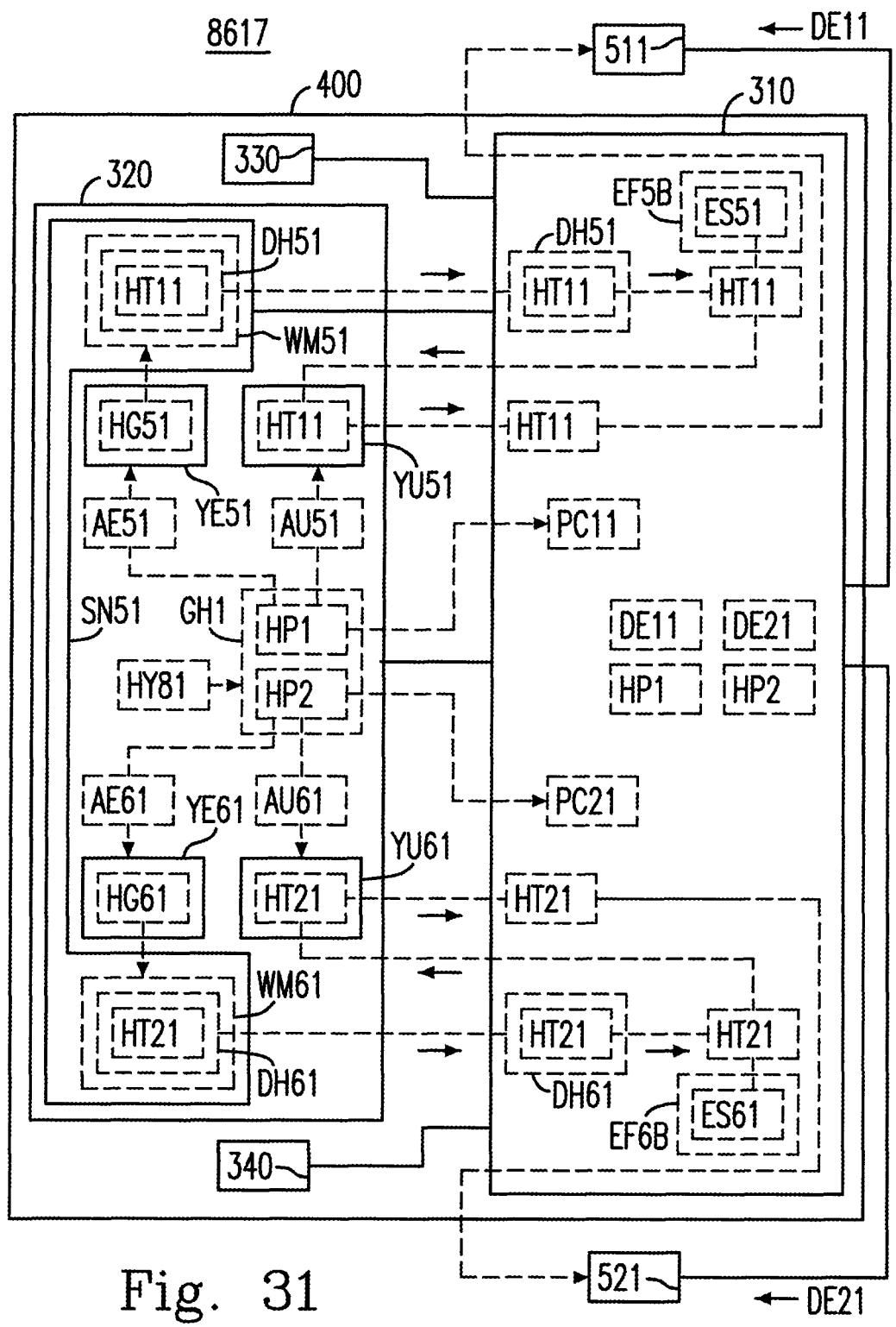
FIG. 31 is a schematic diagram showing an implementation structure of the communication system shown in FIG. 24.

Please refer to FIG. 30 and FIG. 31. FIG. 30 is a schematic diagram showing an implementation structure 8616 of the communication system 861 shown in FIG. 24. FIG. 31 is a schematic diagram showing an implementation structure 8617 of the communication system 861 shown in FIG. 24. As shown in FIGS. 30 and 31, any of the implementation structures 8616 and 8617 includes the electronic device 400, the first communication target 511 and the second communication target 521. The electronic device 400 is to communicate with at least one of the first communication target 511 and the second communication target 521, and includes the processing unit 310, the storage unit 320 coupled to the processing unit 310, the input unit 340 coupled to the processing unit 310, and the display unit 330 coupled to the processing unit 310. Each of the storage unit 320, the input unit 340 and the display unit 330 is controlled by the processing unit 310.

One of the input unit 340 and the display unit 330 includes an electricity application target BX51 coupled to the processing unit 310. One of the input unit 340 and the display unit 330 includes an electricity application target BX61 coupled to the processing unit 310. One of the input unit 340 and the display unit 330 includes an electricity application target BY21 coupled to the processing unit 310. For example, the electricity application targets BX51, BX61 and BY21 are respectively located at different spatial locations.

In some embodiments, the storage unit 320 further stores a target identifier set identifier HG51 and a communication target identifier set WM51 identified by the target identifier set identifier HG51, and further has an application memory location YE51 associated with the first specific application communication protocol PC11. For example, the communication target identifier set WM51 includes the first communication target identifier HT11, and is stored in the nonvolatile memory space SN51 beforehand. The target identifier set identifier HG51 is stored at the application memory location YE51 based on an application memory address AE51 determined according to the first communication protocol identifier HP1.

The input unit 340 receives the third user input operation PK51 in the data preparation phase UP1. The processing unit 310 performs the first data acquisition operation EF51 in response to the third user input operation PK51 using the electricity application target BX51 to obtain the first communication target identifier HT11 to be stored. The first data acquisition operation EF51 is one of a data acquisition action EF5A and a first data acquisition action EF5B. The processing unit 310 fetches the first application memory address AU51 in the data preparation phase UP1 based on the read first communication protocol identifier HP1, and causes the storage unit 320 to store the obtained first communication target identifier HT11 at the first application memory location YU51 based on the fetched first application memory address AU51.

Under a condition that the first data acquisition operation EF51 is the data acquisition action EF5A: the input unit 340 provides input data DC51 to the processing unit 310 in response to the third user input operation PK51; and the processing unit 310, based on the input data DC51, obtains the first communication target identifier HT11 determined according to the input data DC51.

Under a condition that the first data acquisition operation EF51 is the first data acquisition action EF5B: the processing unit 310 is configured to use the read or accessed first communication protocol identifier HP1 to obtain the application memory address AE51; the processing unit 310 reads the target identifier set identifier HG51 stored at the application memory location YE51 based on the obtained application memory address AE51; and the processing unit 310 reads communication target identifier data DH51 belonging to the communication target identifier set WM51 based on the read target identifier set identifier HG51, wherein the communication target identifier data DH51 includes the first communication target identifier HT11.

Under a condition that the first data acquisition operation EF51 is the first data acquisition action EF5B, the processing unit 310 performs a data selection operation ES51 in response to the third user input operation PK51 to obtain the first communication target identifier HT11 from the communication target identifier data DH51. For example, the processing unit 310 causes the display unit 330 to perform a display operation EL51 associated with the read first communication target identifier HT11 in response to reading the communication target identifier data DH51 to display a communication target identification information MH51 associated with the read first communication target identifier HT11. Under a condition that the display unit 330 displays the communication target identification information MH51, the processing unit 310 performs the data selection operation ES51 in response to the third user input operation PK51 to obtain the first communication target identifier HT11.

In some embodiments, the storage unit 320 further stores a target identifier set identifier HG61 and a communication target identifier set WM61 identified by the target identifier set identifier HG61, and further has an application memory location YE61 associated with the second specific application communication protocol PC21. For example, the communication target identifier set WM61 includes the second communication target identifier HT21, and is stored in the nonvolatile memory space SN51 beforehand. The target identifier set identifier HG61 is stored at the application memory location YE61 based on an application memory address AE61 determined according to the second communication protocol identifier HP2.

The input unit 340 receives the fourth user input operation PK61 in the data preparation phase UP1. The processing unit 310 performs the second data acquisition operation EF61 in response to the fourth user input operation PK61 using the electricity application target BX61 to obtain the second communication target identifier HT21 to be stored. The second data acquisition operation EF61 is one of a data acquisition action EF6A and a second data acquisition action EF6B. The processing unit 310 fetches the second application memory address AU61 in the data preparation phase UP1 based on the read second communication protocol identifier HP2, and causes the storage unit 320 to store the obtained second communication target identifier HT21 at the second application memory location YU61 based on the fetched second application memory address AU61.

The processing unit 310 performs the second data acquisition operation EF61 in the data preparation phase UP1 in response to the fourth user input operation PK61 to obtain the second communication target identifier HT21 to be stored. The second data acquisition operation EF61 is one of a data acquisition action EF6A and a second data acquisition action EF6B. The processing unit 310 fetches the second application memory address AU61 in the data preparation phase UP1 based on the read second communication protocol identifier HP2, and causes the storage unit 320 to store the obtained second communication target identifier HT21 at the second application memory location YU61 based on the fetched second application memory address AU61. For example, each of the first and the second application memory locations YU51 and YU61 is disposed in the volatile memory space SV51.

Under a condition that the second data acquisition operation EF61 is the data acquisition action EF6A: the input unit 340 provides input data DC61 to the processing unit 310 in response to the fourth user input operation PK61; and the processing unit 310, based on the input data DC61, obtains the second communication target identifier HT21 determined according to the input data DC61.

Under a condition that the second data acquisition operation EF61 is the second data acquisition action EF6B: the processing unit 310 is configured to use the read or accessed second communication protocol identifier HP2 to obtain the application memory address AE61; the processing unit 310 reads the target identifier set identifier HG61 stored at the application memory location YE61 based on the obtained application memory address AE61; and the processing unit 310 reads communication target identifier data DH61 belonging to the communication target identifier set WM61 based on the read target identifier set identifier HG61, wherein the communication target identifier data DH61 includes the second communication target identifier HT21.

Under a condition that the second data acquisition operation EF61 is the second data acquisition action EF6B, the processing unit 310 performs a data selection operation ES61 in response to the fourth user input operation PK61 to obtain the second communication target identifier HT21 from the communication target identifier data DH61. For example, the processing unit 310 causes the display unit 330 to perform a display operation EL61 associated with the read second communication target identifier HT21 in response to reading the communication target identifier data DH61 to display a communication target identification information MH61 associated with the read second communication target identifier HT21. Under a condition that the display unit 330 displays the communication target identification information MH61, the processing unit 310 performs the data selection operation ES61 in response to the fourth user input operation PK61 to obtain the second communication target identifier HT21.

For example, the first communication target identifier HT11 belonging to the communication target identifier set WM51 is stored at a first practical memory location. The first practical memory location is identified by a first practical memory address, or is identified based on the first practical memory address. The first practical memory address is determined according to the stored first communication protocol identifier HP1 and the stored target identifier set identifier HG51. The second communication target identifier HT21 belonging to the communication target identifier set WM61 is stored at a second practical memory location. The second practical memory location is identified by a second practical memory address, or is identified based on the second practical memory address. The second practical memory address is determined according to the stored second communication protocol identifier HP2 and the stored target identifier set identifier HG61.

In some embodiments, the input unit 340 provides the input data DB11 to the processing unit 310 in response to the fifth user input operation PV11 using the electricity application target BY21. The electricity application target BY21 is associated with the sixth application memory address AB21 and the second address pointer LP21. The processing unit 310 fetches the read second communication protocol identifier HP2 in the data preparation phase UP1 by means of the electricity application target BY21, fetches the sixth application memory address AB21 based on the fetched second communication protocol identifier HP2, and reads the second address pointer LP21 based on the fetched sixth application memory address AB21 to fetch the fourth application memory address AG21.

The processing unit 310, in response to obtaining the input data DB11, fetches the second electronic data DE21 determined according to the obtained input data DB11. The processing unit 310 fetches the fourth application memory address AG21, and causes the storage unit 320 to store the fetched second electronic data DE21 at the fourth application memory location YG21 based on the fetched fourth application memory address AG21. For example, each of the third and the fourth application memory locations YG11 and YG21 is disposed in the volatile memory space SV51.

For example, the processing unit 310 is configured to cause the storage unit 320 to store, in at least one of the nonvolatile memory space SN51 and the volatile memory space SV51, one selected from a group consisting of the protocol identifier group identifier HY81, the communication protocol identifier group GH1, the target identifier set identifier HE51, the communication target identifier set WV51, the target identifier set identifier HE61, the communication target identifier set WV61, the target identifier set identifier HG51, the communication target identifier set WM51, the target identifier set identifier HG61, the communication target identifier set WM61 and any combination thereof.

Figure 32:
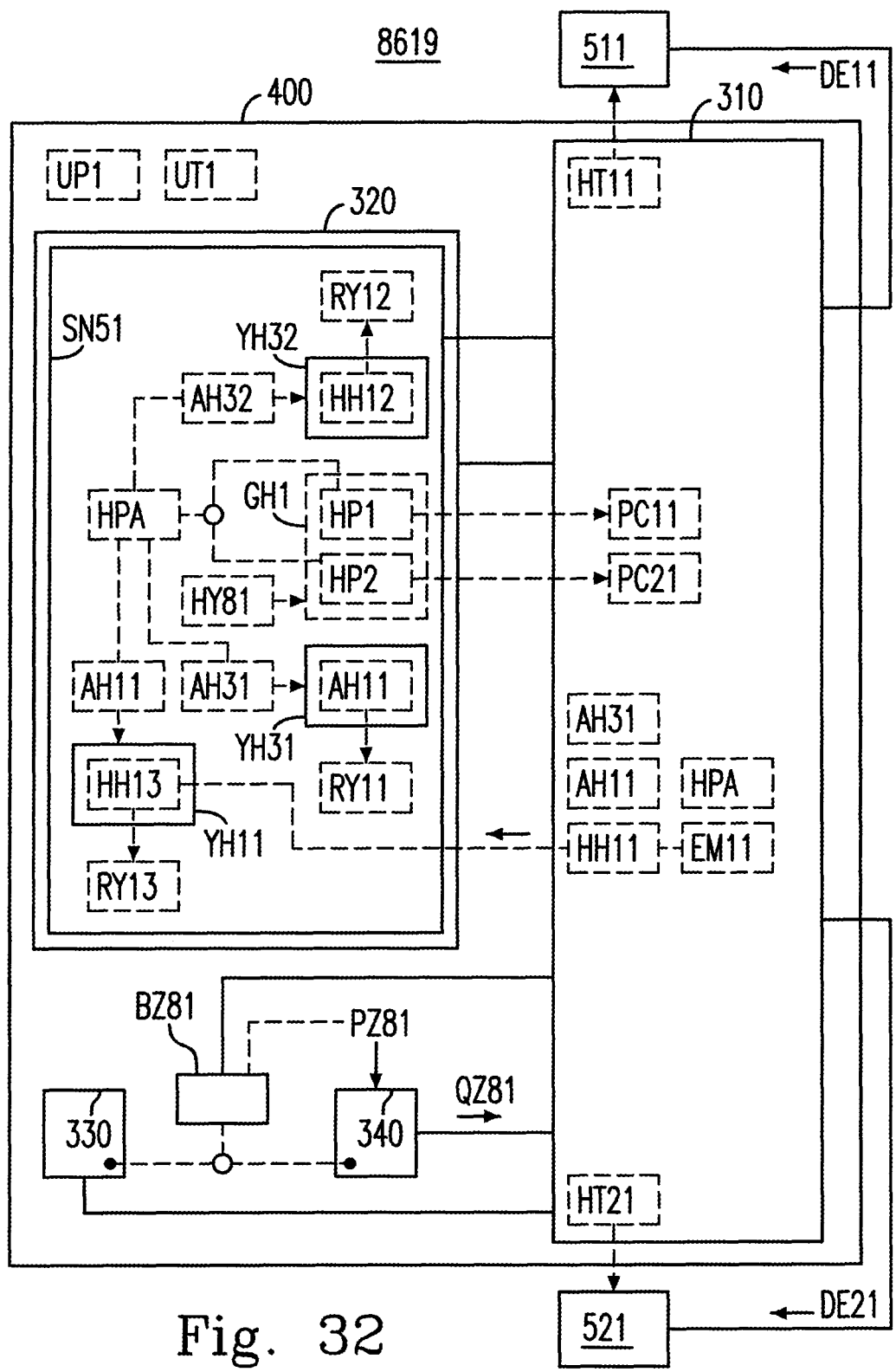
FIG. 32 is a schematic diagram showing an implementation structure of the communication system shown in FIG. 24.

Please refer to FIG. 32, which is a schematic diagram showing an implementation structure 8619 of the communication system 861 shown in FIG. 24. As shown in FIG. 32, the implementation structures 8619 includes the electronic device 400, the first communication target 511 and the second communication target 521. The electronic device 400 includes the processing unit 310, the storage unit 320 coupled to the processing unit 310, the input unit 340 coupled to the processing unit 310, and the display unit 330 coupled to the processing unit 310. Each of the storage unit 320, the input unit 340 and the display unit 330 is controlled by the processing unit 310. For example, the first data derivation rule identifier HH11 stored at the seventh application memory location YH11 is a first active derivation rule identifier or a first current derivation rule identifier. The second data derivation rule identifier HH12 stored at the seventh application memory location YH11 is a second active derivation rule identifier or a second current derivation rule identifier.

In some embodiments, one of the input unit 340 and the display unit 330 includes an electricity application target BZ81 coupled to the processing unit 310. The storage unit 320 stores at the seventh application memory location YH11 a third data derivation rule identifier HH13 being different from the first data derivation rule identifier HH11 beforehand. For example, the third data derivation rule identifier HH13 is configured to identify a third data derivation rule RY13 being different from the first data derivation rule RY11. The input unit 340, in the data preparation phase UP1, receives a user input operation PZ81 occurred earlier than the sixth user input operation PV21. The input unit 340 provides an operation request message QZ81 to the processing unit 310 in response to the user input operation PZ81 using the electricity application target BZ81. For example, the electricity application target BZ81 is the same as or different from the electricity application target BZ82.

The processing unit 310 performs a data acquisition operation EM11 to obtain the first data derivation rule identifier HH11 in response to the operation request message QZ81, fetches the designated protocol identifier HPA in response to the operation request message QZ81, and fetches the seventh application memory address AH11 based on the fetched designated protocol identifier HPA. The processing unit 310, in the data preparation phase UP1 based on the fetched seventh application memory address AH11, replaces the third data derivation rule identifier HH13 stored at the seventh application memory location YH11 with the first data derivation rule identifier HH11. For example, the data acquisition operation EM11 is one of a data encoding operation and a data access operation. Under a condition that the data acquisition operation EM11 is the data encoding operation, the data encoding operation uses the stored third data derivation rule identifier HH13 to obtain the first data derivation rule identifier HH11. For example, the third data derivation rule identifier HH13 and the third data derivation rule RY13 are respectively the same as or different from the second data derivation rule identifier HH12 and the second data derivation rule RY12.

In some embodiments, the storage unit 320 further has an application memory location YH31 identified based on an application memory address AH31. For example, the application memory address AH31 is determined according to the designated protocol identifier HPA. The first data derivation rule identifier HH11 is stored at the application memory location YH31 based on the application memory address AH31. Under a condition that the data acquisition operation EM11 is the data access operation, the data access operation uses the designated protocol identifier HPA to obtain the application memory address AH31, and accesses the first data derivation rule identifier HH11 stored at the application memory location YH31 based on the obtained application memory address AH31 to obtain the first data derivation rule identifier HH11.

For example, the electricity application target BZ81 is associated with the stored protocol identifier group identifier HY81, the stored designated protocol identifier HPA, the application memory address AH31, and the first data derivation rule identifier HH11 stored at the application memory location YH31. For example, the processing unit 310 reads the stored protocol identifier group identifier HY81 in response to the operation request message QZ81, and reads the stored designated protocol identifier HPA belonging to the stored communication protocol identifier group GH1 based on the read protocol identifier group identifier HY81 to obtain the stored designated protocol identifier HPA.

Figure 33:
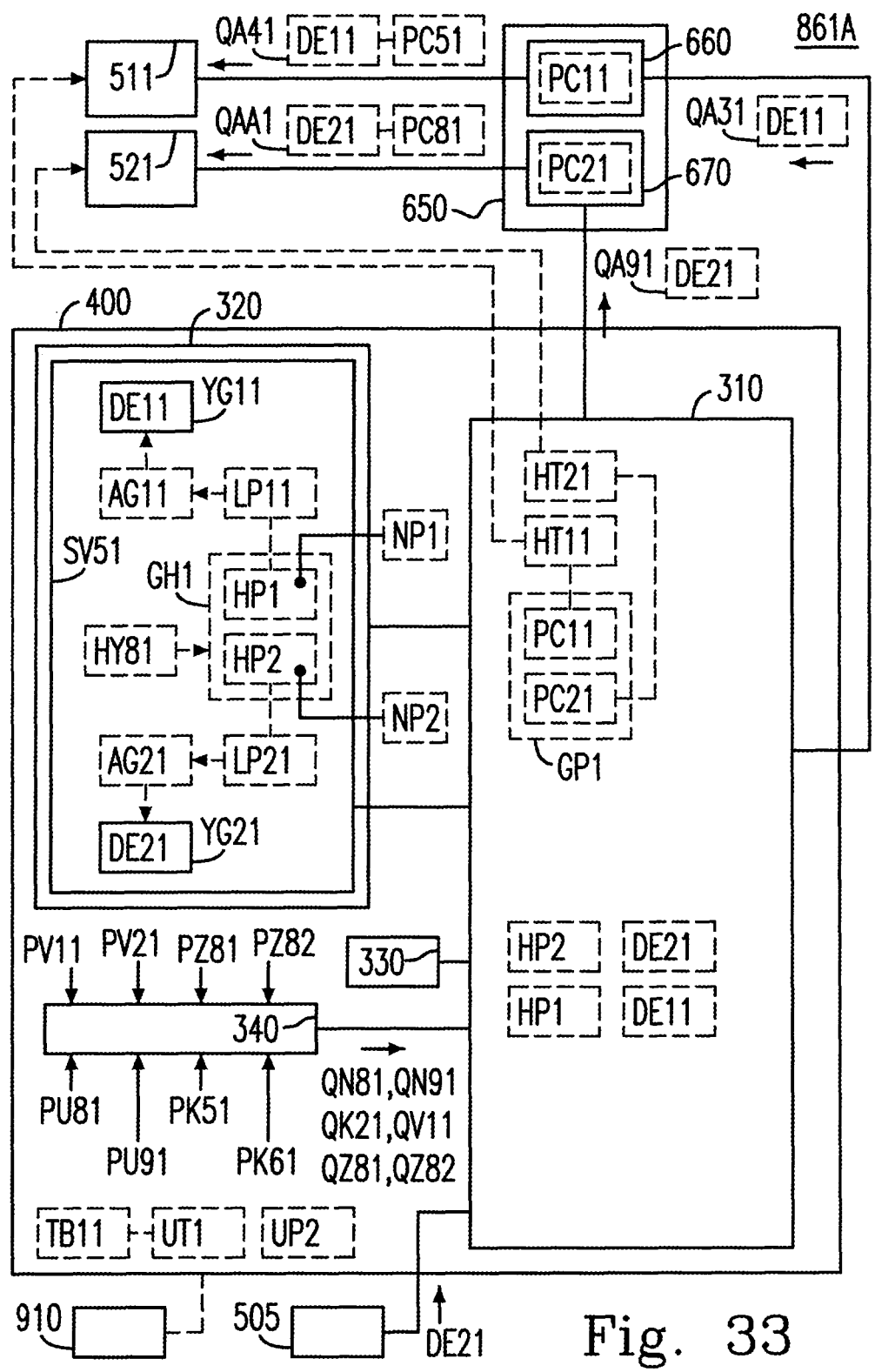
FIG. 33 is a schematic diagram showing an implementation structure of the communication system shown in FIG. 24.

Please refer to FIG. 33, which is a schematic diagram showing an implementation structure 861A of the communication system 861 shown in FIG. 24. As shown in FIG. 33, the implementation structures 861A includes the electronic device 400, a message service system 650, the first communication target 511 and the second communication target 521. The electronic device 400 includes the processing unit 310, the storage unit 320 coupled to the processing unit 310, the input unit 340 coupled to the processing unit 310, and the display unit 330 coupled to the processing unit 310. The message service system 650 includes a first message service device 660 and a second message service device 670. The processing unit 310 is coupled to the first message service device 660 and the second message service device 670. The first message service device 660 supports the first specific application communication protocol PC11. The second message service device 670 supports the second specific application communication protocol PC21, and is the same as or different from the first message service device 660.

The processing unit 310 is configured to support the first specific application communication protocol PC11 and the second specific application communication protocol PC21. The storage unit 320 stores the protocol identifier group identifier HY81, the first electronic data DE11, the second electronic data DE21, the communication protocol identifier group GH1, the first communication target identifier HT11, the second communication target identifier HT21, the first address pointer LP11, the second address pointer LP21, the target identifier set identifier HE51, the communication target identifier set WV51 identified by the target identifier set identifier HE51, the target identifier set identifier HE61, the communication target identifier set WV61 identified by the target identifier set identifier HE61, the target identifier set identifier HG51, the communication target identifier set WM51 identified by the target identifier set identifier HG51, the target identifier set identifier HG61, and the communication target identifier set WM61 identified by the target identifier set identifier HG61.

At least one of the electricity application target BY21 and the first electricity application target BU81 is associated with the application memory address AG21. The second electricity application target BU91 is associated with at least one of the application memory addresses AG11 and AG21. The processing unit 310 fetches the application memory address AG21 in the data preparation phase UP1 by using the second address pointer AG21. The input unit 340 in the data preparation phase UP1 receives the fifth user input operation PV11 using the electricity application target BY21 to provide the input data DB11 to the processing unit 310.

The processing unit 310, in response to obtaining the input data DB11, uses the fetched application memory address AG21 to cause the storage unit 320 to store at the application memory location YG21 the second electronic data DE21 determined according to the obtained input data DB11. The processing unit 310 obtains the application memory address AG21 in the data transmission phase UT1, and accesses the second electronic data DE21 stored at the application memory location YG21 based on the obtained application memory address AG21 to send the accessed second electronic data DE21. For example, the electricity application target BY21 is one of a display area and a sensing area.

In some embodiments, the processing unit 310 accesses or reads the first electronic data DE11, the first communication protocol identifier HP1 and the first communication target identifier HT11, which are stored in the storage unit 320, in response to the second operation request message QN91 to obtain the stored first electronic data DE11, the stored first communication protocol identifier HP1 and the stored first communication target identifier HT11, and uses the first specific application communication protocol PC11 to transmit an electronic message QA31 toward the first message service device 660 in the data transmission phase UT1 based on the obtained electronic data DE61, the obtained first communication protocol identifier HP1 and the obtained first communication target identifier HT11. The electronic message QA31 includes the first electronic data DE11.

For example, the electronic message QA31 is or serves as an instruction message used to instruct the first message service device 660. The first message service device 660 uses the first specific application communication protocol PC11 to transmit an electronic message QA41 toward the first communication target 511 in response to the electronic message QA31, so that the first communication target 511 receives the electronic message QA41 in a specific application communication protocol PC51 being matched with or equal to the first specific application communication protocol PC11. The electronic message QA41 includes the first electronic data DE11.

The processing unit 310 accesses or reads the second electronic data DE21, the second communication protocol identifier HP2 and the second communication target identifier HT21, which are stored in the storage unit 320, in response to the second operation request message QN91 to obtain the stored second electronic data DE21, the stored second communication protocol identifier HP2 and the stored second communication target identifier HT21, and uses the second specific application communication protocol PC21 to transmit an electronic message QA91 toward the second message service device 670 in the data transmission phase UT1 based on the obtained second electronic data DE21, the obtained second communication protocol identifier HP2 and the obtained second communication target identifier HT21. The electronic message QA91 includes the second electronic data DE21.

For example, the electronic message QA91 is or serves as an instruction message used to instruct the second message service device 670. The second message service device 670 uses the second specific application communication protocol PC21 to transmit an electronic message QAA1 toward the second communication target 521 in response to the electronic message QA91, so that the second communication target 521 receives the electronic message QAA1 in a specific application communication protocol PC81 being matched with or equal to the second specific application communication protocol PC21. The electronic message QAA1 includes the second electronic data DE21.

The input unit 340 provides the second operation request message QN91 at a provision time TB11 in response to the second user input operation PU91 using the second electricity application target BU91. For example, the data transmission phase UT1 immediately follows the provision time TB11, and has a time length. For example, the time length is equal to one selected from a group consisting of 10 minutes, 5 minutes, 3 minutes, 2 minutes, 1 minute, 50 seconds, 40 seconds, 30 seconds, 20 seconds, 10 seconds, 5 seconds, 3 seconds, 2 seconds, 1 second and 0.5 second. In some embodiments, when the processing unit 310 is configured to cause the data transmission phase UT1 to end, the processing unit 310 causes the electronic device 400 to enter a data preparation phase UP2 being after the data transmission phase UT1. For example, the processing unit 310 causes the electronic device 400 to enter the data preparation phase UP2 in response to the second operation request message QN91.

In some embodiments, the electronic device 400 is used by a user 910. The input unit 340 receives from the user 910 at least one selected from a plurality of user input operations. The plurality of user input operations include the first user input operation PU81, the second user input operation PU91, the third user input operation PK51, the fourth user input operation PK61, the fifth user input operation PV11, the sixth user input operation PV21, the user input operation PZ81 and the user input operation PZ82. In some embodiments, the electronic device 400 is used by a plurality of users including the user 910. The input unit 340 is operated by the plurality of users to receive the plurality of user input operations. For example, the plurality of users are different.

In some embodiments, each of the first specific application communication protocol PC11 and the second specific application communication protocol PC21 is selected from the plurality of different application communication protocols PC11, PC21, . . . . The plurality of different application communication protocols PC11, PC21, . . . are selected from a group consisting of the email communication protocol, the instant-messaging communication protocol, the short-message service communication protocol and the multimedia-message service communication protocol. For example, the first operation request message QN81 and the second operation request message QN91 are a plurality of user request messages, respectively. For example, the plurality of different application communication protocols PC11, PC21, . . . constitute an application communication protocol group GP1. The communication protocol identifier group GH1 is configured to identify the application communication protocol group GP1.

For example, the processing unit 310 reads at least one selected from a group consisting of the stored protocol identifier group identifier HY81, the stored first communication protocol identifier HP1 and the stored second communication protocol identifier HP2 in response to the first operation request message QN81. For example, the processing unit 310 accesses at least one selected from a group consisting of the stored protocol identifier group identifier HY81, the stored first communication protocol identifier HP1 and the stored second communication protocol identifier HP2 in response to the second operation request message QN91.

In some embodiments, the processing unit 310 receives the second electronic data DE21 from an external device 505 in the data preparation phase UP1, and stores the received second electronic data DE21 into the storage unit 320 in response to receiving the second electronic data DE21. For example, the external device 505 is coupled to the processing unit 310. Please additionally refer to FIG. 5. In some embodiments, the processing unit 310 accesses the protocol identifier group identifier HY81 in response to the second operation request message QN91, and accesses the first communication protocol identifier HP1 stored at the application memory location YC81 based on the accessed protocol identifier group identifier HY81 and the first ordinal number NP1. The processing unit 310 accesses the second communication protocol identifier HP2 stored at the application memory location YC91 based on the accessed protocol identifier group identifier HY81 and the second ordinal number NP2.

Figure 34:
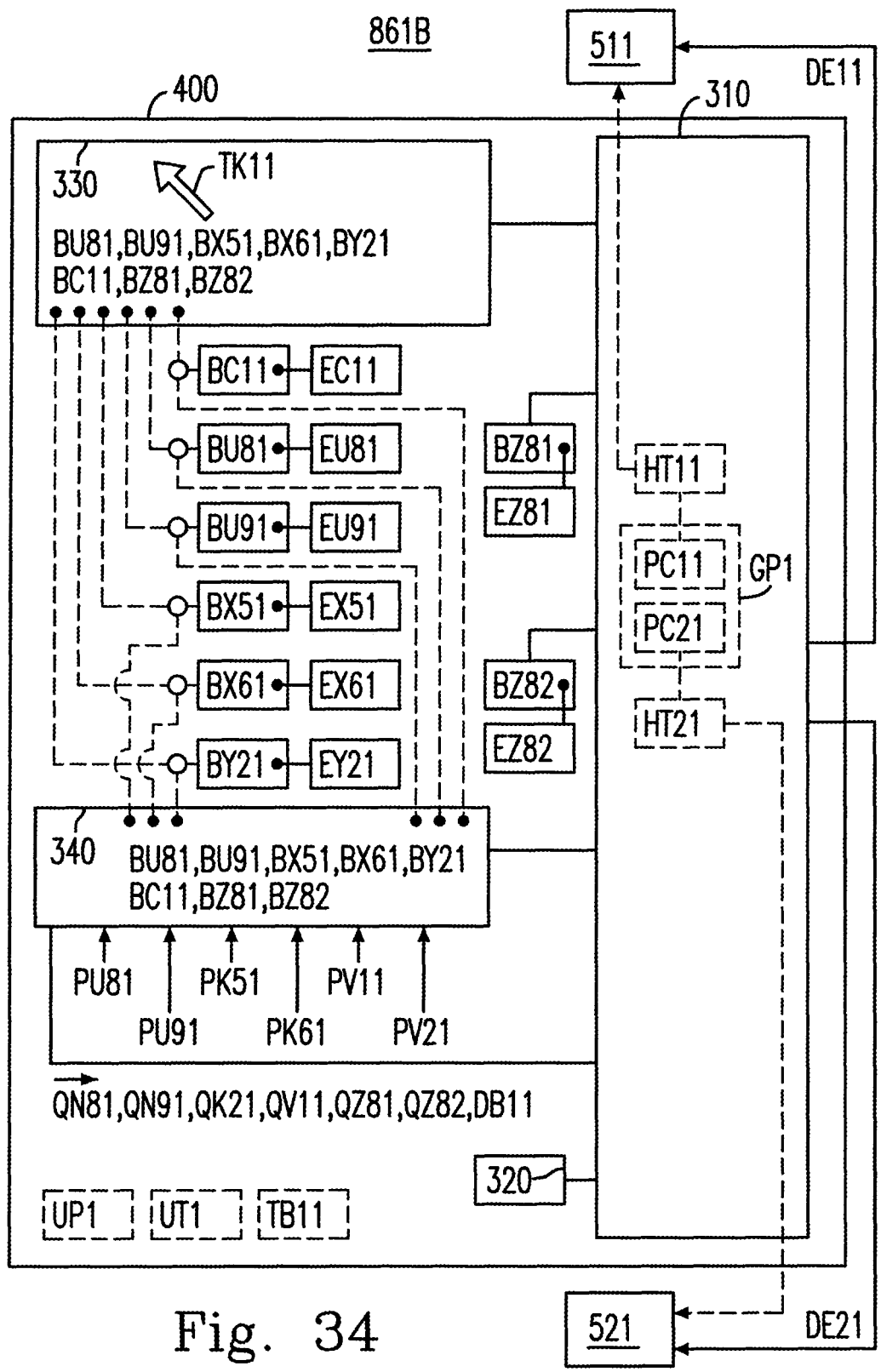
FIG. 34 is a schematic diagram showing an implementation structure of the communication system shown in FIG. 24.

Please refer to FIG. 34, which is a schematic diagram showing an implementation structure 861B of the communication system 861 shown in FIG. 24. As shown in FIG. 34, the implementation structure 861B includes the electronic device 400, the first communication target 511 and the second communication target 521. The electronic device 400 includes the processing unit 310, the storage unit 320 coupled to the processing unit 310, the input unit 340 coupled to the processing unit 310, and the display unit 330 coupled to the processing unit 310. Each of the storage unit 320, the input unit 340 and the display unit 330 is controlled by the processing unit 310.

In some embodiments, the electronic device 400 includes the first electricity application target BU81, the second electricity application target BU91, the electricity application target BX51, the electricity application target BX61, the electricity application target BY21, the third electricity application target BC11, the electricity application target BZ81 and the electricity application target BZ82, each of which is coupled to the processing unit 310. The first and the second electricity application targets BU81 and BU91, the electricity application targets BX51, BX61 and BY21, the third electricity application target BC11, and the electricity application targets BZ81 and BZ82 are respectively located at a spatial location EU81, a spatial location EU91, a spatial location EX51, a spatial location EX61, a spatial location EY21, a spatial location EC11, a spatial location EZ81 and a spatial location EZ82.

For example, the spatial locations EU81, EU91, EX51, EX61, EY21, EC11, EZ81 and EZ82 are different. For example, two selected from a group consisting of the spatial locations EU81, EU91, EX51, EX61, EY21, EC11, EZ81 and EZ82 are the same. The first and the second electricity application targets BU81 and BU91, the electricity application targets BX51, BX61 and BY21, the third electricity application target BC11, and the electricity application targets BZ81 and BZ82 respectively have a plurality of electricity application areas, or are respectively formed by the plurality of electricity application areas.

For example, the input unit 340 includes one selected from a group consisting of the first and the second electricity application targets BU81 and BU91, the electricity application targets BX51, BX61 and BY21, the third electricity application target BC11, the electricity application targets BZ81 and BZ82, and any combination thereof. Any of the first and the second electricity application targets BU81 and BU91, the electricity application targets BX51, BX61 and BY21, the third electricity application target BC11, and the electricity application targets BZ81 and BZ82 is a sensing target, wherein the sensing target includes one selected from a group consisting of a sensing area, a push button and a touch point.

The processing unit 310 causes the electronic device 400 to enter the data preparation phase UP1 by means of the first electricity application target BU81. The processing unit 310 causes the electronic device 400 to leave the data preparation phase UP1 to enter the data transmission phase UT1 by means of the second electricity application target BU91. The processing unit 310 obtains the first communication target identifier HT11 to be stored by means of the electricity application target BX51. The processing unit 310 obtains the second communication target identifier HT21 to be stored by means of the electricity application target BX61. The processing unit 310 obtains the input data DB11 by means of the electricity application target BY21.

The processing unit 310 processes the obtained second electronic data DE21 to form the first electronic data DE11 by means of the third electricity application target BC11. The processing unit 310 performs the data acquisition operation EM11 to obtain the first data derivation rule identifier HH11 by means of the electricity application target BZ81, and stores the obtained first data derivation rule identifier HH11 to the seventh application memory location YH11. The processing unit 310 performs the data acquisition operation EM12 to obtain the second data derivation rule identifier HH12 by means of the electricity application target BZ82, and stores the obtained second data derivation rule identifier HH12 to the seventh application memory location YH11.

For example, the display unit 330 includes one selected from a group consisting of the first and the second electricity application targets BU81 and BU91, the electricity application targets BX51, BX61 and BY21, the third electricity application target BC11, the electricity application targets BZ81 and BZ82, and any combination thereof. For example, the processing unit 310 is configured to cause the display unit 330 to display the first and the second electricity application targets BU81 and BU91 at the same time or for different times. For example, the processing unit 310 is configured to cause the display unit 330 to display at least two selected from a group consisting of the electricity application targets BX51, BX61 and BY21, the third electricity application target BC11, and the electricity application targets BZ81 and BZ82 at the same time or for different times.

For example, any of the first and the second electricity application targets BU81 and BU91, the electricity application targets BX51, BX61 and BY21, the third electricity application target BC11, and the electricity application targets BZ81 and BZ82 is a display target, wherein the display target includes one selected from a group consisting of a display area, an icon and a display action item.

The first electricity application target BU81 is associated with at least one selected from a group consisting of the stored protocol identifier group identifier HY81, the stored first communication protocol identifier HP1, the stored second communication protocol identifier HP2, the stored first communication target identifier HT11, the stored second communication target identifier HT21, the stored target identifier set identifier HE51, the stored target identifier set identifier HE61, the stored target identifier set identifier HG51 and the stored target identifier set identifier HG61. The second electricity application target BU91 is associated with at least one selected from a group consisting of the stored protocol identifier group identifier HY81, the stored first communication protocol identifier HP1, the stored second communication protocol identifier HP2, the stored first electronic data DE11, the stored second electronic data DE21, the stored target identifier set identifier HE51 and the stored target identifier set identifier HE61.

The electricity application target BX51 is associated with at least one of the stored first communication protocol identifier HP1 and the first application memory address AU51. The electricity application target BX61 is associated with at least one of the stored second communication protocol identifier HP2 and the second application memory address AU61. The electricity application target BY21 is associated with the fourth application memory address AG21, and is used to obtain the input data DB11. The third electricity application target BC11 is associated with the stored second address pointer LP21, the seventh application memory address AH11, the stored first data derivation rule identifier HH11 and the first address pointer LP11.

In some embodiments, the electricity application target BY21 is associated with the stored protocol identifier group identifier HY81. The input unit 340 provides an operation request message QK21 to the processing unit 310 in response to the fifth user input operation PV11 using the electricity application target BY21. The processing unit 310 reads or accesses the stored protocol identifier group identifier HY81 in response to the operation request message QK21, and reads the stored second communication protocol identifier HP2 belonging to the stored communication protocol identifier group GH1 based on the read protocol identifier group identifier HY81 and the second ordinal number NP2.

The third electricity application target BC11 is associated with the stored protocol identifier group identifier HY81. The input unit 340 provides the third operation request message QV11 to the processing unit 310 in response to the sixth user input operation PV21 using the third electricity application target BC11. The processing unit 310 reads or accesses the stored protocol identifier group identifier HY81 in response to the third operation request message QV11, and reads the stored second communication protocol identifier HP2 belonging to the stored communication protocol identifier group GH1 based on the read protocol identifier group identifier HY81 and the second ordinal number NP2.

In some embodiments, the processing unit 310 is configured to cause the display unit 330 to display a selection tool TK11. The first user input operation PU81 uses or selects the first electricity application target BU81 displayed by the display unit 330 by means of the selection tool TK11 to cause the input unit 340 to provide the first operation request message QN81 to the processing unit 310. The second user input operation PU91 uses or selects the second electricity application target BU91 displayed by the display unit 330 by means of the selection tool TK11 to cause the input unit 340 to provide the second operation request message QN91 to the processing unit 310.

The third user input operation PK51 uses the electricity application target BX51 displayed by the display unit 330 by means of the selection tool TK11 to cause the processing unit 310 to obtain the first communication target identifier HT11 to be stored. The fourth user input operation PK61 uses the electricity application target BX61 displayed by the display unit 330 by means of the selection tool TK11 to cause the processing unit 310 to obtain the second communication target identifier HT21 to be stored. The fifth user input operation PV11 uses the electricity application target BY21 displayed by the display unit 330 by means of the selection tool TK11 to cause the processing unit 310 to obtain the input data DB11.

The sixth user input operation PV21 uses the third electricity application target BC11 displayed by the display unit 330 by means of the selection tool TK11 to cause the input unit 340 to provide the third operation request message QV11 to the processing unit 310. The user input operation PZ81 uses the electricity application target BZ81 displayed by the display unit 330 by means of the selection tool TK11 to cause the input unit 340 to provide the operation request message QZ81 to the processing unit 310. The user input operation PZ82 uses the electricity application target BZ82 displayed by the display unit 330 by means of the selection tool TK11 to cause the input unit 340 to provide the operation request message QZ82 to the processing unit 310. For example, the selection tool TK11 is a cursor.

Figure 35:
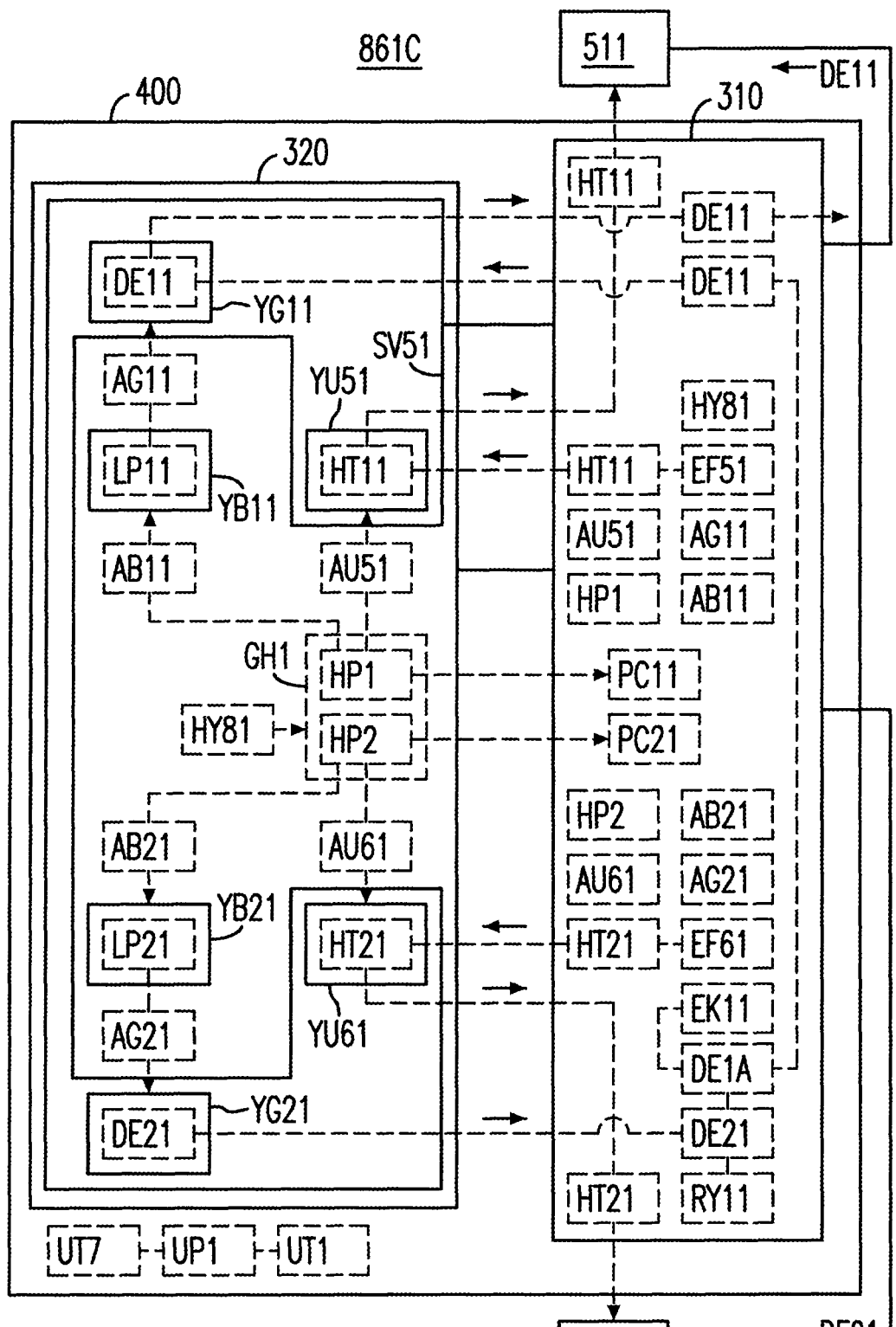
FIG. 35 is a schematic diagram showing an implementation structure of the communication system shown in FIG. 24.

Please refer to FIG. 35, which is a schematic diagram showing an implementation structure 861C of the communication system 861 shown in FIG. 24. As shown in FIG. 35, the implementation structure 861C includes the electronic device 400, the first communication target 511 and the second communication target 521. The electronic device 400 includes the processing unit 310, and the storage unit 320 coupled to the processing unit 310. The storage unit 320 is controlled by the processing unit 310.

Figure 36:
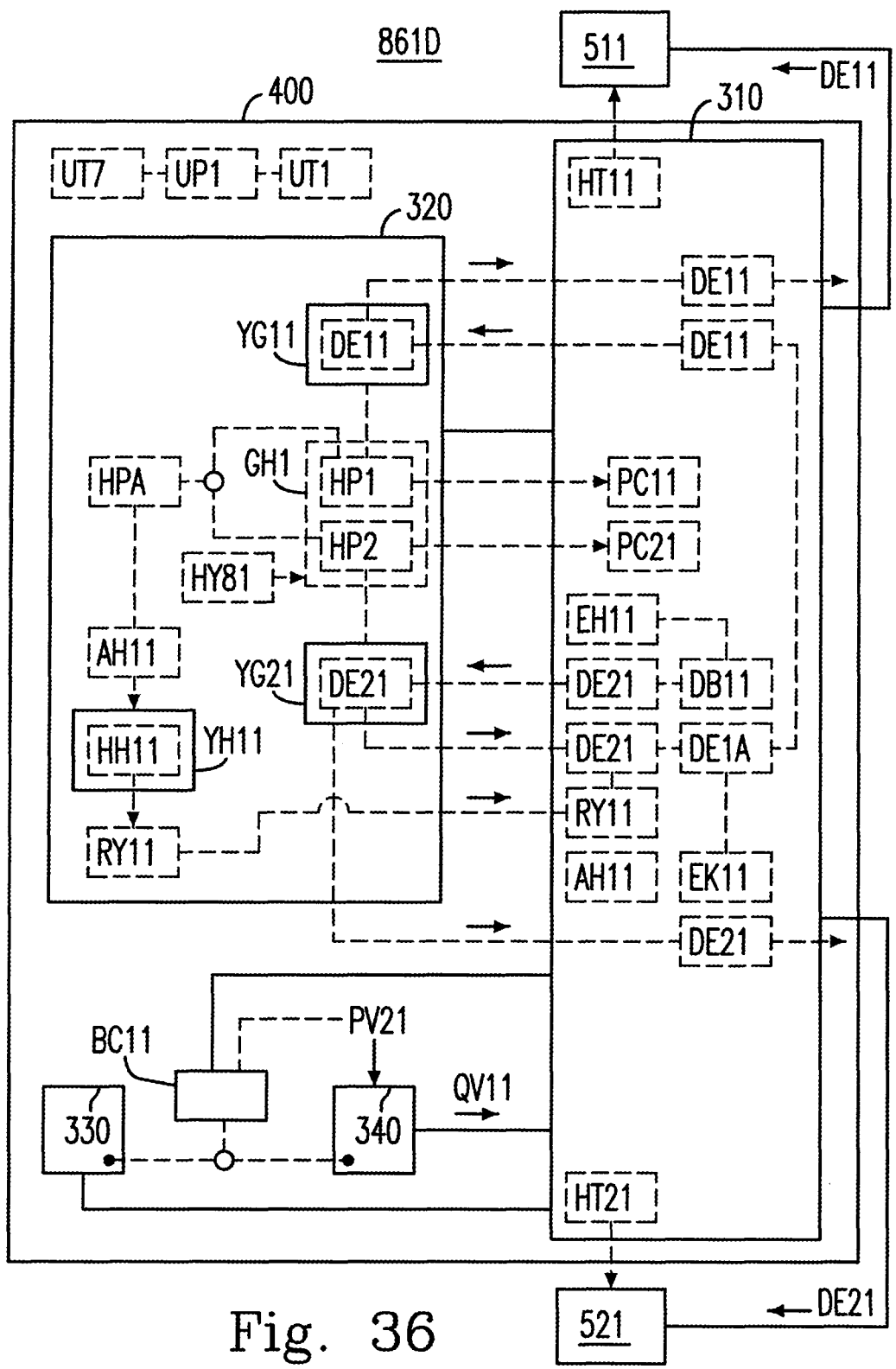
FIG. 36 is a schematic diagram showing an implementation structure of the communication system shown in FIG. 24.
Figure 37:
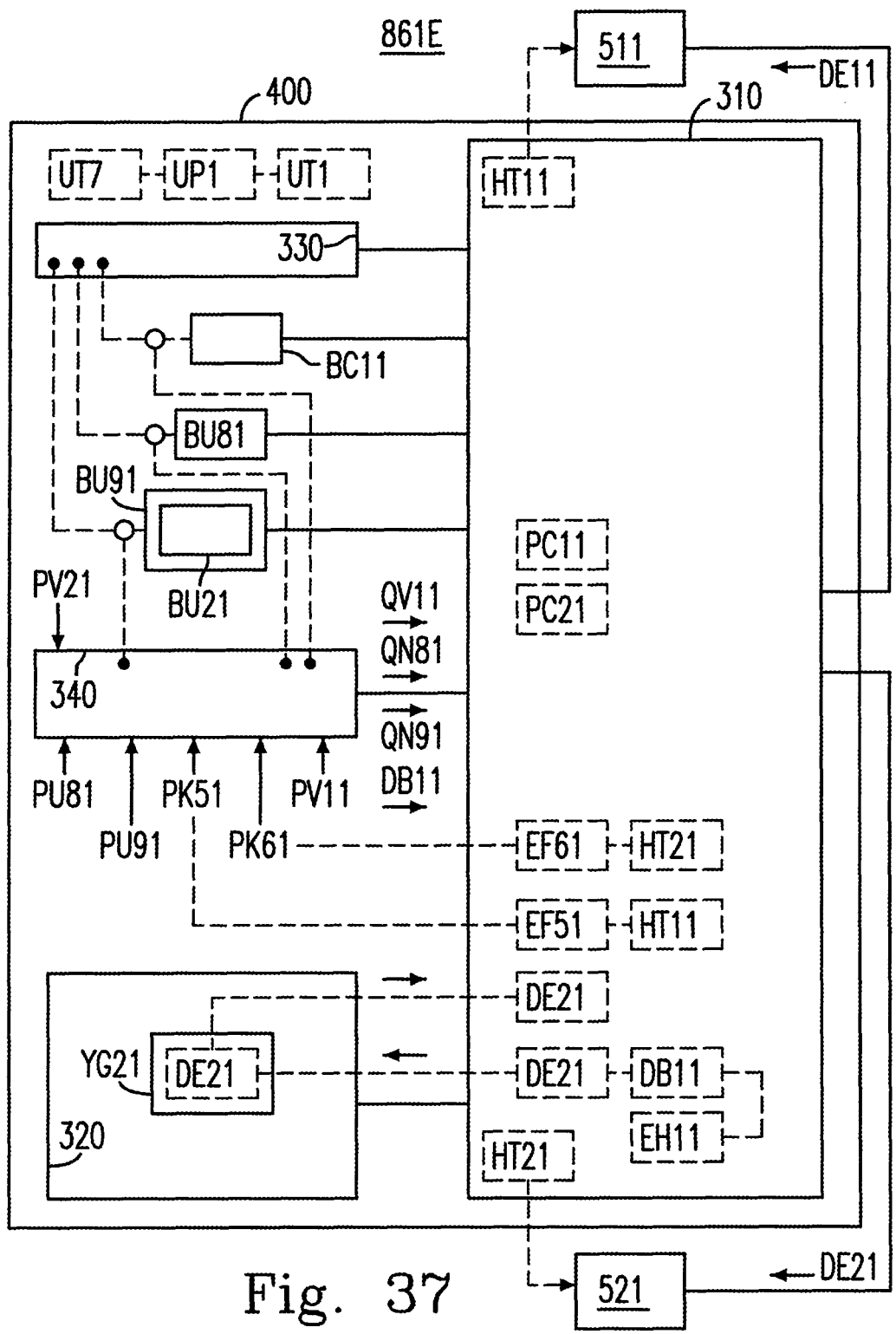
FIG. 37 is a schematic diagram showing an implementation structure of the communication system shown in FIG. 24.

Please refer to FIG. 36 and FIG. 37. FIG. 36 is a schematic diagram showing an implementation structure 861D of the communication system 861 shown in FIG. 24. FIG. 37 is a schematic diagram showing an implementation structure 861E of the communication system 861 shown in FIG. 24. As shown in FIGS. 36 and 37, each of the implementation structures 861D and 861E includes the electronic device 400, the first communication target 511 and the second communication target 521. The electronic device 400 includes the processing unit 310, the storage unit 320 coupled to the processing unit 310, the input unit 340 coupled to the processing unit 310, and the display unit 330 coupled to the processing unit 310. Each of the storage unit 320, the input unit 340 and the display unit 330 is controlled by the processing unit 310.

In some embodiments, the electronic device 400 for sending first electronic data DE11 includes a storage unit 320, an electricity-using target BU21 and a processing unit 310. The storage unit 320 stores the first electronic data DE11. The processing unit 310 is coupled to the storage unit 320 and the electricity-using target BU21, is configured to obtain a first communication protocol identifier HP1 configured to identify a first specific application communication protocol PC11 by means of the electricity-using target BU21, accesses the stored first electronic data DE11 based on the first communication protocol identifier HP1, and sends the accessed first electronic data DE11 toward the first communication target 511 based on the first specific application communication protocol PC11.

In some embodiments, the electronic device 400 sequentially experiences a data transmission phase UT7, a data preparation phase UP1 and a data transmission phase UT1, sends second electronic data DE21 in the data transmission phase UT7, prepares in the data preparation phase UP1 the first electronic data DE11 derived from the second electronic data DE21, and sends the first electronic data DE11 toward the first communication target 511 in the data transmission phase UT1. The first specific application communication protocol PC11 is selected from a plurality of different application communication protocols PC11, PC21, . . . . The first communication protocol identifier HP1 belongs to a communication protocol identifier group GH1 identified by a protocol identifier group identifier HY81. The storage unit 320 further stores the communication protocol identifier group GH1, the protocol identifier group identifier HY81, and a first address pointer LP11 associated with the stored first communication protocol identifier HP1 and the first electronic data DE11.

The processing unit 310 is configured to access the stored protocol identifier group identifier HY81 in the data transmission phase UT1, and accesses the stored first communication protocol identifier HP1 belonging to the stored communication protocol identifier group GH1 based on the accessed protocol identifier group identifier HY81 to obtain the stored first communication protocol identifier HP1 from the storage unit 320. The processing unit 310 uses the stored first address pointer LP11 to access the stored first electronic data DE11 in the data transmission phase UT1 based on the obtained first communication protocol identifier HP1.

In some embodiments, one of the input unit 340 and the display unit 330 includes a first electricity application target BU81 coupled to the processing unit 310. One of the input unit 340 and the display unit 330 includes a second electricity application target BU91 coupled to the processing unit 310. For example, the second electricity application target BU91 is the same as or different from the first electricity application target BU81. The electricity-using target BU21 is the second electricity application target BU91. One of the input unit 340 and the display unit 330 includes a third electricity application target BC11 coupled to the processing unit 310. The stored communication protocol identifier group GH1 include a second communication protocol identifier HP2 configured to identify a second specific application communication protocol PC21. For example, the second specific application communication protocol PC21 is different from the first specific application communication protocol PC11, and is selected from the plurality of different application communication protocols PC11, PC21, . . . .

The storage unit 320 further stores a first data derivation rule identifier HH11 associated with the third electricity application target BC11, and a first data derivation rule RY11 identified by the first data derivation rule identifier HH11. The storage unit 320 further stores a first communication target identifier HT11 associated with the first communication protocol identifier HP1, and a second communication target identifier HT21 associated with the second communication protocol identifier HP2. For example, the first communication target identifier HT11 is configured to identify the first communication target 511. The second communication target identifier HT21 is configured to identify a second communication target 521.

The storage unit 320 has a first application memory location YU51 identified based on a first application memory address AU51, and a second application memory location YU61 identified based on a second application memory address AU61. For example, the first application memory address AU51 is determined according to the stored first communication protocol identifier HP1. The second application memory address AU61 is determined according to the second communication protocol identifier HP2.

The storage unit 320 further has a third application memory location YG11 identified by a third application memory address AG11, and a fourth application memory location YG21 identified by a fourth application memory address AG21. For example, the first electronic data DE11 is configured to be stored at the third application memory location YG11. The second electronic data DE21 is configured to be stored at the fourth application memory location YG21. The storage unit 320 further stores a second address pointer LP21 associated with the second communication protocol identifier HP2. For example, the first address pointer LP11 points to the third application memory address AG11. The second address pointer LP21 points to the fourth application memory address AG21.

The storage unit 320 further has a fifth application memory location YB11 identified by a fifth application memory address AB11, and a sixth application memory location YB21 identified by a sixth application memory address AB21. For example, the fifth application memory address AB11 is determined according to the stored first communication protocol identifier HP1. The sixth application memory address AB21 is determined according to the stored second communication protocol identifier HP2. The first address pointer LP11 is configured to be stored at the fifth application memory location YB11. The second address pointer LP21 is configured to be stored at the sixth application memory location YB21.

The storage unit 320 further has a seventh application memory location YH11 identified by a seventh application memory address AH11. For example, the seventh application memory address AH11 is determined according to a designated protocol identifier HPA being one of the stored first communication protocol identifier HP1 and the stored second communication protocol identifier HP2. The third electricity application target BC11 is associated with the seventh application memory address AH11. The first data derivation rule identifier HH11 is stored at the seventh application memory location YH11 based on the seventh application memory address AH11.

In some embodiments, each of the first and the second electricity application targets BU81 and BU91 is associated with the stored protocol identifier group identifier HY81. The input unit 340 receives a first user input operation PU81 using the first electricity application target BU81 to provide a first operation request message QN81 to the processing unit 310. The input unit 340 receives a second user input operation PU91 occurred later than the first user input operation PU81, and provides a second operation request message QN91 to the processing unit 310 in response to the second user input operation PU91 using the second electricity application target BU91.

The processing unit 310 causes the electronic device 400 to enter the data transmission phase UT7 and the data preparation phase UP1 in response to the first operation request message QN81. For example, when the processing unit 310 is configured to cause the data transmission phase UT7 to end, the processing unit 310 causes the electronic device 400 to leave the data transmission phase UT7 to enter the data preparation phase UP1 being after the data transmission phase UT7.

In some embodiments, the processing unit 310 accesses the stored protocol identifier group identifier HY81 in the data transmission phase UT7, and accesses the stored second communication protocol identifier HP2 belonging to the stored communication protocol identifier group GH1 in the data transmission phase UT7 based on the accessed protocol identifier group identifier HY81. The processing unit 310 uses the accessed second communication protocol identifier HP2 to obtain the second application memory address AU61 in the data transmission phase UT7, and accesses the second communication target identifier HT21 stored at the second application memory location YU61 based on the obtained second application memory address AU61.

The processing unit 310 uses the accessed second communication protocol identifier HP2 to obtain the sixth application memory address AB21 in the data transmission phase UT7, accesses the second address pointer LP21 based on the obtained sixth application memory address AB21 to obtain the fourth application memory address AG21, and accesses the second electronic data DE21 stored at the fourth application memory location YG21 based on the obtained fourth application memory address AG21. The processing unit 310 uses the second specific application communication protocol PC21 to send the accessed second electronic data DE21 toward the second communication target 521 in the data transmission phase UT7 based on the accessed second electronic data DE21, the accessed second communication protocol identifier HP2 and the accessed second communication target identifier HT21.

In some embodiments, the processing unit 310 causes the electronic device 400 to leave the data transmission phase UT7 to enter the data preparation phase UP1 in response to sending the accessed second electronic data DE21. The processing unit 310 causes the storage unit 320 to prepare first electronic data DE11 in the data preparation phase UP1. The processing unit 310 reads the stored protocol identifier group identifier HY81 in the data preparation phase UP1.

The processing unit 310, in the data preparation phase UP1, reads the stored first communication protocol identifiers HP1 belonging to the stored communication protocol identifier group GH1 based on the read protocol identifier group identifier HY81 to obtain the stored first communication protocol identifiers HP1. The processing unit 310 reads the stored second communication protocol identifiers HP2 belonging to the stored communication protocol identifier group GH1 in the data preparation phase UP1 based on the read protocol identifier group identifier HY81.

The input unit 340 receives a third user input operation PK51 in the data preparation phase UP1. The processing unit 310 performs a first data acquisition operation EF51 in response to the third user input operation PK51 to obtain the first communication target identifier HT11 to be stored. The processing unit 310 fetches the first application memory address AU51 in the data preparation phase UP1 based on the read first communication protocol identifier HP1, and causes the storage unit 320 to store the obtained first communication target identifier HT11 at the first application memory location YU51 based on the fetched first application memory address AU51.

In some embodiments, the third electricity application target BC11 is associated with the stored second address pointer LP21, the seventh application memory address AH11, the stored first data derivation rule identifier HH11 and the first address pointer LP11. The input unit 340, in the data preparation phase UP1, receives a sixth user input operation PV21 between the first user input operation PU81 and the second user input operation PU91, and provides a third operation request message QV11 to the processing unit 310 in response to the sixth user input operation PV21 using the third electricity application target BC11.

The processing unit 310 uses the designated protocol identifier HPA to fetch the seventh application memory address AH11 in response to the third operation request message QV11, reads the first data derivation rule identifier HH11 stored at the seventh application memory location YH11 based on the fetched seventh application memory address AH11, and reads the stored first data derivation rule RY11 based on the read first data derivation rule identifier HH11. The processing unit 310 reads the second electronic data DE21 stored at the fourth application memory location YG21 in response to the third operation request message QV11 to obtain the stored second electronic data DE21 from the storage unit 320.

The processing unit 310 processes the read second electronic data DE21 to form third electronic data DE1A based on the read first data derivation rule RY11. For example, the third electronic data DE1A is equal to one of the obtained second electronic data DE21 and a portion of the read second electronic data DE21. The processing unit 310 applies the read first data derivation rule RY11 to the read second electronic data DE21 to form the third electronic data DE1A derived from the read second electronic data DE21. Under a condition that the processing unit 310 forms the third electronic data DE1A, the processing unit 310 performs a data derivation operation EK11 to form the first electronic data DE11 derived from the third electronic data DE1A. For example, the first electronic data DE11 is the same as or different from the third electronic data DE1A. The data derivation operation EK11 is one of a null derivation operation and a practical derivation operation.

The processing unit 310 fetches the fifth application memory address AB11 in the data preparation phase UP1 based on the obtained first communication protocol identifier HP1, reads the first address pointer LP11 based on the fetched fifth application memory address AB11 to fetch the third application memory address AG11, and causes the storage unit 320 to store the formed first electronic data DE11 at the third application memory location YG11 based on the fetched third application memory address AG11. For example, the second user input operation PU91 is further associated with the stored first electronic data DE11.

In some embodiments, the processing unit 310 leaves the data preparation phase UP1 to enter the data transmission phase UT1 in response to the second operation request message QN91, and accesses the stored protocol identifier group identifier HY81 in the data transmission phase UT1. The processing unit 310 accesses the stored first communication protocol identifier HP1 belonging to the stored communication protocol identifier group GH1 based on the accessed protocol identifier group identifier HY81 to obtain the stored first communication protocol identifier HP1.

The processing unit 310 uses the obtained first communication protocol identifier HP1 to obtain the first application memory address AU51 in the data transmission phase UT1, and accesses the first communication target identifier HT11 stored at the first application memory location YU51 based on the obtained first application memory address AU51. The processing unit 310 uses the obtained first communication protocol identifier HP1 to obtain the fifth application memory address AB11 in the data transmission phase UT1, accesses the first address pointer LP11 based on the obtained fifth application memory address AB11 to obtain the third application memory address AG11, and accesses the first electronic data DE11 stored at the third application memory location YG11 based on the obtained third application memory address AG11.

The processing unit 310 uses the first specific application communication protocol PC11 to send the accessed first electronic data DE11 toward the first communication target 511 in the data transmission phase UT1 based on the accessed first electronic data DE11, the obtained first communication protocol identifier HP1 and the accessed first communication target identifier HT11. The plurality of different application communication protocols PC11, PC21, . . . are selected from a group consisting of an email communication protocol, an instant-messaging communication protocol, a short-message service communication protocol and a multimedia-message service communication protocol. The first communication target identifier HT11 is the same as or different from the second communication target identifier HT21. The first communication target 511 is the same as or different from the second communication target 521.

Figure 38:
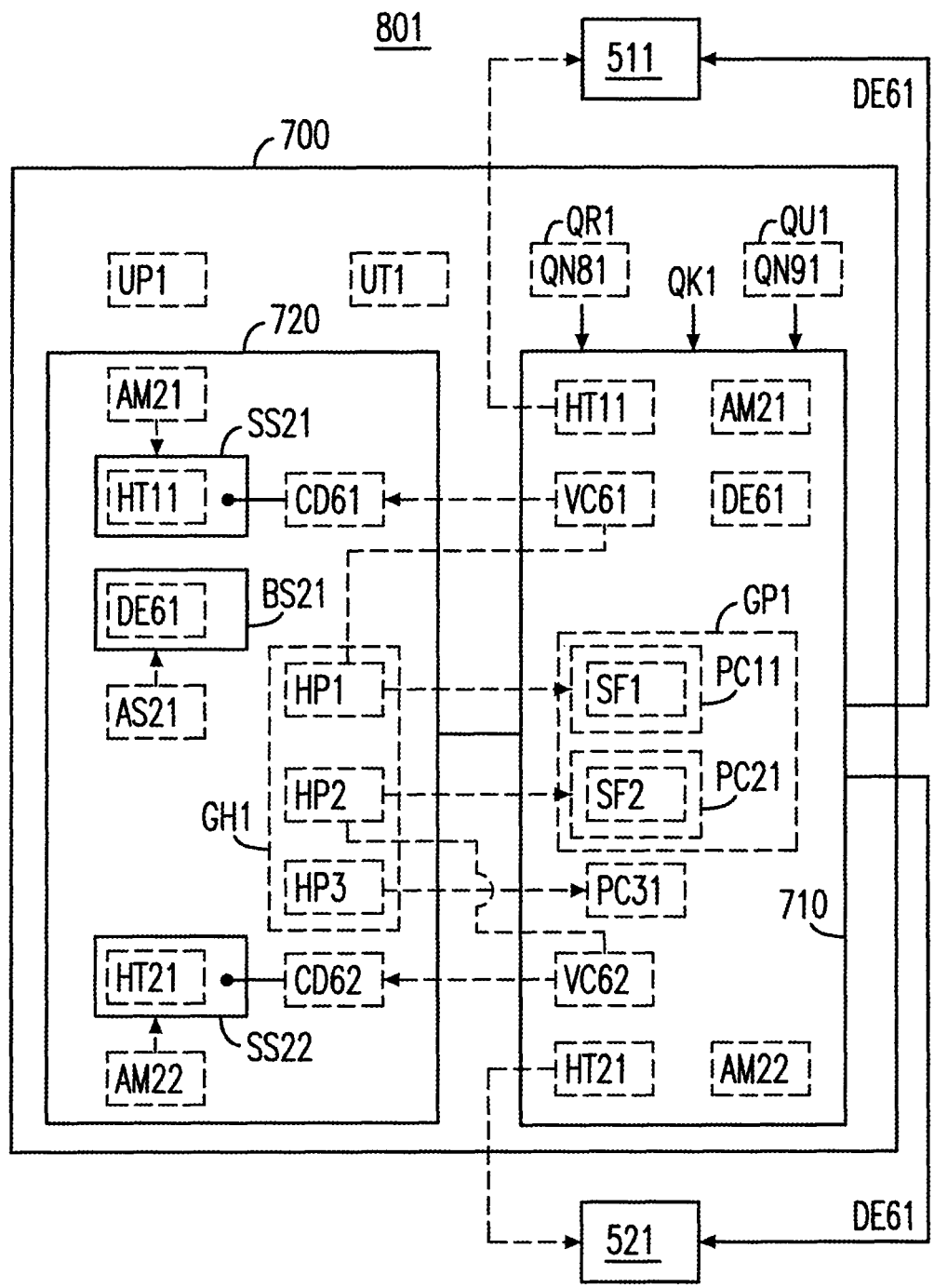
FIG. 38 is a schematic diagram showing a communication system according to various embodiments of the present disclosure.

Please refer to FIG. 38, which is a schematic diagram showing a communication system 801 according to various embodiments of the present disclosure. The communication system 801 includes an electronic device 700, a first communication target 511 and a second communication target 521. For example, the electronic device 700 is to communicate with the first communication target 511. The electronic device 700 includes a storage unit 720 and a processing unit 710. The storage unit 720 stores a first communication protocol identifier HP1 configured to identify a first specific application communication protocol PC1. The processing unit 710 is coupled to the storage unit 720. In addition, the processing unit 710, in response to a specific request signal QK1, obtains an electronic data DE61 and a first communication target identifier HT11 accessed based on the first communication protocol identifier HP1 to send the electronic data DE61 in the first specific application communication protocol PC11 toward the first communication target 511 identified by the first communication target identifier HT11.

In some embodiments, the first communication protocol identifier HP1 is configured to correspond to a first specific data capacity value VC61 representing a first data capacity CD61. For example, the first specific data capacity value VC61 is determined beforehand. The processing unit 710 obtains the first specific data capacity value VC61 based on the first communication protocol identifier HP1. The processing unit 710 allocates in the storage unit 720 a first storage space SS21 having the first data capacity CD61 based on the first specific data capacity value VC61 to obtain a first memory address AM121 configured to identify the first storage space SS21. The processing unit 710 allocates a storage block BS21 in the storage unit 720 to obtain a storage address AS21 configured to identify the storage block BS21. For example, the storage address AS21 is dependent on or independent from the first communication protocol identifier HP1.

Under a condition that the storage address AS21 is dependent on the first communication protocol identifier HP1, the processing unit 710 obtains the storage address AS21 based on the first communication protocol identifier HP1, and causes a display unit 730 to display the electronic data DE61 on a display block BD21 based on the first communication protocol identifier HP1. Under a condition that the storage address AS21 is independent from the first communication protocol identifier HP1, the processing unit 710 obtains the storage address AS21 being independent from the first communication protocol identifier HP1. The first specific application communication protocol PC11 has a first target identifier format stipulation SF1.

In some embodiments, the specific request signal QK1 is one of a first effective request signal QR1 and a second effective request signal QU1. The processing unit 710 causes the electronic device 700 to enter a first data preparation phase UP1 in response to the first effective request signal QR1. In the first data preparation phase UP1, the processing unit 710 obtains the electronic data DE61 and the first communication target identifier HT11 complying with the first target identifier format stipulation SF1, causes the storage unit 720 to store the first communication target identifier HT11 in the first storage space SS21 based on the obtained first memory address AM21, and causes the storage unit 720 to store the electronic data DE61 in the storage block BS21 based on the obtained storage address AS21. The processing unit 710 causes the electronic device 700 to leave the first data preparation phase UP1 to enter a first data transmission phase UT1 in response to the second effective request signal QU1.

For example, the first effective request signal QR1 includes a first operation request message QN81. The processing unit 710 causes the electronic device 700 to enter the first data preparation phase UP1 in response to the first operation request message QN81. The second effective request signal QU1 includes a second operation request message QN91. The processing unit 710 causes the electronic device 700 to leave the first data preparation phase UP1 to enter the first data transmission phase UT1 in response to the second operation request message QN91.

In the first data transmission phase UT1 being after the first data preparation phase UP1, the processing unit 710 accesses the first communication target identifier HT11 stored in the first storage space SS21 based on the obtained first memory address AM21 to obtain the first communication target identifier HT11, accesses the electronic data DE61 stored in the storage block BS21 based on the obtained storage address AS21 to obtain the electronic data DE61, and uses the first specific application communication protocol PC11 to send the electronic data DE61 toward the first communication target 511 in response to obtaining the first communication target identifier HT11 and the electronic data DE61. For example, the processing unit 710 obtains the first memory address AM21 based on the first communication protocol identifier HP1, and thereby accesses the first communication target identifier HT11 stored in the first storage space SS21 based on the first communication protocol identifier HP1. Under a condition that the storage address AS21 is dependent on the first communication protocol identifier HP1, the storage block BS21 is located in one of the inside and the outside of the first storage space SS21.

In some embodiments, the first communication protocol identifier HP1 belongs to a specific communication protocol identifier group GH1 stored in the storage unit 720. The processing unit 710 obtains the first communication protocol identifiers HP1 and a second communication protocol identifier HP2 from the specific communication protocol identifier group GH1 including the first and the second communication protocol identifiers HP1 and HP2. For example, the specific communication protocol identifier group GH1 is a specific communication protocol identifier array, and is determined beforehand. For example, the second communication protocol identifier HP2 is configured to identify a second specific application communication protocol PC21 being different from the first specific application communication protocol PC11.

The second communication protocol identifier HP2 is configured to correspond to a second specific data capacity value VC62 representing a second data capacity CD62. For example, the second specific data capacity value VC62 is the same as or different from the first specific data capacity value VC61, and is determined beforehand. The processing unit 710 obtains the second specific data capacity value VC62 based on the second communication protocol identifier HP2. The processing unit 710 allocates in the storage unit 720 a second storage space SS22 having the second data capacity CD62 based on the second specific data capacity value VC62 to obtain a second memory address AM22 configured to identify the second storage space SS22. For example, the second storage space SS22 is different from the first storage space SS21. Under a condition that the storage address AS21 is independent from the first communication protocol identifier HP1 and is dependent on the second communication protocol identifier HP2, the processing unit 710 obtains the storage address AS21 based on the second communication protocol identifier HP2.

The second specific application communication protocol PC21 has a second target identifier format stipulation SF2. In the first data preparation phase UP1, the processing unit 710 obtains the second communication target identifier HT21 complying with the second target identifier format stipulation SF2, and causes the storage unit 720 to store the second communication target identifier HT21 in the second storage space SS22 based on the obtained second memory address AM22. For example, the second communication target identifier HT21 is configured to identify the second communication target 521.

In the first data transmission phase UT1, the processing unit 710 accesses the second communication target identifier HT21 stored in the second storage space SS22 based on the obtained second memory address AM22 to obtain the second communication target identifier HT21, and uses the second specific application communication protocol PC21 to send the electronic data DE61 toward the second communication target 521 in response to obtaining the second communication target identifier HT21 and the electronic data DE61. For example, the processing unit 710 obtains the second memory address AM22 based on the second communication protocol identifier HP2, and thereby accesses the second communication target identifier HT21 stored in the second storage space SS22 based on the second communication protocol identifier HP2.

The storage address AS21 is dependent on a third communication protocol identifier HP3 selected from the specific communication protocol identifier group GH1. The third communication protocol identifier HP3 is configured to identify a third specific application communication protocol PC31. The specific communication protocol identifier group GH1 is configured to identify a specific application communication protocol group GP1 consisting of a plurality of different application communication protocols PC11, PC21, . . . . Each of the first, the second and the third specific application communication protocols PC11, PC21 and PC31 belongs to the specific application communication protocol group GP1.

Each of the first and the second specific application communication protocols PC11 and PC21 is one selected from a plurality of predetermined application communication protocols. For example, the plurality of predetermined application communication protocols include one selected from a group consisting of an email communication protocol, a short-message service communication protocol, a multimedia-message service communication protocol and an instant-messaging communication protocol. The third specific application communication protocol PC31 is one selected from a group consisting of the email communication protocol, the short-message service communication protocol, the multimedia-message service communication protocol and the instant-messaging communication protocol. The plurality of different application communication protocols PC11, PC21, . . . are selected from the plurality of predetermined application communication protocols. For example, the plurality of predetermined application communication protocols are respectively a plurality of predetermined data transmission communication protocols. Under a condition that the storage address AS21 is dependent on the second communication protocol identifier HP2, the storage block BS21 is located in one of the inside and the outside of the second storage space SS22.

Figure 39:
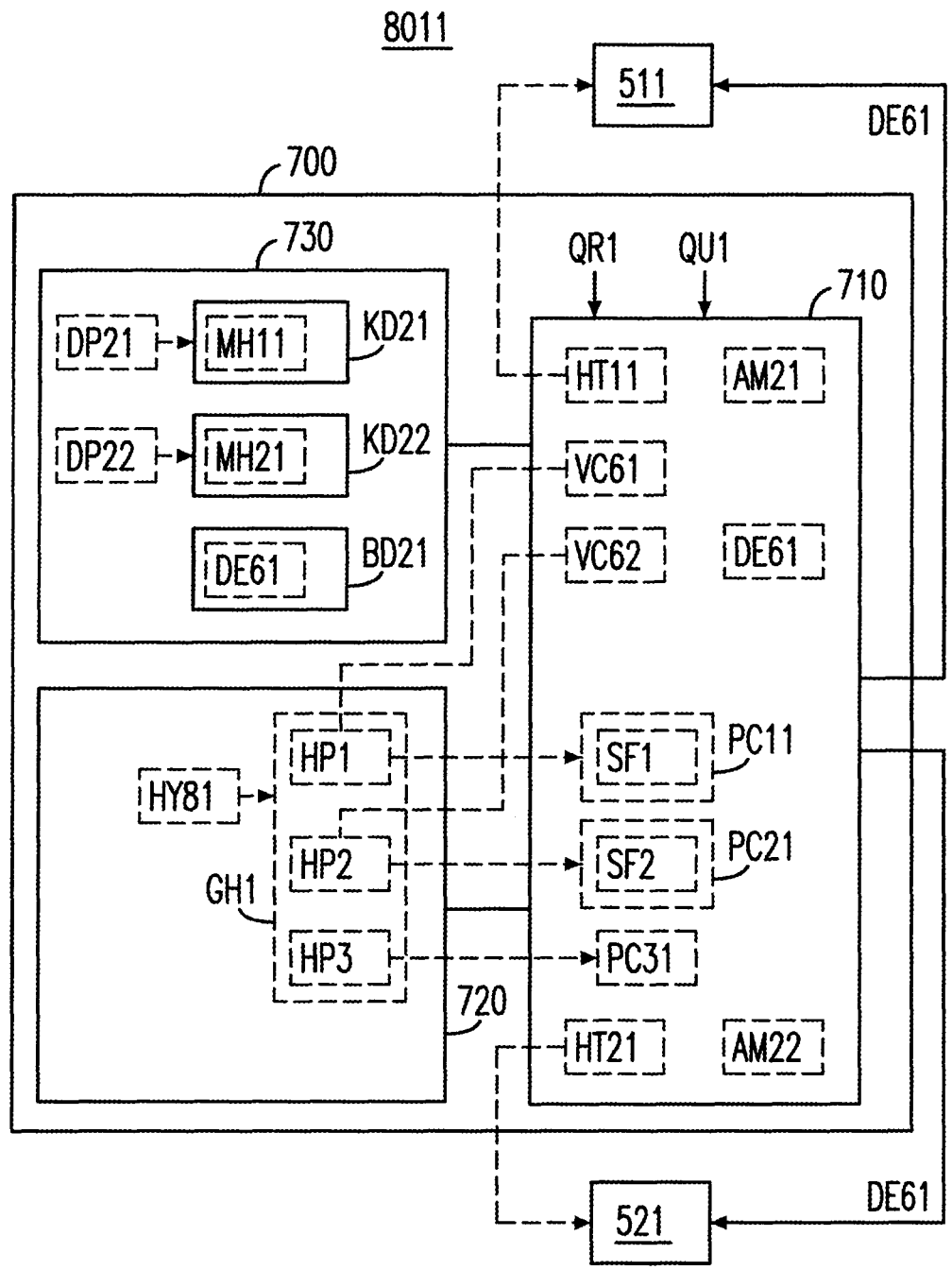
FIG. 39 is a schematic diagram showing an implementation structure of the communication system shown in FIG. 38.

Please refer to FIG. 39, which is a schematic diagram showing an implementation structure 8011 of the communication system 801 shown in FIG. 38. As shown in FIG. 39, the implementation structure 8011 includes the electronic device 700, the first communication target 511 and the second communication target 521. The electronic device 700 further includes a display unit 730 coupled to the processing unit 710. In some embodiments, the display unit 730 includes a first display area KD21 represented by a first display coordinate data DP21, and a display block BD21 being different from the first display area KD21. For example, the first display coordinate data DP21 is associated with the first communication protocol identifier HP1, and is determined based on the first specific data capacity value VC61. The processing unit 710 obtains the first display coordinate data DP21 based on the first communication protocol identifier HP1 to cause the display unit 730 to display a first communication target identification information MH11, representing the first communication target identifier HT11, on the first display area KD21. In addition, the processing unit 710 causes the display unit 730 to display the electronic data DE61 on the display block BD21.

The display unit 730 further includes a second display area KD22 represented by a second display coordinate data DP22. The first display area KD21, the second display area KD22 and the display block BD21 are different. The second display coordinate data DP22 is associated with the second communication protocol identifier HP2, and is determined based on the second specific data capacity value VC62. The processing unit 710 obtains the second display coordinate data DP22 based on the second communication protocol identifier HP2 to cause the display unit 730 to display a second communication target identification information MH21 representing the second communication target identifier HT21 on the second display area KD22.

In some embodiments, the specific communication protocol identifier group GH1 is identified by a protocol identifier group identifier HY81. The storage unit 720 stores the specific communication protocol identifier group GH1 and the protocol identifier group identifier HY81. The processing unit 710 is configured to support the first and the second specific application communication protocols PC11 and PC21, is configured to read the stored protocol identifier group identifier HY81 in the first data preparation phase UP1, and obtains the stored first and the stored second communication protocol identifiers HP1 and HP2 from the stored specific communication protocol identifier group GH1 based on the read protocol identifier group identifier HY81.

Figure 40:
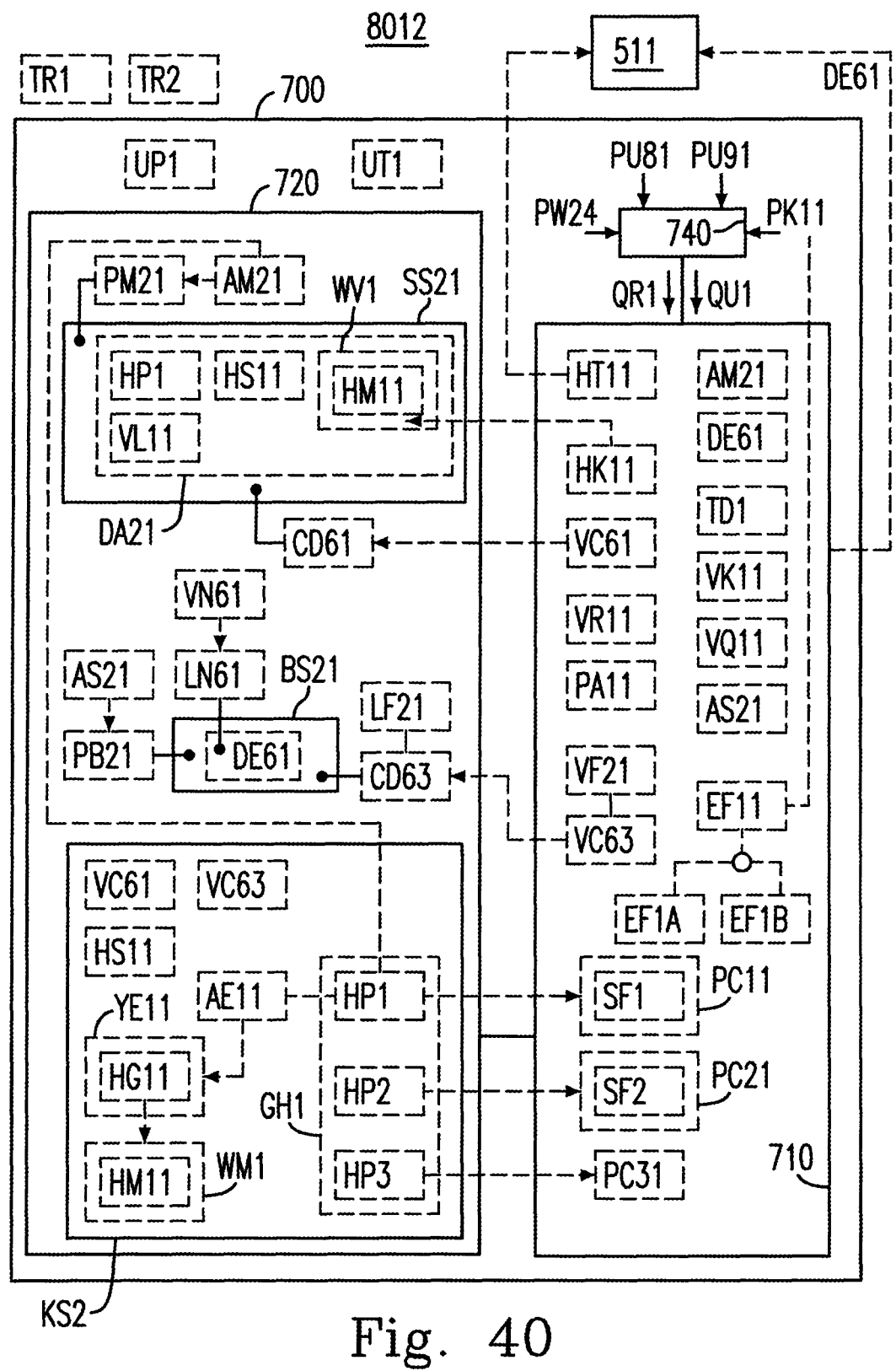
FIG. 40 is a schematic diagram showing an implementation structure of the communication system shown in FIG. 38.

Please refer to FIG. 40, which is a schematic diagram showing an implementation structure 8012 of the communication system 801 shown in FIG. 38. Please additionally refer to FIG. 38. The implementation structure 8012 includes the electronic device 700 and the first communication target 511. The electronic device 700 includes the storage unit 720, the processing unit 710, and an input unit 740 coupled to the processing unit 710. The storage unit 720 includes a storage area KS2, the first storage space SS21, the second storage space SS22 and the storage block BS21, and stores the specific communication protocol identifier group GH1. For example, the first storage space SS21 is one of a first nonvolatile memory space and a first volatile memory space. The second storage space SS22 is one of a second nonvolatile memory space and a second volatile memory space. The storage block BS21 is one of a nonvolatile memory block and a volatile memory block.

The first communication protocol identifier HP1 belonging to the specific communication protocol identifier group GH1 corresponds to the first specific data capacity value VC61 determined according to the first specific application communication protocol PC11. For example, the first specific data capacity value VC61 represents the first data capacity CD61 used to allocate the first storage space SS21, and is determined according to the first specific application communication protocol PC11 beforehand.

The processing unit 710 obtains the first communication protocol identifier HP1 from the specific communication protocol identifier group GH1, obtains the first specific data capacity value VC61 based on the obtained first communication protocol identifier HP1, and allocates in the storage unit 720 the first storage space SS21 having the first data capacity CD61 based on the first specific data capacity value VC61 to obtain the first memory address AM21 configured to identify the first storage space SS21. For example, the first storage space SS21 is located at a first memory location PM21 identified by the first memory address AM21, and is thereby identified by the first memory address AM21. For example, the storage unit 720 has the first memory location PM21 identified based on the first memory address AM21. The first memory address AM21 is determined according to the first communication protocol identifier HP1 belonging to the specific communication protocol identifier group GH1.

In some embodiments, the storage unit 720 stores in the storage area KS2 the first memory address AM21 corresponding to the first communication protocol identifier HP1. The processing unit 710, based on the first communication protocol identifier HP1 obtained from the specific communication protocol identifier group GH1 stored in the storage area KS2, accesses the first memory address AM21 stored in the storage area KS2 to obtain the first memory address AM21 from the storage area KS2.

The processing unit 710 obtains the first memory address AM21 to identify the first storage space SS21, and causes the storage unit 720 to store in the first storage space SS21 a first application data DA21, including the electronic data DE61 and the first communication target identifier HT11, based on the obtained first memory address AM21. For example, the first storage space SS21 is allocated enough to contain the first application data DA21.

In some embodiments, the specific communication protocol identifier group GH1 include the third communication protocol identifier HP3. The third communication protocol identifier HP3 is configured to identify the third specific application communication protocol PC31 included in the plurality of different application communication protocols PC11, PC21, . . . . The storage block BS21 is allocated based on the third communication protocol identifier HP3, and is identified by the storage address AS21. When the third communication protocol identifier HP3 is the first communication protocol identifier HP1, the storage address AS21 is dependent on the first memory address AM21. When the third communication protocol identifier HP3 is the second communication protocol identifier HP2, the storage address AS21 is dependent on the second memory address AM22.

The third communication protocol identifier HP3 corresponds to a third specific data capacity value VC63 determined according to the third specific application communication protocol PC31. For example, the third specific data capacity value VC63 represents a third data capacity CD63 used to allocate the storage block BS21, and is determined according to the third specific application communication protocol PC31 beforehand. The third specific data capacity value VC63 and the third data capacity CD63 are respectively a first data limit length value VF21 and a first data limit length LF21. The third specific data capacity value VC63 is different from any of the first and the second specific data capacity values VC61 and VC62, so that the third data capacity CD63 is different from any of the first and the second data capacities CD61 and CD62.

Under a condition that the plurality of different application communication protocols PC11, PC21, . . . are considered, the first data limit length value VF21 is one selected from a group consisting of a longest limit length value, a shortest limit length value, and a middle limit length value. When the first data limit length value VF21 is the longest limit length value, the third specific application communication protocol PC31 is one of the email communication protocol and the multimedia-message service communication protocol. When the first data limit length value VF21 is the shortest limit length value, the third specific application communication protocol PC31 is one of the short-message service communication protocol and the instant-messaging communication protocol.

The processing unit 710 obtains the third communication protocol identifier HP3 from the specific communication protocol identifier group GH1, obtains the third specific data capacity value VC63 based on the obtained third communication protocol identifier HP3, and allocates in the storage unit 720 the storage block BS21 having the third data capacity CD63 based on the third specific data capacity value VC63 to obtain the storage address AS21 configured to identify the storage block BS21.

For example, the storage block BS21 is located at a storage location PB21 identified by the storage address AS21, and is thereby identified by the storage address AS21. The processing unit 710 obtains the storage address AS21 to identify the storage block BS21, and causes the storage unit 720 to store the electronic data DE61 in the storage block BS21 based on the obtained storage address AS21. For example, the storage block BS21 is allocated enough to contain the electronic data DE61, and is a storage space. For example, the storage location PB21 is a memory location.

In some embodiments, the storage unit 720 includes the storage area KS2 being different from the first storage space SS21, and stores in the storage area KS2 the specific communication protocol identifier group GH1, the first specific data capacity value VC61 corresponding to the first communication protocol identifier HP1, and the third specific data capacity value VC63 corresponding to the third communication protocol identifier HP3. For example, the storage area KS2 is one of a nonvolatile memory area and a volatile memory area, and is a storage space.

The processing unit 710 obtains the first, the second and the third communication protocol identifiers HP1, HP2 and HP3 from the specific communication protocol identifier group GH1 stored in the storage area KS2, accesses the first specific data capacity value VC61 stored in the storage area KS2 based on the obtained first communication protocol identifier HP1 to obtain the first specific data capacity value VC61 from the storage area KS2, and accesses the third specific data capacity value VC63 stored in the storage area KS2 based on the obtained third communication protocol identifier HP3 to obtain the third specific data capacity value VC63 from the storage area KS2.

In some embodiments, the storage unit 720 stores in the storage area KS2 the first memory address AM21 configured to correspond to the first communication protocol identifier HP1, and stores the storage address AS21 in the storage area KS2. For example, the storage address AS21 is a memory address. The processing unit 710 accesses the first memory address AM21 stored in the storage area KS2 based on the obtained first communication protocol identifier HP1 to obtain the first memory address AM21 from the storage area KS2, and obtains the storage address AS21 from the storage area KS2 by accessing the storage address AS21 stored in the storage area KS2. Under a condition that the storage address AS21 is configured to correspond to the third communication protocol identifier HP3, the processing unit 710 accesses the storage address AS21 stored in the storage area KS2 based on the obtained third communication protocol identifier HP3.

In some embodiments, the electronic device 700 is identified by a first source target identifier HS11 under the first specific application communication protocol PC11. For example, the first source target identifier HS11 complies with the first target identifier format stipulation SF1. The storage unit 720 further stores in the storage area KS2 the first source target identifier HS11 corresponding to the first communication protocol identifier HP1, and a first candidate target identifier set WM1 corresponding to the first communication protocol identifier HP1. For example, the first candidate target identifier set WM1 complies with the first target identifier format stipulation SF1.

The storage unit 720 further stores in the storage area KS2 a target identifier set identifier HG11 configured to identify the first candidate target identifier set WM1. The storage unit 720 is configured to have in the storage area KS2 an application memory location YE11 associated with the first specific application communication protocol PC11. For example, the target identifier set identifier HG11 is stored at the application memory location YE11 identified based on an application memory address AE11. For example, the application memory location YE11 is identified by the application memory address AE11. The application memory address AE11 is determined according to the first communication protocol identifier HP1 belonging to the specific communication protocol identifier group GH1.

The storage unit 720 includes the storage block BS21. The storage block BS21 has the third data capacity CD63. The third data capacity CD63 corresponds to the third communication protocol identifier HP3, is determined according to the third specific application communication protocol PC31 beforehand, and is a longest limit length under a condition that the plurality of different application communication protocols PC11, PC21, ... are considered. In the first data preparation phase UP1, the processing unit 710 obtains the electronic data DE61 having an electronic data length LN61, and causes the storage unit 720 to store the electronic data DE61 in the storage block BS21 based on the storage address AS21. For example, the electronic data length LN61 is less than or equal to the first data limit length LF21, and is represented by an electronic data length value VN61.

In the first data preparation phase UP1, the processing unit 710 stores in the first storage space SS21 the first application data DA21 to be applied to the first specific application communication protocol PC11 based on the obtained first memory address AM21 and the obtained first communication protocol identifier HP1. For example, the first application data DA21 includes the first communication protocol identifier HP1, the first source target identifier HS11, a first variable logical value VL11 and a first variable target identifier set WV1. The first variable target identifier set WV1 is configured to identify a first variable target set (not shown). The obtained first communication protocol identifier HP1 corresponds to the first communication protocol identifier HP1 of the first application data DA21, corresponds to the first source target identifier HS11 of the first application data DA21, corresponds to the first variable logical value VL11, and corresponds to the first variable target identifier set WV1. The first variable logical value VL11 is associated with that whether a first data transmission TD1 toward the first variable target set is to be enabled in the first data transmission phase UT1 being after the first data preparation phase UP1.

In some embodiments, the processing unit 710 causes the electronic device 700 to enter the first data preparation phase UP1 at a first request time TR1 in response to a first effective request signal QR1. For example, the first effective request signal QR1 is one of a first interrupt request signal and a first input request message. In the first data preparation phase UP1, the processing unit 710 stores or writes the obtained first communication protocol identifier HP1 into the first storage space SS21 based on the obtained first memory address AM21, accesses or reads the first source target identifier HS11 stored in the storage area KS2 based on the obtained first communication protocol identifier HP1 to obtain the first source target identifier HS11 from the storage area KS2, and thereby stores or writes the obtained first source target identifier HS11 into the first storage space SS21 based on the obtained first memory address AM21.

In the first data preparation phase UP1, the processing unit 710, based on the obtained first communication protocol identifier HP1, determines a first referential logical value VR11 representing that whether the processing unit 710 currently supports the first specific application communication protocol PC11. In the first data preparation phase UP1, the processing unit 710 obtains a first desired logical value VK11 corresponding to the obtained first communication protocol identifier HP1, determines a first operational logical value VQ11 by performing a first logical AND operation PA11 to the first referential logical value VR11 and the first desired logical value VK11, and assigns the first operational logical value VQ11 to the first variable logical value VL11 based on the obtained first memory address AM21.

In the first data preparation phase UP1, the processing unit 710 optionally obtains at least a first desired target identifier HK11, and causes the obtained at least a first desired target identifier HK11 to join the first variable target identifier set WV1 based on the obtained first memory address AM21. For example, the at least a first desired target identifier HK11 complies with the first target identifier format stipulation SF1.

In the first data preparation phase UP1, the processing unit 710 optionally accesses at least a first candidate target identifier HM11 being in a first candidate target identifier set WM1 based on the obtained first communication protocol identifier HP1 to select the at least a first candidate target identifier HM11 from the first candidate target identifier set WM1, and causes the selected at least a first candidate target identifier HM11 to join the first variable target identifier set WV1 based on the obtained first memory address AM21.

In some embodiments, the input unit 740 receives a first user input operation PU81, and provides the first effective request signal QR1 to the processing unit 710 in response to the first user input operation PU81. The processing unit 710 causes the electronic device 700 to enter the first data preparation phase UP1 in response to one of the first effective request signal QR1 and the first operation request message QN81, and reads the first communication protocol identifier HP1 belonging to the specific communication protocol identifier group GH1 in the first data preparation phase UP1.

The input unit 740 receives a user input operation PK11 in the first data preparation phase UP1. The processing unit 710 performs a data acquisition operation EF11 in response to the user input operation PK11. The data acquisition operation EF11 is one of a data acquisition action EF1A and a data acquisition action EF1B. The processing unit 710 uses the read first communication protocol identifier HP1 to obtain the first memory address AM21 in the first data preparation phase UP1.

Under a condition that the data acquisition operation EF11 is the data acquisition action EF1A, the processing unit 710 performs the data acquisition action EF1A to obtain the at least a first desired target identifier HK11 in the first data preparation phase UP1, and causes the obtained at least a first desired target identifier HK11 to join the first variable target identifier set WV1 based on the obtained first memory address AM21.

Under a condition that the data acquisition operation EF11 is the data acquisition action EF1B: the processing unit 710 uses the read first communication protocol identifier HP1 to obtain the application memory address AE11 in the first data preparation phase UP1; the processing unit 710 reads the target identifier set identifier HG11 stored at the application memory location YE11 based on the obtained application memory address AE11; and the processing unit 710 accesses the at least a first candidate target identifier HM11 belonging to the first candidate target identifier set WM1 based on the read target identifier set identifier HG11 to select the at least a first candidate target identifier HM11 from the first candidate target identifier set WM1.

Under a condition that the data acquisition operation EF11 is the data acquisition action EF1B: the processing unit 710 uses the read first communication protocol identifier HP1 to obtain the first memory address AM21 in the first data preparation phase UP1; and the processing unit 710 causes one of the selected at least a first candidate target identifier HM11 and the accessed at least a first candidate target identifier HM11 to join the first variable target identifier set WV1 based on the obtained first memory address AM21. The input unit 740 receives a user input operation PW24 in the first data preparation phase UP1. The processing unit 710 obtains the storage address AS21 in the first data preparation phase UP1 in response to the user input operation PW24, and causes the storage unit 720 to prepare the electronic data DE61 in the storage block BS21 based on the obtained storage address AS21.

Under a condition that the processing unit 710 finishes preparing the first application data DA21 and the electronic data DE61, the input unit 740 receives a second user input operation PU91, and provides the second effective request signal QU1 to the processing unit 710 in response to the second user input operation PU91. The processing unit 710 causes the electronic device 700 to leave the first data preparation phase UP1 to enter the first data transmission phase UT1 in response to one of the second effective request signal QU1 and the second operation request message QN91.

Figure 41:
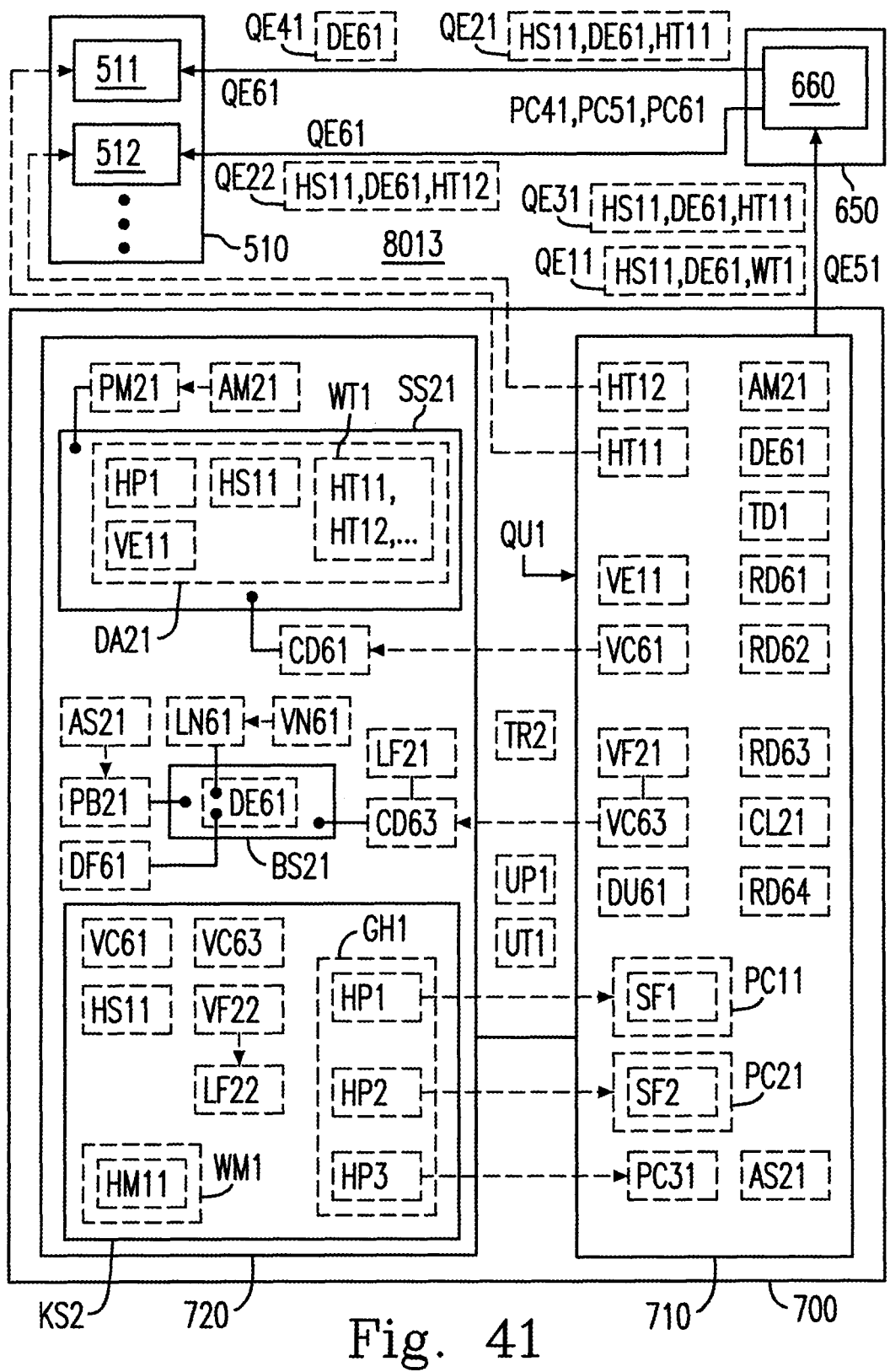
FIG. 41 is a schematic diagram showing an implementation structure of the communication system shown in FIG. 38.

Please refer to FIG. 41, which is a schematic diagram showing an implementation structure 8013 of the communication system 801 shown in FIG. 38. Please additionally refer to FIGS. 38 and 40. The implementation structure 8013 includes the electronic device 700, a message service system 650 and a first communication target set 510. The message service system 650 includes a first message service device 660. The first communication target set 510 includes the first communication target 511 and a communication target 512.

In some embodiments, under a condition that the processing unit 710 finishes preparing the electronic data DE61 and the first application data DA21, the processing unit 710 causes the electronic device 700 to enter the first data transmission phase UT1 being after the first data preparation phase UP1 at a second request time TR2 being after the first request time TR1 in response to the second effective request signal QU1, and thereby separately checks the stored electronic data DE61 and the stored first application data DA21 based on the obtained storage address AS21 and the obtained first memory address AM21. For example, the processing unit 710 receives the second effective request signal QU1 in response to finishing preparing the electronic data DE61 and the first application data DA21. For example, the second effective request signal QU1 is one of a second interrupt request signal and a second input request message.

When the electronic device 700 enters the first data transmission phase UT1, the processing unit 710 checks the electronic data DE61 based on the obtained storage address AS21, confirms that the first variable logical value VL11 and the first variable target identifier set WV1 respectively become a first effective logical value VE11 and a first communication target identifier set WT1, and thereby checks the stored first communication protocol identifier HP1, the stored first source target identifier HS11, the stored first effective logical value VE11 and the stored first communication target identifier set WT1, which are stored in the first storage space SS21, based on the obtained first memory address AM21. For example, the stored first communication target identifier set WT1 is configured to identify the first communication target set 510. The first communication target identifier HT11 belonging to the first communication target identifier set WT1 is configured to identify the first communication target 511 belonging to the first communication target set 510.

In some embodiments, in the first data transmission phase UT1, the processing unit 710 obtains the first effective logical value VE11 from the stored first application data DA21 based on the obtained first memory address AM21, and makes a first logical decision RD61 on whether the first effective logical value VE11 stored in the first storage space SS21 is true by evaluating the obtained first effective logical value VE11.

When the first logical decision RD61 is positive, the processing unit 710 makes a second logical decision RD62 on whether the first communication target identifier set WT1 stored in the first storage space SS21 is empty. When the second logical decision RD62 is positive, the processing unit 710 confirms that the processing unit 710 is prohibited from performing the first data transmission TD1 toward the first communication target set 510 in the first data transmission phase UT1.

When the second logical decision RD62 is negative: the first communication target set 510 consists of one of the first communication target 511 and a first plurality of communication targets 511, 512, . . . ; the first communication target identifier set WT1 consists of one of the first communication target identifier HT11 and a first plurality of communication target identifiers HT11, HT12, . . . ; and the processing unit 710 confirms that the processing unit 710 is allowed to use the first specific application communication protocol PC11 to perform the first data transmission TD1 toward the first communication target set 510 in the first data transmission phase UT1. For example, the first plurality of communication targets 511, 512, . . . include the first communication target 511, and are respectively a first plurality of external communication device or a first plurality of external electronic device. The first plurality of communication target identifiers HT11, HT12, . . . include the first communication target identifier HT11. The first communication target identifier HT11 is one of the first desired target identifier HK11 and the selected first candidate target identifier HM11.

The specific communication protocol identifier group GH1 include the third communication protocol identifier HP3. The third communication protocol identifier HP3 is configured to identify the third specific application communication protocol PC31 included in the plurality of different application communication protocols PC11, PC21, . . . . For example, the third specific application communication protocol PC31 is one selected from a group consisting of the email communication protocol, the short-message service communication protocol, the multimedia-message service communication protocol and the instant-messaging communication protocol.

The storage unit 720 includes the storage block BS21 associated with the third communication protocol identifier HP3. The storage block BS21 is identified by the storage address AS21 being dependent on the third communication protocol identifier HP3. When the third communication protocol identifier HP3 is the first communication protocol identifier HP1, the storage address AS21 is dependent on the first memory address AM21. When the third communication protocol identifier HP3 is the second communication protocol identifier HP2, the storage address AS21 is dependent on the second memory address AM22. The storage block BS21 has the third data capacity CD63. The third data capacity CD63 corresponds to the third communication protocol identifier HP3, and is determined according to the third specific application communication protocol PC31 beforehand.

In some embodiments, under a condition that the plurality of different application communication protocols PC11, PC21, . . . are considered, the first data limit length value VF21 is one selected from a group consisting of a longest limit length value, a shortest limit length value, and a middle limit length value. The storage unit 720 further stores in the storage area KS2 a second data limit length value VF22 corresponding to the first communication protocol identifier HP1. For example, the second data limit length value VF22 represents a second data limit length LF22 to be applied to the first specific application communication protocol PC11, and is determined according to the first specific application communication protocol PC11 beforehand.

When the second logical decision RD62 is negative, the processing unit 710, based on the first communication protocol identifier HP1, further makes a third logical decision RD63 on whether the first specific application communication protocol PC11 is one of the email communication protocol and the multimedia-message service communication protocol. For example, when the processing unit 710 confirms that the first communication protocol identifier HP1 is configured to identify one of the email communication protocol and the multimedia-message service communication protocol, the third logical decision RD63 is made to be positive.

When the third logical decision RD63 is negative, the processing unit 710, by comparing the second data limit length value VF22 with the electronic data length value VN61, makes a fourth logical decision RD64 on whether the electronic data DE61 meets a first specific data length constraint condition CL21 corresponding to the first communication protocol identifier HP1. For example, under a condition that the third specific data capacity value VC63 is one of the longest limit length value and the middle limit length value, the processing unit 710 makes the fourth logical decision RD64. The first specific data length constraint condition CL21 is determined according to the second data limit length value VF22. When the electronic data length value VN61 is less than or equal to the second data limit length value VF22, the fourth logical decision RD64 is made to be positive.

When the fourth logical decision RD64 is negative and there is in a first situation: the processing unit 710 splits the electronic data DE61 to determine a first plurality of operation data portions DF61 based on the second data limit length value VF22; and the processing unit 710 sequentially performs a first plurality of data transmission portions included in the first data transmission TD1 to the first plurality of operation data portions DF61 to send the first plurality of operation data portions DF61 toward the first communication target 511 under the first specific application communication protocol PC11, so that the processing unit 710 causes the first communication target 511 to receive the first plurality of operation data portions DF61 to constitute the electronic data DE61. For example, each of the first plurality of operation data portions DF61 meets the first specific data length constraint condition CL21; and the first plurality of data transmission portions are respectively associated with the first plurality of operation data portions DF61.

When the fourth logical decision RD64 is negative and there is in a second situation: the processing unit 710 converts the electronic data DE61 to determine a first operation data DU61 meeting the first specific data length constraint condition CL21 based on the second data limit length value VF22; and the processing unit 710 sends the first operation data DU61 serving as the electronic data DE61 toward the first communication target 511 under the first specific application communication protocol PC11.

Under a condition that the second logical decision RD62 is negative, the processing unit 710 obtains the electronic data DE61 from the storage block BS21 based on the obtained storage address AS21, and obtains the first communication protocol identifier HP1, the first source target identifier HS11 and the first communication target identifier set WT1 from the stored first application data DA21 based on the obtained first memory address AM21. For example, under a condition that the first communication target identifier set WT1 consists of the first communication target identifier HT11, the processing unit 710 uses the first specific application communication protocol PC11 to send the electronic data DE61 toward the first communication target 511 based on the obtained first communication protocol identifier HP1, the obtained first source target identifier HS11, the obtained electronic data DE61 and the obtained first communication target identifier HT11.

In some embodiments, the processing unit 710 is coupled to the first message service device 660. For example, the first message service device 660 supports the first specific application communication protocol PC11, and is included in the message service system 650. Under a condition that the third logical decision RD63 is positive, the processing unit 710 uses the first specific application communication protocol PC11 to send a first electronic message QE11 toward the first message service device 660 based on the obtained first communication protocol identifier HP1, the obtained first source target identifier HS11, the obtained electronic data DE61 and the obtained first communication target identifier set WT1. For example, the first electronic message QE11 includes the first source target identifier HS11, the electronic data DE61 and the first communication target identifier set WT1, and is or serves as a first instruction message used to instruct the first message service device 660.

Under a condition that the third logical decision RD63 is positive and the first communication target identifier set WT1 consists of the first communication target identifier HT11, the first message service device 660 uses the first specific application communication protocol PC11 to transmit a second electronic message QE21 toward the first communication target 511 in response to the first electronic message QE11, so that the first communication target 511 receives the second electronic message QE21 in a fourth specific application communication protocol PC41 being matched with or equal to the first specific application communication protocol PC11. For example, the second electronic message QE21 includes the first source target identifier HS11, the electronic data DE61 and the first communication target identifier HT11.

Under a condition that the third logical decision RD63 is positive and the first communication target identifier set WT1 consists of the first plurality of communication target identifiers HT11, HT12, . . . , the first message service device 660 uses the first specific application communication protocol PC11 to separately transmit a first plurality of electronic messages QE21, QE22, . . . , respectively corresponding to the first plurality of communication targets 511, 512, . . . , toward the first plurality of communication targets 511, 512, . . . in response to the first electronic message QE11, so that the first plurality of communication targets 511, 512, . . . respectively receive the first plurality of electronic messages QE21, QE22, . . . in a first plurality of respective communication protocols, each of which is matched with or equal to the first specific application communication protocol PC11. For example, each of the first plurality of electronic messages QE21, QE22, . . . includes the first source target identifier HS11, the electronic data DE61 and the first communication target identifier HT11. The first communication target 511 included in the first plurality of communication targets 511, 512, . . . receives the second electronic message QE21, included in the first plurality of electronic messages QE21, QE22, . . . , in the fourth specific application communication protocol PC41 being matched with or equal to the first specific application communication protocol PC11, wherein the fourth specific application communication protocol PC41 is included in the first plurality of respective communication protocols.

Under a condition that the third logical decision RD63 is negative and the fourth logical decision RD64 is positive (or the electronic data length LN61 is less than or equal to the second data limit length LF22) and the first communication target identifier set WT1 consists of the first communication target identifier HT11: the processing unit 710 uses the first specific application communication protocol PC11 to send a third electronic message QE31 toward the first message service device 660 based on the obtained first communication protocol identifier HP1, the obtained first source target identifier HS11, the obtained electronic data DE61 and the obtained first communication target identifier HT11, wherein the third electronic message QE31 includes the first source target identifier HS11, the electronic data DE61 and the first communication target identifier HT11; and the first message service device 660 uses the first specific application communication protocol PC11 to transmit a fourth electronic message QE41 toward the first communication target 511 in response to the third electronic message QE31, so that the first communication target 511 receives the fourth electronic message QE41 in a fifth specific application communication protocol PC51 being matched with or equal to the first specific application communication protocol PC11. For example, the third electronic message QE31 is or serves as a second instruction message used to instruct the first message service device 660. For example, the fourth electronic message QE41 at least includes the electronic data DE61.

Under a condition that the third logical decision RD63 is negative and the fourth logical decision RD64 is positive (or the electronic data length LN61 is less than or equal to the second data limit length LF22) and the first communication target identifier set WT1 consists of the first plurality of communication target identifiers HT11, HT12, . . . , for each first respective identifier: the processing unit 710 uses the first specific application communication protocol PC11 to send a fifth electronic message QE51 toward the first message service device 660 based on the obtained first communication protocol identifier HP1, the obtained first source target identifier HS11, the obtained electronic data DE61 and the obtained first communication target identifier HT11, wherein the fifth electronic message QE51 includes the first source target identifier HS11, the electronic data DE61 and the first communication target identifier HT11; and the first message service device 660 uses the first specific application communication protocol PC11 to transmit a sixth electronic message QE61 toward each first respective target, identified by the each first respective identifier, in response to the fifth electronic message QE51, so that the each first respective target receives the sixth electronic message QE61 in a sixth specific application communication protocol PC61 being matched with or equal to the first specific application communication protocol PC11. For example, the respective fifth electronic message QE51 is or serves as a third instruction message used to instruct the first message service device 660. For example, the respective sixth electronic message QE61 at least includes the electronic data DE61.

Under a condition that the third logical decision RD63 is negative and the fourth logical decision RD64 is negative to cause the electronic device 700 to be in the first situation and the first communication target identifier set WT1 consists of the first communication target identifier HT11, for each first respective data portion included in the first plurality of operation data portions DF61: the processing unit 710 uses the first specific application communication protocol PC11 to send the each first respective data portion toward the first communication target 511 based on the obtained first communication protocol identifier HP1, the obtained first source target identifier HS11, the obtained each first respective data portion and the obtained first communication target identifier HT11, so that the processing unit 710 causes the first communication target 511 to receive the first plurality of operation data portions DF61 to constitute the electronic data DE61.

In some embodiments, under a condition that the second logical decision RD62 is negative, the processing unit 710 controls the storage unit 720 based on the obtained storage address AS21 to obtain the stored electronic data DE61 from the storage block BS21, controls the storage unit 720 based on the obtained first memory address AM21 to obtain the stored first source target identifier HS11 and the stored first communication target identifier set WT1 from the first storage space SS21, and thereby outputs one selected from a group consisting of the first electronic message QE11, the third electronic message QE31, the respective fifth electronic message QE51 and another functional electronic message.

Figure 42:
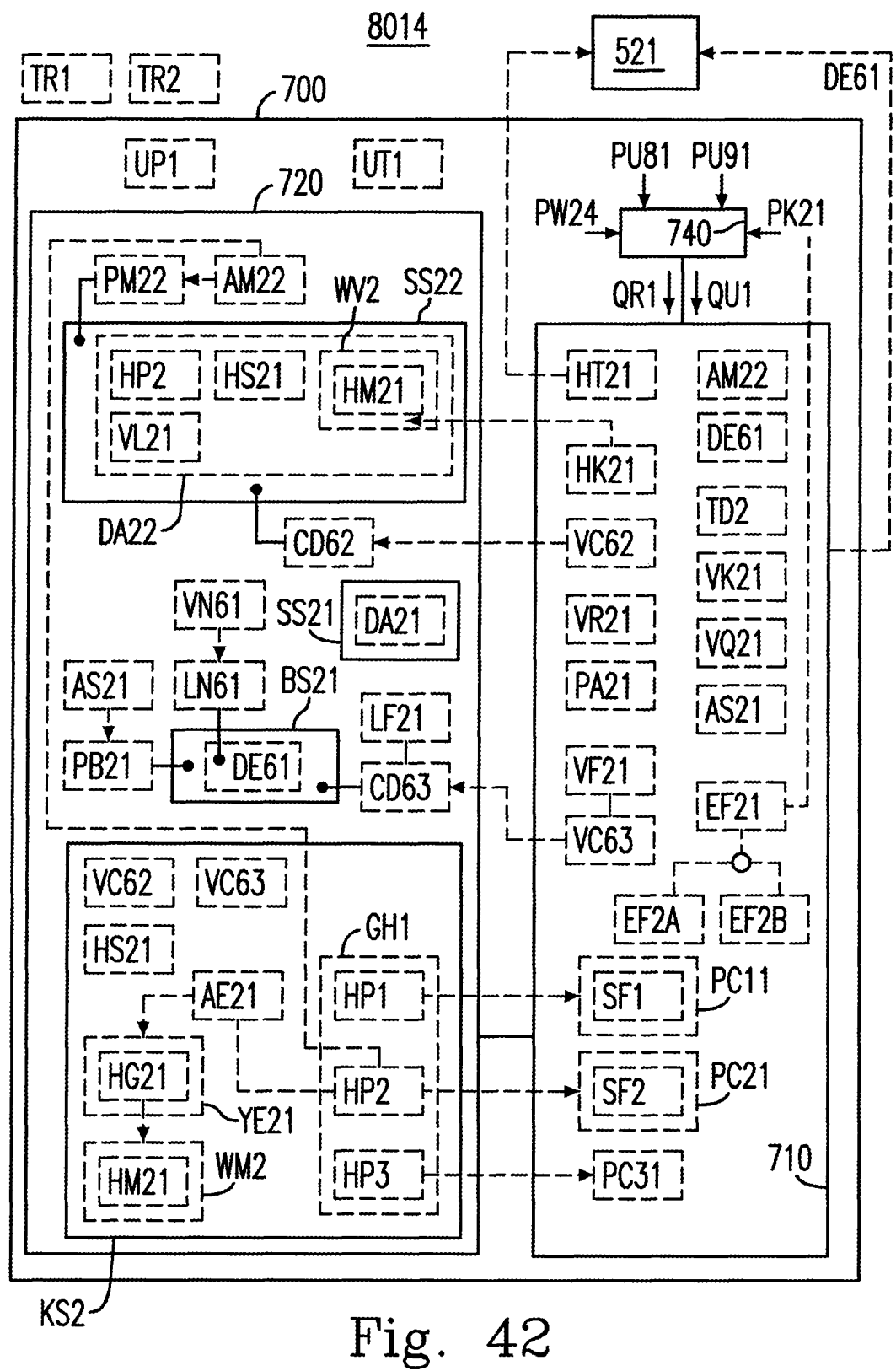
FIG. 42 is a schematic diagram showing an implementation structure of the communication system shown in FIG. 38.

Please refer to FIG. 42, which is a schematic diagram showing an implementation structure 8014 of the communication system 801 shown in FIG. 38. Please additionally refer to FIGS. 38, 40 and 41. The implementation structure 8014 includes the electronic device 700 and the second communication target 521. The electronic device 700 includes the storage unit 720, the processing unit 710 and the input unit 740. The storage unit 720 includes the storage area KS2. The second communication protocol identifier HP2 belongs to the specific communication protocol identifier group GH1 stored in the storage area KS2, and is configured to identify the second specific application communication protocol PC21. For example, the first specific application communication protocol PC11 is one selected from the plurality of different application communication protocols PC11, PC21, . . . . The second specific application communication protocol PC21 is different from the first specific application communication protocol PC11, and is one selected from the plurality of different application communication protocols PC11, PC21, . . . .

The storage unit 720 further stores in the storage area KS2 the second specific data capacity value VC62 corresponding to the second communication protocol identifier HP2. The second specific data capacity value VC62 is determined according to the second specific application communication protocol PC21 beforehand, and represents the second data capacity CD62 used to allocate the second storage space SS22. The second specific data capacity value VC62 is different from the first specific data capacity value VC61, so that the second data capacity CD62 is different from the first data capacity CD61. The second communication protocol identifier HP2 is used to allocate the second storage space SS22.

The processing unit 710 obtains the second communication protocol identifier HP2 from the specific communication protocol identifier group GH1 stored in the storage area KS2, obtains the second specific data capacity value VC62 from the storage area KS2 based on the obtained second communication protocol identifier HP2, and allocates in the storage unit 720 the second storage space SS22 having the second data capacity CD62 based on the obtained second specific data capacity value VC62 to obtain the second memory address AM22 configured to identify the second storage space SS22.

For example, the second communication protocol identifier HP2 corresponds to the second memory address AM22 by corresponding to the second specific data capacity value VC62. The second storage space SS22 is located at a second memory location PM22 identified by the second memory address AM22, and is thereby identified by the second memory address AM22. The second memory location PM22 corresponds to the obtained second communication protocol identifier HP2, and is different from the first memory location PM21. The second data capacity CD62 is the same as or different from the first data capacity CD61. The second storage space SS22 is different from each of the storage area KS2 and the first storage space SS21. For example, the storage unit 720 has the second memory location PM22 identified based on the second memory address AM22. The second memory address AM22 is determined according to the second communication protocol identifier HP2 belonging to the specific communication protocol identifier group GH1.

In some embodiments, the storage unit 720 stores in the storage area KS2 the second memory address AM22 corresponding to the second communication protocol identifier HP2. The processing unit 710, based on the second communication protocol identifier HP2 obtained from the specific communication protocol identifier group GH1 stored in the storage area KS2, accesses the second memory address AM22 stored in the storage area KS2 to obtain the second memory address AM22 from the storage area KS2. The processing unit 710 obtains the second memory address AM22 to identify the second storage space SS22, and causes the storage unit 720 to store in the first storage space SS22 a second application data DA22, including the second communication target identifier HT21, based on the obtained second memory address AM22. For example, the second storage space SS22 is allocated enough to contain the second application data DA22.

In some embodiments, the second specific application communication protocol PC21 is one selected from the plurality of different application communication protocols PC11, PC21, . . . . The electronic device 700 is identified by a second source target identifier HS21 under the second specific application communication protocol PC21. For example, the second source target identifier HS21 complies with the second target identifier format stipulation SF2. The storage unit 720 further stores in the storage area KS2 the second source target identifier HS21 corresponding to the second communication protocol identifier HP2, and a second candidate target identifier set WM2 corresponding to the second communication protocol identifier HP2. For example, the second candidate target identifier set WM2 complies with the second target identifier format stipulation SF2.

The storage unit 720 further stores in the storage area KS2 a target identifier set identifier HG21 configured to identify the second candidate target identifier set WM2. The storage unit 720 is configured to have in the storage area KS2 an application memory location YE21 associated with the second specific application communication protocol PC21. For example, the target identifier set identifier HG21 is stored at the application memory location YE21 identified based on an application memory address AE21. For example, the application memory location YE21 is identified by the application memory address AE21. The application memory address AE21 is determined according to the second communication protocol identifier HP2 belonging to the specific communication protocol identifier group GH1.

In the first data preparation phase UP1, the processing unit 710 stores in the first storage space SS22 the second application data DA22 to be applied to the second specific application communication protocol PC21 based on the obtained second memory address AM22 and the obtained second communication protocol identifier HP2. For example, the second application data DA22 includes the second communication protocol identifier HP2, the second source target identifier HS21, a second variable logical value VL21 and a second variable target identifier set WV2.

The second variable target identifier set WV2 is configured to identify a second variable target set (not shown). The obtained second communication protocol identifier HP2 corresponds to the second communication protocol identifier HP2 of the second application data DA22, corresponds to the second source target identifier HS21 of the second application data DA22, corresponds to the second variable logical value VL21, and corresponds to the second variable target identifier set WV2. The second variable logical value VL21 is associated with that whether a second data transmission TD2 toward the second variable target set is to be enabled in the first data transmission phase UT1.

In the first data preparation phase UP1, the processing unit 710 stores or writes the obtained second communication protocol identifier HP2 into the second storage space SS22 based on the obtained second memory address AM22, accesses or reads the second source target identifier HS21 stored in the storage area KS2 based on the obtained second communication protocol identifier HP2 to obtain the second source target identifier HS21 from the storage area KS2, and thereby stores or writes the obtained second source target identifier HS21 into the second storage space SS22 based on the obtained second memory address AM22.

In the first data preparation phase UP1, the processing unit 710, based on the obtained second communication protocol identifier HP2, determines a second referential logical value VR21 representing that whether the processing unit 710 currently supports the second specific application communication protocol PC21. In the first data preparation phase UP1, the processing unit 710 obtains a second desired logical value VK21 corresponding to the obtained second communication protocol identifier HP2, determines a second operational logical value VQ21 by performing a second logical AND operation PA21 to the second referential logical value VR21 and the second desired logical value VK21, and assigns the second operational logical value VQ21 to the second variable logical value VL21 based on the obtained second memory address AM22.

In the first data preparation phase UP1, the processing unit 710 optionally obtains at least a second desired target identifier HK21, and causes the obtained at least a second desired target identifier HK21 to join the second variable target identifier set WV2 based on the obtained second memory address AM22. For example, the at least a second desired target identifier HK21 complies with the second target identifier format stipulation SF2.

In the first data preparation phase UP1, the processing unit 710 optionally accesses at least a second candidate target identifier HM21 being in a second candidate target identifier set WM2 based on the obtained second communication protocol identifier HP2 to select the at least a second candidate target identifier HM21 from the second candidate target identifier set WM2, and causes the selected at least a second candidate target identifier HM21 to join the second variable target identifier set WV2 based on the obtained second memory address AM22.

In some embodiments, the processing unit 710 reads the second communication protocol identifier HP2 belonging to the specific communication protocol identifier group GH1 in the first data preparation phase UP1. The input unit 740 receives a user input operation PK21 in the first data preparation phase UP1. The processing unit 710 performs a data acquisition operation EF21 in response to the user input operation PK21. The data acquisition operation EF21 is one of a data acquisition action EF2A and a data acquisition action EF2B. The processing unit 710 uses the read second communication protocol identifier HP2 to obtain the second memory address AM22 in the first data preparation phase UP1.

Under a condition that the data acquisition operation EF21 is the data acquisition action EF2A, the processing unit 710 performs the data acquisition action EF2A to obtain the at least a second desired target identifier HK21 in the first data preparation phase UP1, and causes the obtained at least a second desired target identifier HK21 to join the second variable target identifier set WV2 based on the obtained second memory address AM22.

Under a condition that the data acquisition operation EF21 is the data acquisition action EF2B: the processing unit 710 uses the read second communication protocol identifier HP2 to obtain the application memory address AE21 in the first data preparation phase UP1; the processing unit 710 reads the target identifier set identifier HG21 stored at the application memory location YE21 based on the obtained application memory address AE21; and the processing unit 710 accesses the at least a second candidate target identifier HM21 belonging to the second candidate target identifier set WM2 based on the read target identifier set identifier HG21 to select the at least a second candidate target identifier HM21 from the second candidate target identifier set WM2.

Under a condition that the data acquisition operation EF21 is the data acquisition action EF2B: the processing unit 710 uses the read second communication protocol identifier HP2 to obtain the second memory address AM22 in the first data preparation phase UP1; and the processing unit 710 causes one of the selected at least a second candidate target identifier HM21 and the accessed at least a second candidate target identifier HM21 to join the second variable target identifier set WV2 based on the obtained second memory address AM22.

Under a condition that the processing unit 710 finishes preparing the first application data DA21, the second application data DA22 and the electronic data DE61, the input unit 740 receives the second user input operation PU91, and provides the second effective request signal QU1 to the processing unit 710 in response to the second user input operation PU91. The processing unit 710 causes the electronic device 700 to leave the first data preparation phase UP1 to enter the first data transmission phase UT1 in response to one of the second effective request signal QU1 and the second operation request message QN91.

Figure 43:
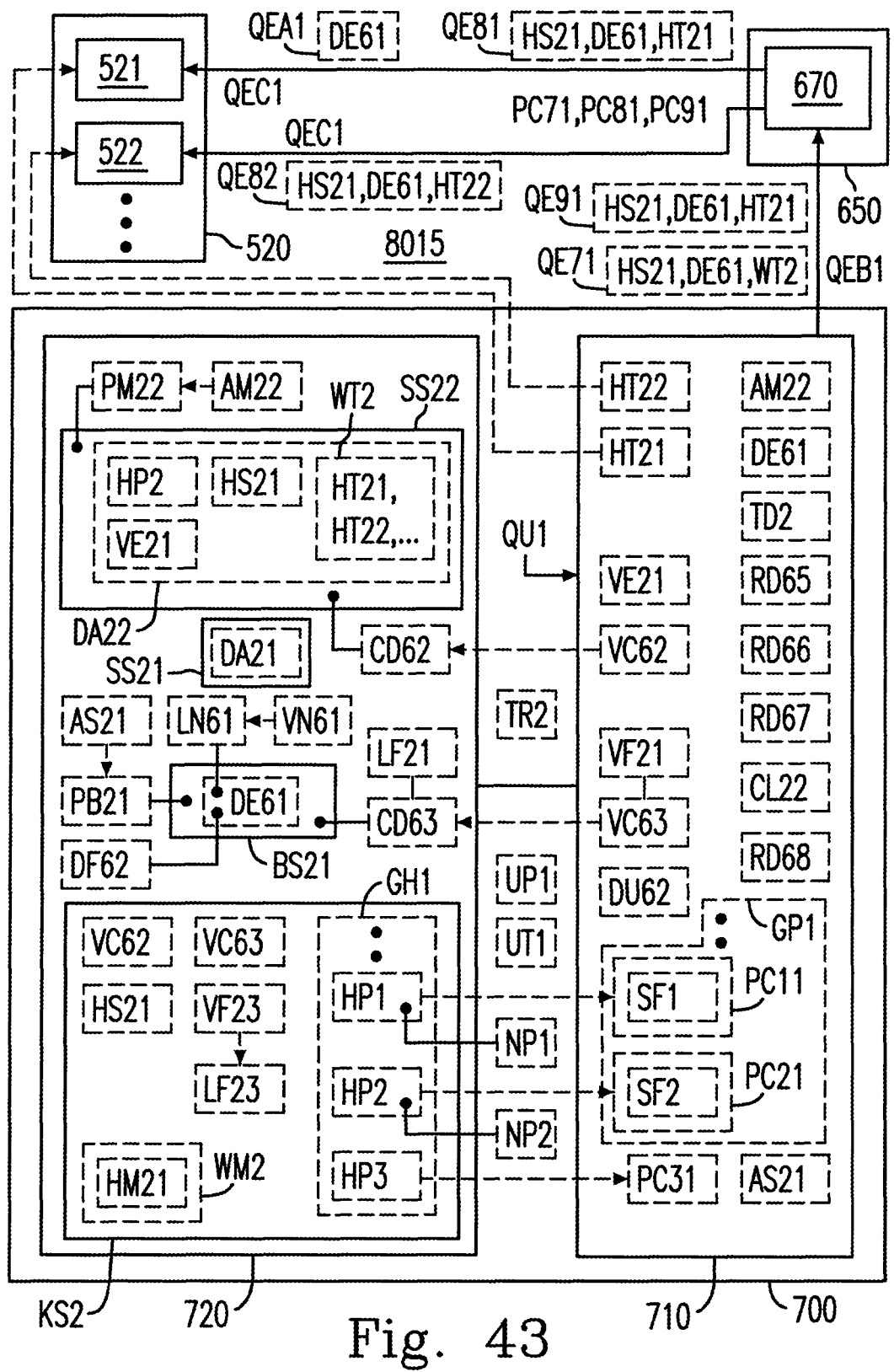
FIG. 43 is a schematic diagram showing an implementation structure of the communication system shown in FIG. 38.

Please refer to FIG. 43, which is a schematic diagram showing an implementation structure 8015 of the communication system 801 shown in FIG. 38. Please additionally refer to FIGS. 38, 40, 41 and 42. The implementation structure 8015 includes the electronic device 700, the message service system 650 and a second communication target set 520. The message service system 650 includes a second message service device 670. The second communication target set 520 includes the second communication target 521 and a communication target 522.

In some embodiments, under a condition that the processing unit 710 finishes preparing the electronic data DE61, the first application data DA21 and the second application data DA22, the processing unit 710 causes the electronic device 700 to enter the first data transmission phase UT1 at the second request time TR2 in response to the second effective request signal QU1, and thereby checks the stored second application data DA22 based on the obtained second memory address AM22. For example, the processing unit 710 receives the second effective request signal QU1 in response to finishing preparing the electronic data DE61, the first application data DA21 and the second application data DA22.

When the electronic device 700 enters the first data transmission phase UT1, the processing unit 710 confirms that the second variable logical value VL21 and the second variable target identifier set WV2 respectively become a second effective logical value VE21 and a second communication target identifier set WT2, and thereby checks the stored second communication protocol identifier HP2, the stored second source target identifier HS21, the stored second effective logical value VE21 and the stored second communication target identifier set WT2, which are stored in the second storage space SS22, based on the obtained second memory address AM22. For example, the stored second communication target identifier set WT2 is configured to identify the second communication target set 520. The second communication target identifier HT21 belonging to the second communication target identifier set WT2 is configured to identify the second communication target 521 belonging to the second communication target set 520.

In the first data transmission phase UT1, the processing unit 710 obtains the second effective logical value VE21 from the stored second application data DA22 based on the obtained second memory address AM22, and makes a fifth logical decision RD65 on whether the second effective logical value VE21 stored in the second storage space SS22 is true by evaluating the obtained second effective logical value VE21.

When the fifth logical decision RD65 is positive, the processing unit 710 makes a sixth logical decision RD66 on whether the second communication target identifier set WT2 stored in the second storage space SS22 is empty. When the sixth logical decision RD66 is positive, the processing unit 710 confirms that the processing unit 710 is prohibited from performing the second data transmission TD2 toward the second communication target set 520 in the first data transmission phase UT1.

When the sixth logical decision RD66 is negative: the second communication target set 520 consists of one of the second communication target 521 and a second plurality of communication targets 521, 522, . . . ; the second communication target identifier set WT2 consists of one of the second communication target identifier HT21 and a second plurality of communication target identifiers HT21, HT22, . . . ; and the processing unit 710 confirms that the processing unit 710 is allowed to use the second specific application communication protocol PC21 to perform the second data transmission TD2 toward the second communication target set 520 in the first data transmission phase UT1. For example, the second plurality of communication targets 521, 522, . . . include the second communication target 521, and are respectively a second plurality of external communication device or a second plurality of external electronic device. The second plurality of communication target identifiers HT21, HT22, . . . include the second communication target identifier HT21. The second communication target identifier HT21 is one of the second desired target identifier HK21 and the selected second candidate target identifier HM21.

When the third communication protocol identifier HP3 is the second communication protocol identifier HP2, the storage address AS21 is dependent on the second memory address AM22. The storage block BS21 has the third data capacity CD63. For example, the third data capacity CD63 corresponds to the third communication protocol identifier HP3, and is determined according to the third specific application communication protocol PC31 beforehand.

In some embodiments, under a condition that the plurality of different application communication protocols PC11, PC21, . . . are considered, the first data limit length value VF21 is one selected from a group consisting of the longest limit length value, the shortest limit length value, and the middle limit length value. The storage unit 720 further stores in the storage area KS2 a third data limit length value VF23 corresponding to the second communication protocol identifier HP2, wherein the third data limit length value VF23 represents a third data limit length LF23 to be applied to the second specific application communication protocol PC21, and is determined according to the second specific application communication protocol PC21 beforehand.

When the sixth logical decision RD66 is negative, the processing unit 710, based on the second communication protocol identifier HP2, further makes a seventh logical decision RD67 on whether the second specific application communication protocol PC21 is one of the email communication protocol and the multimedia-message service communication protocol. For example, when the processing unit 710 confirms that the second communication protocol identifier HP2 is configured to identify one of the email communication protocol and the multimedia-message service communication protocol, the seventh logical decision RD67 is made to be positive.

When the seventh logical decision RD67 is negative, the processing unit 710, by comparing the third data limit length value VF23 with the electronic data length value VN61, makes an eighth logical decision RD68 on whether the electronic data DE61 meets a second specific data length constraint condition CL22 corresponding to the second communication protocol identifier HP2. For example, under a condition that the third specific data capacity value VC63 is one of the longest limit length value and the middle limit length value, the processing unit 710 makes the eighth logical decision RD68. The second specific data length constraint condition CL22 is determined according to the third data limit length value VF23. When the electronic data length value VN61 is less than or equal to the third data limit length value VF23, the eighth logical decision RD68 is made to be positive.

When the eighth logical decision RD68 is negative and there is in a third situation: the processing unit 710 splits the electronic data DE61 to determine a second plurality of operation data portions DF62 based on the third data limit length value VF23; and the processing unit 710 sequentially performs a second plurality of data transmission portions included in the second data transmission TD2 to the second plurality of operation data portions DF62 to send the second plurality of operation data portions DF62 toward the second communication target 521 under the second specific application communication protocol PC21, so that the processing unit 710 causes the second communication target 521 to receive the second plurality of operation data portions DF62 to constitute the electronic data DE61. For example, each of the second plurality of operation data portions DF62 meets the second specific data length constraint condition CL22; and the second plurality of data transmission portions are respectively associated with the second plurality of operation data portions DF62.

When the eighth logical decision RD68 is negative and there is in a fourth situation: the processing unit 710 converts the electronic data DE61 to determine a second operation data DU62 meeting the second specific data length constraint condition CL22 based on the third data limit length value VF23; and the processing unit 710 sends the second operation data DU62 serving as the electronic data DE61 toward the first communication target 521 under the second specific application communication protocol PC21.

Under a condition that the sixth logical decision RD66 is negative, the processing unit 710 obtains the electronic data DE61 from the storage block BS21 based on the obtained storage address AS21, and obtains the second communication protocol identifier HP2, the second source target identifier HS21 and the second communication target identifier set WT2 from the stored second application data DA22 based on the obtained second memory address AM22. For example, under a condition that the second communication target identifier set WT2 consists of the second communication target identifier HT21, the processing unit 710 uses the second specific application communication protocol PC21 to send the electronic data DE61 toward the second communication target 521 based on the obtained second communication protocol identifier HP2, the obtained second source target identifier HS21, the obtained electronic data DE61 and the obtained second communication target identifier HT21.

In some embodiments, the processing unit 710 is further coupled to a second message service device 670 included in the message service system 650. For example, the second message service device 670 supports the second specific application communication protocol PC21, and is the same as or different from the first message service device 660. Under a condition that the seventh logical decision RD67 is positive, the processing unit 710 uses the second specific application communication protocol PC21 to send a seventh electronic message QE71 toward the second message service device 670 based on the obtained second communication protocol identifier HP2, the obtained second source target identifier HS21, the obtained electronic data DE61 and the obtained second communication target identifier set WT2. For example, the seventh electronic message QE71 includes the second source target identifier HS21, the electronic data DE61 and the second communication target identifier set WT2, and is or serves as a fourth instruction message used to instruct the second message service device 670.

Under a condition that the seventh logical decision RD67 is positive and the second communication target identifier set WT2 consists of the second communication target identifier HT21, the second message service device 670 uses the second specific application communication protocol PC21 to transmit an eighth electronic message QE81 toward the second communication target 521 in response to the seventh electronic message QE71, so that the second communication target 521 receives the eighth electronic message QE81 in a seventh specific application communication protocol PC71 being matched with or equal to the second specific application communication protocol PC21. For example, the eighth electronic message QE81 includes the second source target identifier HS21, the electronic data DE61 and the second communication target identifier HT21.

Under a condition that the seventh logical decision RD67 is positive and the second communication target identifier set WT2 consists of the second plurality of communication target identifiers HT21, HT22, . . . , the second message service device 670 uses the second specific application communication protocol PC21 to separately transmit a second plurality of electronic messages QE81, QE82, . . . , respectively corresponding to the second plurality of communication targets 521, 522, . . . , toward the second plurality of communication targets 521, 522, . . . in response to the seventh electronic message QE71, so that the second plurality of communication targets 521, 522, . . . respectively receive the second plurality of electronic messages QE81, QE82, . . . in a second plurality of respective communication protocols, each of which is matched with or equal to the second specific application communication protocol PC21.

For example, each of the second plurality of electronic messages QE81, QE82, . . . includes the second source target identifier HS21, the electronic data DE61 and the second communication target identifier HT21. The second communication target 521 included in the second plurality of communication targets 521, 522, . . . receives the eighth electronic message QE81, included in the second plurality of electronic messages QE81, QE82, . . . , in the seventh specific application communication protocol PC71 being matched with or equal to the second specific application communication protocol PC21, wherein the seventh specific application communication protocol PC71 is included in the second plurality of respective communication protocols.

Under a condition that the seventh logical decision RD67 is negative and the eighth logical decision RD68 is positive (or the electronic data length LN61 is less than or equal to the third data limit length LF23) and the second communication target identifier set WT2 consists of the second communication target identifier HT21: the processing unit 710 uses the second specific application communication protocol PC21 to send a ninth electronic message QE91 toward the second message service device 670 based on the obtained second communication protocol identifier HP2, the obtained second source target identifier HS21, the obtained electronic data DE61 and the obtained second communication target identifier HT21, wherein the ninth electronic message QE91 includes the second source target identifier HS21, the electronic data DE61 and the second communication target identifier HT21; and the second message service device 670 uses the second specific application communication protocol PC21 to transmit a tenth electronic message QEA1 toward the second communication target 521 in response to the ninth electronic message QE91, so that the second communication target 521 receives the tenth electronic message QEA1 in an eighth specific application communication protocol PC81 being matched with or equal to the second specific application communication protocol PC21. For example, the ninth electronic message QE91 is or serves as a fifth instruction message used to instruct the second message service device 670. For example, the tenth electronic message QEA1 at least includes the electronic data DE61.

Under a condition that the seventh logical decision RD67 is negative and the eighth logical decision RD68 is positive (or the electronic data length LN61 is less than or equal to the third data limit length LF23) and the second communication target identifier set WT2 consists of the second plurality of communication target identifiers HT21, HT22, . . . , for each second respective identifier: the processing unit 710 uses the second specific application communication protocol PC21 to send an eleventh electronic message QEB1 toward the second message service device 670 based on the obtained second communication protocol identifier HP2, the obtained second source target identifier HS21, the obtained electronic data DE61 and the obtained second communication target identifier HT21, wherein the eleventh electronic message QEB1 includes the second source target identifier HS21, the electronic data DE61 and the second communication target identifier HT21; and the second message service device 670 uses the second specific application communication protocol PC21 to transmit a twelfth electronic message QEC1 toward each second respective target, identified by the each second respective identifier, in response to the eleventh electronic message QEB1, so that the each second respective target receives the twelfth electronic message QEC1 in a ninth specific application communication protocol PC91 being matched with or equal to the second specific application communication protocol PC21. For example, the respective eleventh electronic message QEB1 is or serves as a sixth instruction message used to instruct the second message service device 670. For example, the respective twelfth electronic message QEC1 at least includes the electronic data DE61.

Under a condition that the seventh logical decision RD67 is negative and the eighth logical decision RD68 is negative to cause the electronic device 700 to be in the third situation and the second communication target identifier set WT2 consists of the second communication target identifier HT21, for each second respective data portion included in the second plurality of operation data portions DF62: the processing unit 710 uses the second specific application communication protocol PC21 to send the each second respective data portion toward the second communication target 521 based on the obtained second communication protocol identifier HP2, the obtained second source target identifier HS21, the obtained each second respective data portion and the obtained second communication target identifier HT21, so that the processing unit 710 causes the second communication target 521 to receive the second plurality of operation data portions DF62 to constitute the electronic data DE61.

In some embodiments, under a condition that the sixth logical decision RD66 is negative, the processing unit 710 controls the storage unit 720 based on the obtained storage address AS21 to obtain the stored electronic data DE61 from the storage block BS21, controls the storage unit 720 based on the obtained second memory address AM22 to obtain the stored second source target identifier HS21 and the stored second communication target identifier set WT2 from the second storage space SS22, and thereby outputs one selected from a group consisting of the seventh electronic message QE71, the ninth electronic message QE91, the respective eleventh electronic message QEB1 and another functional electronic message.

In some embodiments, the second communication target set 520 is a first empty set, or consists of one of the second communication target 521 and the second plurality of communication targets 521, 522, . . . . The second communication target identifier set WT2 is a second empty set, or consists of one of the second communication target identifier HT21 and the second plurality of communication target identifiers HT21, HT22, . . . . The second communication target 521 is the same as or different from the first communication target 511. The storage unit 720 stores the specific communication protocol identifier group GH1 in the storage area KS2. The specific communication protocol identifier group GH1 is configured to identify the specific communication protocol group GP1, and consists of a plurality of communication protocol identifiers HP1, HP2, . . . including the first communication protocol identifier HP1 and the second communication protocol identifier HP2. For example, the specific communication protocol identifier group GH1 is a specific communication protocol identifier array, and is determined beforehand.

In some embodiments, the plurality of communication protocol identifiers HP1, HP2, . . . are configured to respectively identify the plurality of different application communication protocols PC11, PC21, . . . , and respectively have a plurality of ordinal positions respectively represented by a plurality of ordinal numbers NP1, NP2, . . . , so that the first communication protocol identifier HP1 has a first ordinal position represented by a first ordinal number NP1, and the second communication protocol identifier HP2 has a second ordinal position represented by a second ordinal number NP2. The plurality of different application communication protocols PC11, PC21, . . . constitute the specific communication protocol group GP1, and include the first and the second specific application communication protocols PC11 and PC21.

In the first data preparation phase UP1 or before the first data preparation phase UP1, the processing unit 710 accesses the first communication protocol identifier HP1 in the specific communication protocol identifier group GH1 stored in the storage area KS2 based on the first ordinal number NP1 to obtain the first communication protocol identifier HP1, and accesses the second communication protocol identifier HP2 in the specific communication protocol identifier group GH1 stored in the storage area KS2 based on the second ordinal number NP2 to obtain the second communication protocol identifier HP2. The processing unit 710 obtains the plurality of communication protocol identifiers HP1, HP2, . . . from the specific communication protocol identifier group GH1, and sequentially performs a plurality of data transmission respectively associated with the plurality of different application communication protocols PC11, PC21, . . . under the plurality of different application communication protocols PC11, PC21, . . . based on the obtained plurality of communication protocol identifiers HP1, HP2, . . . .

In some embodiments, each of the first plurality of communication target identifiers HT11, HT12, . . . is one selected from a group consisting of a first email address, a first telephone number, a first uniform resource locator (URL) and a first network address, and complies with the first target identifier format stipulation SF1. For example, the respective first telephone number is a first mobile telephone number. The first source target identifier HS11 complies with the first target identifier format stipulation SF1, and is to be used to perform a third data transmission toward the electronic device 700 under the first specific application communication protocol PC11.

Each of the second plurality of communication target identifiers HT21, HT22, . . . is one selected from a group consisting of a second email address, a second telephone number, a second uniform resource locator (URL) and a second network address, and complies with the second target identifier format stipulation SF2. For example, the respective second telephone number is a second mobile telephone number. The second source target identifier HS21 complies with the second target identifier format stipulation SF2, and is to be used to perform a fourth data transmission toward the electronic device 700 under the second specific application communication protocol PC21.

In some embodiments, the electronic device 700 includes the storage unit 720 and the processing unit 710. The storage unit 720 stores the first communication protocol identifier HP1 configured to identify the first specific application communication protocol PC11. The processing unit 710 is coupled to the storage unit 720, and obtains the electronic data DE61 and the first communication target identifier HT11 to use the first specific application communication protocol PC11 to send the electronic data DE61 toward the first communication target 511 in response to one of the first effective request signal QR1 and the second effective request signal QU1, wherein the first communication target identifier HT11 is accessed based on the first communication protocol identifier HP1, and the first communication target 511 is identified by the first communication target identifier HT11.

Figure 44:
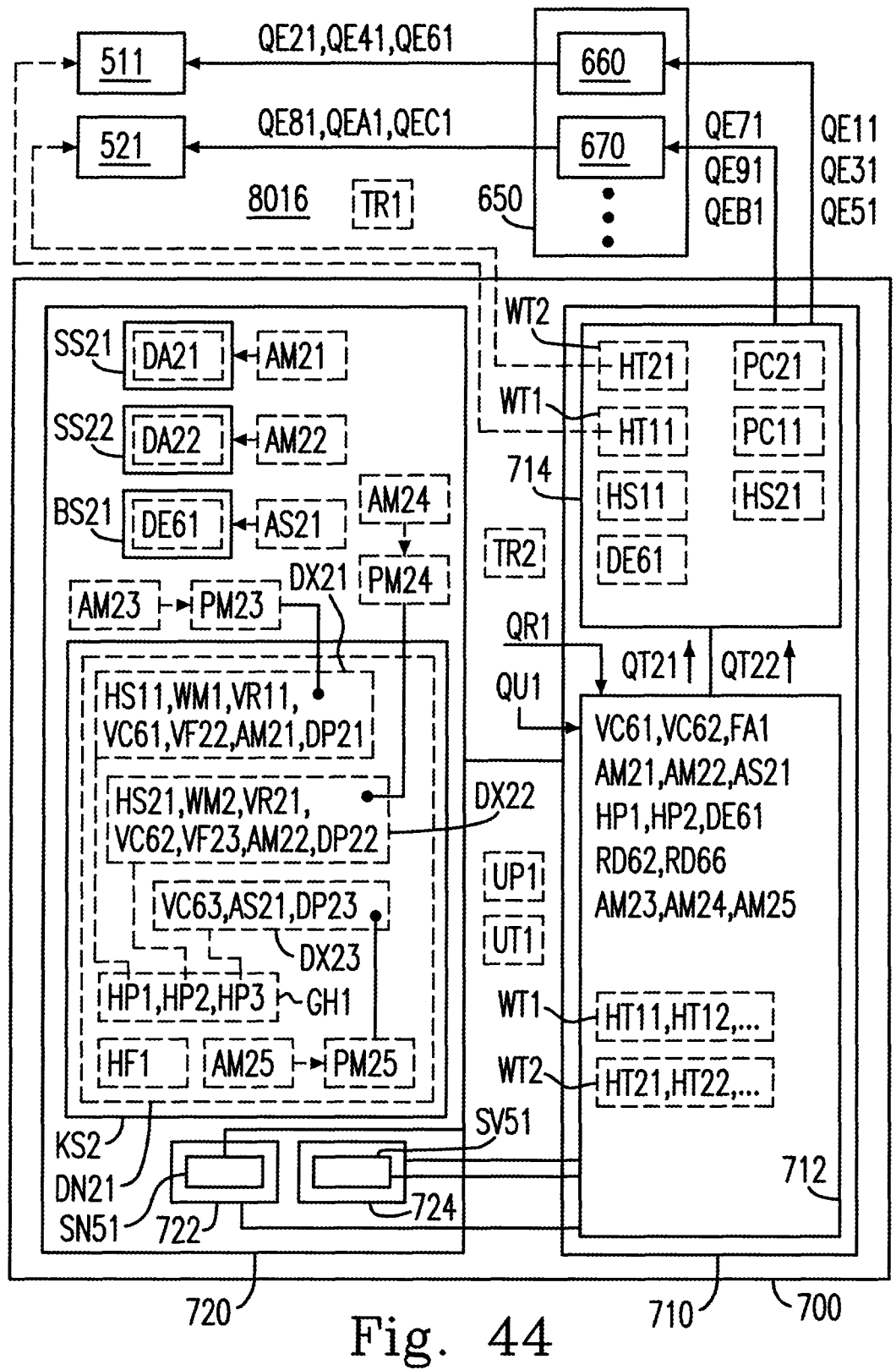
FIG. 44 is a schematic diagram showing an implementation structure of the communication system shown in FIG. 38.

Please refer to FIG. 44, which is a schematic diagram showing an implementation structure 8016 of the communication system 801 shown in FIG. 38. Please additionally refer to FIGS. 38, 39, 40, 41, 42 and 43. The implementation structure 8016 includes the electronic device 700, the message service system 650, the first communication target 511 and the second communication target 521. The message service system 650 includes the first message service device 660 and the second message service device 670.

In some embodiments, any of the electronic devices 100, 200, 201 and 700 is one selected from a group consisting of a first computing device, a first communication device, a first user device, a first mobile device, a first portable device, a first desktop device, a first relatively fixed device, a first fixed device, and any combination thereof. Any of the electronic devices 100, 200, 201 and 700 is identified by the first source target identifier HS11 under the first specific application communication protocol PC11, and is identified by the second source target identifier HS21 under the second specific application communication protocol PC21. For example, the first communication target identifier set WT1 includes or is independent from the first source target identifier HS11. The second communication target identifier set WT2 includes or is independent from the second source target identifier HS21.

The first plurality of communication target identifiers HT11, HT12, . . . are to be used for respectively linking to the first plurality of communication targets 511, 512, . . . by using the first specific application communication protocol PC11. The first source target identifiers HS11 is to be used for linking to the electronic device 700 by using the first specific application communication protocol PC11, and is one selected from a group consisting of a third email address, a third telephone number, a third uniform resource locator (URL) and a third network address. For example, the respective third telephone number is a third mobile telephone number.

In some embodiments, the processing unit 710 performs a specific application function FA1. For example, the specific application function FA1 is identified by an application function identifier HF1. The first specific data capacity value VC61 is determined beforehand according to one being selected from a group consisting of the first specific application communication protocol PC11, the specific application function FA1 and a combination thereof. The second specific data capacity value VC62 is determined beforehand according to one being selected from a group consisting of the second specific application communication protocol PC21, the specific application function FA1 and a combination thereof. The third specific data capacity value VC63 is determined beforehand according to one being selected from a group consisting of the third specific application communication protocol PC31, the specific application function FA1 and a combination thereof. The second data limit length value VF22 is determined beforehand according to one being selected from a group consisting of the first specific application communication protocol PC11, the specific application function FA1 and a combination thereof. The third data limit length value VF23 is determined beforehand according to one being selected from a group consisting of the second specific application communication protocol PC21, the specific application function FA1 and a combination thereof.

In some embodiments, the storage unit 720 is controlled by the processing unit 710, includes a nonvolatile memory unit 722 coupled to the processing unit 710, and a volatile memory unit 724 coupled to the processing unit 710, and stores a stored data DN21, the electronic data DE61, the first application data DA21 and the second application data DA22. For example, the stored data DN21 is stored in the storage area KS2. The nonvolatile memory unit 722 includes a nonvolatile memory space SN51 coupled to the processing unit 710. The volatile memory unit 724 includes a volatile memory space SV51 coupled to the processing unit 710.

When the first storage space SS21 is the first nonvolatile memory space, the first storage space SS21 is included in the nonvolatile memory space SN51 of the nonvolatile memory unit 722. When the first storage space SS21 is the first volatile memory space, the first storage space SS21 is included in the volatile memory space SV51 of the volatile memory unit 724. When the second storage space SS22 is the second nonvolatile memory space, the second storage space SS22 is included in the nonvolatile memory space SN51 of the nonvolatile memory unit 722. When the second storage space SS22 is the second volatile memory space, the second storage space SS22 is included in the volatile memory space SV51 of the volatile memory unit 724.

When the storage block BS21 is the nonvolatile memory block, the storage block BS21 is included in the nonvolatile memory space SN51 of the nonvolatile memory unit 722. When the storage block BS21 is the volatile memory block, the storage block BS21 is included in the volatile memory space SV51 of the volatile memory unit 724. When the storage area KS2 is the nonvolatile memory area, the storage area KS2 is included in the nonvolatile memory space SN51 of the nonvolatile memory unit 722. When the storage area KS2 is the volatile memory area, the storage area KS2 is included in the volatile memory space SV51 of the volatile memory unit 724.

The stored data DN21 is stored in the storage area KS2, and includes the application function identifier HF1, the specific communication protocol identifier group GH1, a first reference data DX21 stored in the storage area KS2 based on the first communication protocol identifier HP1, a second reference data DX22 stored in the storage area KS2 based on the second communication protocol identifier HP2, and a third reference data DX23 stored in the storage area KS2.

The first reference data DX21, the second reference data DX22 and the third reference data DX23 are respectively stored at a third memory location PM23, a fourth memory location PM24 and a fifth memory location PM25. The third, the fourth and the fifth memory locations PM23, PM24 and PM25 are respectively identified by a third memory address AM23, a fourth memory address AM24 and a fifth memory address AM25, or are respectively identified based on the third, the fourth and the fifth memory addresses AM23, AM24 and AM25. The third and the fourth memory addresses AM23 and AM24 are respectively determined based on the first and the second communication protocol identifiers HP1 and HP2, so that the first reference data DX21 and the second reference data DX22 are configured to respectively correspond to the first and the second communication protocol identifiers HP1 and HP2. The specific communication protocol identifier group GH1 includes the first and the second communication protocol identifiers HP1 and HP2.

In some embodiments, the third reference data DX23 is optionally stored in the storage area KS2 based on the third communication protocol identifier HP3. Under a condition that the third reference data DX23 is stored in the storage area KS2 based on the third communication protocol identifier HP3, the fifth memory address AM25 is determined based on the third communication protocol identifier HP3, so that the third reference data DX23 is configured to correspond to the third communication protocol identifier HP3.

Under a condition that the third reference data DX23 is stored in the storage area KS2 based on the third communication protocol identifier HP3 and the third communication protocol identifier HP3 is the first communication protocol identifiers HP1: the third reference data DX23 is included in the first reference data DX21; the fifth memory location PM25 is the third memory location PM23; and the fifth memory address AM25 is the third memory address AM23.

Under a condition that the third reference data DX23 is stored in the storage area KS2 based on the third communication protocol identifier HP3 and the third communication protocol identifier HP3 is the second communication protocol identifiers HP2: the third reference data DX23 is included in the second reference data DX22; the fifth memory location PM25 is the fourth memory location PM24; and the fifth memory address AM25 is the fourth memory address AM24.

For example, the processing unit 710 is configured to cause the storage unit 720 to store the third, the fourth and the fifth memory addresses AM23, AM24 and AM25 in the storage area KS2. The third, the fourth and the fifth memory addresses AM23, AM24 and AM25 are configured to be respectively determined according to the first, the second and the third communication protocol identifiers HP1, HP2 and HP3.

The first reference data DX21 includes a first plurality of application parameters, which include the first source target identifier HS11, the first candidate target identifier set WM1, the first referential logical value VR11, the first specific data capacity value VC61, the second data limit length value VF22, the first memory address AM21 and the first display coordinate data DP21. The second reference data DX22 includes a second plurality of application parameters, which include the second source target identifier HS21, the second candidate target identifier set WM2, the second referential logical value VR21, the second specific data capacity value VC62, the third data limit length value VF23, the second memory address AM22 and the second display coordinate data DP22. The third reference data DX23 includes a third plurality of application parameters, which include the third specific data capacity value VC63, the storage address AS21 and a third display coordinate data DP23.

The processing unit 710 obtains the third memory address AM23 based on the first communication protocol identifier HP1, and accesses at least a first application parameter included in the first plurality of application parameters based on the obtained third memory address AM23 to obtain the at least a first application parameter. The processing unit 710 obtains the fourth memory address AM24 based on the second communication protocol identifier HP2, and accesses at least a second application parameter included in the second plurality of application parameters based on the obtained fourth memory address AM24 to obtain the at least a second application parameter.

The processing unit 710 obtains the fifth memory address AM25, and accesses at least a third application parameter included in the third plurality of application parameters based on the obtained fifth memory address AM25 to obtain the at least a third application parameter. For example, under a condition that the third reference data DX23 is stored in the storage area KS2 based on the third communication protocol identifier HP3, the processing unit 710 obtains the fifth memory address AM25 based on the third communication protocol identifier HP3.

In some embodiments, the processing unit 710 includes a communication interface unit 714 and a processor 712. The communication interface unit 714 is coupled to the first and the second message service devices 660 and 670. For example, the communication interface unit 714 is one of a wireless interface unit and a wired interface unit. The processor 712 is coupled to the storage unit 720 and the communication interface unit 714, and controls the storage unit 720 and the communication interface unit 714.

In some embodiments, the processor 712 obtains the first communication protocol identifier HP1 from the specific communication protocol identifier group GH1 stored in the storage area KS2, and obtains the first specific data capacity value VC61 representing the first data capacity CD61 from the storage area KS2 based on the obtained first communication protocol identifier HP1. The processor 712 allocates in the storage unit 720 the first storage space SS21 having the first data capacity CD61 based on the obtained first specific data capacity value VC61 to obtain the first memory address AM21 configured to identify the first storage space SS21. The processor 712 obtains the third specific data capacity value VC63 representing the third data capacity CD63 from the storage area KS2 based on the obtained third communication protocol identifier HP3, and allocates in the storage unit 720 the storage block BS21 having the third data capacity CD63 based on the obtained third specific data capacity value VC63 to obtain the storage address AS21 configured to identify the storage block BS21. The processor 712 prepares the electronic data DE61 in the storage block BS21 based on the obtained storage address AS21, and prepares the first communication target identifier HT11 in the first storage space SS21 based on the obtained first memory address AM21.

Under a condition that the processor 712 finishes preparing the electronic data DE61, the first communication target identifier HT11 and the second communication target identifier HT21 in the storage unit 720, the processor 712 controls the storage unit 720 to separately access the prepared electronic data DE61 and the prepared first communication target identifier HT11 based on the obtained storage address AS21 and the obtained first memory address AM21 to cause the communication interface unit 714 to separately obtain the prepared electronic data DE61 and the prepared first communication target identifier HT11 from the storage block BS21 and the first storage space SS21, and controls the communication interface unit 714 based on the obtained first communication protocol identifier HP1 to cause the communication interface unit 714 to use the first specific application communication protocol PC11 to send the electronic data DE61 toward the first communication target 511.

The processor 712 outputs a first control signal QT21 to the communication interface unit 714 based on the obtained first communication protocol identifier HP1, the obtained storage address AS21 and the obtained first memory address AM21. The communication interface unit 714 uses the first specific application communication protocol PC11 to output one selected from a group consisting of the first electronic message QE11, the third electronic message QE31, the respective fifth electronic message QE51 and another functional electronic message toward the first message service device 660 based on the first control signal QT21, the obtained electronic data DE61 and the obtained first communication target identifier HT11.

The processor 712 obtains the second communication protocol identifier HP2 from the specific communication protocol identifier group GH1 stored in the storage area KS2, and obtains the second specific data capacity value VC62 representing the second data capacity CD62 from the storage area KS2 based on the obtained second communication protocol identifier HP2. The processor 712 allocates in the storage unit 720 the second storage space SS22 having the second data capacity CD62 based on the obtained second specific data capacity value VC62 to obtain the second memory address AM22 configured to identify the second storage space SS22. The processor 712 prepares the second communication target identifier HT21 in the second storage space SS22 based on the obtained second memory address AM22.

Under a condition that the processor 712 finishes preparing the electronic data DE61, the first communication target identifier HT11 and the second communication target identifier HT21 in the storage unit 720, the processor 712 controls the storage unit 720 to separately access the prepared electronic data DE61 and the prepared second communication target identifier HT21 based on the obtained storage address AS21 and the obtained second memory address AM22 to cause the communication interface unit 714 to separately obtain the prepared electronic data DE61 and the prepared second communication target identifier HT21 from the storage block BS21 and the second storage space SS22, and controls the communication interface unit 714 based on the obtained second communication protocol identifier HP2 to cause the communication interface unit 714 to use the second specific application communication protocol PC21 to send the electronic data DE61 toward the second communication target 521.

The processor 712 outputs a second control signal QT22 to the communication interface unit 714 based on the obtained second communication protocol identifier HP2, the obtained storage address AS21 and the obtained second memory address AM22. The communication interface unit 714 uses the second specific application communication protocol PC21 to output one selected from a group consisting of the seventh electronic message QE71, the ninth electronic message QE91, the respective eleventh electronic message QEB1 and another functional electronic message toward the second message service device 670 based on the second control signal QT22, the obtained electronic data DE61 and the obtained second communication target identifier HT21.

In some embodiments, under a condition that the second logical decision RD62 is negative, the processor 712 controls the storage unit 720 and the communication interface unit 714 to cause the communication interface unit 714 to obtain the stored first source target identifier HS11, the stored electronic data DE61 and the stored first communication target identifier set WT1 from the storage block BS21 and the first storage space SS21 based on the obtained storage address AS21 and the obtained first memory address AM21, and outputs the first control signal QT21 to the communication interface unit 714 to cause the communication interface unit 714 to use the first specific application communication protocol PC11 to output one selected from a group consisting of the first electronic message QE11, the third electronic message QE31, the respective fifth electronic message QE51 and another functional electronic message.

Under a condition that the sixth logical decision RD66 is negative, the processor 712 controls the storage unit 720 and the communication interface unit 714 to cause the communication interface unit 714 to obtain the stored second source target identifier HS21, the stored electronic data DE61 and the stored second communication target identifier set WT2 from the storage block BS21 and the second storage space SS22 based on the obtained storage address AS21 and the obtained second memory address AM22, and outputs the second control signal QT22 to the communication interface unit 714 to cause the communication interface unit 714 to use the second specific application communication protocol PC21 to output one selected from a group consisting of the seventh electronic message QE71, the ninth electronic message QE91, the respective eleventh electronic message QEB1 and another functional electronic message.

In some embodiments, the first communication target 511 is one selected from a group consisting of a second computing device, a second communication device, a second user device, a second mobile device, a second portable device, a second desktop device, a second relatively fixed device, a second fixed device, and any combination thereof. The second communication target 521 is one selected from a group consisting of a third computing device, a third communication device, a third user device, a third mobile device, a third portable device, a third desktop device, a third relatively fixed device, a third fixed device, and any combination thereof.

Figure 45:
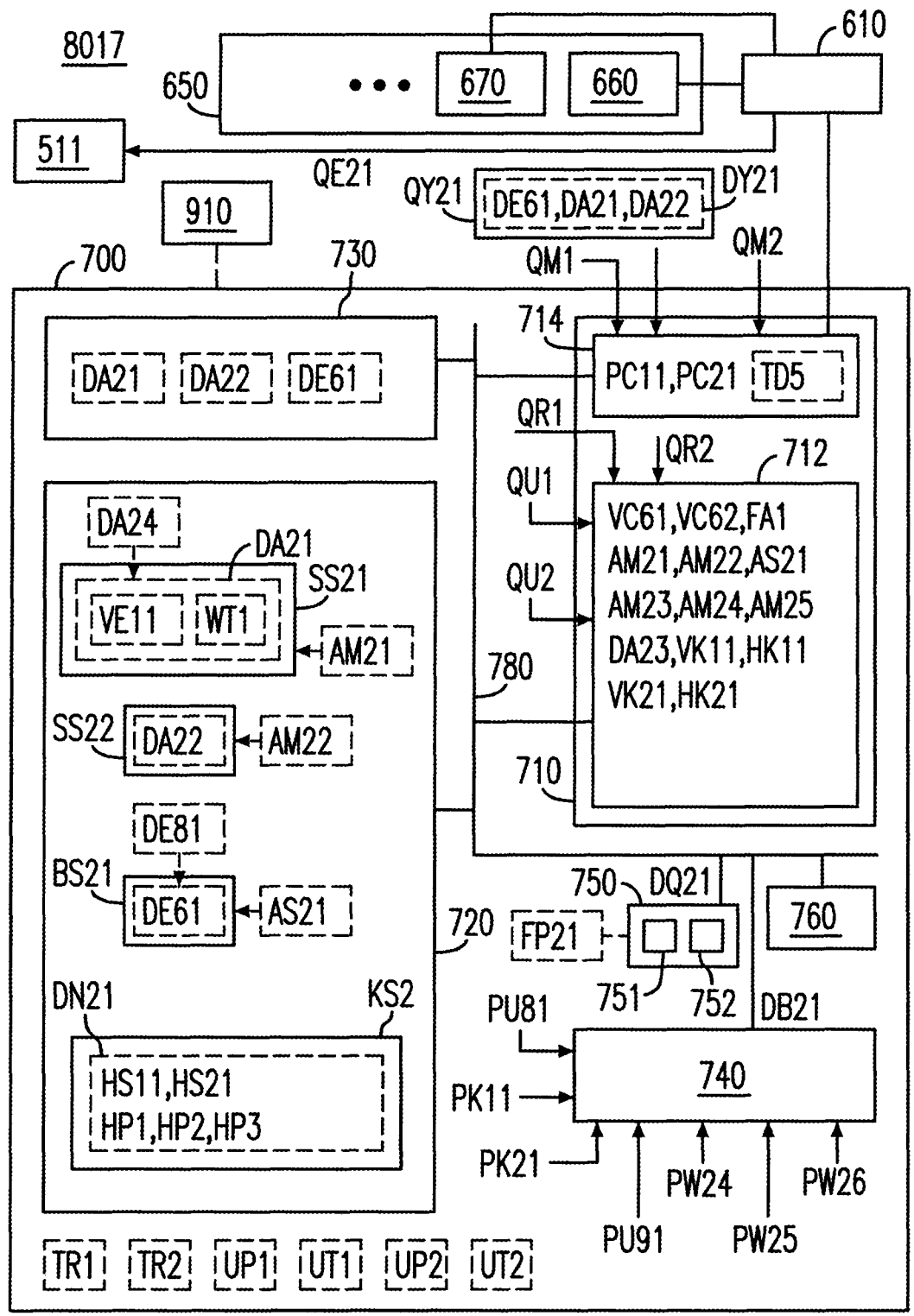
FIG. 45 is a schematic diagram showing an implementation structure of the communication system shown in FIG. 38.

Please refer to FIG. 45, which is a schematic diagram showing an implementation structure 8017 of the communication system 801 shown in FIG. 38. Please additionally refer to FIGS. 38, 39, 41, 43 and 44. The implementation structure 8017 includes the electronic device 700, a network 610, the message service system 650, the first communication target 511 and a user 910. The message service system 650 includes the first and the second message service devices 660 and 670. The electronic device 700 includes the processing unit 710, the storage unit 720 and the display unit 730. The display unit 730 is coupled to the processor 712, and is controlled by the processor 712 to display the electronic data DE61, a data content of the first application data DA21, and a data content of the second application data DA22.

In some embodiments, any of the electronic devices 100, 200, 201 and 700 is one selected from a group consisting of the first computing device, the first communication device, the first user device, the first mobile device, the first portable device, the first desktop device, the first relatively fixed device, the first fixed device and any combination thereof, is used by the user 910, and includes the input unit 740, a sensing unit 750 and a timer 760. The input unit 740 is coupled to the processor 712, is controlled by the processor 712, and provides a first input data DB21 to the processor 712. The sensing unit 750 is coupled to the processor 712, is controlled by the processor 712, and is configured to sense a variable physical parameter FP21 to provide a sense data DQ21 to the processor 712. For example, the variable physical parameter FP21 is one selected from a group consisting of a variable electrical parameter, a variable mechanic parameter, a variable optical parameter and any combination thereof. The timer 760 is coupled to the processor 712, and is controlled by the processor 712.

For example, the sensing unit 750 includes an image sensing component 751 and a sound sensing component 752. Each of the image sensing component 751 and the sound sensing component 752 is coupled to the processor 712. Under a condition that the user 910 presents or is configured to present an application image, the image sensing component 751 is configured to sense the application image of the user 910 to cause the sense data DQ21 to include an image data. Under a condition that the user 910 makes an application sound, the sound sensing component 752 is configured to sense the application sound, made by the user 910, to cause the sense data DQ21 to include a sound data. For example, the image sensing component 751 is a camera. The sound sensing component 752 is a microphone. The application image is one selected from a group consisting of a face image, a fingerprint, a hand image, a body-portion image and a body image. The application sound is one selected from a group consisting of a voice, a musical sound, and a combination of the voice and the musical sound. For example, the sensing unit 750 includes at least one of the image sensing component 751 and the sound sensing component 752.

The communication interface unit 714 is further coupled to the network 610, and receives an input message QY21 including a second input data DY21. For example, the communication interface unit 714 receives the input message QY21 through the network 610. For example, the communication interface unit 714 receives the input message QY21 from one of the first communication target 511 and the second communication target 521. Each of the first and the second message service devices 660 and 670 is coupled to the network 610, and is included in the message service system 650. The electronic device 700 further includes a bus 780. The bus 780 is coupled to the processor 712, the communication interface unit 714, the timer 760, the storage unit 720, the input unit 740, the display unit 730 and the sensing unit 750. For example, the communication interface unit 714 sends the electronic data DE61 toward the first communication target 511 through the network 610, and sends the electronic data DE61 toward the second communication target 521 through the network 610.

Under a condition that the electronic device 700 is applied to the first specific application communication protocol PC11, the first source target identifier HS11 stored in the storage area KS2 serves as a first user identifier configured to identify the user 910. Under a condition that the electronic device 700 is applied to the second specific application communication protocol PC21, the second source target identifier HS21 stored in the storage area KS2 serves as a second user identifier configured to identify the user 910.

In some embodiments, the input unit 740 receives the first user input operation PU81 performed by the user 910. The processor 712 receives the first effective request signal QR1 to cause the electronic device 700 to enter the first data preparation phase UP1 in response to one selected from a group consisting of the first user input operation PU81 associated with the input unit 740 and the user 910, a message reception associated with the input message QY21, a first specific request message QM1 received by the communication interface unit 714, and a first integer overflow associated with the timer 760.

In some embodiments, the communication interface unit 714 receives the first specific request message QM1 including a first specific control instruction. For example, the first specific request message QM1 is the first input request message, so that the first effective request signal QR1 may be the first specific request message QM1. The processor 712 causes the electronic device 700 to enter the first data preparation phase UP1 based on the first specific control instruction. For example, the communication interface unit 714 receives the first specific request message QM1 through the network 610. For example, the communication interface unit 714 receives the first specific request message QM1 from one of the first communication target 511 and the second communication target 521.

In some embodiments, the input unit 740 provides the first effective request signal QR1 to the processor 712 in response to the first user input operation PU81, wherein the first effective request signal QR1 may be the first interrupt request signal. In some embodiments, the timer 760 provides the first effective request signal QR1 to the processor 712 in response to the first integer overflow, wherein the first effective request signal QR1 may be the first interrupt request signal.

Under a condition that the processing unit 710 causes the electronic device 700 to enter the first data preparation phase UP1 in response to the message reception: the second input data DY21 includes the electronic data DE61, the first application data DA21 and the second application data DA22; and in the first data preparation phase UP1, the processing unit 710 obtains the storage address AS21 based on the third communication protocol identifier HP3 obtained from the specific communication protocol identifier group GH1 stored in the storage area KS2, and causes the storage unit 720 to store the received electronic data DE61 into the storage block BS21 based on the obtained storage address AS21. For example, the message reception causes to provide the first effective request signal QR1 to the processor 712 to cause the electronic device 700 to enter the first data preparation phase UP1, wherein the first effective request signal QR1 may be the first interrupt request signal.

Under a condition that the processing unit 710 causes the electronic device 700 to enter the first data preparation phase UP1 in response to the message reception: in the first data preparation phase UP1, the processing unit 710 obtains the first memory address AM21 based on the first communication protocol identifier HP1 obtained from the specific communication protocol identifier group GH1 stored in the storage area KS2, and causes the storage unit 720 to store or write the received first application data DA21 into the first storage space SS21 based on the obtained first memory address AM21; and in the first data preparation phase UP1, the processing unit 710 obtains the second memory address AM22 based on the second communication protocol identifier HP2 obtained from the specific communication protocol identifier group GH1 stored in the storage area KS2, and causes the storage unit 720 to store or write the received second application data DA22 into the second storage space SS22 based on the obtained second memory address AM22.

The first memory address AM21 is one of a first base address and a first end address, so that the first memory location PM21 is one of a first base location and a first end location. The second memory address AM22 is one of a second base address and a second end address, so that the second memory location PM22 is one of a second base location and a second end location.

Under a condition that the processing unit 710 causes the electronic device 700 to enter the first data preparation phase UP1 in response to the first user input operation PU81, the input unit 740 in the first data preparation phase UP1 receives the user input operation PK11 performed by the user 910, the user input operation PK21 performed by the user 910, and the user input operation PW24 performed by the user 910. Therefore, the processing unit 710 causes the storage unit 720 to prepare the electronic data DE61 in the storage area BS21 in the first data preparation phase UP1 in response to the user input operation PW24, causes the storage unit 720 to prepare the first application data DA21 in the first storage space SS21 in the first data preparation phase UP1 in response to the user input operation PK11, and causes the storage unit 720 to prepare the second application data DA22 in the second storage space SS22 in the first data preparation phase UP1 in response to the user input operation PK21.

In some embodiments, under a condition that the processing unit 710 finishes preparing the first application data DA21, the second application data DA22 and the electronic data DE61, the input unit 740 receives the second user input operation PU91 performed by the user 910. Therefore, under a condition that the processing unit 710 finishes preparing the first application data DA21, the second application data DA22 and the electronic data DE61, the processing unit 710 receives the second effective request signal QU1 in response to one selected from a group consisting of the second user input operation PU91 associated with the input unit 740 and the user 910, a second specific request message QM2 received by the communication interface unit 714, and a second integer overflow associated with the timer 760.

In some embodiments, the communication interface unit 714 receives the second specific request message QM2 including a second specific control instruction. For example, the second specific request message QM2 is the second input request message, so that the second effective request signal QU1 may be the second specific request message QM2. The processor 712 causes the electronic device 700 to leave the first data preparation phase UP1 to enter the first data transmission phase UT1 based on the second specific control instruction. For example, the communication interface unit 714 receives the second specific request message QM2 through the network 610. For example, the communication interface unit 714 receives the second specific request message QM2 from one of the first communication target 511 and the second communication target 521.

In some embodiments, the input unit 740 provides the second effective request signal QU1 to the processor 712 in response to the second user input operation PU91, wherein the second effective request signal QU1 may be the second interrupt request signal. In some embodiments, the timer 760 provides the second effective request signal QU1 to the processor 712 in response to the second integer overflow, wherein the second effective request signal QU1 may be the second interrupt request signal.

Under a condition that the processing unit 710 causes the electronic device 700 to enter the first data preparation phase UP1 in response to the first user input operation PU81, the processing unit 710 determines the electronic data DE61 for the specific application function FA1 based on a third application data DA23 provided by the electronic device 700. For example, the third application data DA23 is one selected from a group consisting of the first input data DB21, the stored data DN21, the sense data DQ21, the second input data DY21, and any combination thereof. For example, each of the first desired logical value VK11, the at least a first desired target identifier HK11, the second desired logical value VK21, and the at least a second desired target identifier HK21 is determined based on the third application data DA23, and is desired by the user 910.

The message service system 650 includes a plurality of message service devices 660, 670, . . . respectively support the plurality of different application communication protocols PC11, PC21, . . . . For example, the plurality of message service devices 660, 670, . . . include the first and the second message service devices 660 and 670; and each of the plurality of message service devices 660, 670, . . . is coupled to the communication interface unit 714 and the network 610. For example, the specific application function FA1 is one selected from a group consisting of a service function, a communication function, a control function, a data processing function, a data analysis function, a data conversion function, and any combination thereof. For example, the communication interface unit 714 transmits one selected from a group consisting of the first electronic message QE11, the third electronic message QE31, the respective fifth electronic message QE51 and another functional electronic message toward the first message service device 660 through the network 610, and transmits one selected from a group consisting of the seventh electronic message QE71, the ninth electronic message QE91, the respective eleventh electronic message QEB1 and another functional electronic message toward the second message service device 670 through the network 610.

In some embodiments, the processing unit 710 determines the electronic data DE61 in the first data preparation phase UP1 based on one selected from a group consisting of the first input data DB21, the stored data DN21, the sense data DQ21, the second input data DY21, and any combination thereof. For example, the electronic data DE61 is one selected from a group consisting of a service data, an article data, a manufacture data, a material data, a management data, and any combination thereof. For example, the communication interface unit 714 supports the first and the second specific application communication protocols PC11 and PC21. For example, the input unit 740 receives in the first data preparation phase UP1 the user input operation PW24 performed by the user 910, and provides the first input data DB21 to the processing unit 710 in response to the user input operation PW24 associated with the user 910. For example, the processing unit 710 obtains the electronic data DE61 from the stored data DN21 in response to the user input operation PW24, and causes the storage unit 720 to prepare the electronic data DE61, obtained from the stored data DN21, in the storage area BS21 based on the obtained storage address AS21.

In some embodiments, the input unit 740 in a second data preparation phase UP2 being after the first data transmission phase UT1 receives a user input operation PW25 performed by the user 910. Therefore, the processing unit 710, in the second data preparation phase UP2 in response to the user input operation PW25 associated with the user 910 and the input unit 740, changes the first application data DA21, stored in the first storage space SS21, into a fourth application data DA24, and/or changes the electronic data DE61, stored in the storage area BS21, into changed data DE81.

For example, the processing unit 710 optionally changes a data content of the electronic data DE61, stored in the storage area BS21, to form the changed data DE81 in response to the user input operation PW25. The processing unit 710, in response to the user input operation PW25, optionally further changes a logical-value content of the first effective logical value VE11, stored in the first storage space SS21, to form the fourth application data DA24. The processing unit 710, in response to the user input operation PW25, optionally further changes an identifier-set content of the first communication target identifier set WT1, stored in the first storage space SS21, to form the fourth application data DA24.

In some embodiments, under a condition that the first application data DA21 stored in the first storage space SS21 is changed into the fourth application data DA24 and/or the electronic data DE61 stored in the storage area BS21 is changed into the changed data DE81, the input unit 740 receives a user input operation PW26 performed by the user 910. The processing unit 710 receives a third effective request signal QU2 in response to the user input operation PW26 associated with the user 910 and the input unit 740, and causes the electronic device 700 to enter a second data transmission phase UT2 being after the second data preparation phase UP2 in response to the third effective request signal QU2. For example, the third effective request signal QU2 is one of a third interrupt request signal and a third input request message.

The processing unit 710 accesses the fourth application data DA24, stored in the first storage space SS21, in the second data transmission phase UT2 based on the first communication protocol identifier HP1 to obtain the fourth application data DA24 and/or the changed data DE81 from the storage unit 720, and performs a fifth data transmission TD5 based on the obtained fourth application data DA24 and/or the obtained changed data DE8. For example, the processing unit 710 causes the electronic device 700 to enter the second data preparation phase UP2 in response to a fourth effective request signal QR2.

Figure 46:
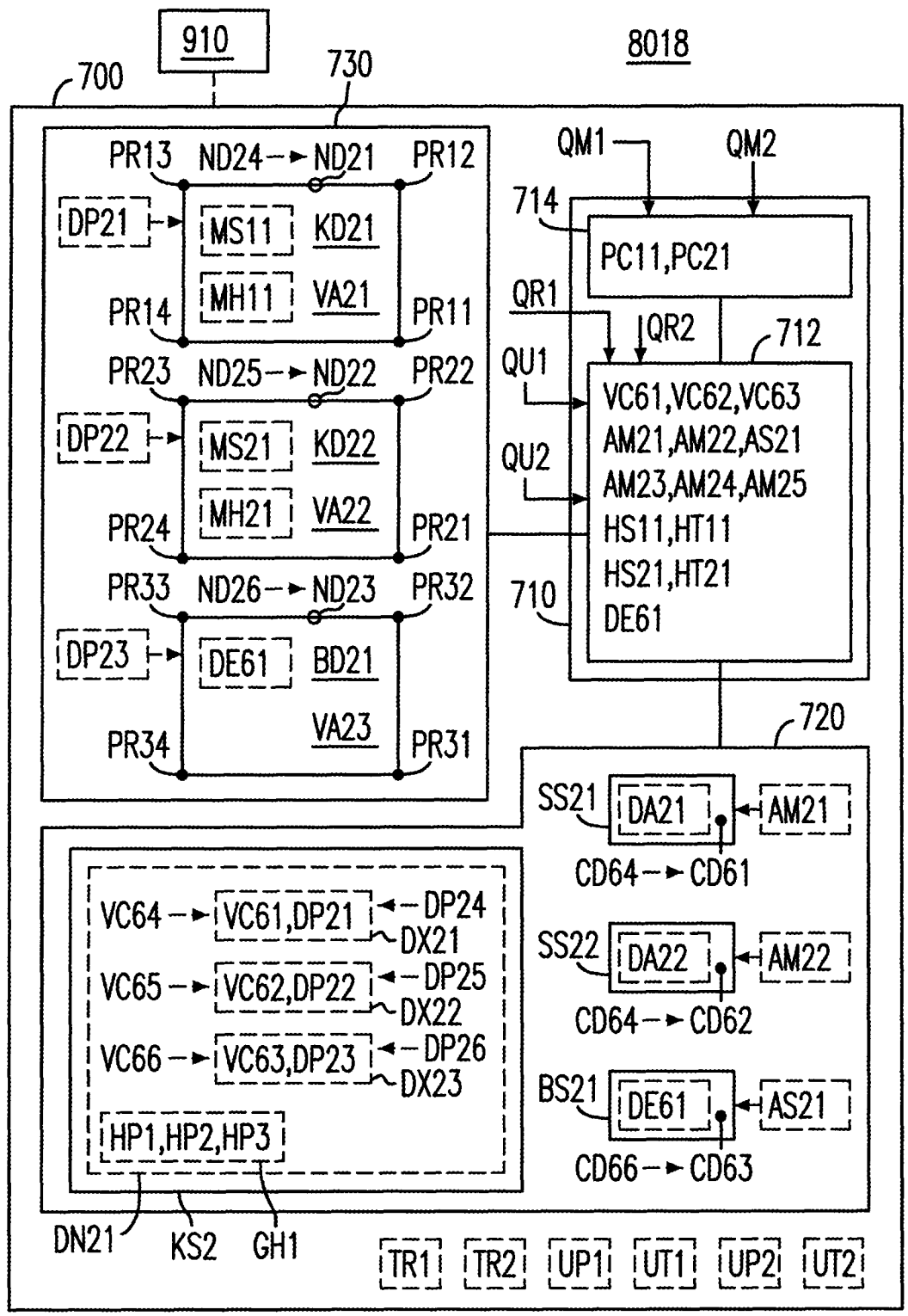
FIG. 46 is a schematic diagram showing an implementation structure of the communication system shown in FIG. 38.

Please refer to FIG. 46, which is a schematic diagram showing an implementation structure 8018 of the communication system 801 shown in FIG. 38. Please additionally refer to FIGS. 38, 39, 41, 43, 44 and 45. The implementation structure 8018 includes the electronic device 700 and the user 910. The electronic device 700 includes the processing unit 710, the storage unit 720 and the display unit 730. The display unit 730 includes the first display area KD21 associated with the first communication protocol identifier HP1, a second display area KD22 associated with the second communication protocol identifier HP2, and the display block BD21 associated with the third communication protocol identifier HP3.

For example, the first display area KD21 includes a first display border ND21 being dependent on a first plurality of display reference locations PR11, PR12, PR13 and PR14, and has a first display area value VA21 being proportional to the first specific data capacity value VC61. The second display area KD22 includes a second display border KD22 being dependent on a second plurality of display reference locations PR21, PR22, PR23 and PR24, and has a second display area value VA22 being proportional to the second specific data capacity value VC62. The display block BD21 includes a third display border ND23 being dependent on a third plurality of display reference locations PR31, PR32, PR33 and PR34, and has a third display area value VA23 being proportional to the third specific data capacity value VC63.

The first display area KD21, the second display area KD22 and the display block BD21 are different, and are respectively represented by the first display coordinate data DP21, a second display coordinate data DP22 and a third display coordinate data DP23. The first, the second and the third display coordinate data DP21, DP22 and DP23 are respectively associated with the first, the second and the third communication protocol identifiers HP1, HP2 and HP3. For example, the first display coordinate data DP21 includes a first plurality of screen reference coordinates configured to respectively represent the first plurality of display reference locations PR11, PR12, PR13 and PR14, and is dependent on the first display area value VA21. The second display coordinate data DP22 includes a second plurality of screen reference coordinates configured to respectively represent the second plurality of display reference locations PR21, PR22, PR23 and PR24, and is dependent on the second display area value VA22. The third display coordinate data DP23 includes a third plurality of screen reference coordinates configured to respectively represent the third plurality of display reference locations PR31, PR32, PR33 and PR34, and is dependent on the third display area value VA23.

In some embodiments, the processing unit 710 accesses the first specific data capacity value VC61, stored in the storage area KS2, based on the first communication protocol identifier HP1, stored in the storage area KS2, to obtain the first specific data capacity value VC61, and determines or determines beforehand the first display coordinate data DP21 based on the obtained first specific data capacity value VC61. Therefore, the processing unit 710 obtains the first display coordinate data DP21 based on the first communication protocol identifier HP1, stores the first display coordinate data DP21 in the storage area KS2 based on the first communication protocol identifier HP1, and accesses the first display coordinate data DP21 stored in the storage area KS2 based on the first communication protocol identifier HP1.

The processing unit 710 accesses the second specific data capacity value VC62, stored in the storage area KS2, based on the second communication protocol identifier HP2, stored in the storage area KS2, to obtain the second specific data capacity value VC62, and determines or determines beforehand the second display coordinate data DP22 based on the obtained second specific data capacity value VC62. Therefore, the processing unit 710 obtains the second display coordinate data DP22 based on the second communication protocol identifier HP2, stores the second display coordinate data DP22 in the storage area KS2 based on the second communication protocol identifier HP2, and accesses the second display coordinate data DP22 stored in the storage area KS2 based on the second communication protocol identifier HP2.

The processing unit 710 accesses the third specific data capacity value VC63, stored in the storage area KS2, based on the third communication protocol identifier HP3, stored in the storage area KS2, to obtain the third specific data capacity value VC63, and determines or determines beforehand the third display coordinate data DP23 based on the obtained third specific data capacity value VC63. Therefore, the processing unit 710 obtains the third display coordinate data DP23 based on the third communication protocol identifier HP3, stores the third display coordinate data DP23 in the storage area KS2 based on the third communication protocol identifier HP3, and accesses the third display coordinate data DP23 stored in the storage area KS2 based on the third communication protocol identifier HP3.

The processing unit 710 obtains the first display coordinate data DP21 based on the first communication protocol identifier HP1 stored in the storage area KS2, and causes the display unit 730 based on the obtained first display coordinate data DP21 to display on the first display area KD21 a first source target identification information MS11 representing the first source target identifier HS11, and the first communication target identification information MH11 representing the first communication target identifier HT11. For example, under a condition that the processor 712 receives the first effective request signal QR1, the processor 712 causes the display unit 730 to display the first source target identification information MS11 and the first communication target identification information MH11 on the first display area KD21 based on the obtained first display coordinate data DP21. For example, the first source target identification information MS11 is the same as or different from the first source target identifier HS11. For example, the first communication target identification information MH11 is the same as or different from the first communication target identifier HT11.

The processing unit 710 obtains the second display coordinate data DP22 based on the second communication protocol identifier HP2 stored in the storage area KS2, and causes the display unit 730 based on the obtained second display coordinate data DP22 to display on the second display area KD22 a second source target identification information MS21 representing the second source target identifier HS21, and the second communication target identification information MH21 representing the second communication target identifier HT21. For example, under a condition that the processor 712 receives the first effective request signal QR1, the processor 712 causes the display unit 730 to display the second source target identification information MS21 and the second communication target identification information MH21 on the second display area KD22 based on the obtained second display coordinate data DP22. For example, the second source target identification information MS21 is the same as or different from the second source target identifier HS21. For example, the second communication target identification information MH21 is the same as or different from the second communication target identifier HT21.

The processing unit 710 obtains the third display coordinate data DP23 based on the third communication protocol identifier HP3 stored in the storage area KS2, and causes the display unit 730 to display the electronic data DE61 on the display block BD21 based on the obtained third display coordinate data DP23. For example, under a condition that the processor 712 receives the first effective request signal QR1, the processor 712 causes the display unit 730 to display the electronic data DE61 on the display block BD21 based on the obtained third display coordinate data DP23.

In some embodiments, the processing unit 710 replaces the first specific data capacity value VC61 stored in the storage area KS2 with a fourth specific data capacity value VC64 being different from the first specific data capacity value VC61 to change the first storage space SS21 from the first data capacity CD61 into a fourth data capacity CD64 represented by the fourth specific data capacity value VC64.

The processing unit 710 replaces the first display coordinate data DP21 stored in the storage area KS2 with a fourth display coordinate data DP24 being different from the first display coordinate data DP21 to change the first display area KD21 from the first display border ND21 into a fourth display border ND24 represented by the fourth display coordinate data DP24. For example, the fourth display coordinate data DP24 is determined based on the fourth specific data capacity value VC64.

The processing unit 710 replaces the second specific data capacity value VC62 stored in the storage area KS2 with a fifth specific data capacity value VC65 being different from the second specific data capacity value VC62 to change the second storage space SS22 from the second data capacity CD62 into a fifth data capacity CD65 represented by the fifth specific data capacity value VC65. The processing unit 710 replaces the second display coordinate data DP22 stored in the storage area KS2 with a fifth display coordinate data DP25 being different from the second display coordinate data DP22 to change the second display area KD22 from the second display border KD22 into a fifth display border ND25 represented by the fifth display coordinate data DP25. For example, the fifth display coordinate data DP25 is determined based on the fifth specific data capacity value VC65.

The processing unit 710 replaces the third specific data capacity value VC63 stored in the storage area KS2 with a sixth specific data capacity value VC66 being different from the third specific data capacity value VC63 to change the storage block BS21 from the third data capacity CD63 into a sixth data capacity CD65 represented by the sixth specific data capacity value VC66. The processing unit 710 replaces the third display coordinate data DP23 stored in the storage area KS2 with a sixth display coordinate data DP26 being different from the third display coordinate data DP23 to change the display block BD21 from the third display border ND23 into a sixth display border ND26 represented by the sixth display coordinate data DP26. For example, the sixth display coordinate data DP26 is determined based on the sixth specific data capacity value VC66.

Figure 47:
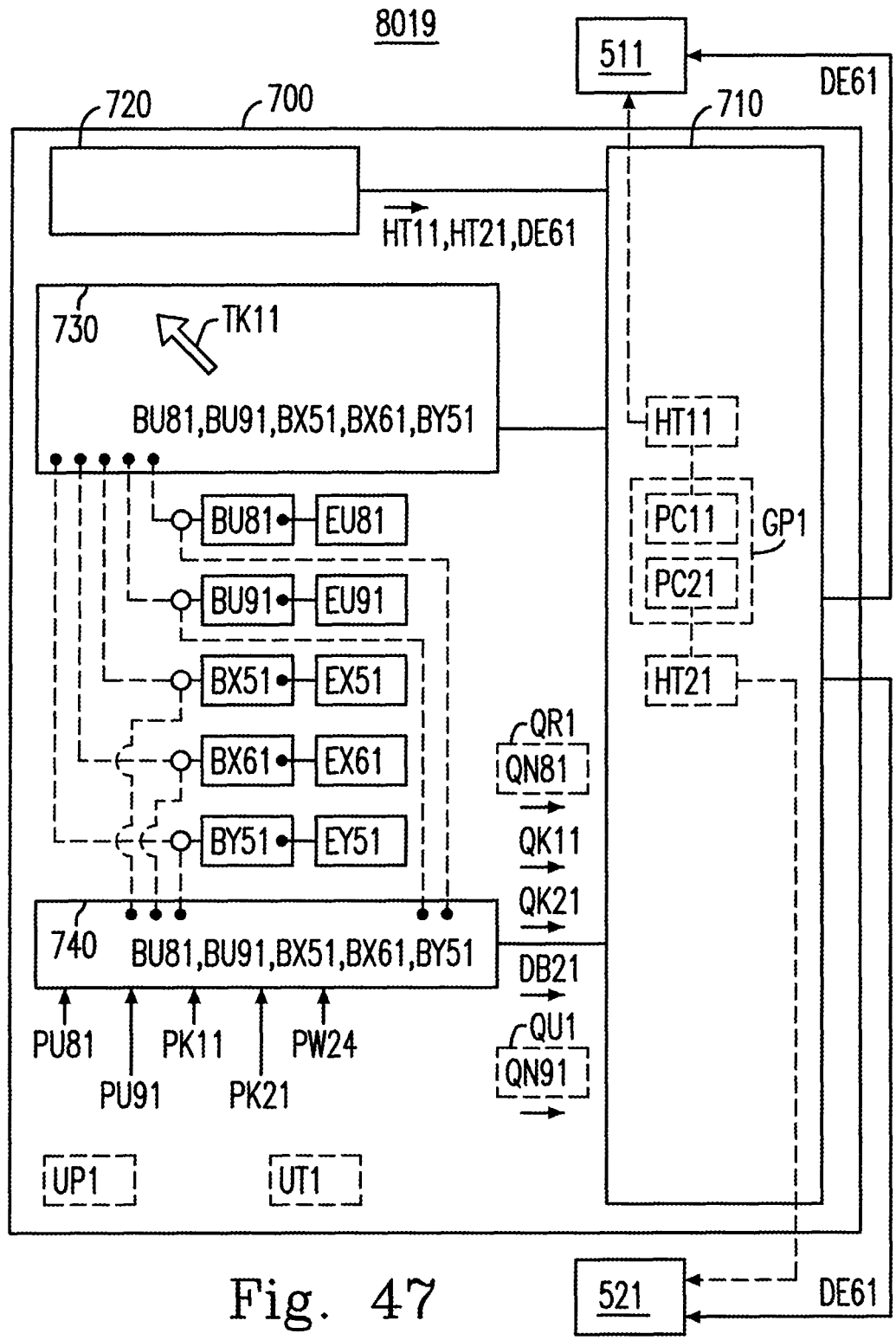
FIG. 47 is a schematic diagram showing an implementation structure of the communication system shown in FIG. 38.

Please refer to FIG. 47, which is a schematic diagram showing an implementation structure 8019 of the communication system 801 shown in FIG. 38. As shown in FIG. 47, the implementation structure 8019 includes the electronic device 700, the first communication target 511 and the second communication target 521. The electronic device 700 includes the processing unit 710, the storage unit 720 coupled to the processing unit 710, the input unit 740 coupled to the processing unit 710, and the display unit 730 coupled to the processing unit 710. Each of the storage unit 720, the input unit 740 and the display unit 730 is controlled by the processing unit 710.

In some embodiments, the electronic device 700 includes a first electricity application target BU81, a second electricity application target BU91, an electricity application target BX51, an electricity application target BX61 and an electricity application target BY51, each of which is coupled to the processing unit 710. The first and the second electricity application targets BU81 and BU91, and the electricity application targets BX51, BX61 and BY51 are respectively located at a spatial location EU81, a spatial location EU91, a spatial location EX51, a spatial location EX61 and a spatial location EY51. For example, one of the input unit 740 and the display unit 730 includes the electricity application target BU81. One of the input unit 740 and the display unit 730 includes the electricity application target BU91. One of the input unit 740 and the display unit 730 includes the electricity application target BX51. One of the input unit 740 and the display unit 730 includes the electricity application target BX61. One of the input unit 740 and the display unit 730 includes the electricity application target BY51.

For example, the spatial locations EU81, EU91, EX51, EX61 and EY51 are different. For example, two selected from a group consisting of the spatial locations EU81, EU91, EX51, EX61 and EY51 are the same. The first and the second electricity application targets BU81 and BU91, and the electricity application targets BX51, BX61 and BY51 respectively have a plurality of electricity application areas, or are respectively formed by the plurality of electricity application areas.

The input unit 740 receives the first user input operation PU81 using the first electricity application target BU81, and provides the first effective request signal QR1 including the first operation request message QN81 to the processing unit 710 in response to the first user input operation PU81. The input unit 740 receives the second user input operation PU91 using the second electricity application target BU91, and provides the second effective request signal QU1 including the second operation request message QN91 to the processing unit 710 in response to the second user input operation PU91.

The input unit 740 receives the user input operation PK11 using the electricity application target BX51, and provides an operation request message QK11 to the processing unit 710 in response to the user input operation PK11. The processing unit 710 performs the data acquisition operation EF11 in response to the operation request message QK11 to obtain the first communication target identifier HT11 to be stored.

The input unit 740 receives the user input operation PK21 using the electricity application target BX61, and provides an operation request message QK21 to the processing unit 710 in response to the user input operation PK21. The processing unit 710 performs the data acquisition operation EF21 in response to the operation request message QK21 to obtain the second communication target identifier HT21 to be stored. The input unit 740 receives the user input operation PW24 using the electricity application target BY51, and provides the first input data DB21 to the processing unit 710 in response to the user input operation PW24. The processing unit 710 causes the storage unit 720 to prepare in the storage block BS21 the electronic data DE61 derived from the obtained first input data DB21. For example, each of the user input operations PK11 and PK21 is performed by the user 910.

For example, the input unit 740 includes one selected from a group consisting of the first and the second electricity application targets BU81 and BU91, the electricity application targets BX51, BX61 and BY51, and any combination thereof. Any of the first and the second electricity application targets BU81 and BU91, and the electricity application targets BX51, BX61 and BY51 is a sensing target, wherein the sensing target includes one selected from a group consisting of a sensing area, a push button and a touch point.

The processing unit 710 causes the electronic device 700 to enter the first data preparation phase UP1 by means of the first electricity application target BU81. The processing unit 710 causes the electronic device 700 to leave the first data preparation phase UP1 to enter the first data transmission phase UT1 by means of the second electricity application target BU91. The processing unit 710 obtains the first communication target identifier HT11 to be stored by means of the electricity application target BX51. The processing unit 710 obtains the second communication target identifier HT21 to be stored by means of the electricity application target BX61. The processing unit 710 obtains the first input data DB21 by means of the electricity application target BY51.

For example, the display unit 730 includes one selected from a group consisting of the first and the second electricity application targets BU81 and BU91, the electricity application targets BX51, BX61 and BY51, and any combination thereof. For example, the processing unit 710 is configured to cause the display unit 730 to display the first and the second electricity application targets BU81 and BU91 at the same time or for different times. For example, the processing unit 710 is configured to cause the display unit 730 to display the electricity application targets BX51, BX61 and BY51 at the same time or for different times. Any of the first and the second electricity application targets BU81 and BU91, and the electricity application targets BX51, BX61 and BY51 is a display target, wherein the display target includes one selected from a group consisting of a display area, an icon and a display action item.

The first electricity application target BU81 is associated with at least one selected from a group consisting of the stored protocol identifier group identifier HY81, the stored first communication protocol identifier HP1, the stored second communication protocol identifier HP2, the stored first communication target identifier HT11, the stored second communication target identifier HT21, the first, the second, the third, the fourth and the fifth memory addresses AM21, AM22, AM23, AM24 and AM25, the storage address AS21, the stored target identifier set identifier HG11 and the stored target identifier set identifier HG21. The second electricity application target BU91 is associated with at least one selected from a group consisting of the stored protocol identifier group identifier HY81, the stored first communication protocol identifier HP1, the stored second communication protocol identifier HP2, the first memory address AM21, the second memory address AM22 and the storage address AS21.

The electricity application target BX51 is associated with at least one selected from a group consisting of the stored first communication protocol identifier HP1, the first memory address AM21 and the application memory address AE11. The electricity application target BX61 is associated with at least one selected from a group consisting of the stored second communication protocol identifier HP2, the second memory address AM22 and the application memory address AE21. The electricity application target BY51 is associated with the storage address AS21, and is used to obtain the first input data DB21.

In some embodiments, the processing unit 710 is configured to cause the display unit 730 to display a selection tool TK11. The first user input operation PU81 uses or selects the first electricity application target BU81 displayed by the display unit 730 by means of the selection tool TK11 to cause the input unit 740 to provide the first operation request message QN81 to the processing unit 710. The second user input operation PU91 uses or selects the second electricity application target BU91 displayed by the display unit 730 by means of the selection tool TK11 to cause the input unit 740 to provide the second operation request message QN91 to the processing unit 710.

The user input operation PK11 uses the electricity application target BX51 displayed by the display unit 730 by means of the selection tool TK11 to cause the processing unit 710 to obtain the first communication target identifier HT11. The user input operation PK21 uses the electricity application target BX61 displayed by the display unit 730 by means of the selection tool TK11 to cause the processing unit 710 to obtain the second communication target identifier HT21. The user input operation PW24 uses the electricity application target BY51 displayed by the display unit 730 by means of the selection tool TK11 to cause the processing unit 710 to obtain the first input data DB21. For example, the selection tool TK11 is a cursor.

In some embodiments, when the first specific application communication protocol PC11 is the email communication protocol, the email communication protocol may be a simple mail transfer protocol (SMTP), and the fourth specific application communication protocol PC41 may be one of a POP3 email protocol and an internet message access protocol (IMAP). When the first specific application communication protocol PC11 is the short-message service communication protocol, the fourth specific application communication protocol PC41 may be the short-message service communication protocol. When the first specific application communication protocol PC11 is the instant-messaging communication protocol, the instant-messaging communication protocol may be one of an instant messaging and presence protocol (IMPP) and an extensible messaging and presence protocol (XMPP), and the fourth specific application communication protocol PC41 may be one of the instant messaging and presence protocol (IMPP) and the extensible messaging and presence protocol (XMPP). When the first specific application communication protocol PC11 is the multimedia-message service communication protocol, the multimedia-message service communication protocol may be a MM1 multimedia-message service protocol, and the fourth specific application communication protocol PC41 may be the MM1 multimedia-message service protocol.

Figure 48:
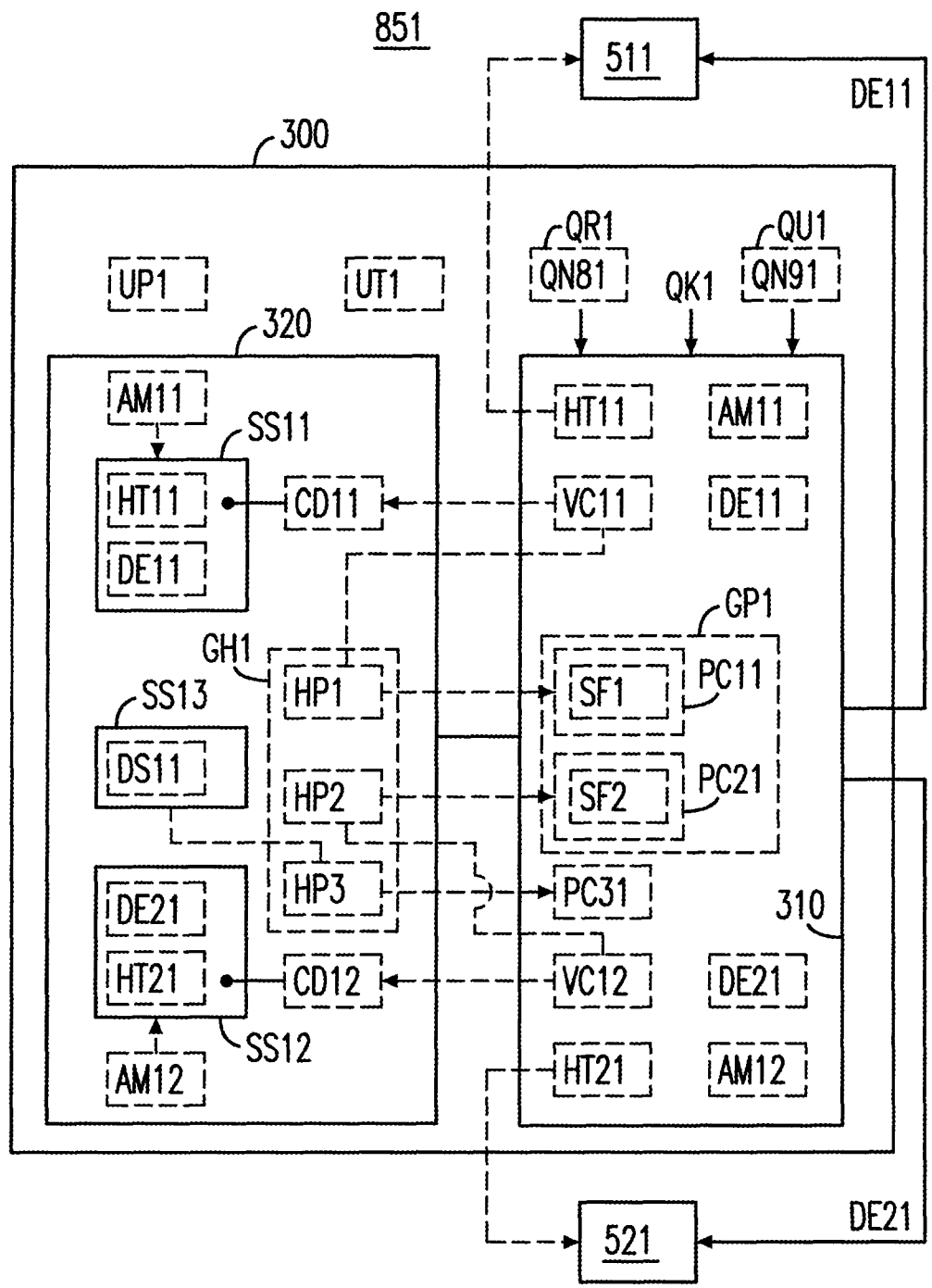
FIG. 48 is a schematic diagram showing a communication system according to various embodiments of the present disclosure.

Please refer to FIG. 48, which is a schematic diagram showing a communication system 851 according to various embodiments of the present disclosure. The communication system 851 includes an electronic device 300, a first communication target 511 and a second communication target 521. For example, the electronic device 300 is to communicate with the first communication target 511. The electronic device 300 includes a storage unit 320 and a processing unit 310. The storage unit 320 stores a first communication protocol identifier HP1 configured to identify a first specific application communication protocol PC1. The processing unit 310 is coupled to the storage unit 320. In addition, the processing unit 310, in response to a specific request signal QK1, obtains a first electronic data DE11 and a first communication target identifier HT11 accessed based on the first communication protocol identifier HP1 to send the first electronic data DE11 in the first specific application communication protocol PC11 toward the first communication target 511 identified by the first communication target identifier HT11.

In some embodiments, the first communication protocol identifier HP1 is configured to correspond to a first specific data capacity value VC11 representing a first data capacity CD11. For example, the first specific data capacity value VC11 is determined beforehand. The processing unit 310 obtains the first specific data capacity value VC11 based on the first communication protocol identifier HP1. The processing unit 310 allocates in the storage unit 320 a first storage space SS11 having the first data capacity CD11 based on the first specific data capacity value VC11 to obtain a first memory address AM11 configured to identify the first storage space SS11. The first specific application communication protocol PC11 has a first target identifier format stipulation SF1.

In some embodiments, the specific request signal QK1 is one of a first effective request signal QR1 and a second effective request signal QU1. The processing unit 310 causes the electronic device 300 to enter a first data preparation phase UP1 in response to the first effective request signal QR1. In the first data preparation phase UP1, the processing unit 310 obtains the first electronic data DE11 and the first communication target identifier HT11 complying with the first target identifier format stipulation SF1, and causes the storage unit 320 to store the first electronic data DE11 and the first communication target identifier HT11 in the first storage space SS11 based on the obtained first memory address AM11. The processing unit 310 causes the electronic device 300 to leave the first data preparation phase UP1 to enter a first data transmission phase UT1 in response to the second effective request signal QU1.

For example, the first effective request signal QR1 includes a first operation request message QN81. The processing unit 310 causes the electronic device 300 to enter the first data preparation phase UP1 in response to the first operation request message QN81. The second effective request signal QU1 includes a second operation request message QN91. The processing unit 310 causes the electronic device 300 to leave the first data preparation phase UP1 to enter the first data transmission phase UT1 in response to the second operation request message QN91.

In the first data transmission phase UT1 being after the first data preparation phase UP1, the processing unit 310 accesses the first electronic data DE11 and the first communication target identifier HT11, which are stored in the first storage space SS11, based on the obtained first memory address AM11 to obtain the first electronic data DE11 and the first communication target identifier HT11, and uses the first specific application communication protocol PC11 to send the first electronic data DE11 toward the first communication target 511 in response to obtaining the first electronic data DE11 and the first communication target identifier HT11. For example, the processing unit 310 obtains the first memory address AM11 based on the first communication protocol identifier HP1, and thereby accesses the first communication target identifier HT11 stored in the first storage space SS11 based on the first communication protocol identifier HP1.

In some embodiments, the first communication protocol identifier HP1 belongs to a specific communication protocol identifier group GH1 stored in the storage unit 320. The processing unit 310 obtains the first communication protocol identifiers HP1 and a second communication protocol identifier HP2 from the specific communication protocol identifier group GH1 including the first and the second communication protocol identifiers HP1 and HP2. For example, the specific communication protocol identifier group GH1 is a specific communication protocol identifier array, and is determined beforehand. For example, the second communication protocol identifier HP2 is configured to identify a second specific application communication protocol PC21 being different from the first specific application communication protocol PC11.

The second communication protocol identifier HP2 is configured to correspond to a second specific data capacity value VC12 representing a second data capacity CD12. The processing unit 310 obtains the second specific data capacity value VC12 based on the second communication protocol identifier HP2. The processing unit 310 allocates in the storage unit 320 a second storage space SS12 having the second data capacity CD12 based on the obtained second specific data capacity value VC12 to obtain a second memory address AM12 configured to identify the second storage space SS12. For example, the second specific data capacity value VC12 is determined beforehand, and is the same as or different from the first specific data capacity value VC11. For example, the second storage space SS12 is different from the first storage space SS11.

In some embodiments, the second specific application communication protocol PC21 has a second target identifier format stipulation SF2. In the first data preparation phase UP1, the processing unit 310 obtains a source data DS11 and a second communication target identifier HT21 complying with the second target identifier format stipulation SF2, wherein the second communication target identifier HT21 is configured to identify the second communication target 521. In the first data preparation phase UP1, the processing unit 310 obtains the first electronic data DE11 for the first specific application communication protocol PC11 based on the source data DS11, obtains a second electronic data DE21 for the second specific application communication protocol PC21 based on the source data DS11, and causes the storage unit 320 to store the second electronic data DE21 and the second communication target identifier HT21 in the second storage space SS12 based on the obtained second memory address AM12. For example, the second electronic data DE21 is the same as or different from the first electronic data DE11.

In the first data transmission phase UT1, under a condition that the processing unit 310 confirms that transmitting the second electronic data DE21 toward the second communication target 521 in the second specific application communication protocol PC21 is allowed, the processing unit 310 accesses the second electronic data DE21 and the second communication target identifier HT21, which are stored in the second storage space SS12, based on the obtained second memory address AM12 to obtain the second electronic data DE21 and the second communication target identifier HT21, and uses the second specific application communication protocol PC21 to send the electronic data DE61 toward the second communication target 521 in response to obtaining the second electronic data DE21 and the second communication target identifier HT21. For example, the processing unit 310 obtains the second memory address AM12 based on the second communication protocol identifier HP2, and thereby accesses the second communication target identifier HT21 stored in the second storage space SS12 based on the second communication protocol identifier HP2.

A third communication protocol identifier HP3 selected from the specific communication protocol identifier group GH1 is configured to identify a third specific application communication protocol PC31. The storage unit 320 includes a third storage space SS13 allocated based on the third communication protocol identifier HP3. For example, the source data DS11 is configured to be stored in the third storage space SS13. The specific communication protocol identifier group GH1 is configured to identify a specific application communication protocol group GP1 consisting of a plurality of different application communication protocols PC11, PC21, . . . . Each of the first, the second and the third specific application communication protocols PC11, PC21 and PC31 belongs to the specific application communication protocol group GP1.

Each of the first and the second specific application communication protocols PC11 and PC21 is one selected from a plurality of predetermined application communication protocols. For example, the plurality of predetermined application communication protocols include one selected from a group consisting of an email communication protocol, a short-message service communication protocol, a multimedia-message service communication protocol and an instant-messaging communication protocol. The plurality of different application communication protocols PC11, PC21, . . . are selected from the plurality of predetermined application communication protocols. For example, the plurality of predetermined application communication protocols are respectively a plurality of predetermined data transmission communication protocols.

The third specific application communication protocol PC31 is one of the email communication protocol and the multimedia-message service communication protocol. Under a condition that the first communication protocol identifier HP1 is the third communication protocol identifier HP3, the first storage space SS11 and the first electronic data DE11 are respectively the third storage space SS13 and the source data DS11. Under a condition that the second communication protocol identifier HP2 is the third communication protocol identifier HP3, the second storage space SS12 and the second electronic data DE21 are respectively the third storage space SS13 and the source data DS11.

Figure 49:
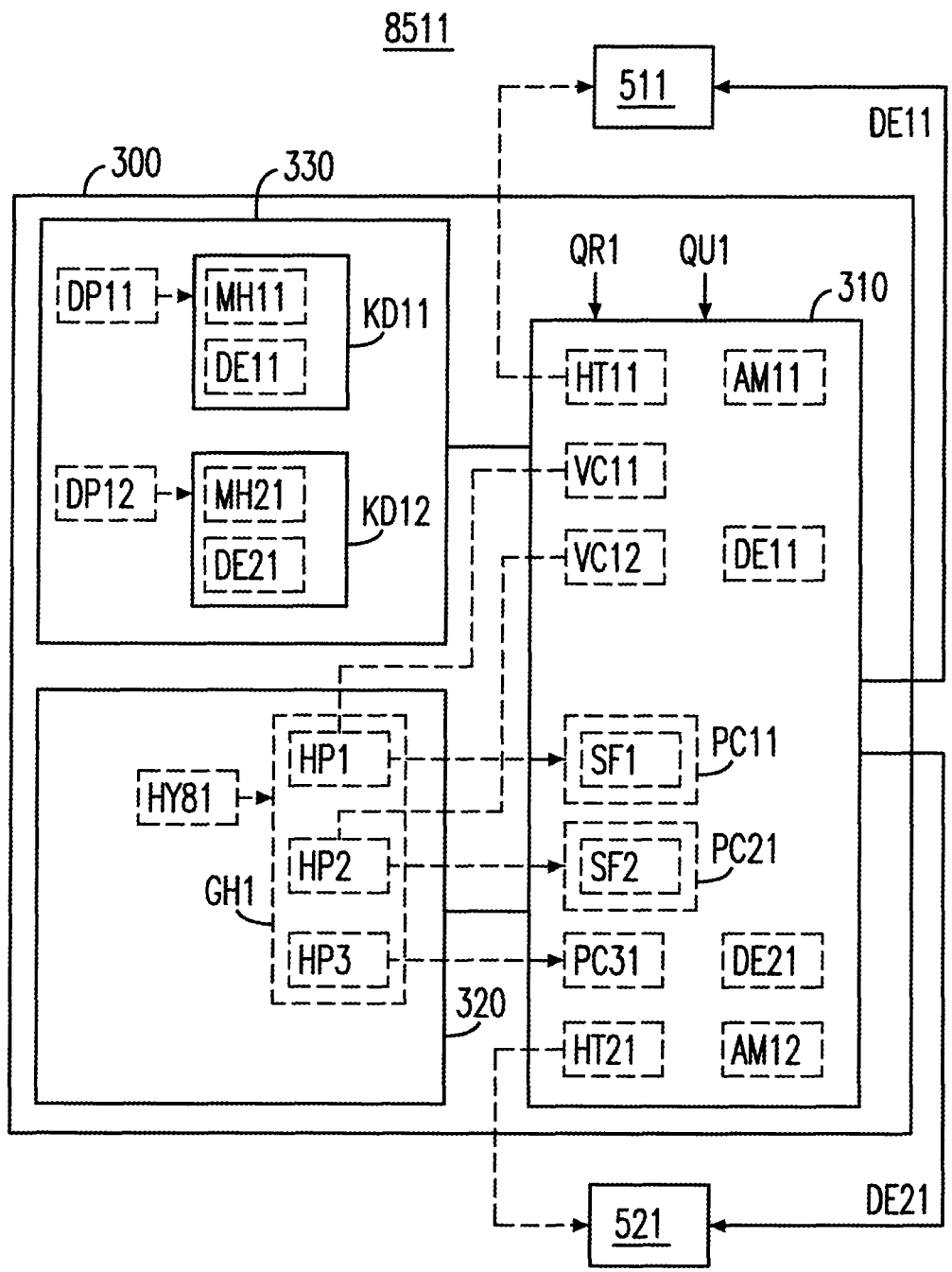
FIG. 49 is a schematic diagram showing an implementation structure of the communication system shown in FIG. 48.

Please refer to FIG. 49, which is a schematic diagram showing an implementation structure 8511 of the communication system 851 shown in FIG. 48. As shown in FIG. 49, the implementation structure 8511 includes the electronic device 300, the first communication target 511 and the second communication target 521. The electronic device 300 further includes a display unit 330 coupled to the processing unit 310. In some embodiments, the display unit 330 includes a first display area KD11 represented by a first display coordinate data DP11. For example, the first display coordinate data DP11 is associated with the first communication protocol identifier HP1, and is determined based on the first specific data capacity value VC11. The processing unit 310 obtains the first display coordinate data DP11 based on the first communication protocol identifier HP1 to cause the display unit 330 to display the first electronic data DE11 and a first communication target identification information MH11 representing the first communication target identifier HT11 on the first display area KD11.

The display unit 330 further includes a second display area KD12 represented by a second display coordinate data DP12. For example, the first display area KD11 is different from the second display area KD12. For example, the second display coordinate data DP12 is associated with the second communication protocol identifier HP2, and is determined based on the second specific data capacity value VC12. The processing unit 310 obtains the second display coordinate data DP12 based on the second communication protocol identifier HP2 to cause the display unit 330 to display the second electronic data DE21 and a second communication target identification information MH21 representing the second communication target identifier HT21 on the second display area KD22.

In some embodiments, the specific communication protocol identifier group GH1 is identified by a protocol identifier group identifier HY81. The storage unit 320 stores the specific communication protocol identifier group GH1 and the protocol identifier group identifier HY81. The processing unit 310 is configured to support the first and the second specific application communication protocols PC11 and PC21, is configured to read the stored protocol identifier group identifier HY81 in the first data preparation phase UP1, and obtains the stored first and the stored second communication protocol identifiers HP1 and HP2 from the stored specific communication protocol identifier group GH1 based on the read protocol identifier group identifier HY81.

Figure 50:
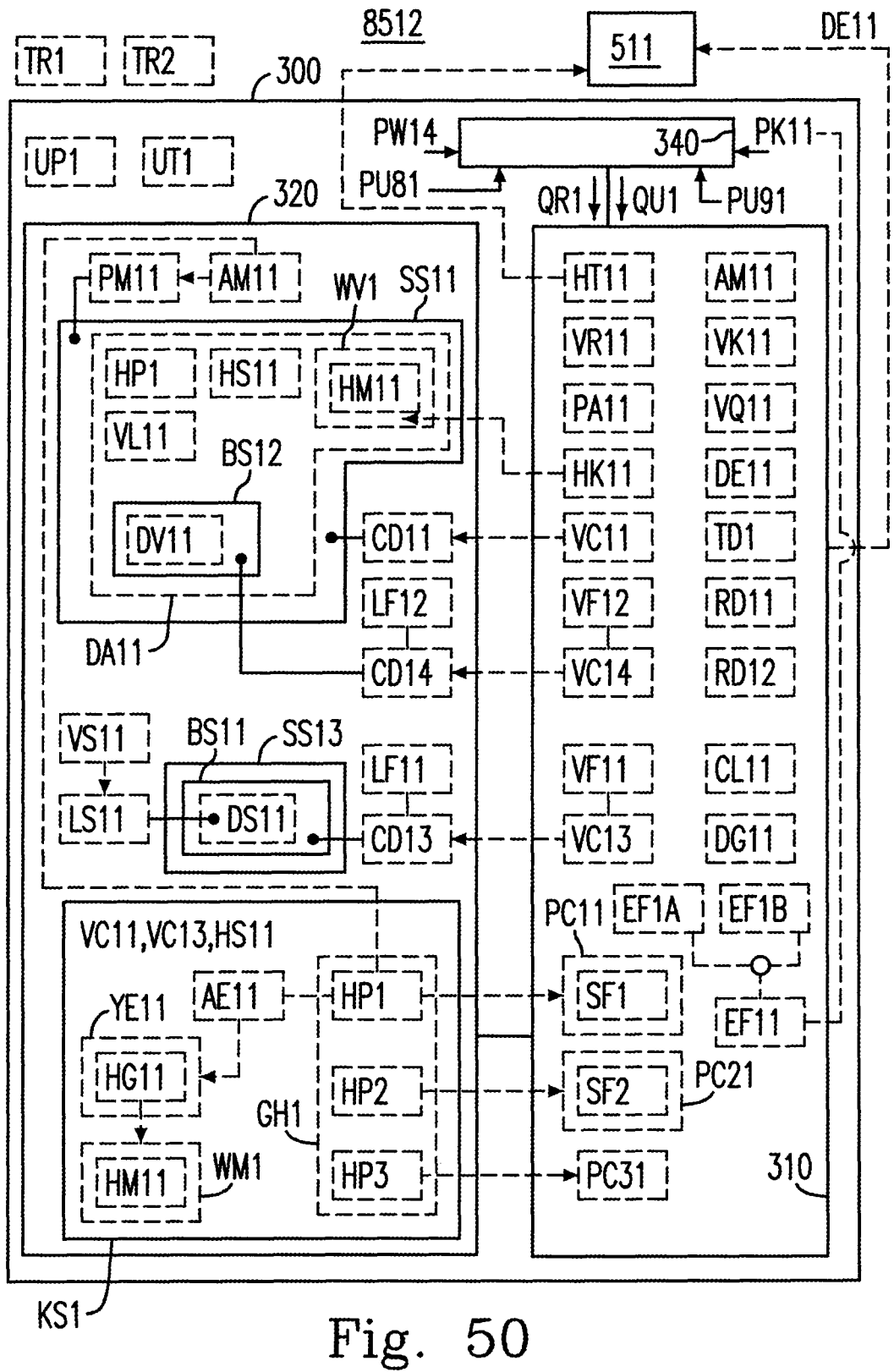
FIG. 50 is a schematic diagram showing an implementation structure of the communication system shown in FIG. 48.

Please refer to FIG. 50, which is a schematic diagram showing an implementation structure 8512 of the communication system 851 shown in FIG. 48. Please additionally refer to FIG. 48. The implementation structure 8512 includes the electronic device 300 and the first communication target 511. The electronic device 300 includes the storage unit 320, the processing unit 310, and an input unit 340 coupled to the processing unit 310. The storage unit 320 includes the first and the second storage spaces SS11 and SS12, and stores the specific communication protocol identifier group GH1. For example, the first storage space SS11 is one of a first nonvolatile memory space and a first volatile memory space. The second storage space SS12 is one of a second nonvolatile memory space and a second volatile memory space.

The first communication protocol identifier HP1 belonging to the specific communication protocol identifier group GH1 corresponds to the first specific data capacity value VC11 determined according to the first specific application communication protocol PC11. For example, the first specific data capacity value VC11 represents the first data capacity CD11 used to allocate the first storage space SS11, and is determined according to the first specific application communication protocol PC11 beforehand.

The storage unit 320 further includes a storage area KS1 being different from each of the first and the second storage spaces SS11 and SS12, and stores the specific communication protocol identifier group GH1 and the first specific data capacity value VC11 corresponding to the first communication protocol identifier HP1 in the storage area KS1. For example, the storage area KS1 is one of a nonvolatile memory area and a volatile memory area.

The processing unit 310 obtains the first communication protocol identifier HP1 from the specific communication protocol identifier group GH1 stored in the storage area KS1, accesses the first specific data capacity value VC11 stored in the storage area KS1 based on the obtained first communication protocol identifier HP1 to obtain the first specific data capacity value VC11 from the storage area KS1, and allocates in the storage unit 320 the first storage space SS11 having the first data capacity CD11 based on the first specific data capacity value VC11 to obtain the first memory address AM11 configured to identify the first storage space SS11. For example, the first storage space SS11 is located at a first memory location PM11 identified by the first memory address AM11, and is thereby identified by the first memory address AMU. For example, the storage unit 320 has the first memory location PM11 identified based on the first memory address AM11. The first memory address AMU is determined according to the first communication protocol identifier HP1 belonging to the specific communication protocol identifier group GH1.

In some embodiments, the storage unit 320 stores in the storage area KS1 the first memory address AM11 corresponding to the first communication protocol identifier HP1. The processing unit 310, based on the first communication protocol identifier HP1 obtained from the specific communication protocol identifier group GH1 stored in the storage area KS1, accesses the first memory address AM11 stored in the storage area KS1 to obtain the first memory address AMU from the storage area KS1.

The processing unit 310 obtains the first memory address AM11 to identify the first storage space SS11, and causes the storage unit 320 to store in the first storage space SS11 a first application data DA11, including the first electronic data DE11 and the first communication target identifier HT11, based on the obtained first memory address AM11. For example, the first storage space SS11 is allocated enough to contain the first application data DA11.

In some embodiments, the electronic device 300 is identified by a first source target identifier HS11 under the first specific application communication protocol PC11. For example, the first source target identifier HS11 complies with the first target identifier format stipulation SF1. The storage unit 320 further stores in the storage area KS1 the first source target identifier HS11 corresponding to the first communication protocol identifier HP1, and a first candidate target identifier set WM1 corresponding to the first communication protocol identifier HP1. For example, the first candidate target identifier set WM1 complies with the first target identifier format stipulation SF1.

The storage unit 320 further stores in the storage area KS1 a target identifier set identifier HG11 configured to identify the first candidate target identifier set WM11. The storage unit 320 is configured to have in the storage area KS1 an application memory location YE11 associated with the first specific application communication protocol PC11. For example, the target identifier set identifier HG11 is stored at the application memory location YE11 identified based on an application memory address AE11. For example, the application memory location YE11 is identified by the application memory address AE11. The application memory address AE11 is determined according to the first communication protocol identifier HP1 belonging to the specific communication protocol identifier group GH1.

In the first data preparation phase UP1, the processing unit 310 stores in the first storage space SS11 the first application data DA11 to be applied to the first specific application communication protocol PC11 based on the obtained first memory address AM11 and the obtained first communication protocol identifier HP1. For example, the first application data DA11 includes the first communication protocol identifier HP1, the first source target identifier HS11, a first variable data DV11, a first variable logical value VL11 and a first variable target identifier set WV1.

The first variable target identifier set WV1 is configured to identify a first variable target set (not shown). The obtained first communication protocol identifier HP1 corresponds to the first communication protocol identifier HP1 of the first application data DA11, corresponds to the first source target identifier HS11 of the first application data DA11, corresponds to the first variable data DV11, corresponds to the first variable logical value VL11, and corresponds to the first variable target identifier set WV1. The first variable logical value VL11 is associated with that whether a first data transmission TD1 toward the first variable target set is to be enabled in the first data transmission phase UT1 being after the first data preparation phase UP1.

In some embodiments, the processing unit 310 causes the electronic device 300 to enter the first data preparation phase UP1 at a first request time TR1 in response to a first effective request signal QR1. For example, the first effective request signal QR1 is a first interrupt request signal. In the first data preparation phase UP1, the processing unit 310 stores or writes the obtained first communication protocol identifier HP1 into the first storage space SS11 based on the obtained first memory address AM11, accesses or reads the first source target identifier HS11 stored in the storage area KS1 based on the obtained first communication protocol identifier HP1 to obtain the first source target identifier HS11 from the storage area KS1, and thereby stores or writes the obtained first source target identifier HS11 into the first storage space SS11 based on the obtained first memory address AM11.

In the first data preparation phase UP1, the processing unit 310, based on the obtained first communication protocol identifier HP1, determines a first referential logical value VR11 representing that whether the processing unit 310 currently supports the first specific application communication protocol PC11. In the first data preparation phase UP1, the processing unit 310 obtains a first desired logical value VK11 corresponding to the obtained first communication protocol identifier HP1, determines a first operational logical value VQ11 by performing a first logical AND operation PA11 to the first referential logical value VR11 and the first desired logical value VK11, and assigns the first operational logical value VQ11 to the first variable logical value VL11 based on the obtained first memory address AM11.

In the first data preparation phase UP1, the processing unit 310 optionally obtains at least a first desired target identifier HK11, and causes the obtained at least a first desired target identifier HK11 to join the first variable target identifier set WV1 based on the obtained first memory address AM11. For example, the at least a first desired target identifier HK11 complies with the first target identifier format stipulation SF1.

In the first data preparation phase UP1, the processing unit 310 optionally accesses at least a first candidate target identifier HM11 being in a first candidate target identifier set WM1 based on the obtained first communication protocol identifier HP1 to select the at least a first candidate target identifier HM11 from the first candidate target identifier set WM1, and causes the selected at least a first candidate target identifier HM11 to join the first variable target identifier set WV1 based on the obtained first memory address AM11.

The specific communication protocol identifier group GH1 include the third communication protocol identifier HP3. The third communication protocol identifier HP3 is configured to identify the third specific application communication protocol PC31 included in the plurality of different application communication protocols PC11, PC21, . . . . For example, the third specific application communication protocol PC31 is one of the email communication protocol and the multimedia-message service communication protocol. The storage unit 320 includes the third storage space SS13 allocated based on the third communication protocol identifier HP3. When the third communication protocol identifier HP3 is the first communication protocol identifier HP1, the third storage space SS13 is the first storage space SS11. When the third communication protocol identifier HP3 is the second communication protocol identifier HP2, the third storage space SS13 is the second storage space SS12.

In some embodiments, the third storage space SS13 includes a first storage block BS11. The first storage block BS11 has a third data capacity CD13 represented by a third specific data capacity value VC13, wherein the third specific data capacity value VC13 and the third data capacity CD13 are respectively a first data limit length value VF11 and a first data limit length LF11. The first data limit length LF11 corresponds to the third communication protocol identifier HP3, is determined according to the third specific application communication protocol PC31 beforehand, and is a longest limit length under a condition that the plurality of different application communication protocols PC11, PC21, . . . are considered.

In the first data preparation phase UP1, the processing unit 310 obtains a source data DS11 having a source data length LS11, and causes the storage unit 320 to store the source data DS11 in the first storage block BS11. For example, the source data length LS11 is less than or equal to the first data limit length LF11, and is represented by a source data length value VS11.

The first storage space SS11 includes a second storage block BS12 configured to contain the first variable data DV11. For example, the second storage block BS12 has a fourth data capacity CD14 represented by a fourth specific data capacity value VC14. For example, the fourth specific data capacity value VC14 and the fourth data capacity CD14 are respectively a second data limit length value VF12 and a second data limit length LF12. The second data limit length LF12 is associated with the first communication protocol identifier HP1, is less than or equal to the first data limit length LF11, and is determined according to the first specific application communication protocol PC11 beforehand.

In some embodiments, in the first data preparation phase UP1, the processing unit 310 makes a first logical decision RD11 on whether the first specific application communication protocol PC11 is the third specific application communication protocol PC31 by comparing the first communication protocol identifier HP1 with the third communication protocol identifier HP3. For example, when the first specific application communication protocol PC11 is the third specific application communication protocol PC31, the first logical decision RD11 is made to be positive.

When the first logical decision RD11 is positive, the processing unit 310 regards the first variable data DV11 as the source data DS11, and thereby regards the first electronic data DE11 as the source data DS11. When the first logical decision RD11 is negative, the processing unit 310, by comparing the second data limit length value VF12 with the source data length value VS11, makes a second logical decision RD12 on whether the source data DS11 meets a first specific data length constraint condition CL11 corresponding to the first communication protocol identifier HP1. For example, the first specific data length constraint condition CL11 is determined according to the second data limit length value VF12.

When the source data length value VS11 is less than or equal to the second data limit length value VF12, the second logical decision RD12 is made to be positive. When the second logical decision RD12 is positive, the processing unit 310 assigns the source data DS11 to the first variable data DV11. When the second logical decision RD12 is negative, the processing unit 310 converts the source data DS11 based on the second data limit length value VF12 to determine a first operation data DG11 meeting the first specific data length constraint condition CL11, and assigns the first operation data DG11 to the first variable data DV11.

In some embodiments, the input unit 340 receives a first user input operation PU81, and provides the first effective request signal QR1 to the processing unit 310 in response to the first user input operation PU81. The processing unit 310 causes the electronic device 300 to enter the first data preparation phase UP1 in response to one of the first effective request signal QR1 and the first operation request message QN81, and reads the first communication protocol identifier HP1 belonging to the specific communication protocol identifier group GH1 in the first data preparation phase UP1.

The input unit 340 receives a user input operation PK11 in the first data preparation phase UP1. The processing unit 310 performs a data acquisition operation EF11 in response to the user input operation PK11. The data acquisition operation EF11 is one of a data acquisition action EF1A and a data acquisition action EF1B. The processing unit 310 uses the read first communication protocol identifier HP1 to obtain the first memory address AM11 in the first data preparation phase UP1.

Under a condition that the data acquisition operation EF11 is the data acquisition action EF1A, the processing unit 310 performs the data acquisition action EF1A to obtain the at least a first desired target identifier HK11 in the first data preparation phase UP1, and causes the obtained at least a first desired target identifier HK11 to join the first variable target identifier set WV1 based on the obtained first memory address AM11.

Under a condition that the data acquisition operation EF11 is the data acquisition action EF1B: the processing unit 310 uses the read first communication protocol identifier HP1 to obtain the application memory address AE11 in the first data preparation phase UP1; the processing unit 310 reads the target identifier set identifier HG11 stored at the application memory location YE11 based on the obtained application memory address AE11; and the processing unit 310 accesses the at least a first candidate target identifier HM11 belonging to the first candidate target identifier set WM1 based on the read target identifier set identifier HG11 to select the at least a first candidate target identifier HM11 from the first candidate target identifier set WM1.

Under a condition that the data acquisition operation EF11 is the data acquisition action EF1B: the processing unit 310 uses the read first communication protocol identifier HP1 to obtain the first memory address AM11 in the first data preparation phase UP1; and the processing unit 310 causes one of the selected at least a first candidate target identifier HM11 and the accessed at least a first candidate target identifier HM11 to join the first variable target identifier set WV1 based on the obtained first memory address AM11.

The input unit 340 receives a user input operation PW24 in the first data preparation phase UP1. The processing unit 310 obtains the source data DS11 in the first data preparation phase UP1 in response to the user input operation PW14, causes the storage unit 320 to store the source data DS11 in the first storage block BS11, and determines the first variable data DV11 based on the source data DS11 to cause the storage unit 320 to store the first application data DA11 in the first storage space SS11.

Under a condition that the processing unit 310 finishes preparing the first application data DA11, the input unit 30 receives a second user input operation PU91, and provides the second effective request signal QU1 to the processing unit 310 in response to the second user input operation PU91. The processing unit 310 causes the electronic device 300 to leave the first data preparation phase UP1 to enter the first data transmission phase UT1 in response to one of the second effective request signal QU1 and the second operation request message QN91.

Figure 51:
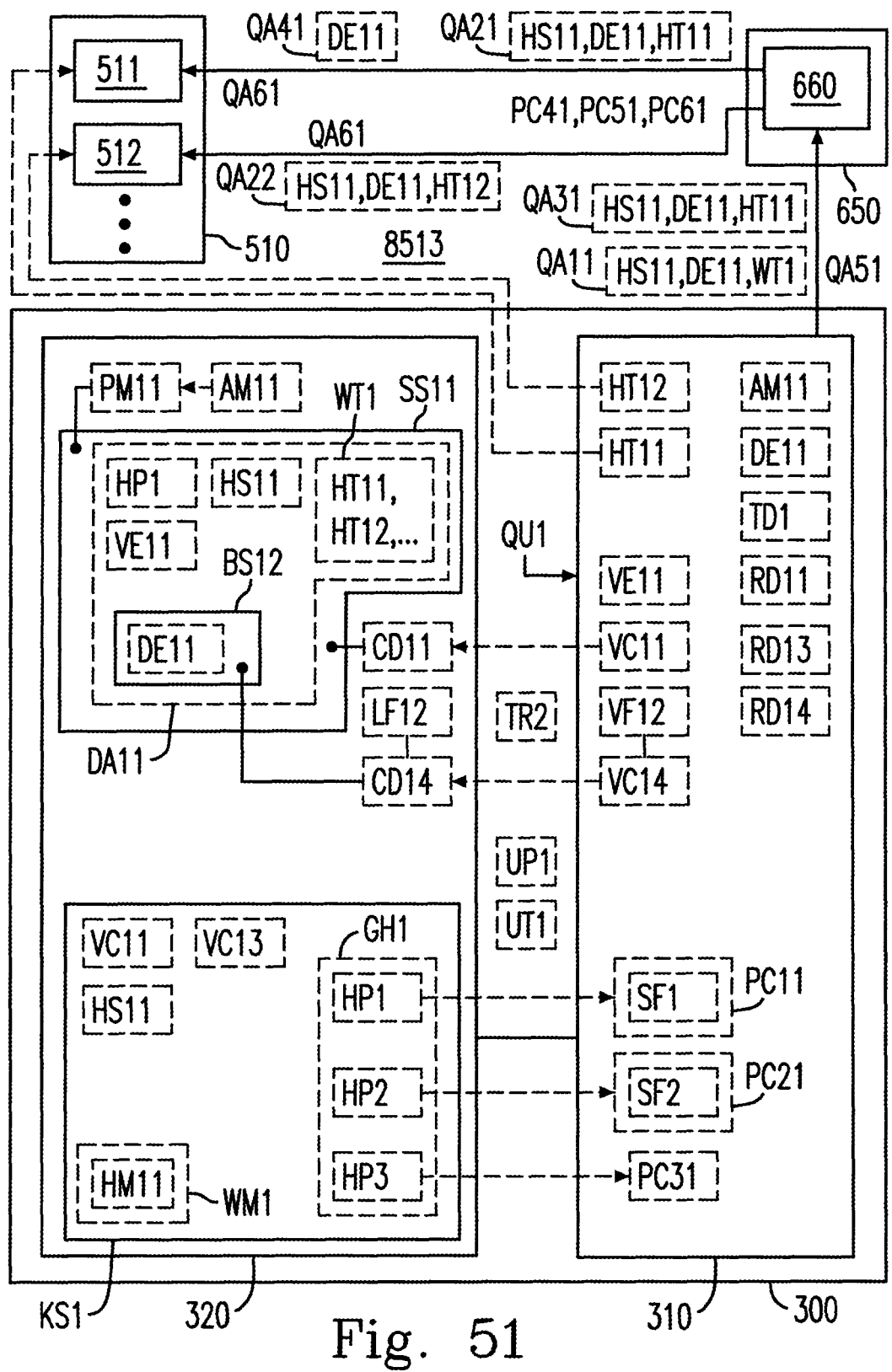
FIG. 51 is a schematic diagram showing an implementation structure of the communication system shown in FIG. 48.

Please refer to FIG. 51, which is a schematic diagram showing an implementation structure 8513 of the communication system 851 shown in FIG. 48. Please additionally refer to FIGS. 48 and 50. The implementation structure 8513 includes the electronic device 300, a message service system 650 and a first communication target set 510. The message service system 650 includes a first message service device 660. The first communication target set 510 includes the first communication target 511 and a communication target 512.

In some embodiments, under a condition that the processing unit 310 finishes preparing the first application data DA11, the processing unit 310 causes the electronic device 300 to enter the first data transmission phase UT1 being after the first data preparation phase UP1 at a second request time TR2 being after the first request time TR1 in response to the second effective request signal QU1, and thereby checks the stored first application data DA11 based on the obtained first memory address AM11. For example, the processing unit 310 receives the second effective request signal QU1 in response to finishing preparing the first application data DA11. For example, the second effective request signal QU1 is a second interrupt request signal.

When the electronic device 300 enters the first data transmission phase UT1, the processing unit 310 confirms that the first variable data DV11, the first variable logical value VL11 and the first variable target identifier set WV1 respectively become the first electronic data DE11, a first effective logical value VE11 and a first communication target identifier set WT1, and thereby checks the stored first communication protocol identifier HP1, the stored first source target identifier HS11, the stored first electronic data DE11, the stored first effective logical value VE11 and the stored first communication target identifier set WT1, which are stored in the first storage space SS11, based on the obtained first memory address AM11. For example, the stored first electronic data DE11 is derived from the source data DS11. The stored first communication target identifier set WT1 is configured to identify the first communication target set 510. The first communication target identifier HT11 belonging to the first communication target identifier set WT1 is configured to identify the first communication target 511 belonging to the first communication target set 510.

In some embodiments, in the first data transmission phase UT1, the processing unit 310 obtains the first effective logical value VE11 from the stored first application data DA11 based on the obtained first memory address AM11, and makes a third logical decision RD13 on whether the first effective logical value VE11 stored in the first storage space SS11 is true by evaluating the obtained first effective logical value VE11.

When the third logical decision RD13 is positive, the processing unit 310 makes a fourth logical decision RD14 on whether the first communication target identifier set WT1 stored in the first storage space SS11 is empty. When the fourth logical decision RD14 is positive, the processing unit 310 confirms that the processing unit 310 is prohibited from performing the first data transmission TD1 toward the first communication target set 510 in the first data transmission phase UT1.

When the fourth logical decision RD14 is negative: the first communication target set 510 consists of one of the first communication target 511 and a first plurality of communication targets 511, 512, . . . ; the first communication target identifier set WT1 consists of one of the first communication target identifier HT11 and a first plurality of communication target identifiers HT11, HT12, . . . ; and the processing unit 310 confirms that the processing unit 310 is allowed to use the first specific application communication protocol PC11 to perform the first data transmission TD1 toward the first communication target set 510 in the first data transmission phase UT1. For example, the first plurality of communication targets 511, 512, . . . include the first communication target 511, and are respectively a first plurality of external communication device or a first plurality of external electronic device. The first plurality of communication target identifiers HT11, HT12, . . . include the first communication target identifier HT11. The first communication target identifier HT11 is one of the first desired target identifier HK11 and the selected first candidate target identifier HM11.

Under a condition that the fourth logical decision RD14 is negative, the processing unit 310 obtains the first communication protocol identifier HP1, the first source target identifier HS11, the first electronic data DE11 and the first communication target identifier set WT1 from the stored first application data DA11 based on the obtained first memory address AM11. For example, under a condition that the first communication target identifier set WT1 consists of the first communication target identifier HT11, the processing unit 310 uses the first specific application communication protocol PC11 to send the first electronic data DE11 toward the first communication target 511 based on the obtained first communication protocol identifier HP1, the obtained first source target identifier HS11, the obtained first electronic data DE11 and the obtained first communication target identifier HT11.

In some embodiments, the processing unit 310 is coupled to the first message service device 660. For example, the first message service device 660 supports the first specific application communication protocol PC11, and is included in the message service system 650. Under a condition that the first logical decision RD11 is positive and the fourth logical decision RD14 is negative, the processing unit 310 uses the first specific application communication protocol PC11 to send a first electronic message QA11 toward the first message service device 660 based on the obtained first communication protocol identifier HP1, the obtained first source target identifier HS11, the obtained first electronic data DE11 and the obtained first communication target identifier set WT1. For example, the first electronic message QA11 includes the first source target identifier HS11, the first electronic data DE11 and the first communication target identifier set WT1, and is or serves as a first instruction message used to instruct the first message service device 660.

Under a condition that the first logical decision RD11 is positive and the fourth logical decision RD14 is negative and the first communication target identifier set WT1 consists of the first communication target identifier HT11, the first message service device 660 uses the first specific application communication protocol PC11 to transmit a second electronic message QA21 toward the first communication target 511 in response to the first electronic message QA11, so that the first communication target 511 receives the second electronic message QA21 in a fourth specific application communication protocol PC41 being matched with or equal to the first specific application communication protocol PC11. For example, the second electronic message QA21 includes the first source target identifier HS11, the first electronic data DE11 and the first communication target identifier HT11.

Under a condition that the first logical decision RD11 is positive and the fourth logical decision RD14 is negative and the first communication target identifier set WT1 consists of the first plurality of communication target identifiers HT11, HT12, . . . , the first message service device 660 uses the first specific application communication protocol PC11 to separately transmit a first plurality of electronic messages QA21, QA22, . . . , respectively corresponding to the first plurality of communication targets 511, 512, . . . , toward the first plurality of communication targets 511, 512, . . . in response to the first electronic message QA11, so that the first plurality of communication targets 511, 512, . . . respectively receive the first plurality of electronic messages QA21, QA22, . . . in a first plurality of respective communication protocols, each of which is matched with or equal to the first specific application communication protocol PC11. For example, each of the first plurality of electronic messages QA21, QA22, . . . includes the first source target identifier HS11, the first electronic data DE11 and the first communication target identifier HT11. The first communication target 511 included in the first plurality of communication targets 511, 512, . . . receives the second electronic message QA21, included in the first plurality of electronic messages QA21, QA22, . . . , in the fourth specific application communication protocol PC41 being matched with or equal to the first specific application communication protocol PC11, wherein the fourth specific application communication protocol PC41 is included in the first plurality of respective communication protocols.

Under a condition that the first logical decision RD11 is negative and the fourth logical decision RD14 is negative and the first communication target identifier set WT1 consists of the first communication target identifier HT11: the processing unit 310 uses the first specific application communication protocol PC11 to send a third electronic message QA31 toward the first message service device 660 based on the obtained first communication protocol identifier HP1, the obtained first source target identifier HS11, the obtained first electronic data DE11 and the obtained first communication target identifier HT11, wherein the third electronic message QA31 includes the first source target identifier HS11, the first electronic data DE11 and the first communication target identifier HT11; and the first message service device 660 uses the first specific application communication protocol PC11 to transmit a fourth electronic message QA41 toward the first communication target 511 in response to the third electronic message QA31, so that the first communication target 511 receives the fourth electronic message QA41 in a fifth specific application communication protocol PC51 being matched with or equal to the first specific application communication protocol PC11. For example, the third electronic message QA31 is or serves as a second instruction message used to instruct the first message service device 660. For example, the fourth electronic message QA41 at least includes the first electronic data DE11.

Under a condition that the first logical decision RD11 is negative and the fourth logical decision RD14 is negative and the first communication target identifier set WT1 consists of the first plurality of communication target identifiers HT11, HT12, . . . , for each first respective identifier: the processing unit 310 uses the first specific application communication protocol PC11 to send a fifth electronic message QA51 toward the first message service device 660 based on the obtained first communication protocol identifier HP1, the obtained first source target identifier HS11, the obtained first electronic data DE11 and the obtained first communication target identifier HT11, wherein the fifth electronic message QA51 includes the first source target identifier HS11, the first electronic data DE11 and the first communication target identifier HT11; and the first message service device 660 uses the first specific application communication protocol PC11 to transmit a sixth electronic message QA61 toward each first respective target, identified by the each first respective identifier, in response to the fifth electronic message QA51, so that the each first respective target receives the sixth electronic message QA61 in a sixth specific application communication protocol PC61 being matched with or equal to the first specific application communication protocol PC11. For example, the respective fifth electronic message QA51 is or serves as a third instruction message used to instruct the first message service device 660. For example, the respective sixth electronic message QA61 at least includes the first electronic data DE11.

In some embodiments, under a condition that the fourth logical decision RD14 is negative, the processing unit 310 controls the storage unit 320 based on the obtained first memory address AM11 to obtain the stored first source target identifier HS11, the stored first electronic data DE11 and the stored first communication target identifier set WT1 from the first storage space SS11, and thereby outputs one selected from a group consisting of the first electronic message QA11, the third electronic message QA31 and the respective fifth electronic message QA51.

Figure 52:
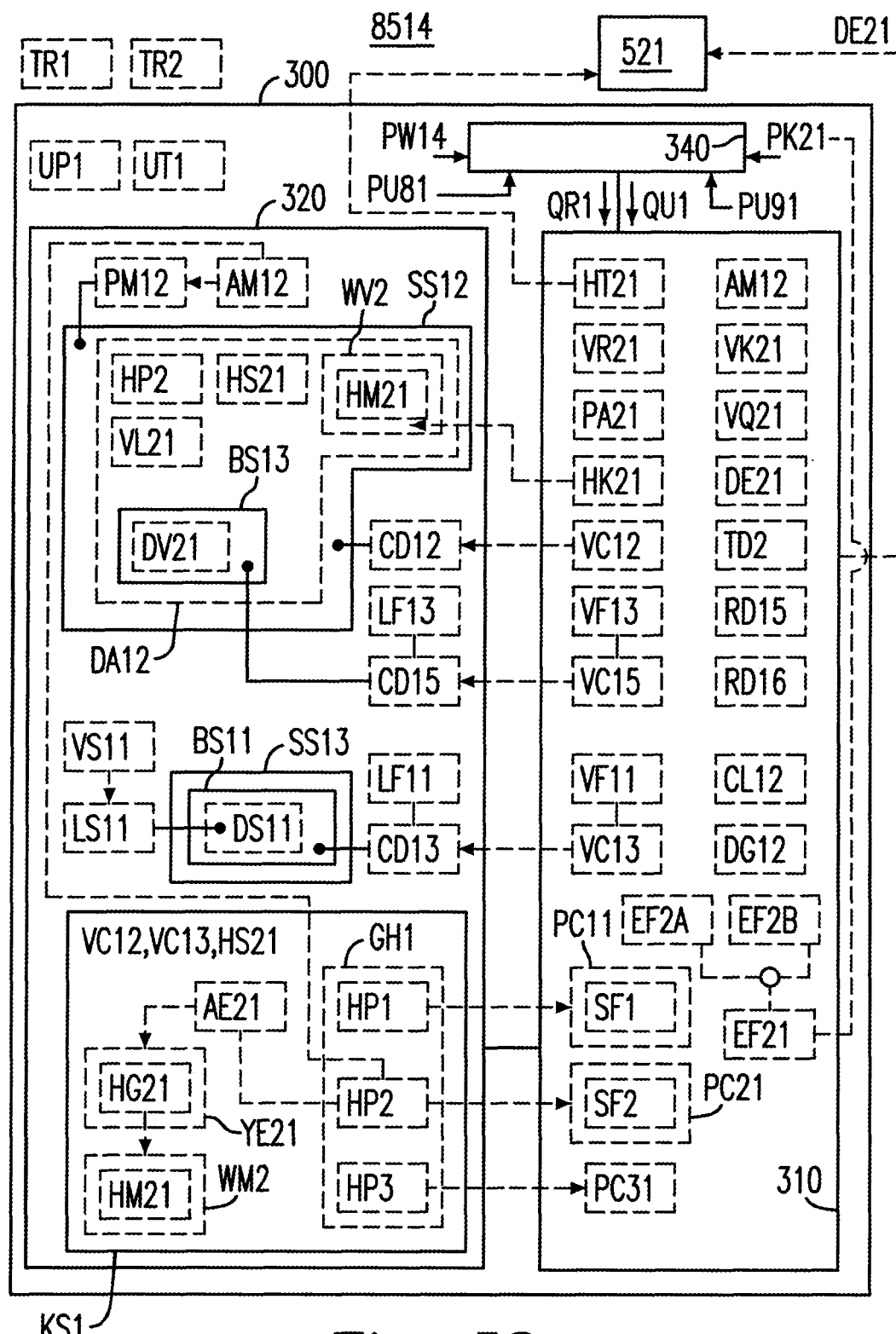
FIG. 52 is a schematic diagram showing an implementation structure of the communication system shown in FIG. 48.

Please refer to FIG. 52, which is a schematic diagram showing an implementation structure 8514 of the communication system 851 shown in FIG. 48. Please additionally refer to FIGS. 48, 50 and 51. The implementation structure 8514 includes the electronic device 300 and the second communication target 521. The electronic device 300 includes the storage unit 320, the processing unit 310 and the input unit 340. The storage unit 320 includes the storage area KS1. The second communication protocol identifier HP2 belongs to the specific communication protocol identifier group GH1 stored in the storage area KS1, and is configured to identify the second specific application communication protocol PC21. For example, the first specific application communication protocol PC11 is one selected from the plurality of different application communication protocols PC11, PC21, . . . . The second specific application communication protocol PC21 is different from the first specific application communication protocol PC11, and is one selected from the plurality of different application communication protocols PC11, PC21, . . . .

The storage unit 320 further stores in the storage area KS1 the second specific data capacity value VC12 corresponding to the second communication protocol identifier HP2. The second specific data capacity value VC12 is determined according to the second specific application communication protocol PC21 beforehand, and represents the second data capacity CD12 used to allocate the second storage space SS12. The second specific data capacity value VC12 is different from the first specific data capacity value VC11, so that the second data capacity CD12 is different from the first data capacity CD11. The second communication protocol identifier HP2 is used to allocate the second storage space SS12.

The processing unit 310 obtains the second communication protocol identifier HP2 from the specific communication protocol identifier group GH1 stored in the storage area KS1, obtains the second specific data capacity value VC12 from the storage area KS1 based on the obtained second communication protocol identifier HP2, and allocates in the storage unit 320 the second storage space SS12 having the second data capacity CD12 based on the second specific data capacity value VC12 to obtain the second memory address AM12 configured to identify the second storage space SS12.

For example, the second communication protocol identifier HP2 corresponds to the second memory address AM12 by corresponding to the second specific data capacity value VC12. The second storage space SS12 is located at a second memory location PM12 identified by the second memory address AM12, and is thereby identified by the second memory address AM12. The second memory location PM12 corresponds to the obtained second communication protocol identifier HP2, and is different from the first memory location PM11. The second data capacity CD12 is the same as or different from the first data capacity CD11. The second storage space SS12 is different from each of the storage area KS1 and the first storage space SS11. For example, the storage unit 320 has the second memory location PM12 identified based on the second memory address AM12. The second memory address AM12 is determined according to the second communication protocol identifier HP2 belonging to the specific communication protocol identifier group GH1.

In some embodiments, the storage unit 320 stores in the storage area KS1 the second memory address AM12 corresponding to the second communication protocol identifier HP2. The processing unit 310, based on the second communication protocol identifier HP2 obtained from the specific communication protocol identifier group GH1 stored in the storage area KS1, accesses the second memory address AM12 stored in the storage area KS1 to obtain the second memory address AM12 from the storage area KS1. The processing unit 310 obtains the second memory address AM12 to identify the second storage space SS12, and causes the storage unit 320 to store in the first storage space SS12 a second application data DA12, including the second electronic data DE21 and the second communication target identifier HT21, based on the obtained second memory address AM12. For example, the second storage space SS12 is allocated enough to contain the second application data DA12.

In some embodiments, the second specific application communication protocol PC21 is one selected from the plurality of different application communication protocols PC11, PC21, . . . . The electronic device 300 is identified by a second source target identifier HS21 under the second specific application communication protocol PC21. For example, the second source target identifier HS21 complies with the second target identifier format stipulation SF2. The storage unit 320 further stores in the storage area KS1 the second source target identifier HS21 corresponding to the second communication protocol identifier HP2, and a second candidate target identifier set WM2 corresponding to the second communication protocol identifier HP2. For example, the second candidate target identifier set WM2 complies with the second target identifier format stipulation SF2.

The storage unit 320 further stores in the storage area KS1 a target identifier set identifier HG21 configured to identify the second candidate target identifier set WM2. The storage unit 320 is configured to have in the storage area KS1 an application memory location YE21 associated with the second specific application communication protocol PC21. For example, the target identifier set identifier HG21 is stored at the application memory location YE21 identified based on an application memory address AE21. For example, the application memory location YE21 is identified by the application memory address AE21. The application memory address AE21 is determined according to the second communication protocol identifier HP2 belonging to the specific communication protocol identifier group GH1.

In the first data preparation phase UP1, the processing unit 310 stores in the first storage space SS12 the second application data DA12 to be applied to the second specific application communication protocol PC21 based on the obtained second memory address AM12 and the obtained second communication protocol identifier HP2. For example, the second application data DA12 includes the second communication protocol identifier HP2, the second source target identifier HS21, a second variable data DV21, a second variable logical value VL21 and a second variable target identifier set WV2.

The second variable target identifier set WV2 is configured to identify a second variable target set (not shown). The obtained second communication protocol identifier HP2 corresponds to the second communication protocol identifier HP2 of the second application data DA12, corresponds to the second source target identifier HS21 of the second application data DA12, corresponds to the second variable data DV21, corresponds to the second variable logical value VL21, and corresponds to the second variable target identifier set WV2. The second variable logical value VL21 is associated with that whether a second data transmission TD2 toward the second variable target set is to be enabled in the first data transmission phase UT1.

In the first data preparation phase UP1, the processing unit 310 stores or writes the obtained second communication protocol identifier HP2 into the second storage space SS12 based on the obtained second memory address AM12, accesses or reads the second source target identifier HS21 stored in the storage area KS1 based on the obtained second communication protocol identifier HP2 to obtain the second source target identifier HS21 from the storage area KS1, and thereby stores or writes the obtained second source target identifier HS21 into the second storage space SS12 based on the obtained second memory address AM12.

In the first data preparation phase UP1, the processing unit 310, based on the obtained second communication protocol identifier HP2, determines a second referential logical value VR21 representing that whether the processing unit 310 currently supports the second specific application communication protocol PC21. In the first data preparation phase UP1, the processing unit 310 obtains a second desired logical value VK21 corresponding to the obtained second communication protocol identifier HP2, determines a second operational logical value VQ21 by performing a second logical AND operation PA21 to the second referential logical value VR21 and the second desired logical value VK21, and assigns the second operational logical value VQ21 to the second variable logical value VL21 based on the obtained second memory address AM12.

In the first data preparation phase UP1, the processing unit 310 optionally obtains at least a second desired target identifier HK21, and causes the obtained at least a second desired target identifier HK21 to join the second variable target identifier set WV2 based on the obtained second memory address AM12. For example, the at least a second desired target identifier HK21 complies with the second target identifier format stipulation SF2.

In the first data preparation phase UP1, the processing unit 310 optionally accesses at least a second candidate target identifier HM21 being in the second candidate target identifier set WM2 based on the obtained second communication protocol identifier HP2 to select the at least a second candidate target identifier HM21 from the second candidate target identifier set WM2, and causes the selected at least a second candidate target identifier HM21 to join the second variable target identifier set WV2 based on the obtained second memory address AM12.

In some embodiments, the second storage space SS12 includes a third storage block BS13 configured to contain the second variable data DV21. For example, the third storage block BS13 has a fifth data capacity CD15 represented by a fifth specific data capacity value VC15. For example, the fifth specific data capacity value VC15 and the fifth data capacity CD15 are respectively a third data limit length value VF13 and a third data limit length LF13. The third data limit length LF13 is associated with the first communication protocol identifier HP1, is less than or equal to the first data limit length LF11, and is determined according to the second specific application communication protocol PC21 beforehand In some embodiments, in the first data preparation phase UP1, the processing unit 310 makes a fifth logical decision RD15 on whether the second specific application communication protocol PC21 is the third specific application communication protocol PC31 by comparing the second communication protocol identifier HP1 with the third communication protocol identifier HP3. For example, when the second specific application communication protocol PC21 is the third specific application communication protocol PC31, the fifth logical decision RD15 is made to be positive.

When the fifth logical decision RD15 is positive, the processing unit 310 regards the second variable data DV21 as the source data DS11, and thereby regards the second electronic data DE21 as the source data DS11. When the fifth logical decision RD15 is negative, the processing unit 310, by comparing the third data limit length value VF13 with the source data length value VS11, makes a sixth logical decision RD16 on whether the source data DS11 meets a second specific data length constraint condition CL12 corresponding to the second communication protocol identifier HP2. For example, the second specific data length constraint condition CL12 is determined according to the third data limit length value VF13.

When the source data length value VS11 is less than or equal to the third data limit length value VF13, the sixth logical decision RD16 is made to be positive. When the sixth logical decision RD16 is positive, the processing unit 310 assigns the source data DS11 to the second variable data DV21. When the sixth logical decision RD16 is negative, the processing unit 310 converts the source data DS11 based on the third data limit length value VF13 to determine a second operation data DG12 meeting the second specific data length constraint condition CL12, and assigns the second operation data DG12 to the second variable data DV21.

In some embodiments, the processing unit 310 reads the second communication protocol identifier HP2 belonging to the specific communication protocol identifier group GH1 in the first data preparation phase UP1. The input unit 340 receives a user input operation PK21 in the first data preparation phase UP1. The processing unit 310 performs a data acquisition operation EF21 in response to the user input operation PK21. The data acquisition operation EF21 is one of a data acquisition action EF2A and a data acquisition action EF2B. The processing unit 310 uses the read second communication protocol identifier HP2 to obtain the second memory address AM12 in the first data preparation phase UP1.

Under a condition that the data acquisition operation EF21 is the data acquisition action EF2A, the processing unit 310 performs the data acquisition action EF2A to obtain the at least a second desired target identifier HK21 in the first data preparation phase UP1, and causes the obtained at least a second desired target identifier HK21 to join the second variable target identifier set WV2 based on the obtained second memory address AM12.

Under a condition that the data acquisition operation EF21 is the data acquisition action EF2B: the processing unit 310 uses the read second communication protocol identifier HP2 to obtain the application memory address AE21 in the first data preparation phase UP1; the processing unit 310 reads the target identifier set identifier HG21 stored at the application memory location YE21 based on the obtained application memory address AE21; and the processing unit 310 accesses the at least a second candidate target identifier HM21 belonging to the second candidate target identifier set WM2 based on the read target identifier set identifier HG21 to select the at least a second candidate target identifier HM21 from the second candidate target identifier set WM2.

Under a condition that the data acquisition operation EF21 is the data acquisition action EF2B: the processing unit 310 uses the read second communication protocol identifier HP2 to obtain the second memory address AM12 in the first data preparation phase UP1; and the processing unit 310 causes one of the selected at least a second candidate target identifier HM21 and the accessed at least a second candidate target identifier HM21 to join the second variable target identifier set WV2 based on the obtained second memory address AM12. The processing unit 310 determines the second variable data DV21 in the first data preparation phase UP1 based on the source data DS11 to cause the storage unit 320 to store the second application data DA12 in the second storage space SS12.

Under a condition that the processing unit 310 finishes preparing the first application data DA11 and the second application data DA12, the input unit 340 receives the second user input operation PU91, and provides the second effective request signal QU1 to the processing unit 310 in response to the second user input operation PU91. The processing unit 310 causes the electronic device 300 to leave the first data preparation phase UP1 to enter the first data transmission phase UT1 in response to one of the second effective request signal QU1 and the second operation request message QN91.

Figure 53:
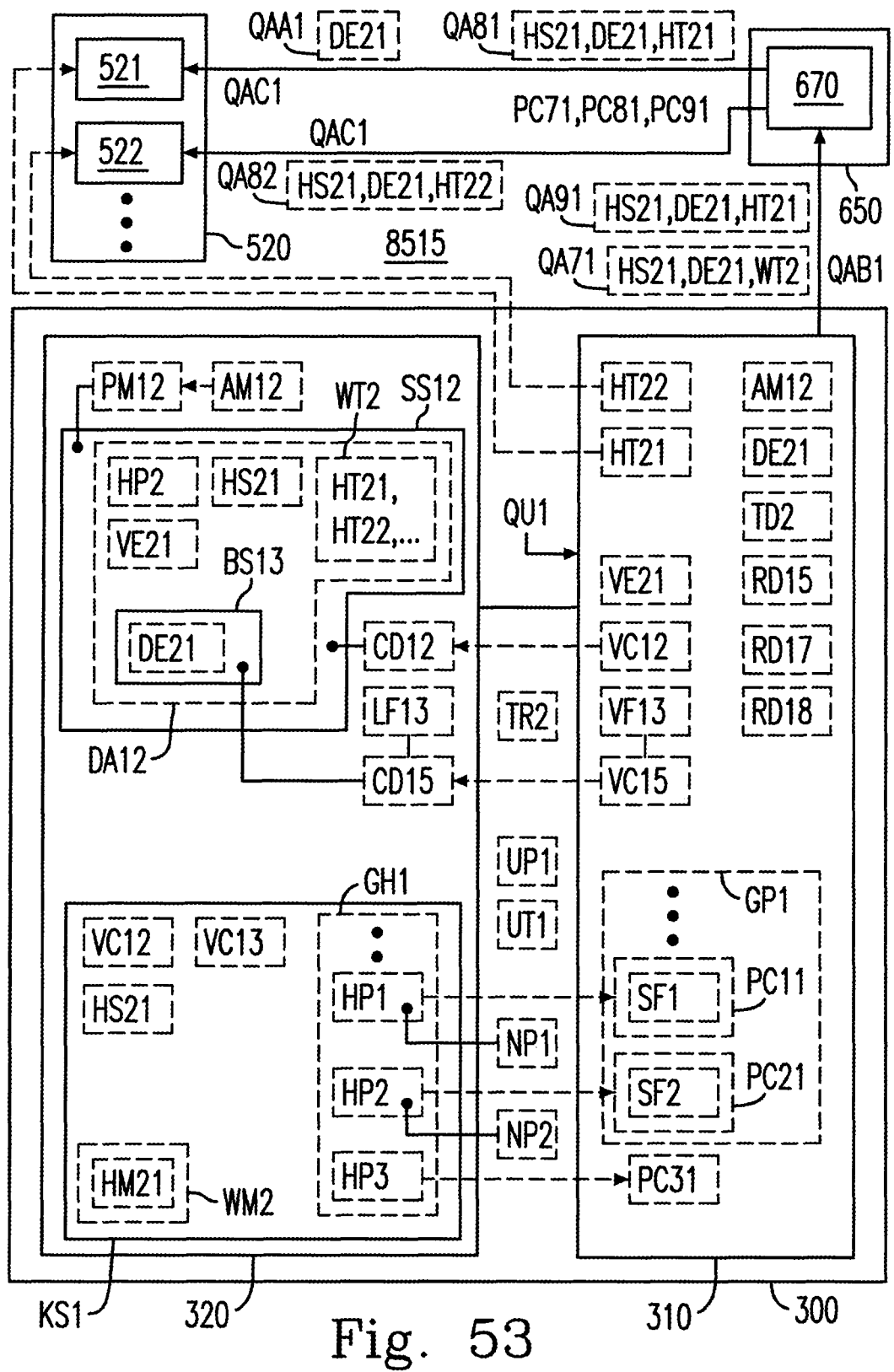
FIG. 53 is a schematic diagram showing an implementation structure of the communication system shown in FIG. 48.

Please refer to FIG. 53, which is a schematic diagram showing an implementation structure 8515 of the communication system 851 shown in FIG. 48. Please additionally refer to FIGS. 48, 50, 51 and 52. The implementation structure 8515 includes the electronic device 300, the message service system 650 and a second communication target set 520. The message service system 650 includes a second message service device 670. The second communication target set 520 includes the second communication target 521 and a communication target 522.

In some embodiments, under a condition that the processing unit 310 finishes preparing the first application data DA11 and the second application data DA12, the processing unit 310 causes the electronic device 300 to enter the first data transmission phase UT1 at the second request time TR2 in response to the second effective request signal QU1, and thereby checks the stored second application data DA12 based on the obtained second memory address AM12. For example, the processing unit 310 receives the second effective request signal QU1 in response to finishing preparing the first application data DA11 and the second application data DA12.

When the electronic device 300 enters the first data transmission phase UT1, the processing unit 310 confirms that the second variable data DV21, the second variable logical value VL21 and the second variable target identifier set WV2 respectively become the second electronic data DE21, a second effective logical value VE21 and a second communication target identifier set WT2, and thereby checks the stored second communication protocol identifier HP2, the stored second source target identifier HS21, the stored second electronic data DE21, the stored second effective logical value VE21 and the stored second communication target identifier set WT2, which are stored in the second storage space SS12, based on the obtained second memory address AM12. For example, the stored second communication target identifier set WT2 is configured to identify the second communication target set 520. The second communication target identifier HT21 belonging to the second communication target identifier set WT2 is configured to identify the second communication target 521 belonging to the second communication target set 520.

In the first data transmission phase UT1, the processing unit 310 obtains the second effective logical value VE21 from the stored second application data DA12 based on the obtained second memory address AM12, and makes a seventh logical decision RD17 on whether the second effective logical value VE21 stored in the second storage space SS12 is true by evaluating the obtained second effective logical value VE21.

When the seventh logical decision RD17 is positive, the processing unit 310 makes an eighth logical decision RD18 on whether the second communication target identifier set WT2 stored in the second storage space SS12 is empty. When the eighth logical decision RD18 is positive, the processing unit 310 confirms that the processing unit 310 is prohibited from performing the second data transmission TD2 toward the second communication target set 520 in the first data transmission phase UT1.

When the eighth logical decision RD18 is negative: the second communication target set 520 consists of one of the second communication target 521 and a second plurality of communication targets 521, 522, . . . ; the second communication target identifier set WT2 consists of one of the second communication target identifier HT21 and a second plurality of communication target identifiers HT21, HT22, . . . ; and the processing unit 310 confirms that the processing unit 310 is allowed to use the second specific application communication protocol PC21 to perform the second data transmission TD2 toward the second communication target set 520 in the first data transmission phase UT1. For example, the second plurality of communication targets 521, 522, . . . include the second communication target 521, and are respectively a second plurality of external communication device or a second plurality of external electronic device. The second plurality of communication target identifiers HT21, HT22, . . . include the second communication target identifier HT21. The second communication target identifier HT21 is one of the second desired target identifier HK21 and the selected second candidate target identifier HM21.

Under a condition that the eighth logical decision RD18 is negative, the processing unit 310 obtains the second communication protocol identifier HP2, the second source target identifier HS21, the second electronic data DE21 and the second communication target identifier set WT2 from the stored second application data DA12 based on the obtained second memory address AM12. For example, under a condition that the second communication target identifier set WT2 consists of the second communication target identifier HT21, the processing unit 310 uses the second specific application communication protocol PC21 to send the second electronic data DE21 toward the second communication target 521 based on the obtained second communication protocol identifier HP2, the obtained second source target identifier HS21, the obtained second electronic data DE21 and the obtained second communication target identifier HT21.

In some embodiments, the processing unit 310 is further coupled to a second message service device 670 included in the message service system 650. For example, the second message service device 670 supports the second specific application communication protocol PC21, and is the same as or different from the first message service device 660. Under a condition that the fifth logical decision RD15 is positive and the eighth logical decision RD18 is negative, the processing unit 310 uses the second specific application communication protocol PC21 to send a seventh electronic message QA71 toward the second message service device 670 based on the obtained second communication protocol identifier HP2, the obtained second source target identifier HS21, the obtained second electronic data DE21 and the obtained second communication target identifier set WT2. For example, the seventh electronic message QA71 includes the second source target identifier HS21, the second electronic data DE21 and the second communication target identifier set WT2, and is or serves as a fourth instruction message used to instruct the second message service device 670.

Under a condition that the fifth logical decision RD15 is positive and the eighth logical decision RD18 is negative and the second communication target identifier set WT2 consists of the second communication target identifier HT21, the second message service device 670 uses the second specific application communication protocol PC21 to transmit an eighth electronic message QA81 toward the second communication target 521 in response to the seventh electronic message QA71, so that the second communication target 521 receives the eighth electronic message QA81 in a seventh specific application communication protocol PC71 being matched with or equal to the second specific application communication protocol PC21. For example, the eighth electronic message QA81 includes the second source target identifier HS21, the second electronic data DE21 and the second communication target identifier HT21.

Under a condition that the fifth logical decision RD15 is positive and the eighth logical decision RD18 is negative and the second communication target identifier set WT2 consists of the second plurality of communication target identifiers HT21, HT22, . . . , the second message service device 670 uses the second specific application communication protocol PC21 to separately transmit a second plurality of electronic messages QA81, QAE82, . . . , respectively corresponding to the second plurality of communication targets 521, 522, . . . , toward the second plurality of communication targets 521, 522, . . . in response to the seventh electronic message QA71, so that the second plurality of communication targets 521, 522, . . . respectively receive the second plurality of electronic messages QA81, QA82, . . . in a second plurality of respective communication protocols, each of which is matched with or equal to the second specific application communication protocol PC21. For example, each of the second plurality of electronic messages QA81, QA82, . . . includes the second source target identifier HS21, the second electronic data DE21 and the second communication target identifier HT21. The second communication target 521 included in the second plurality of communication targets 521, 522, . . . receives the eighth electronic message QA81, included in the second plurality of electronic messages QA81, QA82, . . . , in the seventh specific application communication protocol PC71 being matched with or equal to the second specific application communication protocol PC21, wherein the seventh specific application communication protocol PC71 is included in the second plurality of respective communication protocols.

Under a condition that the fifth logical decision RD15 is negative and the eighth logical decision RD18 is negative and the second communication target identifier set WT2 consists of the second communication target identifier HT21: the processing unit 310 uses the second specific application communication protocol PC21 to send a ninth electronic message QA91 toward the second message service device 670 based on the obtained second communication protocol identifier HP2, the obtained second source target identifier HS21, the obtained second electronic data DE21 and the obtained second communication target identifier HT21, wherein the ninth electronic message QA91 includes the second source target identifier HS21, the second electronic data DE21 and the second communication target identifier HT21; and the second message service device 670 uses the second specific application communication protocol PC21 to transmit a tenth electronic message QAA1 toward the second communication target 521 in response to the ninth electronic message QA91, so that the second communication target 521 receives the tenth electronic message QAA1 in an eighth specific application communication protocol PC81 being matched with or equal to the second specific application communication protocol PC21. For example, the ninth electronic message QA91 is or serves as a fifth instruction message used to instruct the second message service device 670. For example, the tenth electronic message QAA1 at least includes the second electronic data DE21.

Under a condition that the fifth logical decision RD15 is negative and the eighth logical decision RD18 is negative and the second communication target identifier set WT2 consists of the second plurality of communication target identifiers HT21, HT22, . . . , for each second respective identifier: the processing unit 310 uses the second specific application communication protocol PC21 to send an eleventh electronic message QAB1 toward the second message service device 670 based on the obtained second communication protocol identifier HP2, the obtained second source target identifier HS21, the obtained second electronic data DE21 and the obtained second communication target identifier HT21, wherein the eleventh electronic message QAB1 includes the second source target identifier HS21, the second electronic data DE21 and the second communication target identifier HT21; and the second message service device 670 uses the second specific application communication protocol PC21 to transmit a twelfth electronic message QAC1 toward each second respective target, identified by the each second respective identifier, in response to the eleventh electronic message QAB1, so that the each second respective target receives the twelfth electronic message QAC1 in a ninth specific application communication protocol PC91 being matched with or equal to the second specific application communication protocol PC21. For example, the respective eleventh electronic message QAB1 is or serves as a sixth instruction message used to instruct the second message service device 670. For example, the respective twelfth electronic message QAC1 at least includes the second electronic data DE21.

In some embodiments, under a condition that the eighth logical decision RD18 is negative, the processing unit 310 controls the storage unit 320 based on the obtained second memory address AM12 to obtain the stored second source target identifier HS21, the stored second electronic data DE21 and the stored second communication target identifier set WT2 from the second storage space SS12, and thereby outputs one selected from a group consisting of the seventh electronic message QA71, the ninth electronic message QA91 and the respective eleventh electronic message QAB1.

In some embodiments, the second communication target set 520 is a first empty set, or consists of one of the second communication target 521 and the second plurality of communication targets 521, 522, . . . . The second communication target identifier set WT2 is a second empty set, or consists of one of the second communication target identifier HT21 and the second plurality of communication target identifiers HT21, HT22, . . . . The second communication target 521 is the same as or different from the first communication target 511. The storage unit 320 stores the specific communication protocol identifier group GH1 in the storage area KS1. The specific communication protocol identifier group GH1 is configured to identify the specific communication protocol group GP1, and consists of a plurality of communication protocol identifiers HP1, HP2, . . . including the first communication protocol identifier HP1 and the second communication protocol identifier HP2.

In some embodiments, the plurality of communication protocol identifiers HP1, HP2, . . . are configured to respectively identify the plurality of different application communication protocols PC11, PC21, . . . , and respectively have a plurality of ordinal positions respectively represented by a plurality of ordinal numbers NP1, NP2, . . . , so that the first communication protocol identifier HP1 has a first ordinal position represented by a first ordinal number NP1, and the second communication protocol identifier HP2 has a second ordinal position represented by a second ordinal number NP2. The plurality of different application communication protocols PC11, PC21, . . . constitute the specific communication protocol group GP1, and include the first and the second specific application communication protocols PC11 and PC21. For example, the specific communication protocol identifier group GH1 is a specific communication protocol identifier array, and is determined beforehand.

In the first data preparation phase UP1 or before the first data preparation phase UP1, the processing unit 310 accesses the first communication protocol identifier HP1 in the specific communication protocol identifier group GH1 stored in the storage area KS1 based on the first ordinal number NP1 to obtain the first communication protocol identifier HP1, and accesses the second communication protocol identifier HP2 in the specific communication protocol identifier group GH1 stored in the storage area KS1 based on the second ordinal number NP2 to obtain the second communication protocol identifier HP2. The processing unit 310 obtains the plurality of communication protocol identifiers HP1, HP2, . . . from the specific communication protocol identifier group GH1, and sequentially performs a plurality of data transmission respectively associated with the plurality of different application communication protocols PC11, PC21, . . . under the plurality of different application communication protocols PC11, PC21, . . . based on the obtained plurality of communication protocol identifiers HP1, HP2, . . . .

In some embodiments, each of the first plurality of communication target identifiers HT11, HT12, . . . is one selected from a group consisting of a first email address, a first telephone number, a first uniform resource locator (URL) and a first network address, and complies with the first target identifier format stipulation SF1. For example, the respective first telephone number is a first mobile telephone number. The first source target identifier HS11 complies with the first target identifier format stipulation SF1, and is to be used to perform a third data transmission toward the electronic device 300 under the first specific application communication protocol PC11.

Each of the second plurality of communication target identifiers HT21, HT22, . . . is one selected from a group consisting of a second email address, a second telephone number, a second uniform resource locator (URL) and a second network address, and complies with the second target identifier format stipulation SF2. For example, the respective second telephone number is a second mobile telephone number. The second source target identifier HS21 complies with the second target identifier format stipulation SF2, and is to be used to perform a fourth data transmission toward the electronic device 300 under the second specific application communication protocol PC21.

In some embodiments, the electronic device 300 includes the storage unit 320 and the processing unit 310. The storage unit 320 stores the first communication protocol identifier HP1 configured to identify the first specific application communication protocol PC11. The processing unit 310 is coupled to the storage unit 320, and obtains the first electronic data DE11 and the first communication target identifier HT11 to use the first specific application communication protocol PC11 to send the first electronic data DE11 toward the first communication target 511 in response to one of the first effective request signal QR1 and the second effective request signal QU1, wherein the first communication target identifier HT11 is accessed based on the first communication protocol identifier HP1, and the first communication target 511 is identified by the first communication target identifier HT11.

Figure 54:
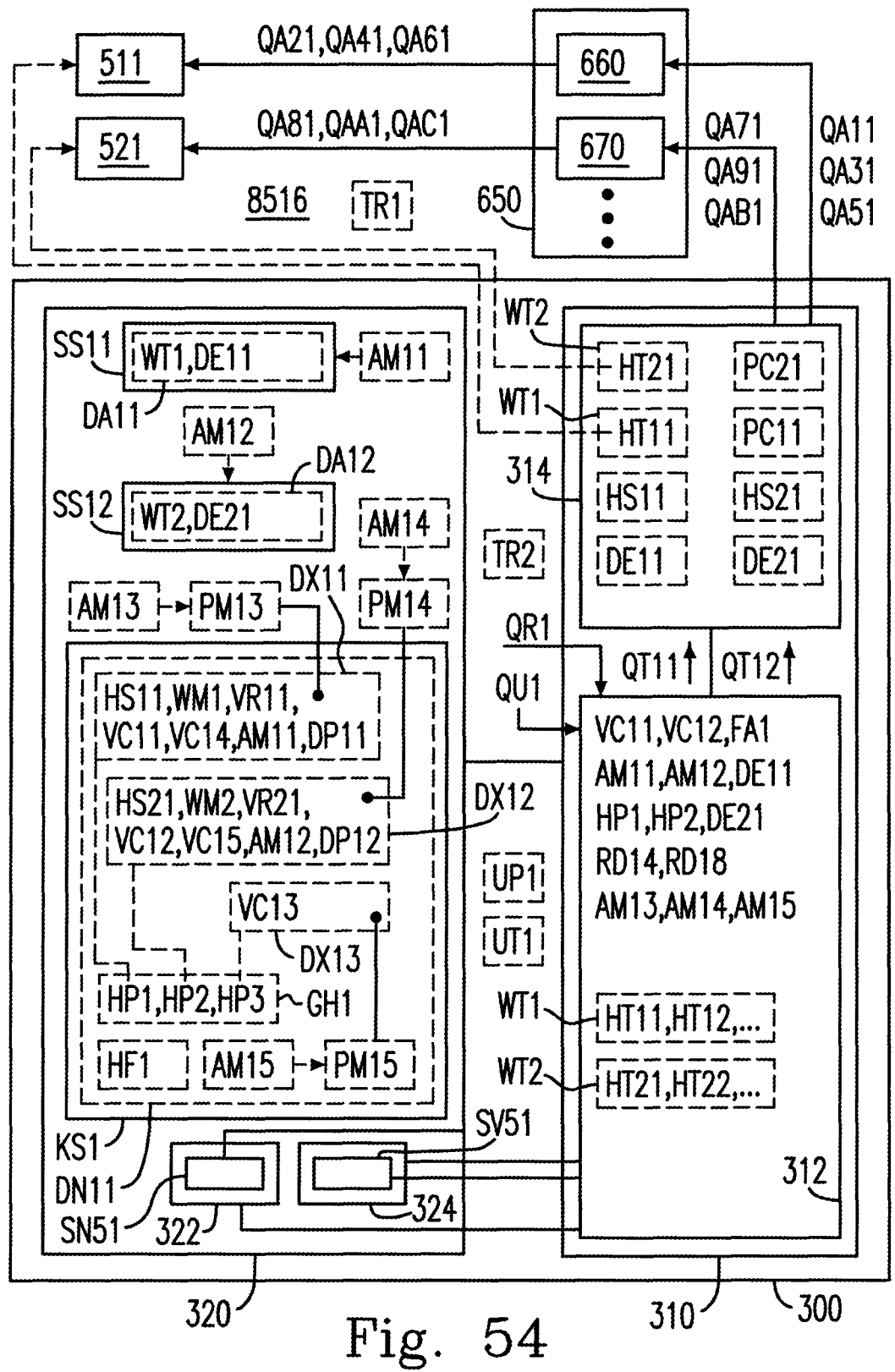
FIG. 54 is a schematic diagram showing an implementation structure of the communication system shown in FIG. 48.

Please refer to FIG. 54, which is a schematic diagram showing an implementation structure 8516 of the communication system 851 shown in FIG. 48. Please additionally refer to FIGS. 48, 49, 50, 51, 52 and 53. The implementation structure 8516 includes the electronic device 300, the message service system 650, the first communication target 511 and the second communication target 521. The message service system 650 includes the first message service device 660 and the second message service device 670.

In some embodiments, any of the electronic devices 400 and 300 is one selected from a group consisting of a first computing device, a first communication device, a first user device, a first mobile device, a first portable device, a first desktop device, a first relatively fixed device, a first fixed device, and any combination thereof. Any of the electronic devices 400 and 300 is identified by the first source target identifier HS11 under the first specific application communication protocol PC11, and is identified by the second source target identifier HS21 under the second specific application communication protocol PC21. For example, the first communication target identifier set WT1 includes or is independent from the first source target identifier HS11. The second communication target identifier set WT2 includes or is independent from the second source target identifier HS21.

The first plurality of communication target identifiers HT11, HT12, . . . are to be used for respectively linking to the first plurality of communication targets 511, 512, . . . by using the first specific application communication protocol PC11. The first source target identifiers HS11 is to be used for linking to the electronic device 300 by using the first specific application communication protocol PC11, and is one selected from a group consisting of a third email address, a third telephone number, a third uniform resource locator (URL) and a third network address. For example, the respective third telephone number is a third mobile telephone number.

In some embodiments, the processing unit 310 performs a specific application function FA1. For example, the specific application function FA1 is identified by an application function identifier HF1. The first specific data capacity value VC11 is determined beforehand according to one being selected from a group consisting of the first specific application communication protocol PC11, the specific application function FA1 and a combination thereof. The second specific data capacity value VC12 is determined beforehand according to one being selected from a group consisting of the second specific application communication protocol PC21, the specific application function FA1 and a combination thereof. The third specific data capacity value VC13 is determined beforehand according to one being selected from a group consisting of the third specific application communication protocol PC31, the specific application function FA1 and a combination thereof. The fourth specific data capacity value VC14 is determined beforehand according to one being selected from a group consisting of the first specific application communication protocol PC11, the specific application function FA1 and a combination thereof. The fifth specific data capacity value VC15 is determined beforehand according to one being selected from a group consisting of the second specific application communication protocol PC21, the specific application function FA1 and a combination thereof.

In some embodiments, the storage unit 320 is controlled by the processing unit 310, includes a nonvolatile memory unit 322 coupled to the processing unit 310, and a volatile memory unit 324 coupled to the processing unit 310, and stores a stored data DN11, the first application data DA11 and the second application data DA12. For example, the stored data DN11 is stored in the storage area KS1. The nonvolatile memory unit 322 includes a nonvolatile memory space SN51 coupled to the processing unit 310. The volatile memory unit 324 includes a volatile memory space SV51 coupled to the processing unit 310.

When the first storage space SS11 is the first nonvolatile memory space, the first storage space SS11 is included in the nonvolatile memory space SN51 of the nonvolatile memory unit 322. When the first storage space SS11 is the first volatile memory space, the first storage space SS11 is included in the volatile memory space SV51 of the volatile memory unit 324. When the second storage space SS12 is the second nonvolatile memory space, the second storage space SS12 is included in the nonvolatile memory space SN51 of the nonvolatile memory unit 322.

When the second storage space SS12 is the second volatile memory space, the second storage space SS12 is included in the volatile memory space SV51 of the volatile memory unit 324. When the storage area KS1 is the nonvolatile memory area, the storage area KS1 is included in the nonvolatile memory space SN51 of the nonvolatile memory unit 322. When the storage area KS1 is the volatile memory area, the storage area KS1 is included in the volatile memory space SV51 of the volatile memory unit 324. For example, the third storage space SS13 is disposed in the volatile memory space SV51 of the volatile memory unit 324.

The stored data DN11 is stored in the storage area KS1, and includes the application function identifier HF1, the specific communication protocol identifier group GH1, a first reference data DX11 stored in the storage area KS1 based on the first communication protocol identifier HP1, a second reference data DX12 stored in the storage area KS1 based on the second communication protocol identifier HP2, and a third reference data DX13 stored in the storage area KS1 based on the third communication protocol identifier HP3.

The first reference data DX11, the second reference data DX12 and the third reference data DX13 are respectively stored at a third memory location PM13, a fourth memory location PM14 and a fifth memory location PM15. The third, the fourth and the fifth memory locations PM13, PM14 and PM15 are respectively identified by a third memory address AM13, a fourth memory address AM14 and a fifth memory address AM15, or are respectively identified based on the third, the fourth and the fifth memory addresses AM13, AM14 and AM15.

In some embodiments, the third, the fourth and the fifth memory addresses AM13, AM14 and AM15 are respectively determined based on the first, the second and the third communication protocol identifiers HP1, HP2 and HP3, so that the first reference data DX11, the second reference data DX12 and the third reference data DX13 are configured to respectively correspond to the first, the second and the third communication protocol identifiers HP1, HP2 and HP3.

The specific communication protocol identifier group GH1 include the first and the second communication protocol identifiers HP1 and HP2. Under a condition that the third communication protocol identifier HP3 is the first communication protocol identifiers HP1: the third reference data DX13 is included in the first reference data DX11; the fifth memory location PM15 is the third memory location PM13; and the fifth memory address AM15 is the third memory address AM13. Under a condition that the third communication protocol identifier HP3 is the second communication protocol identifiers HP2: the third reference data DX13 is included in the second reference data DX12; the fifth memory location PM15 is the fourth memory location PM14; and the fifth memory address AM15 is the fourth memory address AM14.

For example, the processing unit 310 is configured to cause the storage unit 320 to store the third, the fourth and the fifth memory addresses AM13, AM14 and AM15 in the storage area KS1. The third, the fourth and the fifth memory addresses AM13, AM14 and AM15 are configured to be respectively determined according to the first, the second and the third communication protocol identifiers HP1, HP2 and HP3.

The first reference data DX11 includes a first plurality of application parameters, which include the first source target identifier HS11, the first candidate target identifier set WM1, the first referential logical value VR11, the first specific data capacity value VC11, the fourth specific data capacity value VC14, the first memory address AM11 and the first display coordinate data DP11. The second reference data DX12 includes a second plurality of application parameters, which include the second source target identifier HS21, the second candidate target identifier set WM2, the second referential logical value VR21, the second specific data capacity value VC12, the fifth specific data capacity value VC15, the second memory address AM12 and the second display coordinate data DP12. The third reference data DX13 includes the third specific data capacity value VC13.

The processing unit 310 obtains the third memory address AM13 based on the first communication protocol identifier HP1, and accesses at least a first application parameter included in the first plurality of application parameters based on the obtained third memory address AM13 to obtain the at least a first application parameter. The processing unit 310 obtains the fourth memory address AM14 based on the second communication protocol identifier HP2, and accesses at least a second application parameter included in the second plurality of application parameters based on the obtained fourth memory address AM14 to obtain the at least a second application parameter. The processing unit 310 obtains the fifth memory address AM15 based on the third communication protocol identifier HP3, and accesses the third specific data capacity value VC13 included in the third reference data DX13 based on the obtained fifth memory address AM15 to obtain the third specific data capacity value VC13.

In some embodiments, the processing unit 310 includes a communication interface unit 314 and a processor 312. The communication interface unit 314 is coupled to the first and the second message service devices 660 and 670. For example, the communication interface unit 314 is one of a wireless interface unit and a wired interface unit. The processor 312 is coupled to the storage unit 320 and the communication interface unit 314, and controls the storage unit 320 and the communication interface unit 314.

In some embodiments, the processor 312 obtains the first communication protocol identifier HP1 from the specific communication protocol identifier group GH1 stored in the storage area KS1, and obtains the first specific data capacity value VC11 representing the first data capacity CD11 from the storage area KS1 based on the obtained first communication protocol identifier HP1. The processor 312 allocates in the storage unit 320 the first storage space SS11 having the first data capacity CD11 based on the obtained first specific data capacity value VC11 to obtain the first memory address AM11 configured to identify the first storage space SS11. In addition, the processor 712 prepares the first electronic data DE11 and the first communication target identifier HT11 in the first storage space SS11 based on the obtained first memory address AM11.

Under a condition that the processor 312 finishes preparing the first electronic data DE11, the second electronic data DE21, the first communication target identifier HT11 and the second communication target identifier HT21 in the storage unit 320, the processor 312 controls the storage unit 320 to access the prepared first electronic data DE11 and the prepared first communication target identifier HT11 based on the obtained first memory address AM11 to cause the communication interface unit 314 to obtain the prepared first electronic data DE11 and the prepared first communication target identifier HT11 from the first storage space SS11, and controls the communication interface unit 314 based on the obtained first communication protocol identifier HP1 to cause the communication interface unit 314 to use the first specific application communication protocol PC11 to send the first electronic data DE11 toward the first communication target 511.

The processor 312 outputs a first control signal QT11 to the communication interface unit 314 based on the obtained first communication protocol identifier HP1 and the obtained first memory address AM11. The communication interface unit 314 uses the first specific application communication protocol PC11 to output one selected from a group consisting of the first electronic message QA11, the third electronic message QA31 and the respective fifth electronic message QA51 toward the first message service device 660 based on the first control signal QT11, the obtained first electronic data DE11 and the obtained first communication target identifier HT11.

The processor 312 obtains the second communication protocol identifier HP2 from the specific communication protocol identifier group GH1 stored in the storage area KS1, and obtains the second specific data capacity value VC12 representing the second data capacity CD12 from the storage area KS1 based on the obtained second communication protocol identifier HP2. The processor 712 allocates in the storage unit 320 the second storage space SS12 having the second data capacity CD12 based on the obtained second specific data capacity value VC12 to obtain the second memory address AM12 configured to identify the second storage space SS12. In addition, the processor 712 prepares the second electronic data DE21 and the second communication target identifier HT21 in the second storage space SS12 based on the obtained second memory address AM12.

Under a condition that the processor 312 finishes preparing the first electronic data DE11, the second electronic data DE21, the first communication target identifier HT11 and the second communication target identifier HT21 in the storage unit 320, the processor 312 controls the storage unit 320 to access the prepared second electronic data DE21 and the prepared second communication target identifier HT21 based on the obtained second memory address AM12 to cause the communication interface unit 314 to obtain the prepared second electronic data DE21 and the prepared second communication target identifier HT21 from the second storage space SS12, and controls the communication interface unit 314 based on the obtained second communication protocol identifier HP2 to cause the communication interface unit 314 to use the second specific application communication protocol PC21 to send the second electronic data DE21 toward the second communication target 521.

The processor 312 outputs a second control signal QT12 to the communication interface unit 314 based on the obtained second communication protocol identifier HP2 and the obtained second memory address AM12. The communication interface unit 314 uses the second specific application communication protocol PC21 to output one selected from a group consisting of the seventh electronic message QA71, the ninth electronic message QA91 and the respective eleventh electronic message QAB1 toward the second message service device 670 based on the second control signal QT12, the obtained second electronic data DE21 and the obtained second communication target identifier HT21.

In some embodiments, under a condition that the fourth logical decision RD14 is negative, the processor 312 controls the storage unit 320 and the communication interface unit 314 to cause the communication interface unit 314 to obtain the stored first source target identifier HS11, the stored first electronic data DE11 and the stored first communication target identifier set WT1 from the first storage space SS11 based on the obtained first memory address AM11, and outputs the first control signal QT11 to the communication interface unit 314 to cause the communication interface unit 314 to use the first specific application communication protocol PC11 to output one selected from a group consisting of the first electronic message QA11, the third electronic message QA31 and the respective fifth electronic message QA51.

Under a condition that the eighth logical decision RD18 is negative, the processor 312 controls the storage unit 320 and the communication interface unit 314 to cause the communication interface unit 314 to obtain the stored second source target identifier HS21, the stored second electronic data DE21 and the stored second communication target identifier set WT2 from the second storage space SS12 based on the obtained second memory address AM12, and outputs the second control signal QT12 to the communication interface unit 314 to cause the communication interface unit 314 to use the second specific application communication protocol PC21 to output one selected from a group consisting of the seventh electronic message QA71, the ninth electronic message QA91 and the respective eleventh electronic message QAB1.

In some embodiments, the first communication target 511 is one selected from a group consisting of a second computing device, a second communication device, a second user device, a second mobile device, a second portable device, a second desktop device, a second relatively fixed device, a second fixed device, and any combination thereof.

The second communication target 521 is one selected from a group consisting of a third computing device, a third communication device, a third user device, a third mobile device, a third portable device, a third desktop device, a third relatively fixed device, a third fixed device, and any combination thereof.

Figure 55:
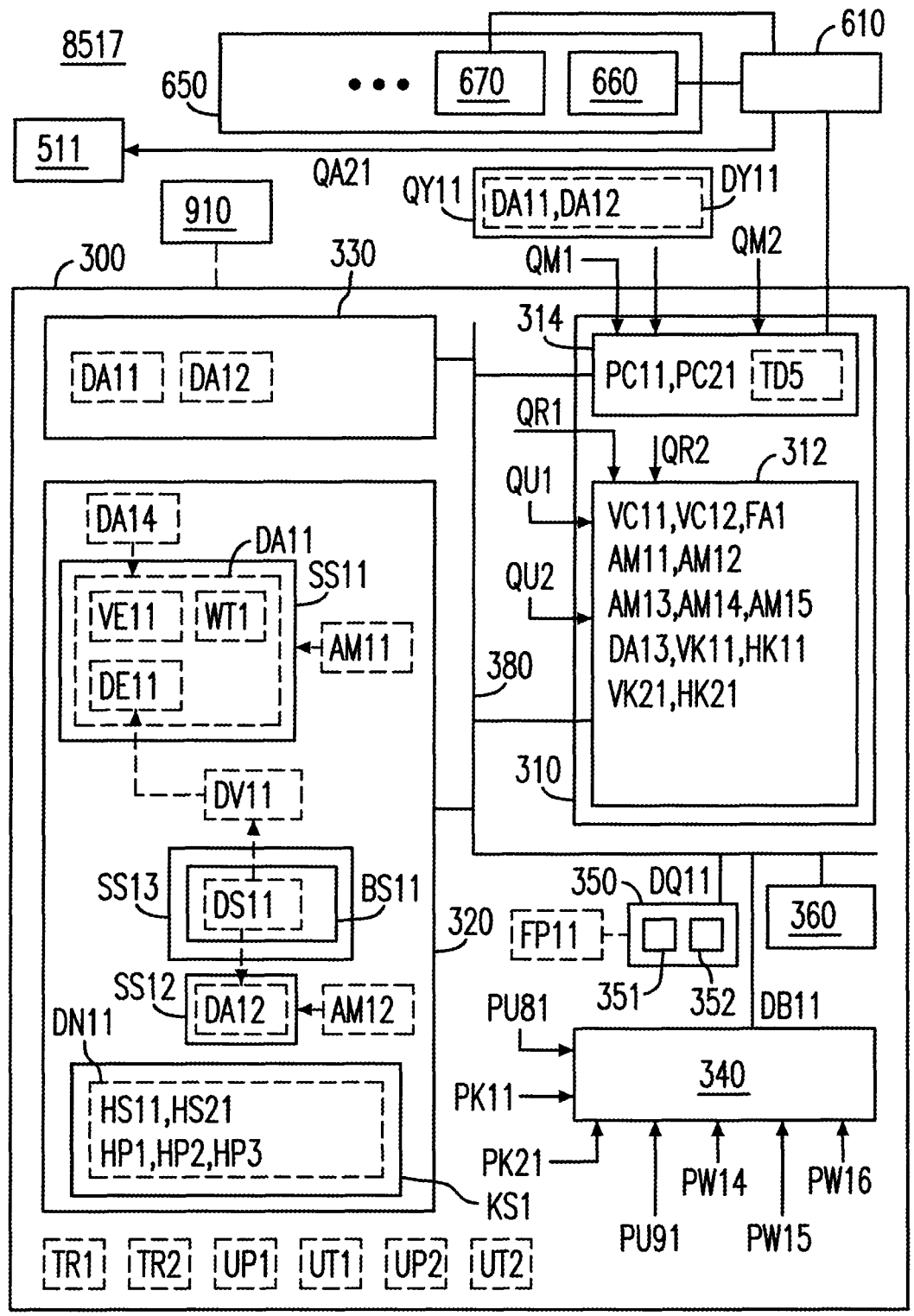
FIG. 55 is a schematic diagram showing an implementation structure of the communication system shown in FIG. 48.

Please refer to FIG. 55, which is a schematic diagram showing an implementation structure 8517 of the communication system 851 shown in FIG. 48. Please additionally refer to FIGS. 48, 49, 51, 53 and 54. The implementation structure 8517 includes the electronic device 300, a network 610, the message service system 650, the first communication target 511 and a user 910. The message service system 650 includes the first and the second message service devices 660 and 670. The electronic device 300 includes the processing unit 310, the storage unit 320 and the display unit 330. The display unit 330 is coupled to the processor 312, and is controlled by the processor 312 to display a data content of the first application data DA11, and a data content of the second application data DA12.

In some embodiments, any of the electronic devices 400 and 300 is one selected from a group consisting of the first computing device, the first communication device, the first user device, the first mobile device, the first portable device, the first desktop device, the first relatively fixed device, the first fixed device and any combination thereof, is used by the user 910, and includes the input unit 340, a sensing unit 350 and a timer 360. The input unit 340 is coupled to the processor 312, is controlled by the processor 312, and provides a first input data DB11 to the processor 312. The sensing unit 350 is coupled to the processor 312, is controlled by the processor 312, and is configured to sense a variable physical parameter FP11 to provide a sense data DQ11 to the processor 312. For example, the variable physical parameter FP11 is one selected from a group consisting of a variable electrical parameter, a variable mechanic parameter, a variable optical parameter and any combination thereof. The timer 360 is coupled to the processor 312, and is controlled by the processor 312.

For example, the sensing unit 350 includes an image sensing component 351 and a sound sensing component 352. Each of the image sensing component 351 and the sound sensing component 352 is coupled to the processor 312. Under a condition that the user 910 presents or is configured to present an application image, the image sensing component 351 is configured to sense the application image of the user 910 to cause the sense data DQ11 to include an image data. Under a condition that the user 910 makes an application sound, the sound sensing component 352 is configured to sense the application sound, made by the user 910, to cause the sense data DQ11 to include a sound data. For example, the image sensing component 351 is a camera. The sound sensing component 352 is a microphone. The application image is one selected from a group consisting of a face image, a fingerprint, a hand image, a body-portion image and a body image. The application sound is one selected from a group consisting of a voice, a musical sound, and a combination of the voice and the musical sound. For example, the sensing unit 350 includes at least one of the image sensing component 351 and the sound sensing component 352.

The communication interface unit 314 is further coupled to the network 610, and receives an input message QY11 including a second input data DY11. For example, the communication interface unit 314 receives the input message QY11 through the network 610. For example, the communication interface unit 314 receives the input message QY11 from one of the first communication target 511 and the second communication target 521. Each of the first and the second message service devices 660 and 670 is coupled to the network 610, and is included in the message service system 650. The electronic device 300 further includes a bus 380. The bus 380 is coupled to the processor 312, the communication interface unit 314, the timer 360, the storage unit 320, the input unit 340, the display unit 330 and the sensing unit 350. For example, the communication interface unit 314 sends the first electronic data DE11 toward the first communication target 511 through the network 610, and sends the second electronic data DE21 toward the second communication target 521 through the network 610.

Under a condition that the electronic device 300 is applied to the first specific application communication protocol PC11, the first source target identifier HS11 stored in the storage area KS1 serves as a first user identifier configured to identify the user 910. Under a condition that the electronic device 300 is applied to the second specific application communication protocol PC21, the second source target identifier HS21 stored in the storage area KS1 serves as a second user identifier configured to identify the user 910.

In some embodiments, the input unit 340 receives the first user input operation PU81 performed by the user 910. The processor 312 receives the first effective request signal QR1 to cause the electronic device 300 to enter the first data preparation phase UP1 in response to one selected from a group consisting of the first user input operation PU81 associated with the input unit 340 and the user 910, a message reception associated with the input message QY11, a first specific request message QM1 received by the communication interface unit 314, and a first integer overflow associated with the timer 360.

In some embodiments, the communication interface unit 314 receives the first specific request message QM1 including a first specific control instruction. For example, the first specific request message QM1 is a first input request message, so that the first effective request signal QR1 may be the first specific request message QM1. The processor 312 causes the electronic device 300 to enter the first data preparation phase UP1 based on the first specific control instruction. For example, the communication interface unit 314 receives the first specific request message QM1 through the network 610. For example, the communication interface unit 314 receives the first specific request message QM1 from one of the first communication target 511 and the second communication target 521.

In some embodiments, the input unit 340 provides the first effective request signal QR1 to the processor 312 in response to the first user input operation PU81, wherein the first effective request signal QR1 may be the first interrupt request signal. In some embodiments, the timer 360 provides the first effective request signal QR1 to the processor 312 in response to the first integer overflow, wherein the first effective request signal QR1 may be the first interrupt request signal.

Under a condition that the processing unit 310 causes the electronic device 300 to enter the first data preparation phase UP1 in response to the message reception: the second input data DY11 includes the first application data DA11 and the second application data DA12; in the first data preparation phase UP1, the processing unit 310 obtains the first memory address AM11 based on the first communication protocol identifier HP1 obtained from the specific communication protocol identifier group GH1 stored in the storage area KS1, and causes the storage unit 320 to store or write the received first application data DA11 into the first storage space SS11 based on the obtained first memory address AM11; and in the first data preparation phase UP1, the processing unit 310 obtains the second memory address AM12 based on the second communication protocol identifier HP2 obtained from the specific communication protocol identifier group GH1 stored in the storage area KS1, and causes the storage unit 320 to store or write the received second application data DA12 into the second storage space SS12 based on the obtained second memory address AM12.

The first memory address AM11 is one of a first base address and a first end address, so that the first memory location PM11 is one of a first base location and a first end location. The second memory address AM12 is one of a second base address and a second end address, so that the second memory location PM12 is one of a second base location and a second end location.

Under a condition that the processing unit 310 causes the electronic device 300 to enter the first data preparation phase UP1 in response to the first user input operation PU81, the input unit 340 in the first data preparation phase UP1 receives the user input operation PK11 performed by the user 910, the user input operation PK21 performed by the user 910, and the user input operation PW14 performed by the user 910. Therefore, the processing unit 310 obtains the source data DS11 in the first data preparation phase UP1 in response to the user input operation PW14 associated with the input unit 340 and the user 910, determines the first variable data DV11 based on the source data DS11 to cause the storage unit 320 to store the first application data DA11 in the first storage space SS21, and determines the second variable data DV21 based on the source data DS11 to cause the storage unit 320 to store the first application data DA12 in the second storage space SS12.

The processing unit 310 causes the storage unit 320 to prepare the first communication target identifier HT11 in the first storage space SS11 to form the first application data DA11 in the first data preparation phase UP1 in response to the user input operation PK11, and causes the storage unit 320 to prepare the second communication target identifier HT21 in the second storage space SS12 to form the second application data DA12 in the first data preparation phase UP1 in response to the user input operation PK21.

In some embodiments, under a condition that the processing unit 310 finishes preparing the first application data DA11 and the second application data DA12, the input unit 340 receives the second user input operation PU91 performed by the user 910. Therefore, under a condition that the processing unit 310 finishes preparing the first application data DA11 and the second application data DA12, the processing unit 310 receives the second effective request signal QU1 in response to one selected from a group consisting of the second user input operation PU91 associated with the input unit 340 and the user 910, a second specific request message QM2 received by the communication interface unit 314, and a second integer overflow associated with the timer 360.

In some embodiments, the communication interface unit 314 receives the second specific request message QM2 including a second specific control instruction. For example, the second specific request message QM2 is a second input request message, so that the second effective request signal QU1 may be the second specific request message QM2. The processor 312 causes the electronic device 300 to leave the first data preparation phase UP1 to enter the first data transmission phase UT1 based on the second specific control instruction. For example, the communication interface unit 314 receives the second specific request message QM2 through the network 610. For example, the communication interface unit 314 receives the second specific request message QM2 from one of the first communication target 511 and the second communication target 521.

In some embodiments, the input unit 340 provides the second effective request signal QU1 to the processor 312 in response to the second user input operation PU91, wherein the second effective request signal QU1 may be the second interrupt request signal. In some embodiments, the timer 360 provides the second effective request signal QU1 to the processor 312 in response to the second integer overflow, wherein the second effective request signal QU1 may be the second interrupt request signal.

Under a condition that the processing unit 310 causes the electronic device 300 to enter the first data preparation phase UP1 in response to the first user input operation PU81, the processing unit 310 determines the source data DS11 for the specific application function FA1 based on a third application data DA13 provided by the electronic device 300. For example, the third application data DA13 is one selected from a group consisting of the first input data DB11, the stored data DN11, the sense data DQ11, the second input data DY11, and any combination thereof. For example, each of the first desired logical value VK11, the at least a first desired target identifier HK11, the second desired logical value VK21, and the at least a second desired target identifier HK21 is determined based on the third application data DA13, and is desired by the user 910.

The message service system 650 includes a plurality of message service devices 660, 670, . . . respectively support the plurality of different application communication protocols PC11, PC21, . . . . For example, the plurality of message service devices 660, 670, . . . include the first and the second message service devices 660 and 670; and each of the plurality of message service devices 660, 670, . . . is coupled to the communication interface unit 314 and the network 610. For example, the specific application function FA1 is one selected from a group consisting of a service function, a communication function, a control function, a data processing function, a data analysis function, a data conversion function, and any combination thereof. For example, the communication interface unit 314 transmits one selected from a group consisting of the first electronic message QA11, the third electronic message QA31 and the respective fifth electronic message QA51 toward the first message service device 660 through the network 610, and transmits one selected from a group consisting of the seventh electronic message QA71, the ninth electronic message QA91 and the respective eleventh electronic message QAB1 toward the second message service device 670 through the network 610.

In some embodiments, the processing unit 310 determines the source data DS11 in the first data preparation phase UP1 based on one selected from a group consisting of the first input data DB11, the stored data DN11, the sense data DQ11, the second input data DY11, and any combination thereof, and thereby causes the storage unit 320 to separately store the first electronic data DE11 and the second electronic data DE21 in the first and the second storage spaces SS11 and SS12. For example, the first electronic data DE11 is one selected from a group consisting of a service data, an article data, a manufacture data, a material data, a management data, and any combination thereof. For example, the communication interface unit 314 supports the first and the second specific application communication protocols PC11 and PC21. For example, the input unit 340 receives in the first data preparation phase UP1 the user input operation PW14 performed by the user 910, and provides the first input data DB11 to the processing unit 310 in response to the user input operation PW14 associated with the user 910. For example, the processing unit 310 obtains the source data DS11 from the stored data DN11 in response to the user input operation PW14, and causes the storage unit 320 to store in the storage block BS11 the source data DS11 obtained from the stored data DN11.

In some embodiments, the input unit 340 in a second data preparation phase UP2 being after the first data transmission phase UT1 receives a user input operation PW15 performed by the user 910. Therefore, the processing unit 310, in the second data preparation phase UP2 in response to the user input operation PW15 associated with the user 910 and the input unit 340, changes the first application data DA11, stored in the first storage space SS11, into a fourth application data DA14. For example, the processing unit 310 optionally changes a data content of the first electronic data DE11 stored in the first storage space SS11 to form the fourth application data DA14 in response to the user input operation PW15.

The processing unit 310, in response to the user input operation PW15, optionally further changes a logical-value content of the first effective logical value VE11, stored in the first storage space SS11, to form the fourth application data DA14. The processing unit 310, in response to the user input operation PW15, optionally further changes an identifier-set content of the first communication target identifier set WT1, stored in the first storage space SS11, to form the fourth application data DA24.

In some embodiments, under a condition that the first application data DA11 stored in the first storage space SS11 is changed into the fourth application data DA14, the input unit 340 receives a user input operation PW16 performed by the user 910. The processing unit 310 receives a third effective request signal QU2 in response to the user input operation PW16 associated with the user 910 and the input unit 340, and causes the electronic device 300 to enter a second data transmission phase UT2 being after the second data preparation phase UP2 in response to the third effective request signal QU2. For example, the third effective request signal QU2 is a third interrupt request signal.

The processing unit 310 accesses the fourth application data DA14, stored in the first storage space SS11, in the second data transmission phase UT2 based on the first communication protocol identifier HP1 to obtain the fourth application data DA14 from the storage unit 320, and uses the first specific application communication protocol PC11 to perform a fifth data transmission TD5 based on the obtained fourth application data DA14. For example, the processing unit 310 causes the electronic device 300 to enter the second data preparation phase UP2 in response to a fourth effective request signal QR2.

Figure 56:
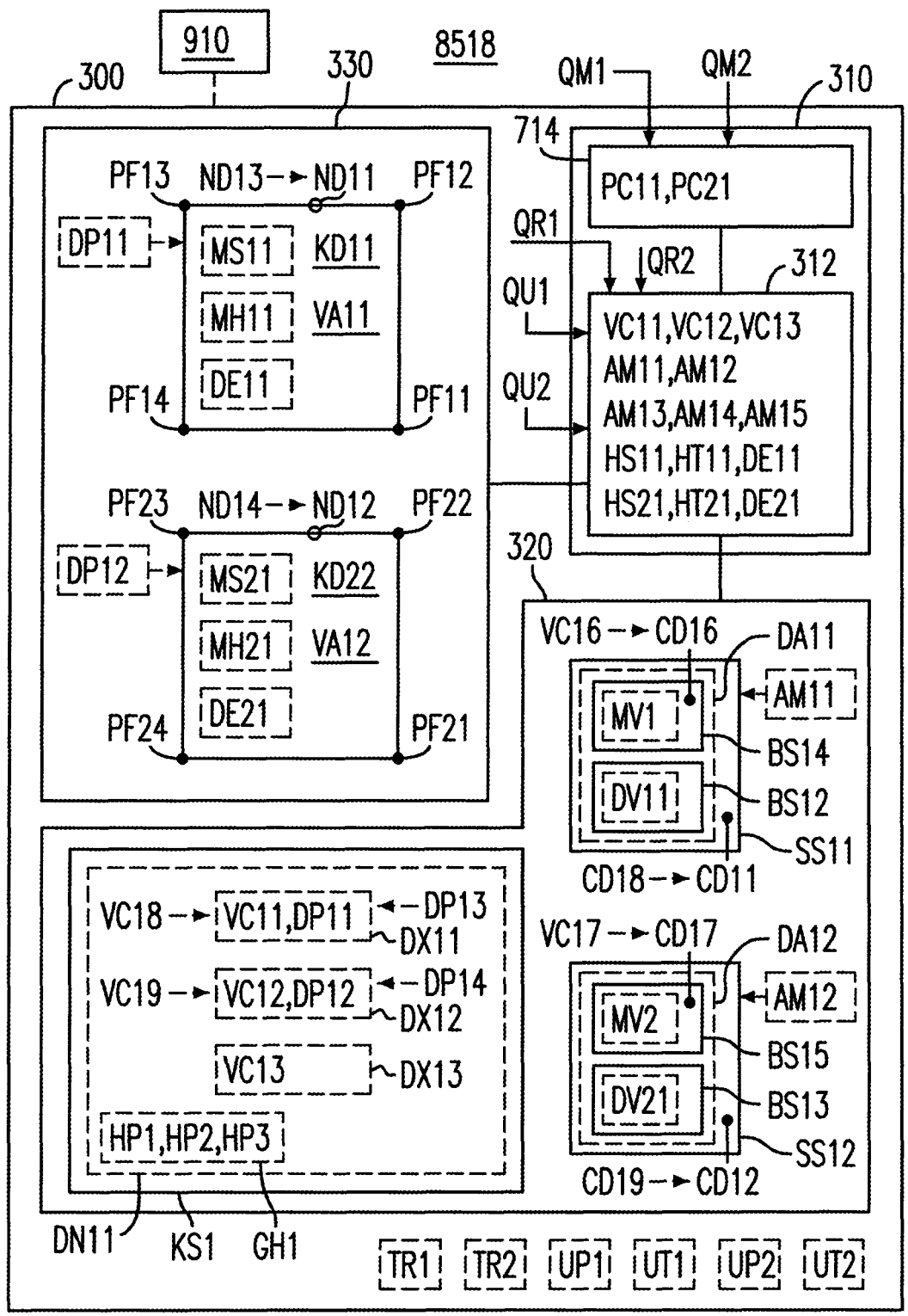
FIG. 56 is a schematic diagram showing an implementation structure of the communication system shown in FIG. 48.

Please refer to FIG. 56, which is a schematic diagram showing an implementation structure 8518 of the communication system 851 shown in FIG. 48. Please additionally refer to FIGS. 48, 49, 51, 53, 54 and 55. The implementation structure 8518 includes the electronic device 300 and the user 910. The electronic device 300 includes the processing unit 310, the storage unit 320 and the display unit 330. The display unit 330 includes the first display area KD11 associated with the first communication protocol identifier HP1, and a second display area KD12 associated with the second communication protocol identifier HP2.

For example, the first display area KD11 includes a first display border ND11 being dependent on a first plurality of display reference locations PF11, PF12, PF13 and PF14, and has a first display area value VA11 being proportional to the first specific data capacity value VC11. The second display area KD12 includes a second display border ND12 being dependent on a second plurality of display reference locations PF21, PF22, PF23 and PF24, and has a second display area value VA12 being proportional to the second specific data capacity value VC12.

The first and the second display areas KD11 and KD12 are different, and are respectively represented by the first display coordinate data DP11 and a second display coordinate data DP12. The first and the second display coordinate data DP11 and DP12 are respectively associated with the first and the second communication protocol identifiers HP1 and HP2. For example, the first display coordinate data DP11 includes a first plurality of screen reference coordinates configured to respectively represent the first plurality of display reference locations PF11, PF12, PF13 and PF14, and is dependent on the first display area value VA11. The second display coordinate data DP12 includes a second plurality of screen reference coordinates configured to respectively represent the second plurality of display reference locations PF21, PF22, PF23 and PF24, and is dependent on the second display area value VA12.

In some embodiments, the processing unit 310 accesses the first specific data capacity value VC11, stored in the storage area KS1, based on the first communication protocol identifier HP1, stored in the storage area KS1, to obtain the first specific data capacity value VC11, and determines or determines beforehand the first display coordinate data DP11 based on the obtained first specific data capacity value VC11. Therefore, the processing unit 310 obtains the first display coordinate data DP11 based on the first communication protocol identifier HP1, stores the first display coordinate data DP11 in the storage area KS1 based on the first communication protocol identifier HP1, and accesses the first display coordinate data DP11 stored in the storage area KS1 based on the first communication protocol identifier HP1.

The processing unit 310 accesses the second specific data capacity value VC12, stored in the storage area KS1 based on the second communication protocol identifier HP2, stored in the storage area KS1, to obtain the second specific data capacity value VC12, and determines or determines beforehand the second display coordinate data DP12 based on the obtained second specific data capacity value VC12. Therefore, the processing unit 310 obtains the second display coordinate data DP12 based on the second communication protocol identifier HP2, stores the second display coordinate data DP12 in the storage area KS1 based on the second communication protocol identifier HP2, and accesses the second display coordinate data DP12 stored in the storage area KS1 based on the second communication protocol identifier HP2.

The processing unit 310 obtains the first display coordinate data DP11 based on the first communication protocol identifier HP1 stored in the storage area KS1, and causes the display unit 330 based on the obtained first display coordinate data DP11 to display on the first display area KD11 the first electronic data DE11, a first source target identification information MS11 representing the first source target identifier HS11, and the first communication target identification information MH11 representing the first communication target identifier HT11. For example, under a condition that the processor 312 receives the first effective request signal QR1, the processor 312 causes the display unit 330 to display the first electronic data DE11, the first source target identification information MS11 and the first communication target identification information MH11 on the first display area KD11 based on the obtained first display coordinate data DP11. For example, the first source target identification information MS11 is the same as or different from the first source target identifier HS11. For example, the first communication target identification information MH11 is the same as or different from the first communication target identifier HT11.

The processing unit 310 obtains the second display coordinate data DP12 based on the second communication protocol identifier HP2 stored in the storage area KS1, and causes the display unit 330 based on the obtained second display coordinate data DP12 to display on the second display area KD12 the second electronic data DE21, a second source target identification information MS21 representing the second source target identifier HS21, and the second communication target identification information MH21 representing the second communication target identifier HT21. For example, under a condition that the processor 312 receives the first effective request signal QR1, the processor 312 causes the display unit 330 to display the second electronic data DE21, the second source target identification information MS21 and the second communication target identification information MH21 on the second display area KD12 based on the obtained second display coordinate data DP12. For example, the second source target identification information MS21 is the same as or different from the second source target identifier HS21. For example, the second communication target identification information MH21 is the same as or different from the second communication target identifier HT21.

In some embodiments, the first storage space SS11 further includes a fourth storage block BS14 configured to contain the first variable target identifier set WV1. For example, the fourth storage block BS14 is different from the second storage block BS12, and has a sixth data capacity CD16 represented by a sixth specific data capacity value VC16. The second storage space SS12 further includes a fifth storage block BS15 configured to contain the second variable target identifier set WV2. For example, the fifth storage block BS15 is different from the third storage block BS13, and has a seventh data capacity CD17 represented by a seventh specific data capacity value VC17.

In some embodiments, the processing unit 310 replaces the first specific data capacity value VC11 stored in the storage area KS1 with an eighth specific data capacity value VC18 being different from the first specific data capacity value VC11 to change the first storage space SS11 from the first data capacity CD11 into an eighth data capacity CD18 represented by the eighth specific data capacity value VC18, and thereby changes at least one of a data capacity of the second storage block BS12 and a data capacity of the fourth storage block BS14. The processing unit 310 replaces the first display coordinate data DP11 stored in the storage area KS1 with a third display coordinate data DP13 being different from the first display coordinate data DP11 to change the first display area KD11 from the first display border ND11 into a third display border ND13 represented by the third display coordinate data DP13. For example, the third display coordinate data DP13 is determined based on the sixth specific data capacity value VC16.

The processing unit 310 replaces the second specific data capacity value VC12 stored in the storage area KS1 with a ninth specific data capacity value VC19 being different from the second specific data capacity value VC12 to change the second storage space SS12 from the second data capacity CD12 into a ninth data capacity CD19 represented by the ninth specific data capacity value VC19, and thereby changes at least one of a data capacity of the third storage block BS13 and a data capacity of the fifth storage block BS15. The processing unit 310 replaces the second display coordinate data DP12 stored in the storage area KS1 with a fourth display coordinate data DP14 being different from the second display coordinate data DP12 to change the second display area KD12 from the second display border ND12 into a fourth display border ND14 represented by the fourth display coordinate data DP14. For example, the fourth display coordinate data DP14 is determined based on the seventh specific data capacity value VC17.

Figure 57:
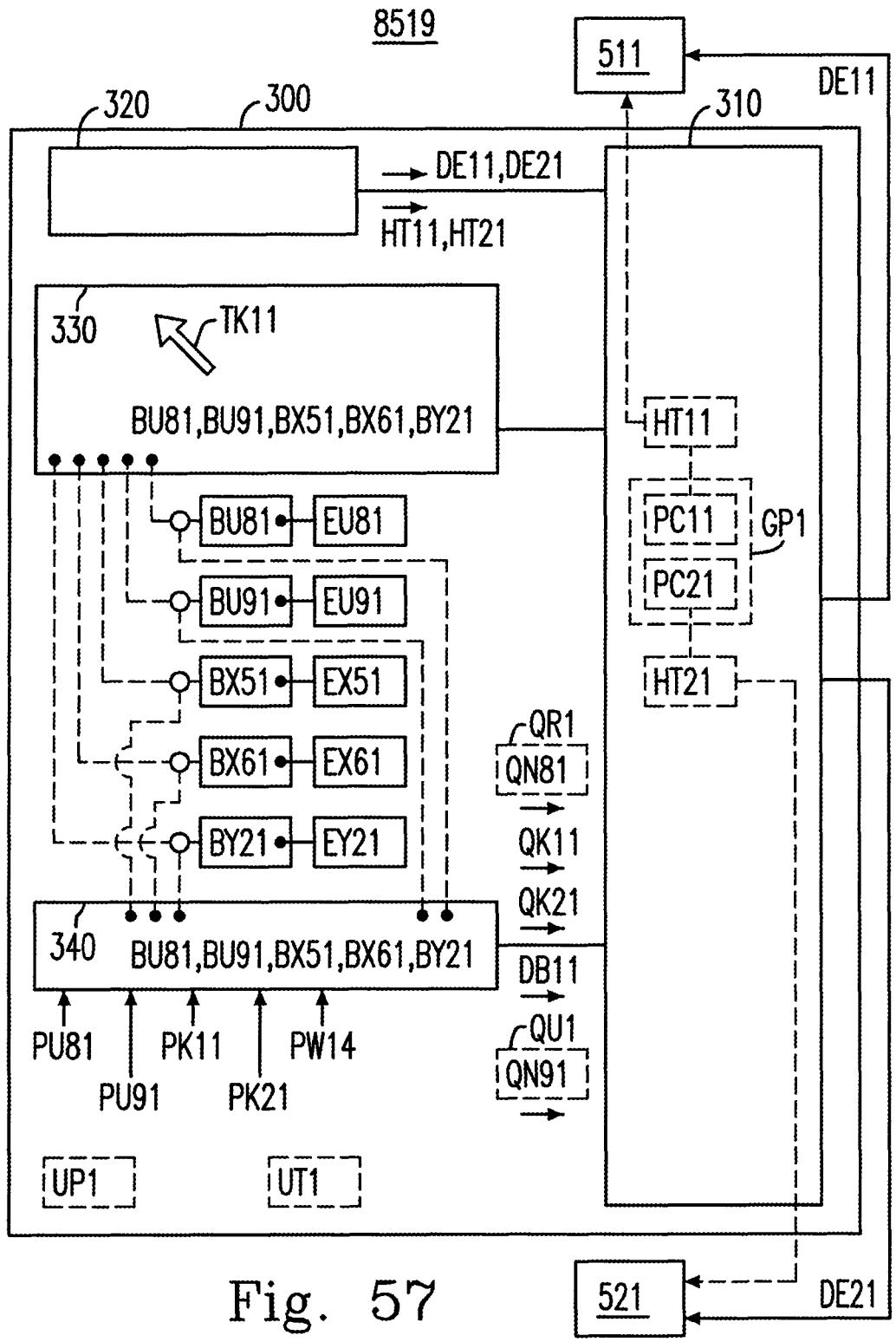
FIG. 57 is a schematic diagram showing an implementation structure of the communication system shown in FIG. 48.

Please refer to FIG. 57, which is a schematic diagram showing an implementation structure 8519 of the communication system 851 shown in FIG. 48. As shown in FIG. 57, the implementation structure 8519 includes the electronic device 300, the first communication target 511 and the second communication target 521. The electronic device 300 includes the processing unit 310, the storage unit 320 coupled to the processing unit 310, the input unit 340 coupled to the processing unit 310, and the display unit 330 coupled to the processing unit 310. Each of the storage unit 320, the input unit 340 and the display unit 330 is controlled by the processing unit 310.

In some embodiments, the electronic device 300 includes a first electricity application target BU81, a second electricity application target BU91, an electricity application target BX51, an electricity application target BX61 and an electricity application target BY21, each of which is coupled to the processing unit 310. The first and the second electricity application targets BU81 and BU91, and the electricity application targets BX51, BX61 and BY21 are respectively located at a spatial location EU81, a spatial location EU91, a spatial location EX51, a spatial location EX61 and a spatial location EY21. For example, one of the input unit 340 and the display unit 330 includes the electricity application target BU81. One of the input unit 340 and the display unit 330 includes the electricity application target BU91. One of the input unit 340 and the display unit 330 includes the electricity application target BX51. One of the input unit 340 and the display unit 330 includes the electricity application target BX61. One of the input unit 340 and the display unit 30 includes the electricity application target BY21.

For example, the spatial locations EU81, EU91, EX51, EX61 and EY21 are different. For example, two selected from a group consisting of the spatial locations EU81, EU91, EX51, EX61 and EY21 are the same. The first and the second electricity application targets BU81 and BU91, and the electricity application targets BX51, BX61 and BY21 respectively have a plurality of electricity application areas, or are respectively formed by the plurality of electricity application areas.

The input unit 340 receives the first user input operation PU81 using the first electricity application target BU81, and provides the first effective request signal QR1 including the first operation request message QN81 to the processing unit 310 in response to the first user input operation PU81. The input unit 340 receives the second user input operation PU91 using the second electricity application target BU91, and provides the second effective request signal QU1 including the second operation request message QN91 to the processing unit 310 in response to the second user input operation PU91.

The input unit 340 receives the user input operation PK11 using the electricity application target BX51, and provides an operation request message QK11 to the processing unit 310 in response to the user input operation PK11. The processing unit 310 performs the data acquisition operation EF11 in response to the operation request message QK11 to obtain the first communication target identifier HT11 to be stored.

The input unit 340 receives the user input operation PK21 using the electricity application target BX61, and provides an operation request message QK21 to the processing unit 310 in response to the user input operation PK21. The processing unit 310 performs the data acquisition operation EF21 in response to the operation request message QK21 to obtain the second communication target identifier HT21 to be stored. The input unit 340 receives the user input operation PW14 using the electricity application target BY21, and provides the first input data DB11 to the processing unit 310 in response to the user input operation PW14. The processing unit 310 obtains the source data DS11 based on the first input data DB11. For example, each of the user input operations PK11 and PK21 is performed by the user 910.

For example, the input unit 340 includes one selected from a group consisting of the first and the second electricity application targets BU81 and BU91, the electricity application targets BX51, BX61 and BY21, and any combination thereof. Any of the first and the second electricity application targets BU81 and BU91, and the electricity application targets BX51, BX61 and BY2 is a sensing target, wherein the sensing target includes one selected from a group consisting of a sensing area, a push button and a touch point.

The processing unit 310 causes the electronic device 300 to enter the first data preparation phase UP1 by means of the first electricity application target BU81. The processing unit 310 causes the electronic device 300 to leave the first data preparation phase UP1 to enter the first data transmission phase UT1 by means of the second electricity application target BU91. The processing unit 310 obtains the first communication target identifier HT11 to be stored by means of the electricity application target BX51. The processing unit 310 obtains the second communication target identifier HT21 to be stored by means of the electricity application target BX61. The processing unit 310 obtains the first input data DB11 by means of the electricity application target BY21.

For example, the display unit 330 includes one selected from a group consisting of the first and the second electricity application targets BU81 and BU91, the electricity application targets BX51, BX61 and BY21, and any combination thereof. For example, the processing unit 310 is configured to cause the display unit 330 to display the first and the second electricity application targets BU81 and BU91 at the same time or for different times. For example, the processing unit 310 is configured to cause the display unit 330 to display the electricity application targets BX51, BX61 and BY21 at the same time or for different times. Any of the first and the second electricity application targets BU81 and BU91, and the electricity application targets BX51, BX61 and BY21 is a display target, wherein the display target includes one selected from a group consisting of a display area, an icon and a display action item.

The first electricity application target BU81 is associated with at least one selected from a group consisting of the stored protocol identifier group identifier HY81, the stored first communication protocol identifier HP1, the stored second communication protocol identifier HP2, the stored first communication target identifier HT11, the stored second communication target identifier HT21, the first, the second, the third, the fourth and the fifth memory addresses AM11, AM12, AM13, AM14 and AM15, the stored target identifier set identifier HG11 and the stored target identifier set identifier HG21. The second electricity application target BU91 is associated with at least one selected from a group consisting of the stored protocol identifier group identifier HY81, the stored first communication protocol identifier HP1, the stored second communication protocol identifier HP2, the first memory address AM11 and the second memory address AM12.

The electricity application target BX51 is associated with at least one selected from a group consisting of the stored first communication protocol identifier HP1, the first memory address AM11 and the application memory address AE11. The electricity application target BX61 is associated with at least one selected from a group consisting of the stored second communication protocol identifier HP2, the second memory address AM12 and the application memory address AE21. The electricity application target BY21 is associated with the first memory address AM11 and the second memory address AM12, and is used to obtain the first input data DB11.

In some embodiments, the processing unit 310 is configured to cause the display unit 330 to display a selection tool TK11. The first user input operation PU81 uses or selects the first electricity application target BU81 displayed by the display unit 330 by means of the selection tool TK11 to cause the input unit 340 to provide the first operation request message QN81 to the processing unit 310. The second user input operation PU91 uses or selects the second electricity application target BU91 displayed by the display unit 330 by means of the selection tool TK11 to cause the input unit 340 to provide the second operation request message QN91 to the processing unit 310.

The user input operation PK11 uses the electricity application target BX51 displayed by the display unit 330 by means of the selection tool TK11 to cause the processing unit 310 to obtain the first communication target identifier HT11 to be stored. The user input operation PK21 uses the electricity application target BX61 displayed by the display unit 330 by means of the selection tool TK11 to cause the processing unit 310 to obtain the second communication target identifier HT21 to be stored. The user input operation PW14 uses the electricity application target BY21 displayed by the display unit 330 by means of the selection tool TK11 to cause the processing unit 310 to obtain the first input data DB11. For example, the selection tool TK11 is a cursor.

In some embodiments, when the first specific application communication protocol PC11 is the email communication protocol, the email communication protocol may be a simple mail transfer protocol (SMTP), and the fourth specific application communication protocol PC41 may be one of a POP3 email protocol and an internet message access protocol (IMAP). When the first specific application communication protocol PC11 is the short-message service communication protocol, the fourth specific application communication protocol PC41 may be the short-message service communication protocol. When the first specific application communication protocol PC11 is the instant-messaging communication protocol, the instant-messaging communication protocol may be one of an instant messaging and presence protocol (IMPP) and an extensible messaging and presence protocol (XMPP), and the fourth specific application communication protocol PC41 may be one of the instant messaging and presence protocol (IMPP) and the extensible messaging and presence protocol (XMPP). When the first specific application communication protocol PC11 is the multimedia-message service communication protocol, the multimedia-message service communication protocol may be a MM1 multimedia-message service protocol, and the fourth specific application communication protocol PC41 may be the MM1 multimedia-message service protocol.

While the disclosure has been described in terms of what is presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for sending electronic data, comprising steps of:
   providing an electronic device including an electricity-using target and a processing unit coupled to the electricity-using target, wherein the electricity-using target is one of a display target and a sensing target, the display target includes an icon, and the sensing target includes a push button;
   storing a first communication target identifier used to identify a first communication target under a first specific application communication protocol, and a second communication target identifier used to identify a second communication target under a second specific application communication protocol being different from the first specific application communication protocol;
   causing the processing unit to receive a specific request signal by means of the electricity-using target in response to a first user input operation using the electricity-using target;
   accessing the first and the second communication target identifiers by using the processing unit in response to the specific request signal;
   sending the electronic data toward the first communication target by using the electronic device based on the accessed first communication target identifier and the first specific application communication protocol; and
   sending the electronic data toward the second communication target by using the electronic device based on the accessed second communication target identifier and the second specific application communication protocol.

2. The method according to claim 1, wherein:
the method further comprises steps of:
   providing a volatile memory space;
   providing an application memory location identified based on an application memory address, wherein the application memory address is determined according to a communication protocol identifier used to identify the first specific application communication protocol;
   storing a communication target identifier set in the volatile memory space;
   storing a target identifier set identifier used to identify the communication target identifier set, wherein the target identifier set identifier is stored at the application memory location based on the application memory address;
   obtaining the communication protocol identifier by using the processing unit in response to the specific request signal;
   obtaining the application memory address by using the processing unit based on the obtained communication protocol identifier;
   accessing the target identifier set identifier stored at the application memory location by using the processing unit based on the obtained application memory address; and
   under a condition that the communication target identifier set consists of a plurality of communication target identifiers including the stored first communication target identifier and the plurality of communication target identifiers are used to respectively identify a plurality of communication targets, accessing the plurality of communication target identifiers by using the processing unit based on the accessed target identifier set identifier; and
the step of sending the electronic data toward the first communication target is included in a step, included in the method, of using the first specific application communication protocol to send the electronic data toward each of the plurality of communication targets by using the electronic device based on the obtained communication protocol identifier and the accessed plurality of communication target identifiers.

3. The method according to claim 1, wherein:
the electricity-using target is formed by a first electricity application area, and is associated with a first communication protocol identifier used to identify the first specific application communication protocol;
the first specific application communication protocol is one selected from a plurality of different application communication protocols;
the first communication protocol identifier belongs to a communication protocol identifier group identified by a protocol identifier group identifier; and
the method further comprises steps of:
   storing the communication protocol identifier group and the protocol identifier group identifier associated with the electricity-using target;
   accessing the stored protocol identifier group identifier by using the processing unit in response to the specific request signal; and
obtaining the stored first communication protocol identifier from the stored communication protocol identifier group by using the processing unit based on the accessed protocol identifier group identifier.

4. The method according to claim 3, wherein:
the stored communication protocol identifier group includes a second communication protocol identifier used to identify the second specific application communication protocol selected from the plurality of different application communication protocols;
the stored second communication target identifier is associated with the second communication protocol identifier;
the method further comprises a step of providing a volatile memory space which includes a first application memory location identified based on a first application memory address, and a second application memory location identified based on a second application memory address, wherein the first and the second application memory addresses are determined according to the stored first communication protocol identifier and the second communication protocol identifier respectively;
the electronic device includes a first electricity application target formed by a second electricity application area, and a second electricity application target formed by a third electricity application area, wherein each of the first and the second electricity application targets is coupled to the processing unit, and the second electricity application target is the same as or different from the first electricity application target;

under a condition that the electricity-using target is the display target, one of the first and the second electricity application targets is the display target;

under a condition that the electricity-using target is the sensing target, one of the first and the second electricity application targets is the sensing target; and each of the first and the second electricity application targets is associated with the stored protocol identifier group identifier.

5. The method according to claim 4, wherein:

the first user input operation is one of a second user input operation and a third user input operation; and the specific request signal includes one of a first operation request message and a second operation request message;

the method further comprises steps of:
receiving the second user input operation;
providing the first operation request message in response to the second user input operation using the first electricity application target;
receiving the third user input operation after the second user input operation;
providing the second operation request message in response to the third user input operation using the second electricity application target;
entering a data preparation phase in response to the first operation request message;
preparing the electronic data in the data preparation phase;
reading the stored protocol identifier group identifier in the data preparation phase;
reading the stored first and the stored second communication protocol identifiers belonging to the stored communication protocol identifier group based on the read protocol identifier group identifier;
receiving a fourth user input operation in the data preparation phase;
performing a first data acquisition operation in response to the fourth user input operation to obtain the first communication target identifier to be stored;
fetching the first application memory address in the data preparation phase based on the read first communication protocol identifier;
receiving a fifth user input operation in the data preparation phase;
performing a second data acquisition operation in response to the fifth user input operation to obtain the second communication target identifier to be stored;
fetching the second application memory address in the data preparation phase based on the read second communication protocol identifier; and
leaving the data preparation phase to enter a data transmission phase in response to the second operation request message.

6. The method according to claim 5, wherein:
the step of storing the first and the second communication target identifiers comprises sub-steps of:
storing the obtained first communication target identifier at the first application memory location in the data preparation phase based on the fetched first application memory address; and
storing the obtained second communication target identifier at the second application memory location in the data preparation phase based on the fetched second application memory address;

the step of preparing the electronic data comprises sub-steps of:
receiving a sixth user input operation before the third user input operation in the data preparation phase to provide an input data; and
in response to obtaining the input data, storing the electronic data determined based on the obtained input data, wherein the second electricity application target is further associated with the stored electronic data;

the step of accessing the stored protocol identifier group identifier by using the electricity-using target comprises a sub-step of accessing the stored protocol identifier group identifier in the data transmission phase; and the step of obtaining the stored first communication protocol identifier from the stored communication protocol identifier group comprises a sub-step of accessing the stored first communication protocol identifier belonging to the stored communication protocol identifier group in the data transmission phase based on the accessed protocol identifier group identifier to obtain the stored first communication protocol identifier from the stored communication protocol identifier group.

7. The method according to claim 6, wherein:
the method further comprises steps of:
accessing the stored second communication protocol identifier belonging to the stored communication protocol identifier group in the data transmission phase based on the accessed protocol identifier group identifier; and
accessing the stored electronic data in the data transmission phase;

the step of accessing the first and the second communication target identifiers comprises sub-steps of:
obtaining the first application memory address in the data transmission phase based on the obtained first communication protocol identifier;
accessing the first communication target identifier stored at the first application memory location based on the obtained first application memory address;
obtaining the second application memory address in the data transmission phase based on the accessed second communication protocol identifier; and
accessing the second communication target identifier stored at the second application memory location based on the obtained second application memory address;

the step of sending the electronic data toward the first communication target comprises a sub-step of using the first specific application communication protocol to send the accessed electronic data toward the first communication target in the data transmission phase based on the accessed electronic data, the obtained first communication protocol identifier and the accessed first communication target identifier;

the step of sending the electronic data toward the second communication target comprises a sub-step of using the second specific application communication protocol to send the accessed electronic data toward the second communication target in the data transmission phase based on the accessed electronic data, the accessed second communication protocol identifier and the accessed second communication target identifier;

the plurality of different application communication protocols are selected from a group consisting of an email communication protocol, an instant-messaging communication protocol, a short-message service communication protocol and a multimedia-message service communication protocol;

the first communication target identifier is the same as or different from the second communication target identifier; and the first communication target is the same as or different from the second communication target.

8. An electronic device for sending electronic data, comprising:

an electricity-using target being one of a display target and a sensing target, wherein the display target includes an icon, and the sensing target includes one of a push button and a touch point;

a storage unit storing a first communication target identifier used to identify a first communication target under a first specific application communication protocol, and a second communication target identifier used to identify a second communication target under a second specific application communication protocol being different from the first specific application communication protocol; and a processing unit coupled to the electricity-using target and the storage unit, configured to receive a specific request signal by means of the electricity-using target in response to a first user input operation using the electricity-using target, accessing the first and the second communication target identifiers in response to the specific request signal, sending the electronic data toward the first communication target based on the accessed first communication target identifier and the first specific application communication protocol, and sending the electronic data toward the second communication target based on the accessed second communication target identifier and the second specific application communication protocol.

9. The electronic device according to claim 8, wherein:

the storage unit has a volatile memory space coupled to the processing unit, and an application memory location identified based on an application memory address, wherein the application memory address is determined according to a communication protocol identifier used to identify the first specific application communication protocol;

the storage unit further stores a target identifier set identifier and a communication target identifier set identified by the target identifier set identifier, wherein the target identifier set identifier is stored at the application memory location based on the application memory address, and the communication target identifier set is stored in the volatile memory space;

the processing unit obtains the communication protocol identifier in response to the specific request signal, obtains the application memory address based on the obtained communication protocol identifier, and accesses the target identifier set identifier stored at the application memory location based on the obtained application memory address;

under a condition that the communication target identifier set consists of a plurality of communication target identifiers including the stored first communication target identifier and the plurality of communication target identifiers are used to respectively identify a plurality of communication targets, the processing unit accesses the plurality of communication target identifiers based on the accessed target identifier set identifier; and the processing unit uses the first specific application communication protocol to send the electronic data toward each of the plurality of communication targets based on the obtained communication protocol identifier and the accessed plurality of communication target identifiers.

10. The electronic device according to claim 8, wherein:

the processing unit accesses the stored first communication target identifier and the stored second communication target identifier in response to the specific request signal;

the electricity-using target is formed by a first electricity application area, and is associated with a first communication protocol identifier used to identify the first specific application communication protocol;

the first specific application communication protocol is selected from a plurality of different application communication protocols;

the first communication protocol identifier belongs to a communication protocol identifier group identified by a protocol identifier group identifier;

the storage unit further stores the communication protocol identifier group and the protocol identifier group identifier associated with the electricity-using target; and the processing unit accesses the stored protocol identifier group identifier in response to the specific request signal, and obtains the stored first communication protocol identifier from the stored communication protocol identifier group based on the accessed protocol identifier group identifier.

11. The electronic device according to claim 10, further comprising an input unit coupled to the processing unit and a display unit coupled to the processing unit, wherein:

the storage unit has a volatile memory space coupled to the processing unit;

one of the input unit and the display unit includes a first electricity application target coupled to the processing unit, wherein the first electricity application target is formed by a second electricity application area;

one of the input unit and the display unit includes a second electricity application target coupled to the processing unit, wherein the second electricity application target is formed by a third electricity application area and is the same as or different from the first electricity application target;

under a condition that the electricity-using target is the display target, the display unit includes the display target being one of the first and the second electricity application targets;

under a condition that the electricity-using target is the sensing target, the input unit includes the sensing target being one of the first and the second electricity application targets;

the stored communication protocol identifier group includes a second communication protocol identifier used to identify the second specific application communication protocol, wherein the second specific application communication protocol is selected from the plurality of different application communication protocols;

the stored second communication target identifier is associated with the second communication protocol identifier;
the storage unit has a first application memory location identified based on a first application memory address, and a second application memory location identified based on a second application memory address, wherein each of the first and the second application memory locations is disposed in the volatile memory space, the first application memory address is determined according to the stored first communication protocol identifier, and the second application memory address is determined according to the second communication protocol identifier; and
each of the first and the second electricity application targets is associated with the stored protocol identifier group identifier.

12. The electronic device according to claim 11, wherein:
the first user input operation is one of a second user input operation and a third user input operation;
the specific request signal includes one of a first operation request message and a second operation request message;
the input unit receives the second user input operation, and provides the first operation request message to the processing unit in response to the second user input operation using the first electricity application target;
the input unit receives the third user input operation after the second user input operation, and provides the second operation request message to the processing unit in response to the third user input operation using the second electricity application target;
the processing unit causes the electronic device to enter a data preparation phase in response to the first operation request message, and causes the storage unit to prepare the electronic data in the data preparation phase;
the processing unit reads the stored protocol identifier group identifier in the data preparation phase, and reads the stored first and the stored second communication protocol identifiers belonging to the stored communication protocol identifier group based on the read protocol identifier group identifier;
the input unit receives a fourth user input operation in the data preparation phase;
the processing unit performs a first data acquisition operation in response to the fourth user input operation to obtain the first communication target identifier to be stored;
the processing unit fetches the first application memory address in the data preparation phase based on the read first communication protocol identifier, and causes the storage unit to store the obtained first communication target identifier at the first application memory location based on the fetched first application memory address;
the input unit receives a fifth user input operation in the data preparation phase;
the processing unit performs a second data acquisition operation in response to the fifth user input operation to obtain the second communication target identifier to be stored;
the processing unit fetches the second application memory address in the data preparation phase based on the read second communication protocol identifier, and causes the storage unit to store the obtained second communication target identifier at the second application memory location based on the fetched second application memory address;

the input unit receives a sixth user input operation before the third user input operation in the data preparation phase to provide an input data to the processing unit; and
the processing unit, in response to obtaining the input data, causes the storage unit to store the electronic data determined based on the obtained input data, wherein the second electricity application target is further associated with the stored electronic data.

13. The electronic device according to claim 12, wherein:
the processing unit causes the electronic device to leave the data preparation phase to enter a data transmission phase in response to the second operation request message, and accesses the stored protocol identifier group identifier in the data transmission phase;
the processing unit accesses the stored first communication protocol identifier that belongs to the stored communication protocol identifier group in the data transmission phase based on the accessed protocol identifier group identifier to obtain the stored first communication protocol identifier from the stored communication protocol identifier group;
the processing unit accesses the stored second communication protocol identifier that belongs to the stored communication protocol identifier group in the data transmission phase based on the accessed protocol identifier group identifier;
the processing unit accesses the stored electronic data in the data transmission phase;
the processing unit obtains the first application memory address in the data transmission phase based on the obtained first communication protocol identifier, accesses the first communication target identifier stored at the first application memory location based on the obtained first application memory address, and uses the first specific application communication protocol to send the accessed electronic data toward the first communication target in the data transmission phase based on the accessed electronic data, the obtained first communication protocol identifier and the accessed first communication target identifier;
the processing unit obtains the second application memory address in the data transmission phase based on the accessed second communication protocol identifier, accesses the second communication target identifier stored at the second application memory location based on the obtained second application memory address, and uses the second specific application communication protocol to send the accessed electronic data toward the second communication target in the data transmission phase based on the accessed electronic data, the accessed second communication protocol identifier and the accessed second communication target identifier;
the plurality of different application communication protocols are selected from a group consisting of an email communication protocol, an instant-messaging communication protocol, a short-message service communication protocol and a multimedia-message service communication protocol;
the first communication target identifier is the same as or different from the second communication target identifier; and
the first communication target is the same as or different from the second communication target.

14. A method for sending electronic data, comprising steps of:
  providing an electronic device including an electricity-using target and a processing unit coupled to the electricity-using target, wherein the electricity-using target is one of a display target and a sensing target, the display target includes an icon, and the sensing target includes a touch point;
  storing a first communication target identifier used to identify a first communication target under a first specific application communication protocol, and a second communication target identifier used to identify a second communication target under a second specific application communication protocol being different from the first specific application communication protocol;
  causing the processing unit to receive a specific request signal by means of the electricity-using target in response to a first user input operation using the electricity-using target;
  accessing the first and the second communication target identifiers by using the processing unit in response to the specific request signal;
  sending the electronic data toward the first communication target by using the electronic device based on the accessed first communication target identifier and the first specific application communication protocol; and
  sending the electronic data toward the second communication target by using the electronic device based on the accessed second communication target identifier and the second specific application communication protocol.

15. The method according to claim 14, wherein:
the method further comprises steps of:
  providing a volatile memory space;
  providing an application memory location identified based on an application memory address, wherein the application memory address is determined according to a communication protocol identifier used to identify the first specific application communication protocol;
  storing a communication target identifier set in the volatile memory space;
  storing a target identifier set identifier used to identify the communication target identifier set, wherein the target identifier set identifier is stored at the application memory location based on the application memory address;
  obtaining the communication protocol identifier by using the processing unit in response to the specific request signal;
  obtaining the application memory address by using the processing unit based on the obtained communication protocol identifier;
  accessing the target identifier set identifier stored at the application memory location by using the processing unit based on the obtained application memory address; and
  under a condition that the communication target identifier set consists of a plurality of communication target identifiers including the stored first communication target identifier and the plurality of communication target identifiers are used to respectively identify a plurality of communication targets, accessing the plurality of communication target identifiers by using the processing unit based on the accessed target identifier set identifier; and
  the step of sending the electronic data toward the first communication target is included in a step, included in the method, of using the first specific application communication protocol to send the electronic data toward each of the plurality of communication targets by using the electronic device based on the obtained communication protocol identifier and the accessed plurality of communication target identifiers.

16. The method according to claim 14, wherein:
the electricity-using target is formed by a first electricity application area, and is associated with a first communication protocol identifier used to identify the first specific application communication protocol;
the first specific application communication protocol is selected from a plurality of different application communication protocols;
the first communication protocol identifier belongs to a communication protocol identifier group identified by a protocol identifier group identifier; and
the method further comprises steps of:
  storing the communication protocol identifier group and the protocol identifier group identifier associated with the electricity-using target;
  accessing the stored protocol identifier group identifier by using target using the processing unit in response to the specific request signal; and
  obtaining the stored first communication protocol identifier from the stored communication protocol identifier group by using the processing unit based on the accessed protocol identifier group identifier.

17. The method according to claim 16, wherein:
the stored communication protocol identifier group includes a second communication protocol identifier used to identify the second specific application communication protocol selected from the plurality of different application communication protocols;
the stored second communication target identifier is associated with the second communication protocol identifier;
the method further comprises a step of providing a volatile memory space which includes a first application memory location identified based on a first application memory address, and a second application memory location identified based on a second application memory address, wherein the first application memory address is determined according to the stored first communication protocol identifier, and the second application memory address is determined according to the second communication protocol identifier;
the electronic device includes a first electricity application target formed by a second electricity application area, and a second electricity application target formed by a third electricity application area, wherein each of the first and the second electricity application targets is coupled to the processing unit, and the second electricity application target is the same as or different from the first electricity application target;
under a condition that the electricity-using target is the display target, one of the first and the second electricity application targets is the display target;
under a condition that the electricity-using target is the sensing target, one of the first and the second electricity application targets is the sensing target; and
each of the first and the second electricity application targets is associated with the stored protocol identifier group identifier.

18. The method according to claim 17, wherein:

the first user input operation is one of a second user input operation and a third user input operation; and the specific request signal includes one of a first operation request message and a second operation request message;

the method further comprises steps of:
- receiving the second user input operation;
- providing the first operation request message in response to the second user input operation using the first electricity application target;
- receiving the third user input operation after the second user input operation;
- providing the second operation request message in response to the third user input operation using the second electricity application target;
- entering a data preparation phase in response to the first operation request message;
- preparing the electronic data in the data preparation phase;
- reading the stored protocol identifier group identifier in the data preparation phase;
- reading the stored first and the stored second communication protocol identifiers belonging to the stored communication protocol identifier group based on the read protocol identifier group identifier;
- receiving a fourth user input operation in the data preparation phase;
- performing a first data acquisition operation in response to the fourth user input operation to obtain the first communication target identifier to be stored;
- fetching the first application memory address in the data preparation phase based on the read first communication protocol identifier;
- receiving a fifth user input operation in the data preparation phase;
- performing a second data acquisition operation in response to the fifth user input operation to obtain the second communication target identifier to be stored;
- fetching the second application memory address in the data preparation phase based on the read second communication protocol identifier; and
- leaving the data preparation phase to enter a data transmission phase in response to the second operation request message.

19. The method according to claim 18, wherein:

the step of storing the first and the second communication target identifiers comprises sub-steps of:
- storing the obtained first communication target identifier at the first application memory location in the data preparation phase based on the fetched first application memory address; and
- storing the obtained second communication target identifier at the second application memory location in the data preparation phase based on the fetched second application memory address;

the step of preparing the electronic data comprises sub-steps of:
- receiving a sixth user input operation before the third user input operation in the data preparation phase to provide an input data; and
- in response to obtaining the input data, storing the electronic data determined based on the obtained input data, wherein the second electricity application target is further associated with the stored electronic data;

the step of accessing the stored protocol identifier group identifier by means of the electricity-using target comprises a sub-step of accessing the stored protocol identifier group identifier in the data transmission phase; and the step of obtaining the stored first communication protocol identifier from the stored communication protocol identifier group comprises a sub-step of accessing the stored first communication protocol identifier belonging to the stored communication protocol identifier group in the data transmission phase based on the accessed protocol identifier group identifier to obtain the stored first communication protocol identifier from the stored communication protocol identifier group.

20. The method according to claim 19, wherein:

the method further comprises steps of:
- accessing the stored second communication protocol identifier belonging to the stored communication protocol identifier group in the data transmission phase based on the accessed protocol identifier group identifier; and
- accessing the stored electronic data in the data transmission phase;

the step of accessing the first and the second communication target identifiers comprises sub-steps of:
- obtaining the first application memory address in the data transmission phase based on the obtained first communication protocol identifier;
- accessing the first communication target identifier stored at the first application memory location based on the obtained first application memory address;
- obtaining the second application memory address in the data transmission phase based on the accessed second communication protocol identifier; and
- accessing the second communication target identifier stored at the second application memory location based on the obtained second application memory address;

the step of sending the electronic data toward the first communication target comprises a sub-step of using the first specific application communication protocol to send the accessed electronic data toward the first communication target in the data transmission phase based on the accessed electronic data, the obtained first communication protocol identifier and the accessed first communication target identifier;

the step of sending the electronic data toward the second communication target comprises a sub-step of using the second specific application communication protocol to send the accessed electronic data toward the second communication target in the data transmission phase based on the accessed electronic data, the accessed second communication protocol identifier and the accessed second communication target identifier;

the plurality of different application communication protocols are selected from a group consisting of an email communication protocol, an instant-messaging communication protocol, a short-message service communication protocol and a multimedia-message service communication protocol;

the first communication target identifier is the same as or different from the second communication target identifier; and the first communication target is the same as or different from the second communication target.

* * * * *